United States Patent [19]

Loshbough

[11] 4,310,893
[45] Jan. 12, 1982

[54] DIGITAL SCALE

[75] Inventor: Richard C. Loshbough, Westerville, Ohio

[73] Assignee: Reliance Electric Company, Cleveland, Ohio

[21] Appl. No.: 103,093

[22] Filed: Dec. 12, 1979

[51] Int. Cl.³ ............... G01G 19/413; G01G 23/365; G06F 15/20
[52] U.S. Cl. ..................... 364/567; 177/25; 177/50; 364/466; 364/571
[58] Field of Search ......... 364/466, 567, 571; 177/25, DIG. 3, 50

[56] References Cited

U.S. PATENT DOCUMENTS

| | | | |
|---|---|---|---|
| 3,777,828 | 12/1973 | Dietmeyer | 177/DIG. 3 |
| 4,055,748 | 10/1977 | Boshinski et al. | 364/466 |
| 4,080,657 | 3/1978 | Caldicott et al. | 364/567 |
| 4,091,449 | 5/1978 | Meckstroth et al. | 364/466 |
| 4,155,411 | 5/1979 | Weaver | 364/567 X |

*Primary Examiner*—Felix D. Gruber
*Attorney, Agent, or Firm*—Roy F. Hollander

[57] ABSTRACT

This invention relates to an improved digital scale arrangement which employs apparatus for generating an electrical analog signal representing the weight on the scale mechanism. The analog signal is then converted to a digital representation of the weight on the scale under control of a microprocessor or microcomputer. The microcomputer then further processes the digital representation and causes it to be displayed. In accordance with the present invention, a fully automatically operating arrangement is provided for verifying the correct operation of the analog portion, the converting portion, and the digital portion of the arrangement. In addition, the arrangement is also employed to automatically correct the span of the scale under control of the results of the verification operation.

19 Claims, 35 Drawing Figures

DIGITAL SCALE

BACKGROUND OF THE INVENTION

1. Field of Invention

This invention relates to weight measuring apparatus and more particularly the invention relates to a digital weight scale system comprising a scale mechanism apparatus for generating an electrical analog signal representing the weight on the scale and an analog to digital converting arrangement, a microprocessor and a display arrangement.

2. Description of the Prior Art

Weighing and computing scales must meet several stringent requirements for performance and cost. The scales must be accurate enough to satisfy public weights and measures authorities yet be available at reasonably affordable prices and perform their operations within a period of time which is convenient for sales transactions. In the past digital weighing and computing scales have typically been provided with the above types of apparatus and equipment and have performed the various functions required. In addition the scales have been provided with various control and protective features and apparatus to insure that the scale provides accurate indications of weights and at the same time cannot be improperly manipulated by an attendant to display an improper weight. For example, U.S. Pat. No. 3,709,309 granted to Williams Jr. et al Jan. 9, 1973 and Pat. No. 3,986,012 granted to Loshbough et al on Oct. 12, 1976 describe arrangements for accurately maintaining a scale at a zero indication when no weight is on the scale platform or platter. Pat. No. 4,159,521 granted to Hall et al on June 26, 1979 discloses various control arrangements to prevent improper operation of the scale in addition to the zero arrangement. Pat. No. 4,204,197 granted to Loshbough et al on May 20, 1980 shows still different arrangement for improving the operation of scales. Pat. No. 3,439,524 granted to Rogers on Apr. 22, 1969 shows an arrangement for compensating for the weight displayed by a scale at a relatively high percentage of the scale capacity. This arrangement however provides accurate correction at only such high weight and the correction introduce greater and greater errors the farther the weight is from the corrected weight.

SUMMARY OF THE INVENTION

There is therefore a need for a digital weighing scale having a reliable overall and combined verification arrangement which is operative independently of any action required by a scale attendant. In addition it is desirable that the arrangement be capable of making minor corrections to the scale throughout its entire operating range. These corrections are required on occasion due to variations in temperature or pressure of the environments of the scale, due to wear and aging of scale components and electronic equipment, and also due to minor variations in voltage and power supply as well as vibrations and other spurious signals and effects. In accordance with the present invention a span control factor is stored which when multiplied by each weight determination accurately corrects the weight determination. In addition an automatic verification arrangement is provided which is rendered operative after each weight operation.

In accordance with an exemplary embodiment of the invention, an analog electrical signal of accurately predetermined magnitude is introduced into the electrical system after each completed weighing operation and the indication from the scale is zero and the scale platform or platter is at rest. That is a no motion signal or condition is indicated. This verification signal is then processed by the entire analog and digital equipment of the scale and compared with a previously stored reference digital value corresponding to the correct operation of the electrical equipment in response to the automatic verification signal. If the response to the automatic verification analog signal and the stored reference signal are within predetermined small tolerance limits then the automatic verification test is considered successful and the scale is thereafter in condition for another weighing operation. If however, the response to the automatic verification signal and the stored reference signal are not within the prescribed small tolerance but are within a wider tolerance, then the stored span control value is modified under control of the difference between the response to the automatic verification signal and the stored signal value so that the next response to the automatic verification signal by the electrical equipment will produce a weight value closer to the stored reference value. This process is then repeated until the response to the automatic verification signal falls within the narrow tolerance limits of the stored signal value. During the time of these operations, an automatic verification signal may be displayed by the display equipment instead of a weight signal. If the response to the automatic verification signal falls outside the wide tolerance limits from the stored signal, then an error signal will be displayed and the further operation of the scale prevented until at least power is removed and restored thus clearly calling attention of some difficulty to the scale attendant.

The Weights and Measures Bureau or authorities in some countries limit the total amount of correction that may be made to a span multiplication factor to improve the accuracy of the scale. Accordingly in the exemplary embodiment of the invention described herein provision has been made to prevent the changing of the span multiplier factor more than a predetermined amount.

In accordance with the present invention the span control multiplying factor may be changed in fixed steps of any desirable magnitude or it may be changed in accordance with variable magnitude steps of any magnitude as may be desired including a single step to correct the error. Since the weights and measure bureaus or authorities' regulations usually are in terms of weight increments displayed by the scale it is desirable to relate the limits of the error encountered in the automatic verification as well as the limit to the amount of correction to the span multiplier factor in terms of the major display increments of the scale. It is also desirable to relate the individual increments of corrections to the span multiplication factor to such increments of the scale. However in order to reduce the quantizing error due to the converting the weight into digits it is desirable to be able to determine the weight within a small fraction of the major display increments to the scale. In accordance with the exemplary embodiments described herein the weight is determined to a tenth of the weight display increments of the scale. Such fractions are called minor increments. In addition it is desirable to correct the result of the analog verification by predetermined amount. Consequently in accordance with the exemplary embodiment described herein the span control multiplying factor is changed by an amount necessary to correct one-half the difference between the analog verification weight and the reference recorded weight. In order to accomplish this a fraction comprising one over the full scale number of increments multiplied by the one-half of the difference in increments between the analog verification weight and the reference weight is added to or subtracted from the span multiplying factor. If this correction is insufficient to bring the automatic verification weight within the required limits then the sequence of operation of the automatic verification is repeated and this time the correction factor will be half of the difference between the reference value and the new automatic verification weight which will be approximately half of the previous difference. However the invention is not limited to correcting one-half of the difference between the reference value and the automatic verification weight obtained. Instead any fraction of the difference may be employed or a fixed increment of any desired size may be added or subtracted to the span control multiplication factor.

While the analog signal applied to the input of the electrical portion of the scale may be of any magnitude within the operating range of the scale, the value of approximately 90% of the full scale capacity has been employed in the exemplary embodiment described herein since this value meets the requirements of some of the weights and measures bureaus or authorities.

The foregoing and other objects and features of the invention will be readily apparent from the specification and claims when considered with reference to the accompanying drawings illustrating an exemplary embodiment of the invention.

The means, apparatus, and structure, by which the above novel improvements, in accordance with the present invention, are achieved in the exemplary embodiment described herein, comprises various registers, counters, timers, flags, storage spacers, together with specific routines for the control of the respective apparatus or means by the central controlled unit. In addition, numerous switches, lamps and display devices cooperate with the central control unit and the various storage spaces, counters, timers, etc., which apparatus comprises input and output means for the system.

GENERAL DESCRIPTION

Figure 1:
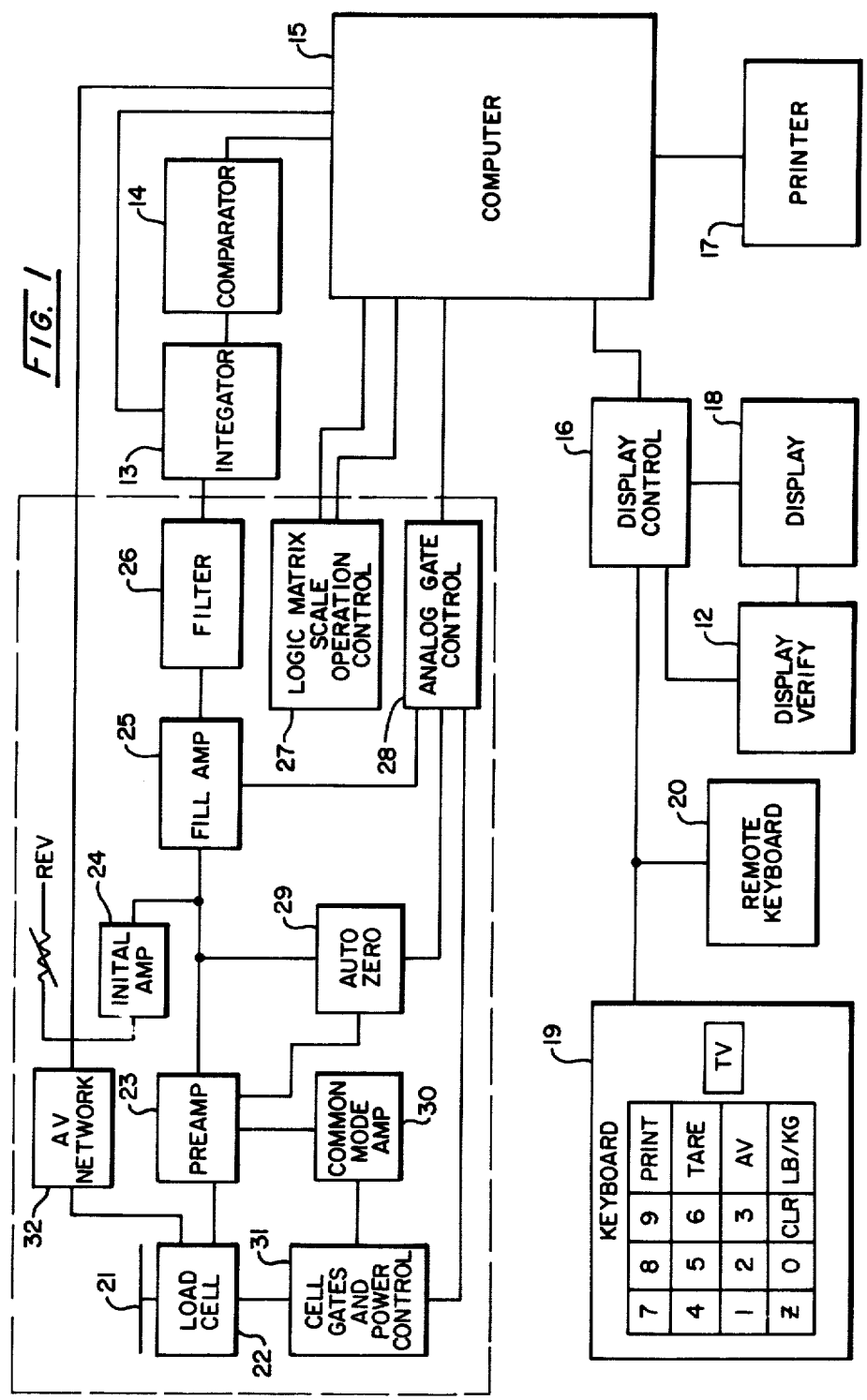
FIG. 1 is a block diagram showing the various component apparatus and their interconnection of the exemplary embodiment of the invention described herein.

To provide automatic verification and also automatic span control, an analog verification, network 32, is provided which applies a predetermined voltage or unbalanced condition to the strain gauge bridge applied to the load cell, as will be described hereinater. Numerous improvements and refinements are required to achieve sufficient accuracy of the load cell and related circuits as well as the various amplifier and electronic circuits and components to enable an automatic analog verification and span control.

In order to obtain the necessary accuracy and stability of the electronic amplifiers and related equipment, the power supply to the load cell 22 is periodically interrupted in accordance with the exemplary embodiment of the invention described herein. The rate of interruption should not have any harmonics which are common to harmonics of the power supply. During the time the power supplied to the load cell 22 is interrupted, the output from the fill amplifier 25 is maintained substantially constant at the value at which it was when the power was interrupted to the load cell. In addition, the analog zero is reset during the interruption by means of the auto zero amplifier and circuit 29. As a result the output of the scale to the analog-to-digital converter and integrator 13 is maintained at proper value representing the loads so that the analog to digital converter is not affected adversely by these interruptions. Consequently, the operation the analog to digital converter continues in a normal manner to convert the analog voltage to a digital number representing the load or weight of the scale platform 21.

The analog to digital converter comprising the integrator 13 and comparator 14, in the exemplary embodiment described herein, is similar to the triple slope analog to digital converter shown in co-pending U.S. patent application, Ser. No. 824,858 filed Aug. 15, 1977, by Loshbough et al, which application is incorporated herein by reference. As described in this copending application, the computer 15 controls the integrator 13. By causing the scale output to be selected for integration and then controlling the further operation of the integrator 13 in combination with the comparator 14 and the computer 15 the analog output of the scale is converted into a digital number which is stored in the computer 15 which number represents the weight on the scale platter or platform 21.

In order to provide for the automatic analog verification and for the automatic span control or tracking, an unbalanced voltage is introduced into the load cell bridge circuit by network 32 and related control equipment. In accordance with the usual prior art arrangements the load cell power supply has been balanced with respect to ground in order to reduce effects of load cell power supply voltage variations and other unbalanced effects. When it is desired to inject an analog verify voltage or unbalancing the load cell where the load cell strain gauge bridges are balanced with respect to ground, it is necessary to inject two equally accurate voltages.

To avoid this difficulty in accordance with the exemplary embodiment described herein, a single analog to verification voltage is injected into the load cell strain gauge resistor bridge but this necessitates an unbalanced power supply to the load cell. Consequently, it is necessary to maintain both the applied voltage extremely accurately and also to maintain the ground or reference voltage accurately at the ground potential.

The common mode amplifier 30 is employed to control the gated power supply and also the values of the power supply and the reference or ground voltage applied to the load cell. To accomplish this, a single accurately regulated power supply voltage is employed as a reference voltage to control the critical voltages applied to the load cell from the power supply 31 and also to supply the voltage applied to the analog verification network 32 and to various of the amplifiers and the electronic circuits of the scale arrangement, described herein.

A logic matrix and scale operation control circuitry 27 is provided with a plurality of mode and functional switches which control the various modes of operation and features of the scale. This circuitry is controlled by the computer 15 and the various switches thereof are located under the scale cover so that they can set and be maintained in given position when the scale is installed. The keyboard 19 is provided to enable the operator to operate this scale in a desired manner. An analog verification key AV is provided. A test verify key TV is provided which introduces a display fault in order to check the operation of the verification circuits. If the TV key is pressed and the fault verifying circuits do not indicate a fault, then the circuits are not operating satisfactorily, thus providing check for the verification circuits. A print key is also provided as well as a clear key, and a LB/KG. In addition, a numerical keyboard is provided from which it is possible to enter a tare weight so that the computer can subtract the tare weight and compute the netweight. In order to enter a tare weight a T-key is provided. Also in order to initially zero the scale a Z-key is provided. The operation of the numerical keys, tare key and the Z-key is similar to that described in the above identified patent application, Ser. No. 824,858 which patent application is incorporated herein. The display unit is interconnected with the computer through the interface or control unit 19 as is the printer 17, thus, the weight on the selected scale will be displayed on the display unit and a printer 17 will print a ticket or label, in accordance with the weight on the selected scale if the print key of the keyboard 19 is operated. In addition the operation of the display is verified by the verify arrangement 12.

An initial amplifier 24 is also provided for injecting an initial voltage into the output of the preamplifier which initial voltage is employed to compensate for the initial load of weight of the platform or platter or other equipment applied to the load cell.

Figure 2:
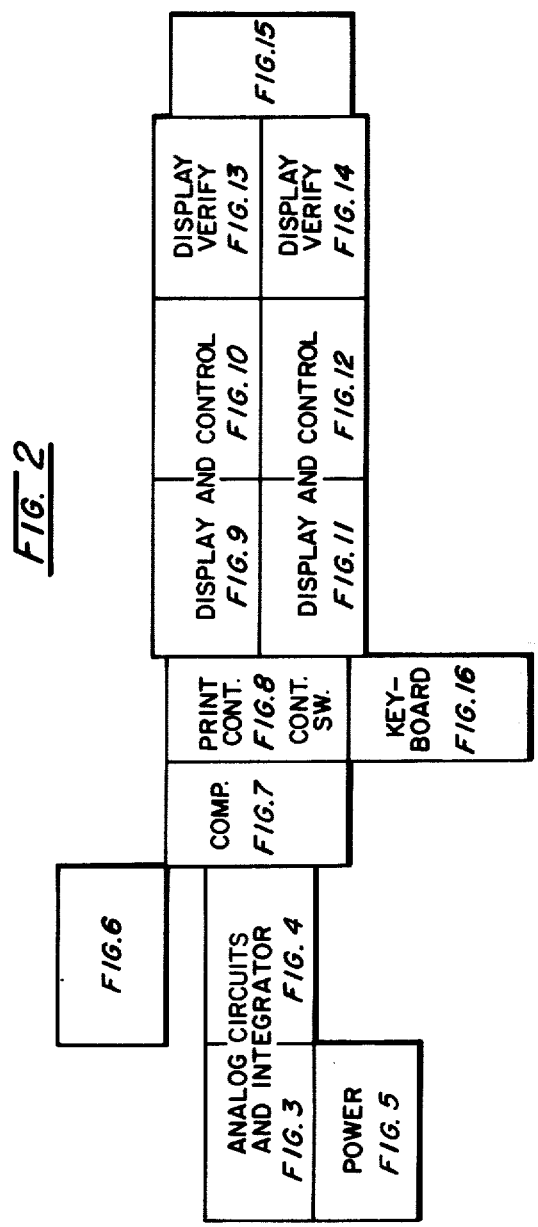
FIG. 2 is a diagram illustrating the relative positions of the circuit diagrams of FIGS. 3 through 16 of the drawing.
Figure 3:
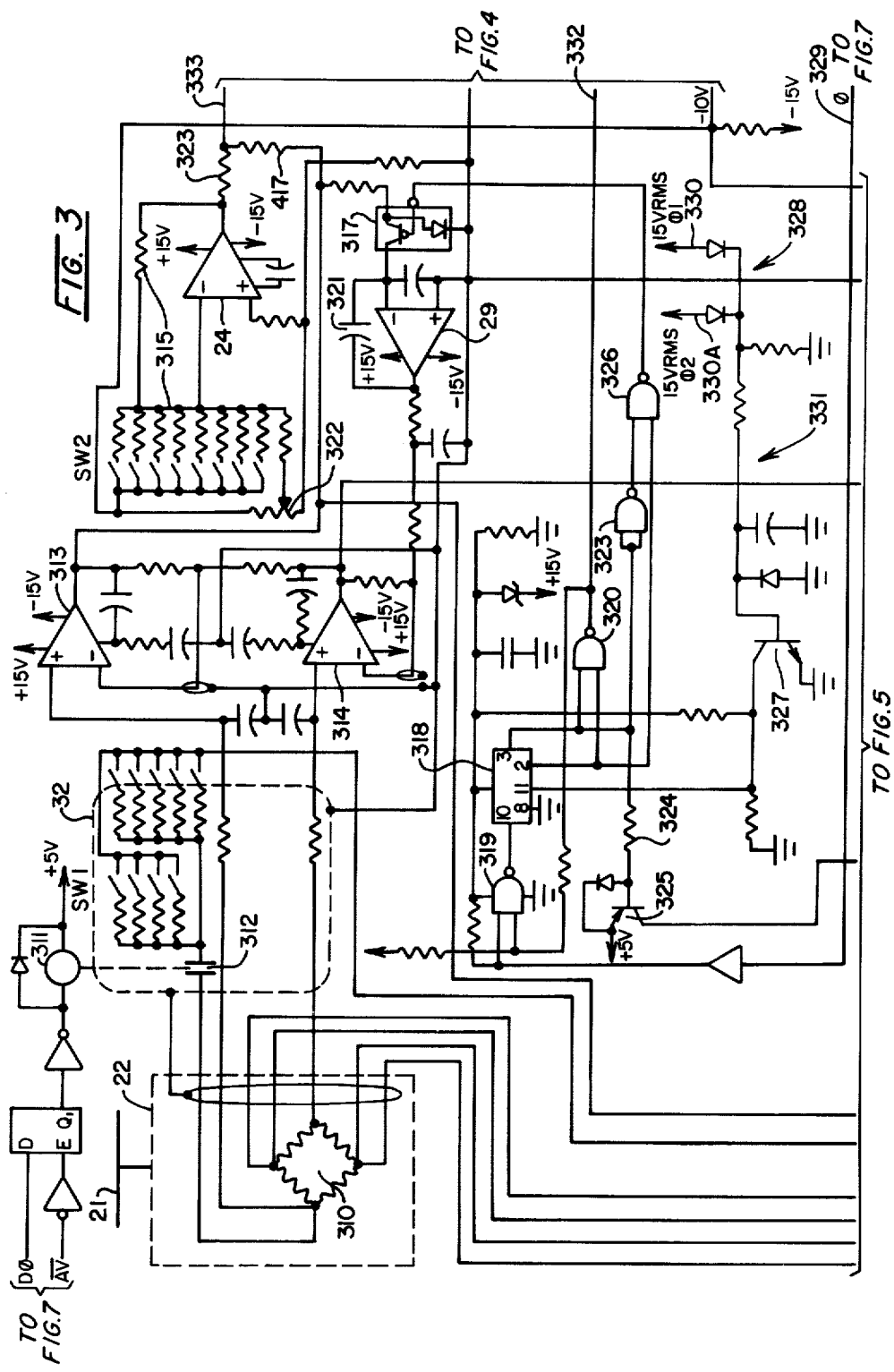
FIGS. 3 and 4 illustrate the analog circuits and integrator circuits.
Figure 4:
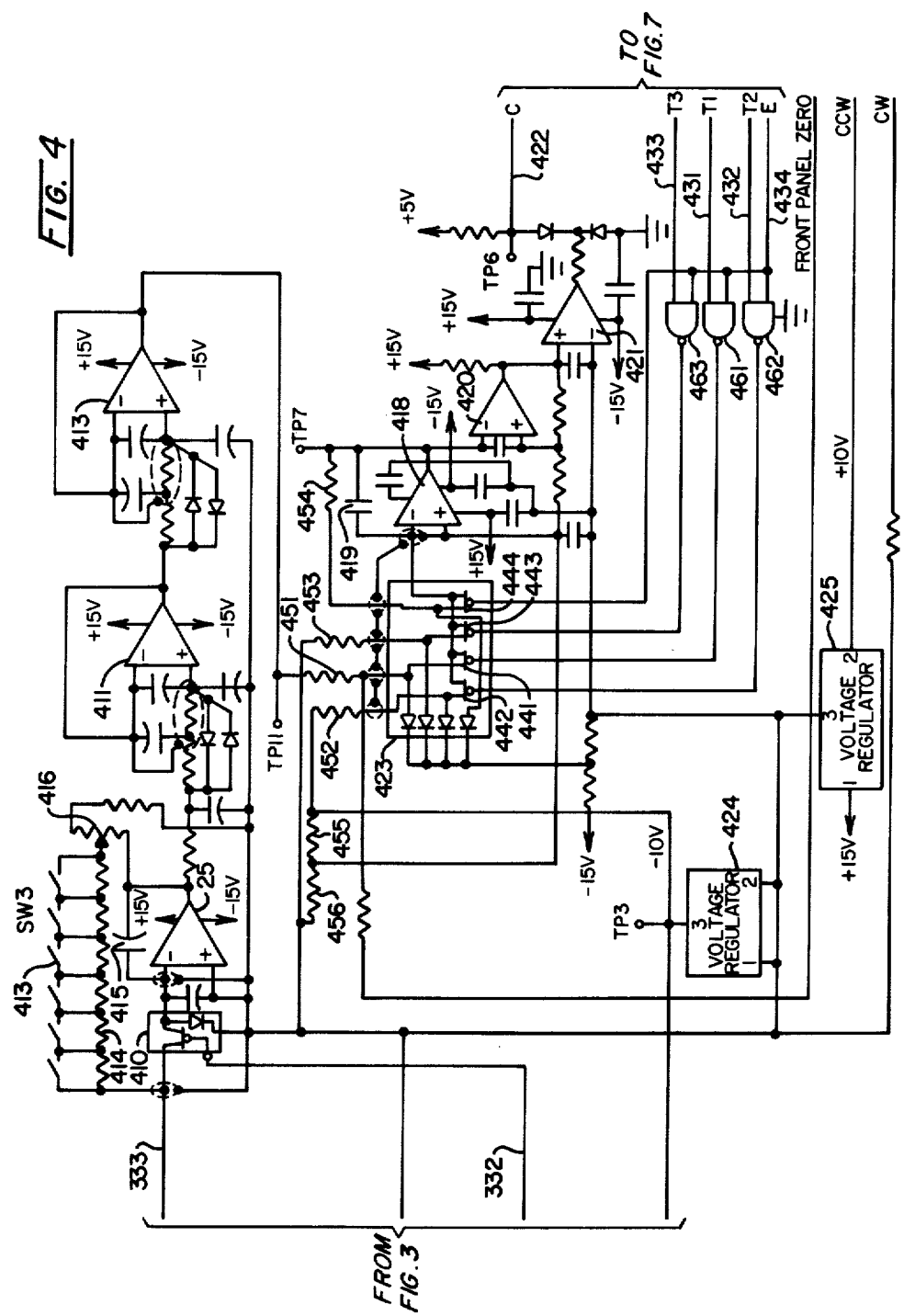
Figure 5:
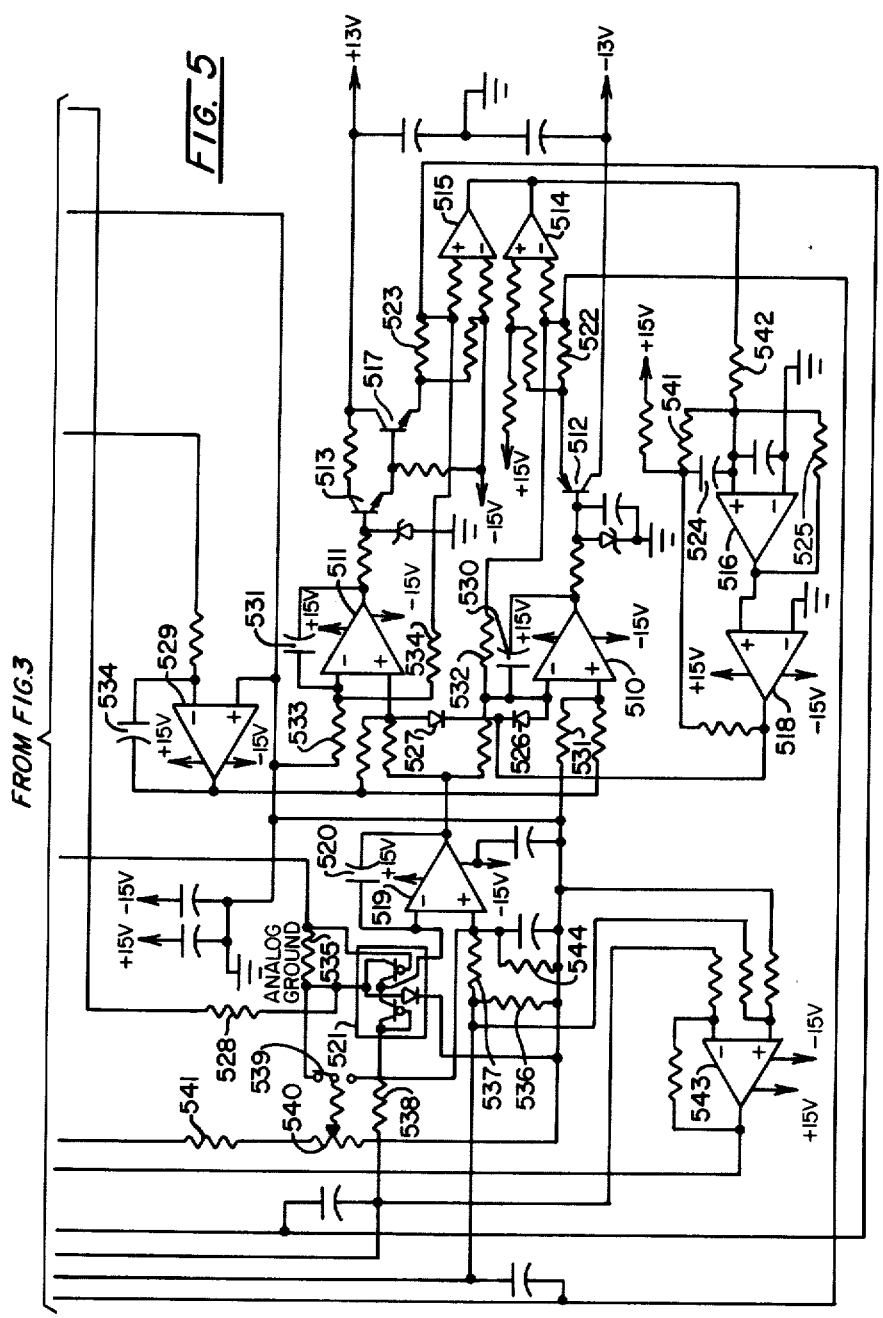
FIG. 5 shows the details of the gated power supply for the strain gauge bridge of the load cell.

FIGS. 3, 4 and 5, when arranged as shown in FIG. 2 show the details of the analog circuits.

The scale platter or platform and mechanism 21 together with the load cell 22 including the strain gauge bridge 310 attached thereto are represented in FIG. 3. Typical scale mechanisms suitable for cooperating with the exemplary embodiment of the invention described herein are shown in U.S. Pat. No. 3,847,238 granted to D. L. Hall, et al, on Nov. 12, 1974, and in U. S. Pat. No. 3,074,496 granted to L. S. Williams on Jan. 22, 1963.

The output of the strain gauge bridge is connected to the inputs of the operational amplifiers 313 and 314 which comprise the preamplifier 23 shown in FIG. 1. The output of the operational amplifier 314 is connected through the resistance network to the inverting input of the operational amplifier 313 so that the output of amplifier 313 represents the combined voltage changes on both output conductors from the strain gauge bridge 310. Thus the output voltage changes on these two conductors is in effect added together and forms the output of the preamplifier comprising these two operational amplifiers 314 and 313. The output is in turn connected through the gate circuit 410 to the fill and span amplifier 25. The gain of this amplifier is controlled by the switch SW-3 together with the resistor network 414 and resistor 417. Potentiometer 416 is employed for fine control of the gain and thus the span of the scale.

The condenser 415 is employed to maintain the output of this amplifier substantially constant during the time gate circuit 410 is turned off, but allows the output to follow the input signal through the gate circuit 410 when this gate circuit is turned on, thus the output of this amplifier is maintained substantially constant at the last value received on the input when the gate 410 is turned off but follows the input signal applied through the gate circuit when the gate circuit 410 is turned on. By selectively closing various switches of switch 413, the feed back resistor connected around the amplifier 25 is controlled and this in turn controls the gain of the amplifier so that the span of the scale may be accurately adjusted.

The output of the fill amplifier 25 is then transmitted through the operational or filter amplifiers 411 and 413 which together with the condenser and resistor network connected to the inputs of these amplifiers provide a filter circuit which discriminates against noise, vibrations and other spurious and extraneous signals. The output of the amplifier 413 is then transmitted as the weight signal from scale 21 to the switching and integrating circuit forming part of the analog to digital converter.

The initial amplifier 24 is provided to compensate for the weight of the platter or platform 21 as well as other initial loads applied to the load cell. The resistor network 315 together with the switches SW-2 provide means for adjusting the gain of the amplifier 24, since these resistors form a feedback path for the amplifier. Thus the output of amplifier 24 may be adjusted by controlling the various switches 315 and potentiometer 322 so that the output of the initial amplifier 24 accurately represents the initial adjustment or load on the scale mechanism. This output is transmitted through the resistor 323 and summed with the output of the preamplifier through resistor 417 and applied to the input of the gate circuit 410. Thus the signal applied to gate circuit 410 is an analog signal accurately representing the weight on the scale.

The output of the preamplifier operational amplifier 313 is also connected through the gate circuit 317 to the input of the analog zero amplifier 29. A condenser 321 is connected in the feedback path around this amplifier and thus provides an integrating circuit which holds the output of the amplifier constant during interruptions of the input to the amplifier due to the operation of the gate 317 as described herein. The output of the amplifier 29 is connected to the inverting input of the operation amplifier 314 of the preamplifier and causes the zero reference level of the output of amplifier 313 to be maintained substantially at zero potential.

FIG. 5 shows the circuit arrangement for the gated or switched regulated power supply for the load cell bridge 310. Transistor 512 operates as an emitter follower and is in series with the negative voltage supply to the load cell strain gauge bridge 310. This transistor maintains the voltage applied to this lead at the voltage of its base as determined by the output from amplifier 510. In a similar manner the transistors 513 and 517 supply the voltage to the positive supply lead to the strain gauge bridge 310 of the load cell. This voltage is maintained at the voltage of the base of the transistor 513 which is substantially the same as the voltage of the base of transistor 517. The voltage of the base of transistor 513 is determined by the output of the amplifier 511.

Amplifiers 514 and 515 monitor the current in the respective negative and positive lead supply conductors to the strain gauge bridge circuit 310. Thus if the current in the positive supply conductor exceeds a predetermined maximum value, the voltage drop across the resistor 523 will cause the output of amplifier 515 to be driven to its most negative value of approximately minus 15 volts. Likewise, if the current supplied through the negative supply conductor to the strain gauge bridge 310 exceeds a predetermined maximum value, then the output of the amplifier 514 is likewise driven to its most negative value. The outputs of both amplifiers 514 and 515 are combined and transmitted through resistor 542 to the input of amplifier 516. If either of the outputs of these amplifiers go to the most negative value then, after a time delay determined by resistor 542, condenser 524, the output of amplifier 516 becomes negative with a result that this negative voltage causes the output of amplifier 518 to likewise become negative. The negative voltage from amplifier 516 is then transmitted through resistor 525 back to condenser 524 and resistor 541 to the input of amplifier 516 which in effect locks amplifiers 516 and 518 in their state in which the negative output is obtained from the output of amplifier 518. This condition is then maintained as long as power is supplied to the scale mechanism. To unlock this amplifier circuit, it is necessary to remove power from the scale system, thus insuring that some improper condition is brought to the attention of the scale attendant or operator and the service personnel.

The negative voltage from the amplifier 518 is applied to the junction between the diodes 526 and 527 and then to the noninverting input of amplifier 511 and the inverting input of amplifier 510 with result that these amplifiers in effect turn off the series transistors 512 and 513 and 517 and the power supply leads to the strain gauge bridge 310 thus effectively interrupting and removing power from the bridge circuit.

As indicated above, the voltage is applied to the base of the transistors 512 and 513 from the respective amplifiers 510 and 511, control the voltages applied to the load cell strain gauge bridge. These voltages in turn are controlled by the inputs to the respective amplifiers 510 and 511.

The outputs of the amplifiers 510 and 511 are controlled by the voltages applied to the inputs of these differential operational amplifiers. The voltage applied to these inputs are in turn in part controlled by the output voltages from amplifiers 519 and 529. Amplifier 529 in turn is controlled by the output from amplifier 314 and this in turn in part by the voltage from amplifier 29. Amplifiers 510, 511, 519 and 529 are all provided with integrating capacitors 530, 531, 520 and 534 respectively. The amplifiers 510 and 511 with the integrating capacitors have a relatively short time constant. While amplifiers 519 and 529 have an intermediate time constant.

Assume initially that the various gate circuits 317 and 521 are turned off or non-conducting. With gate 521 turned off the path from regulated reference through resistor 528 is interrupted but the path from resistor 538 is not interrupted so that the voltage of the positive excitation terminal from the bridge circuit 310 is applied to the inverting input of amplifier 519. The voltage of the negative excitation terminal from the bridge circuit 310 is also applied through resistors 544, 536, and 537 to the non-inverting input of amplifier 519. Amplifiers 519, 510, and 511 perform in a closed loop regulator system for regulating the voltage supplied across the load cell bridge 310. The algebraic difference of the excitation voltages is directly ratioed to the regulated reference voltage supplied to one end of resistor 528 when gate 521 is turned on. When gate 521 is turned off, the algebraic difference of the voltage supplied to the bridge 310 is zero.

Thus, with gate 521 off as stated above, the excitation potentials supplied across the load cell bridge 310 will be substantially zero potential. The output of amplifier 314 should always be at substantially ground potential. If the output of this amplifier varies from ground potential, it will apply a corresponding potential to the inverting input of amplifier 529, with the result that the output of this amplifier will vary and apply a compensating voltage through the resistors networks to the non-inverting input of amplifiers 510 and 511 with the result that the outputs of both of these amplifiers are adjusted algebraically in substantially the same amount so as to increase the magnitude of one of the excitation voltages and correspondingly decrease the magnitude of the second excitation voltage to the bridge 310, so that the output of amplifier 314 is adjusted towards ground potential.

Assume now that the bridge 310 excitation is turned off by gate 521 and the gate circuit 317 is now turned on, in a manner to be described herein, so that the inverting input of amplifier 29 is effectively connected to the output of the amplifier 313. With a substantially ground potential applied to the strain gauge bridge 310, ground potential should be received from amplifier 313. This voltage is transmitted through the gate circuit 317 to the noninverting input of amplifier 29. If this voltage is not zero then the output of amplifier 29 will depart from zero and apply a corrective voltage to the inverting input of amplifier 314. The output signal of amplifier 314 is applied to the input of amplifier 313 causing the output of amplifier 313 to change in the same amount and direction as the output of amplifier 29. Thus, the feedback loop is closed from output of amplifier 313 through gate 317 to the inverting input of amplifier 29. As a result, the output of amplifier 313 is corrected to ground potential. The integrating capacitor 321 of amplifier 29 is of such value that the output of amplifier 29 remains substantially constant during the times when the gate circuit 317 is turned off or open, as described herein.

At a later time, with gate circuit 317 turned off and gate circuit 521 turned on, as described herein, voltage from the regulated reference voltage supply through resistor 528 is applied to the inverting input of amplifier 519. The corresponding output voltage from the amplifier 519 is applied to the non-inverting input of amplifier 511 and the inverting input of amplifier 510, which causes the desired output voltage from the transistors 512, 513, and 517 to be applied to the strain gauge bridge 310. If the strain gauge bridge 310 is located at a distance from the power supply circuits in FIG. 5, there may be a significant voltage drop in the leads from FIG. 5 to the strain gauge bridge 310. This voltage drop is compensated for by applying the voltage at the terminals of the strain gauge bridge 510 to the network of resistors, 536, 537 and 544 and the network of resistors 538 and 528. As a result, the correcting voltages are applied both to the non-inverting and inverting input of operational amplifier 519, with a result that the output of the amplifier 510 and 511 are corrected so that the desired voltage will be maintained at the input of the strain gauge bridge 310 independently of the resistance in the power supply leads between the strain gauge bridge 310 and the power supply circuits of FIG. 5.

If the power supply does not remain balanced at this time, then the output of the operational amplifier 314 does not remain at ground potential. Consequently, a small potential will be applied to the inverting input of the operational amplifier 525 which causes a corresponding correction voltage to be applied to the non-inverting inputs of the operational amplifier 510 and 511 which voltage changes the output voltages of these amplifiers algebraically in the same manner so that the output of the amplifier 314 will be changed towards ground potential by increasing the magnitude of one while decreasing the magnitude of the other.

Switch 539, potentiometer 540, and resistor 541 are provided to compensate for a nonlinearity of the output on the load cell and strain gauge resistor bridge 310. With the switch 539 set in a position shown in FIG. 5 the excitation of the load cell is slightly increased proportionally as the load or weight on the scale is increased, thus the output of the operational amplifier 313 is connected through resistor 541, potentiometer 540 and switch 539 to the junction of resistors 528 and 535. As a result, as the output of the operational amplifier 313 increases due to increased load on the load cell and strain gauge resistor bridge 310 the voltage of this junction output rises a small amount depending upon the setting of the potentiometer 540. As a result the output of the operational amplifier 314 also rises a small amount and as a result a slightly larger voltage is applied to the inputs of the operational amplifiers 510 and 511 thus increasing their output which in turn causes the power supplied to the strain gauge bridge 310 to increase slightly thus tending to compensate for the non-linearity of the load and strain gauge bridge 310 when the output increases due to an increase in the load applied to the load scale platter. In this case the output of the potentiometer 540 is connected to the lower noninverting input of the operational amplifier 514 thus tending to reduce its output slightly which in turn slightly reduces the power supplied to the strain gauge bridge 310. Thus if the output of the load cell and strain gauge bridge 310 tends to increase slightly slower than the increase in load applied to the scale platform the switch 539 is set in a position shown in the drawing which causes a slightly higher voltage to be applied to the strain gauge bridge as the load on the scale increases thus tending to compensate for the decrease in the output of the strain gauge as the load increases. Alternatively if the output of the load cell and strain gauge increases slightly faster than the load on the scale then the switch 539 is set in the opposite position where the voltage applied to the strain gauge bridge decreases slightly as the load on the scale increases thus tending to compensate for the increased output of the strain gauge bridge 311 as the load on the scale increases.

The amplifier 543 is provided to regulate the voltage applied to the network 32. The input of this amplifier is connected essentially in parallel with the input to the amplifier 519 so that the output voltage of this amplifier 543 is proportional to the voltage applied to the strain gauge resistor bridge 310. Thus any change in the voltages applied to the strain gauge resistor bridge 310 is similarly applied to the network 32 for analog verification, thus insuring accurate analog verification and the span control and tracking in accordance with the present invention. In order to apply the analog verification voltage to the strain gauge resistor bridge 310, the analog verification relay 311 is operated under control of the computer or data processor 15 which relay in turn closes contacts 312 thus interconnecting the output of the analog verification resistor and switch network 32 to the output of the strain gauge resistor bridge 310. The gate circuits 317, 410, and 521 referred to above are controlled by the circuits shown in the lower portion of FIG. 4.

The circuits for controlling the gate circuits 521, 317 and 410 are shown in the lower portion of FIG. 3. These circuits comprise transistor 327, full wave rectifier circuitry 328, binary counters 318, and gates 319, 320, 323 and 326 all of which are provided with an inverted output and also transistor 325. The binary counter 318 may be an asynchronous fourteen bit binary counter such as 4020 manufactured by the Texas Instruments Corporation. These circuits in the lower portion of FIG. 3 are in turn controlled by a fifty or sixty cycle source of current 330 and clock pulses received over conductor 329 from the microprocessor or microcomputer 15.

Transistor 327 and full wave rectifiers 328 together with the network 331 are employed to obtain a positive going reset pulse each time the applied alternating current crosses the zero axis in either direction. This pulse, which occurs at twice the AC supply frequency, is applied to the reset terminal 11 of the binary counter 318.

The clock pulses received over conductor 329 are applied to the input terminal 10 of the binary counter 318 through the end gate 319.

Figure 17:
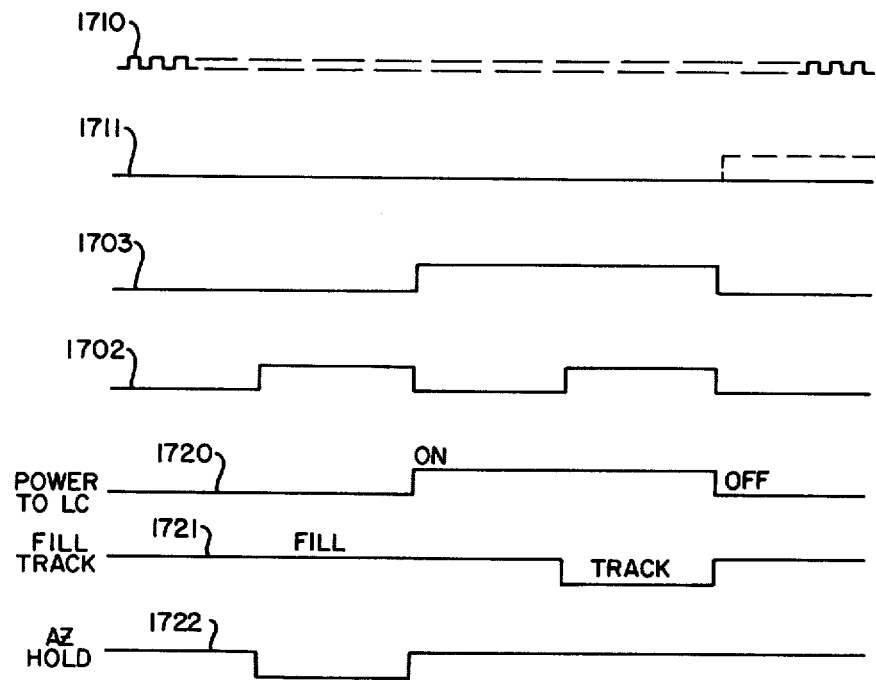
FIG. 17 shows wave forms of various signals employed to control the gated power supply of FIG. 4.

The clock pulses received over conductor 329 are represented by line 1710 in FIG. 17. Line 1711 of FIG. 17 shows the reset pulse applied to the terminal 11 of the binary counter 318 each time the applied alternating current from source 330 crosses the zero axis. As a result of the reset pulse applied to the reset terminal 11 of the binary counter 318 the outputs 2 and 3 of this counter are restored to their zero or low condition. As a result a transistor 325 is turned on which applies a positive potential to the control input of the gate circuit 521 thus causing this gate circuit to be turned off. As a result the power applied to the strain gauge bridge circuit 310 is likewise turned off as described above.

With the output 3 of the binary counter 318 at its low or zero value the output of gate 323 will be positive. This is in addition to the positive voltage applied to the base of the transistor 325 turning on this transistor as described above. With the output from output 2 of the binary counter 318 at a low value and the output from gate 323 at a high value the output of the gate circuit 326 will be at a high value thus maintaining the off condition of the gate circuit 317. As a result the analog zero amplifier 20 will continue to maintain its output at the same potential as it was when the gate circuit 317 was last turned off.

With the outputs 2 and 3 of the binary counters 318 at their low value the output for the gate circuit 320 would be at a high value thus applying a high value to the conductor 332 extending to the fill amplifier gate circuit 410. As a result the output of the fill amplifier 25 is maintained at substantially the value that it was at the time the gate circuit 410 is turned off as described above.

The output of the gate circuit 320 is also applied to one of the inputs of the gate circuit 319 and since the output of this gate circuit is high at this time the gate circuit 319 will be conditioned to transmit the clock pulses received over the conductor 329 to the binary counter 318. This counter then counts the clock pulses that are transmitted to its input 10 terminal.

During this initial counting interval power remains turned off to the strain gauge bridge circuit 310 as indicated in line 1720 of FIG. 17. The fill amplifier 25 maintains its output at substantially the same value that it had when the gate circuit 410 was turned off.

After the counter has counted a predetermined number of pulses which in the exemplary embodiment described herein comprises substantially a quarter of a full count capability of the counter 318 the output terminal 2 of the counter changes from a low level to a high level. As a result the output of the gate circuit 326 changes from a high level to a low level thus turning on the gate circuit 317. With gate circuit 317 turned on the input of the zero analog amplifier 29 is connected to the output of the preamplifier 313. At this time with the power turned off to the strain gauge bridge circuit 310 the output of the preamplifier 313 is at the operating ground potential of the system. Thus at this time the analog zero amplifier 29 has obtained the value required to accurately set the output of preamplifier 313 to the operating ground potential. This operation is illustrated in lines 1702 and 1722 of FIG. 17. The other control circuits and gate circuits described above remain in the condition previously described with the result that the counter 318 continues to count clock pulses received over conductor 329 from the microprocessor or computer 15. After a second predetermined number of pulses have been received by the counter 318 the output on the number 2 output terminal of the counter changes from a high level to a low level while the output on the number 3 terminal changes from a low level to a high level. In the exemplary embodiment described herein this change occurs when the counter has counted substantially half the maximum number of pulses the counter is designed to count. These changes in the output of the terminals 2 and 3 of the counter are illustrated in lines 1702 and 1703 of FIG. 17. At this time the output of the gate circuit 326 now changes from a low level to a high level with the result that the gate circuit 317 is turned off so that the analog zero amplifier 29 now maintains its output at the required offset correcting potential determined during the time the gate circuit 317 was turned on. This operation is illustrated in line 1722 of FIG. 17.

When the output of the output number 3 of the counter 318 changes from a low level to a high level the transistor 325 is turned off with the result that the gate circuit 521 is turned on which causes the power to be supplied to the strain gauge bridge circuit 310 so that the output of this bridge circuit now represents the weight on the scale and the output of the preamplifiers 313 and 314 correspondingly represent the weight on the scale. This operation is represented in line 7020 of FIG. 17.

The output of the gate circuit 320 remains high at this time with the result that the gate circuit 410 remains turned off so that the fill amplifier 25 maintains its output at substantially the same value as described above and shown in line 7021 of FIG. 17. In addition the gate circuit 319 is maintained in the active condition so that it will transmit the clock pulses received over conductors 329 to the input 10 of the counting circuit 318.

At the end of this third interval determined by a third predetermined count counted by the counter 318 the number 2 output terminal of this counter will again change from a lower value to a high value. In the exemplary embodiment described herein this third predetermined count is substantially three quarters of the full count of counter 318. With both output terminals 2 and 3 at a high value the output of gate 320 changes to a low value with the result that the gate circuit 410 is now turned on so that the input of the fill amplifier 25 is connected to the output of the preamplifier 313 and 314 of the conductor 333 so that this amplifier now follows and transmits the signal level received over this conductor 333. At this time power is still applied to the strain gauge bridge 310 so that the output of the amplifier 25 now accurately represents and follows the load on the scale.

In addition when the output of the gate circuit 320 changes to the low value this time it deactivates the gate circuit 319 so that this circuit no longer transmits clock pulses received over conductor 329 from the microprocessor 15. As a result the circuits remain in the condition described until the next synchronizing and resetting pulse from the alternating current source 330 is applied to the reset terminal 11 of the binary counter 318 at which time the above cycle of operations is repeated. If it is desired to operate the counter 318 asynchronously and totally independently of the alternating current supply 330 then the connections between the output of transistor 327 and the reset terminal 11 of the binary counter 318 are interrupted and the connection from the output of the gate circuit 320 and the gate circuit 319 also interrupted. Under these circumstances the binary counter 318 will continue to count pulses until it arrives at a full count at which time it is automatically returned to zero or reset and the above cycle of operations repeated.

As indicated above the output of the amplifier 25 is transmitted through the amplifier 411 and 412 and the input filter circuits to these amplifiers. These circuits are provided to reduce the effects of various spurious currents and voltages due to vibrations stray fields and the like. The output of the amplifier 412 is then transmitted to the gate circuits 423 of the integrator control. The integrator comprises the operational amplifier 418 together with condenser 419. The output of this integrating amplifier 418 is then transmitted through the amplifier 420 to the threshold amplifier 421. The amplifier 420 and the threshold amplifier circuit 421 are provided to give an accurate indication of the output of the amplifier or integrator 418 when it reaches or passes through a threshold or datum reference value. The output from amplifier 421 is then transmitted over conductor 422 to the computer 15.

Figure 18:
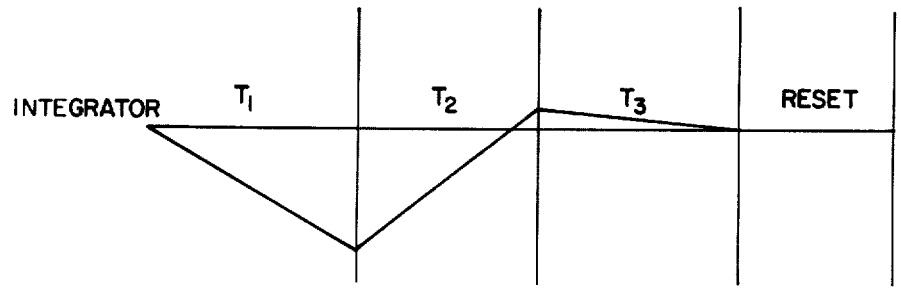
FIG. 18 illustrates typical waveform of the integrator circuit during the four different time intervals shown.

The analog-to-digital converter arrangement comprises a triple slope converter similar to the arrangement disclosed in the copending application Ser. No. 824,858 filed Aug. 15, 1977, by Loshbough and Pryor, which application is hereby made a part of the present application as if fully included herein. As described in the above copending application, the integrating arrangement is divided into a four part cycle or four time intervals for each conversion operation. As described in the above copending application and shown in FIG. 18 the first time interval, T1 is a time interval during which the analog signal from the scale circuitry is connected to the input of amplifier 418 and causes condenser 419 of this integrating circuit to be charged to a value representing the load on the scale. During the second time interval, T2 of the integrating cycle, condenser 419 is discharged a fixed rate determined by the voltage applied through resistor 451. This voltage is applied until the output of the integrating circuit 418 and in particular output of the amplifier 420 crosses a predetermined threshold value at which time a signal is transmitted over conductor 422 to the computer or microprocessor 15. At this time, a lower voltage of opposite polarity is applied to the amplifier 418 through resistors 453. In the above identified copending application, the magnitude of the voltage applied during the T3 interval was 1/32 of the voltage applied during the T2 interval. In accordance with the exemplary embodiment described herein, a magnitude of the voltage applied during the T3 interval is also 1/32 of the magnitude of the voltage applied during the T2 interval and is opposite in polarity to the voltage applied during the T2 interval.

The operation of the integration circuit comprising the amplifier 418 and condenser 419 is controlled by means of the gate circuits 423 which are in turn controlled over conductors 431, 432, 433 and 434. These conductors receive signals from the computer 15 through interface circuits described herein.

Normally the conductor 434 is maintained at a low or ground level from the computer interface circuits. With this conductor at a low level the gate circuits 461, 462 and 463 are rendered inactive so that the remaining conductors 431, 432 and 433 may be used by the computer for other operations.

Also with conductor 434 maintained at a low level the gate circuit 444 is turned on so that the discharging resistor 454 is maintained connected around the integrating condenser 419 thus maintaining this condenser discharged. When the gate circuits 461, 462 and 463 are inactive due to low signals received over conductor 434 the output of these gate circuits will be high thus turning off the gate circuits 441, 442 and 443 with the result that the other inputs are disconnected from the integrating amplifier and circuit 418.

The fourth time interval T4 during an integration cycle is a reset interval during which time condenser 419 of the integrating circuit is discharged to its initial value. When it is desired to initiate an analog to digital conversion cycle of operations the computer 15 will cause a high signal to be applied to the conductor 434 which signal turns off the gate circuit 444 thus disconnecting the discharging resistor 454 from around the integrating condenser 419. In addition the high signal applied to the conductor 434 conditions the gate circuits 461, 462 and 463 to respond to the one or high signals applied to the conductors 431, 432 and 433. In addition the computer will cause a one or high signal to be applied to the conductor 431 which in turn causes the output from the gate circuit 461 to change from a high level to a low level and thus turn on the gate circuit 441. The gate circuit 441 when turned on connects the output of the amplifier 413 through the resistor 451 to the input of the integrating amplifier 418 with the result that during this first T1 time interval of the conversion cycle the weight signal is applied to the integrating circuit which charges the condenser 419 to a value representing the weight on the scale. At the end of the T1 interval the computer will cause the high signal or one signal to be removed from the conductor 431 with the result that the output of the gate circuit 461 is returned to a high value which causes gate circuit 441 to be turned off and disconnect the output of the amplifier 413 from the input to the integrating amplifier 418. In addition the computer will cause a high or one signal to be applied to conductor 432 which in turn causes the output of gate circuit 462 to be changed to a low value thus turning on gate 442. With gate circuit 422 turned on the input to the integrating amplifier 418 is connected through resistor 452 to the regulated and highly accurate power source 424 which causes the condenser 419 to be discharged at a constant and uniform rate. When a condenser 419 has been discharged to a predetermined value an output signal will be transmitted from the integrating amplifier 418 through amplifiers 420 and threshold circuits 421 back to the computer over conductor 422. The computer in turn in response to this signal over conductor 422 then removes the one or high signal from conductor 432.

With the high signal removed from a conductor 432 the output of the gate circuit 462 again becomes high so that the gate circuit 442 is turned off thus disconnecting the input of the integrating amplifier 418 from resistor 452. Then at the beginning of the T3 time interval a computer will cause a one or high signal to be applied to the conductor 433 which causes the output of the gate circuit 463 to be reduced to a low or zero value which causes gate circuit 443 to be turned on and connect the input of the integrating circuit 418 through resistor 453 to round potential. As a result a charge on the condenser 419 is again changed towards a reference level and when this reference level is reached or crossed another signal will be transmitted through amplifiers 420 and 421 over conductor 422 to the computer circuit indicating the end of the T3 interval at which time the computer will cause the high or one signal to be removed from conductors 433 and 434. As a result the output of gate circuit 463 is restored to its high value turning off the gate circuit 443 thus disconnecting the input of the integration amplifier 418 from resistor 453. In addition removal of the high or one signal from the conductor 434 removes the conditioning signal from the gate circuits 461, 462 and 463 thus rendering these gate circuits non-responsive to any further signals received over conductors 431, 434 and 433. In addition the gate circuit 444 is turned on thus connecting the discharge resistor 454 around the integrating condenser 419 thus discharging this condenser and restoring it to its initial condition. These circuits then remain in this condition until the next conversion or weight reading cycle is initiated by the computer.

As shown in FIG. 4 the non-inverting or plus terminal of the integrating amplifier 418 is connected to the midpoint between the resistors 455 and 456. These resistors provide a potentiometer having a ratio equal to the ratio of the charge or discharge rates of the condenser 419 through the resistors 452 and 453. Since the noninverting input of amplifier 418 is the reference point for the operation of this amplifier and the integrating circuits shown in FIG. 4 the discharging voltage through resistor 452 is of one polarity while the discharging voltage during the time resistor 453 is connected will be of opposite polarity and the ratio of these two discharging rates may be controlled by the ratios of the resistor 455 and 456 as indicated above. Thus during the T1 time interval the computer will cause a high signal level to be applied to conductors 434 and 431. During the T2 time interval high voltage will be applied to the conductors 434 and 432. During the T3 time interval high voltage will be applied to conductors 434 and 433. During the T4 interval low voltage will be applied to conductor 434. The voltages applied to the conductors 431, 432 and 433 at this time will be ineffective to control or affect the operation of the integrating circuits or the conversion of the analog weight signals to digital signals by the computer. In the exemplary embodiment described herein the voltage regulators 424 and 425 may comprise for example the precision voltage regulators manufactured by National Semiconductor such as LH0070 Series Precision BCD Buffered Reference. While other regulators or voltage sources may be employed the above described regulators are suitable for use in combination with the exemplary embodiment described herein.

Figure 7:
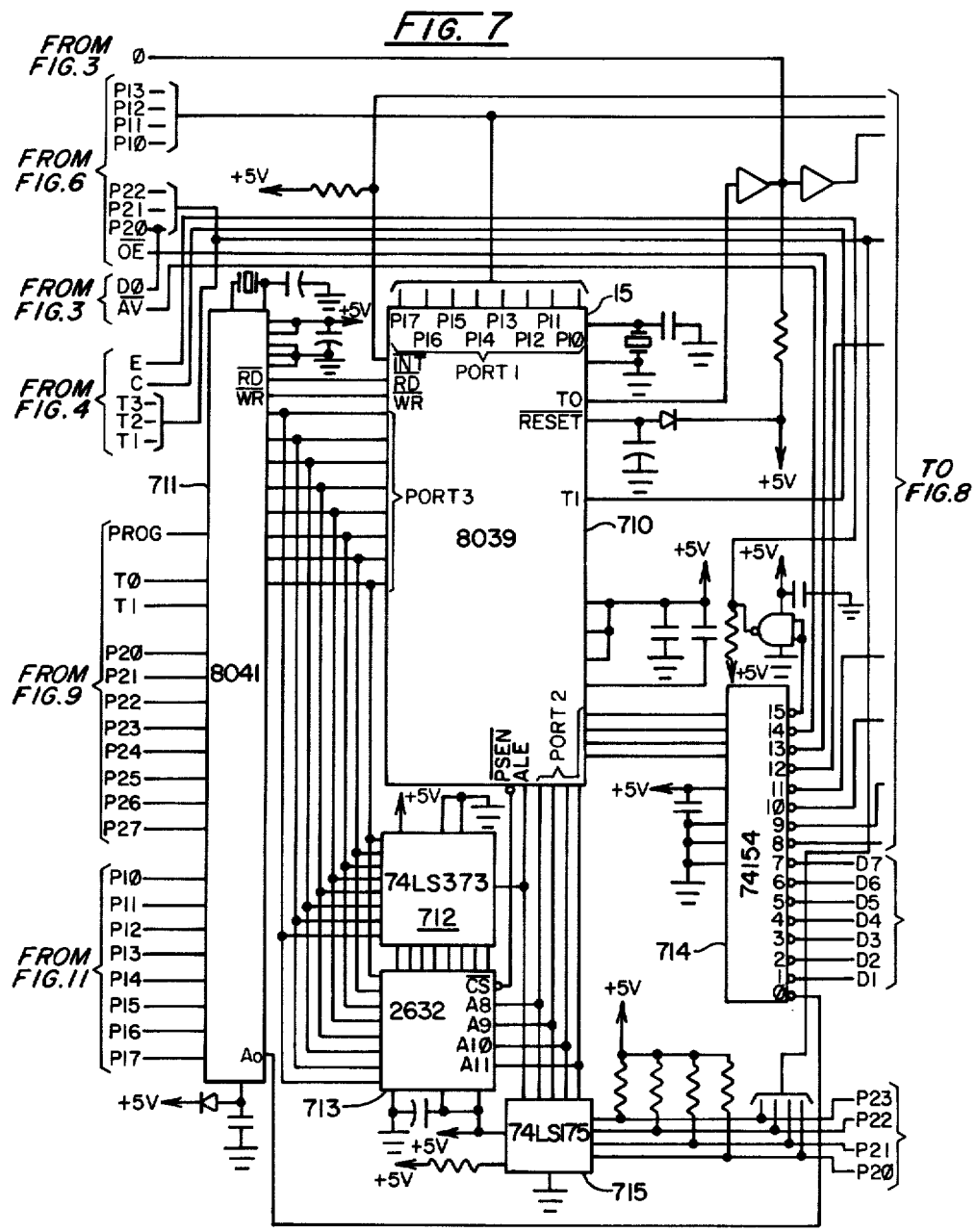
FIG. 7 shows the microprocessor and interface apparatus together with the auxiliary microprocessor for controlling the display.
Figure 19:
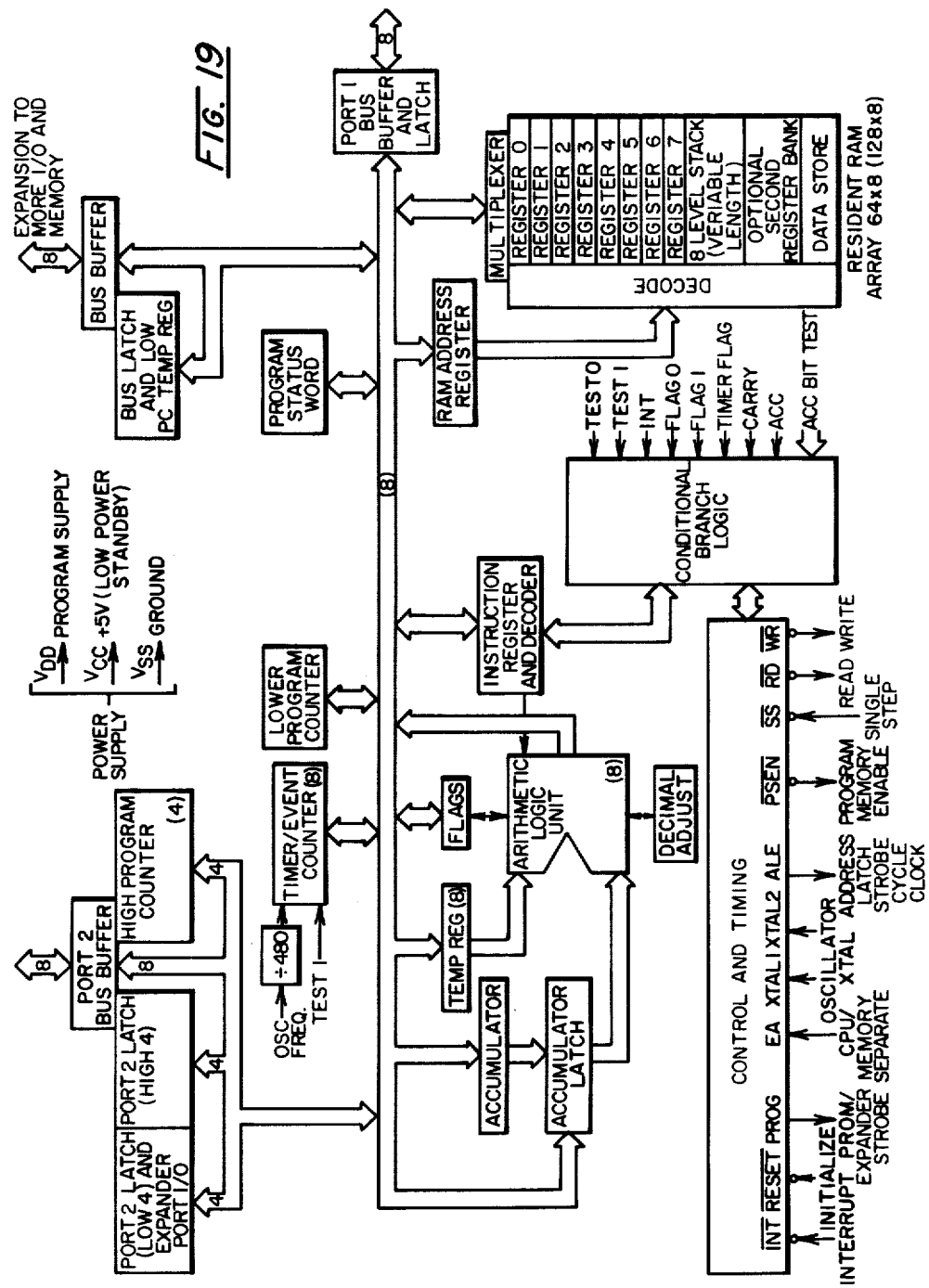
FIG. 19 is a block diagram of the microprocessor employed in the exemplary embodiment of the invention described herein.
Figure 20:
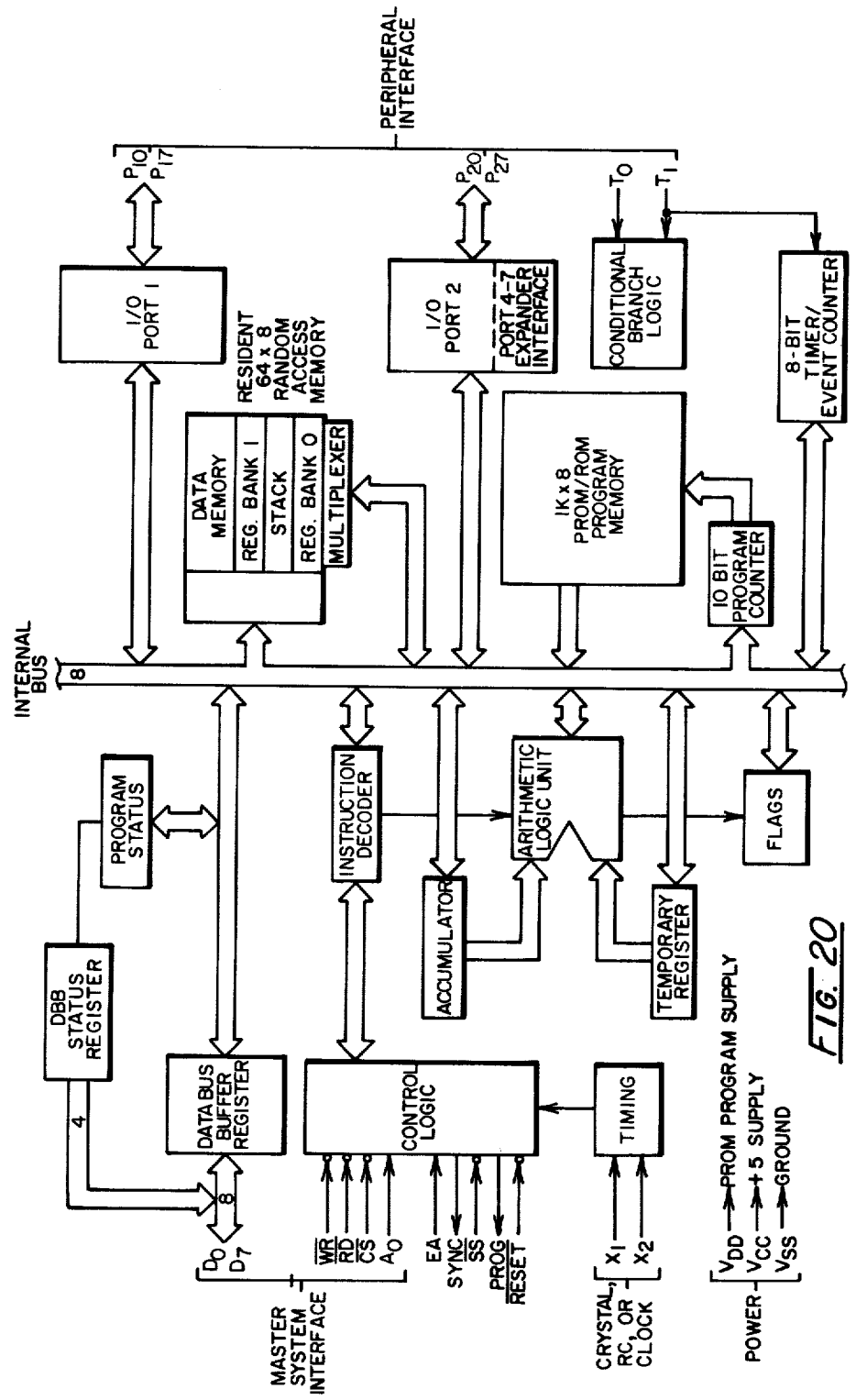
FIG. 20 is a block diagram of the auxiliary microprocessor or a universal peripheral interface microcomputer employed to control the display and keyboard.
Figure 21:
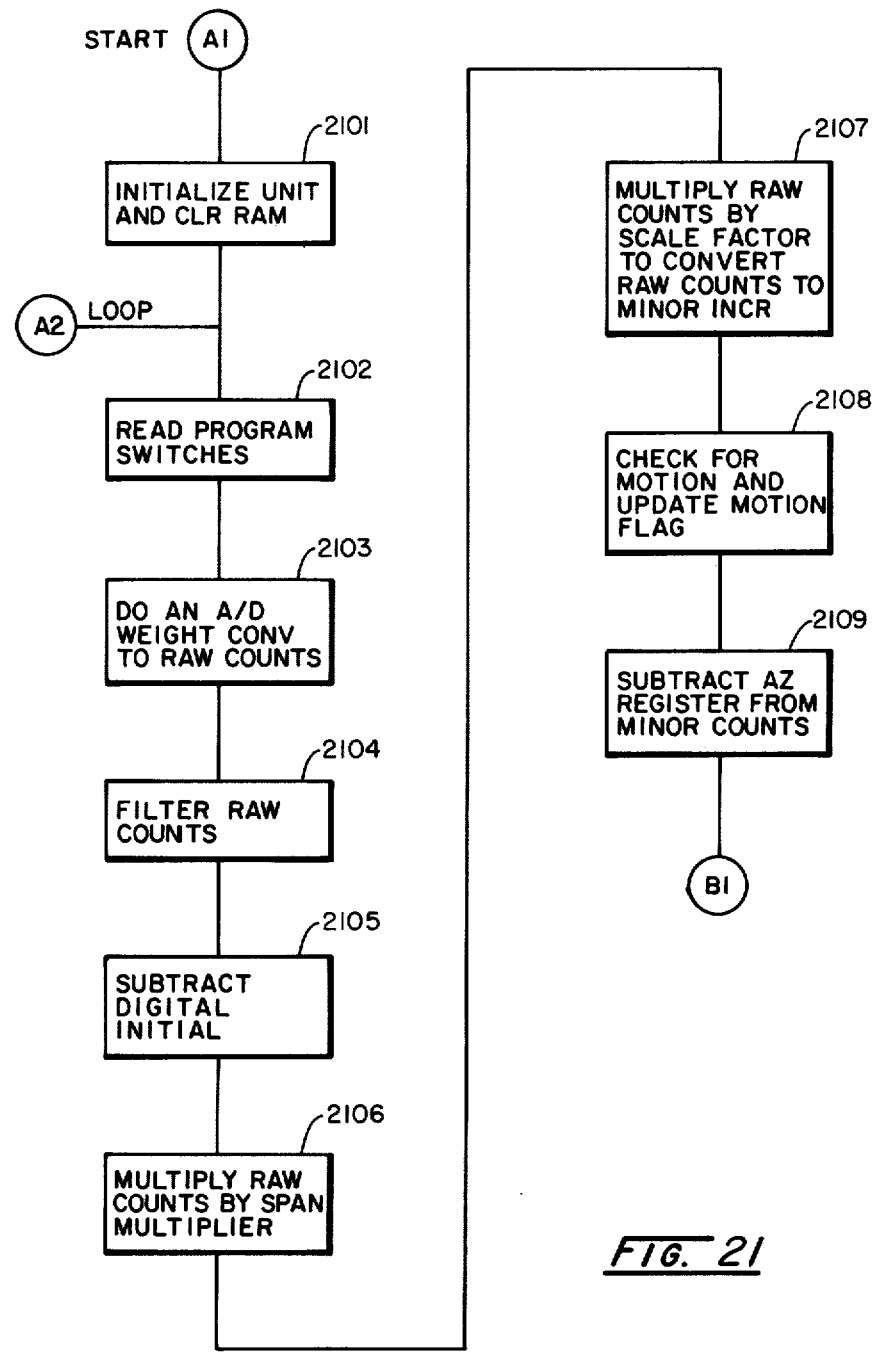
FIGS. 21–35 show flow diagrams of the programs employed to control the microprocessor and the auxiliary microprocessor or universal peripheral interface.
Figure 22:
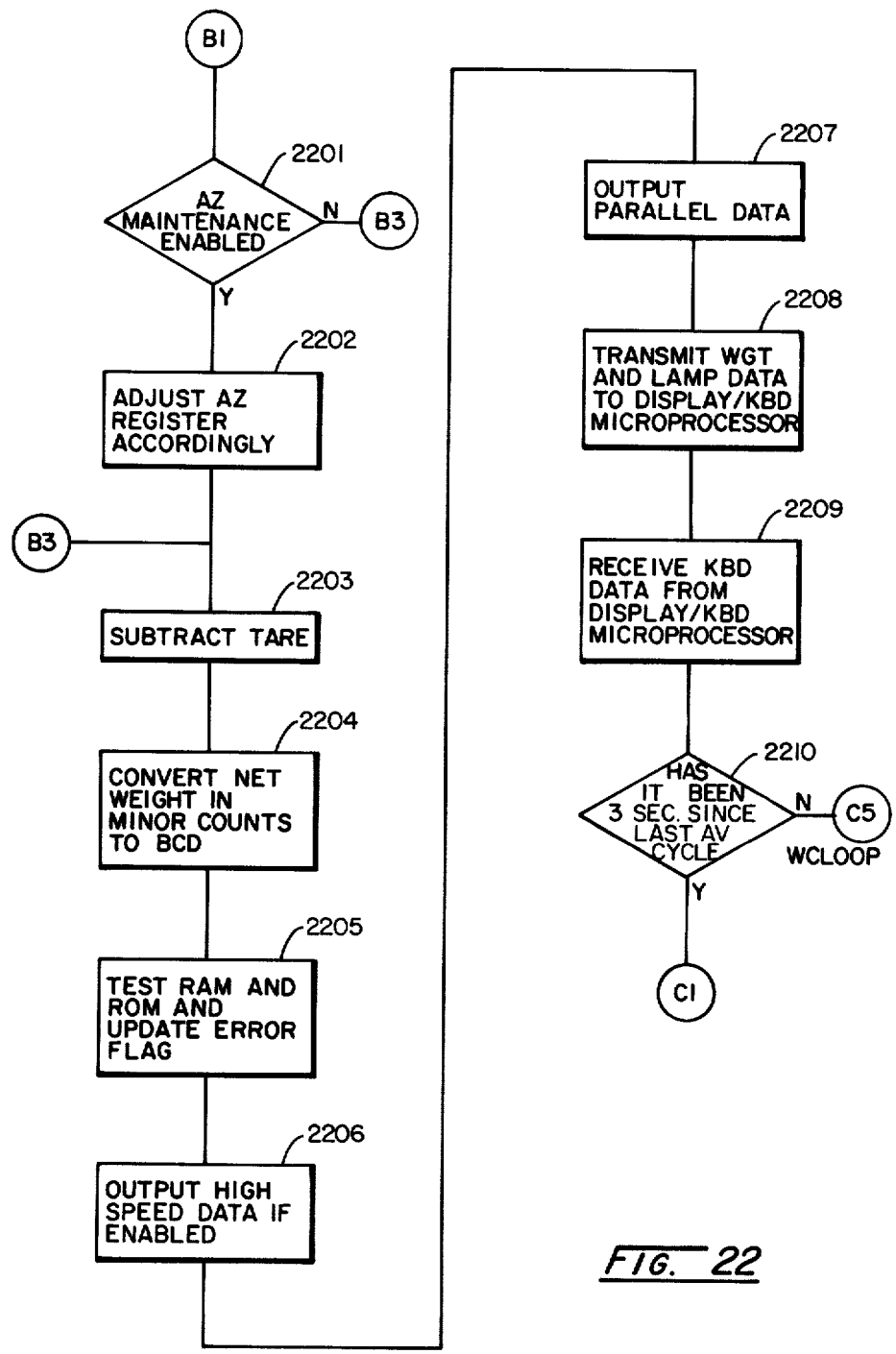
Figure 23:
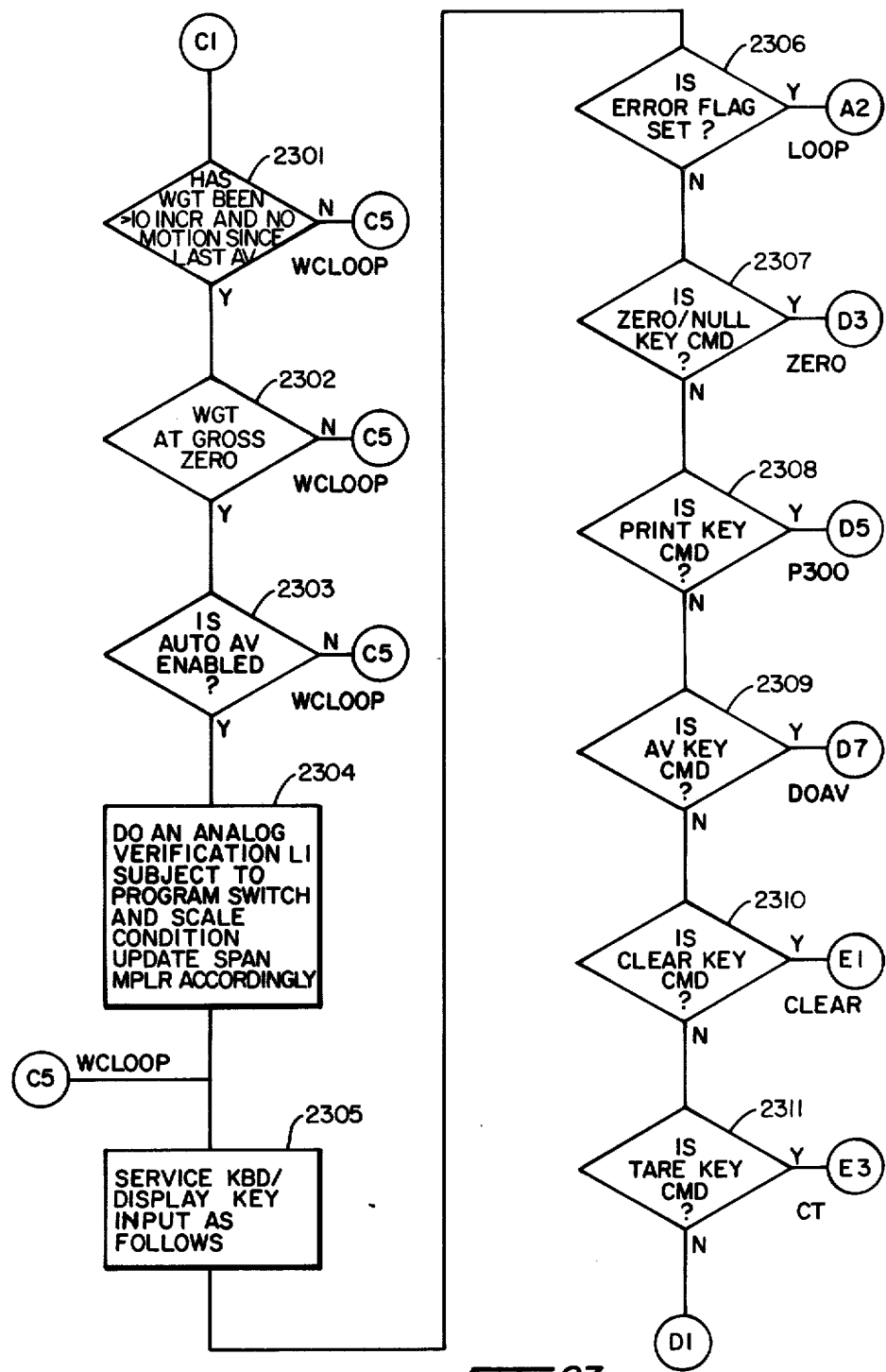
Figure 24:
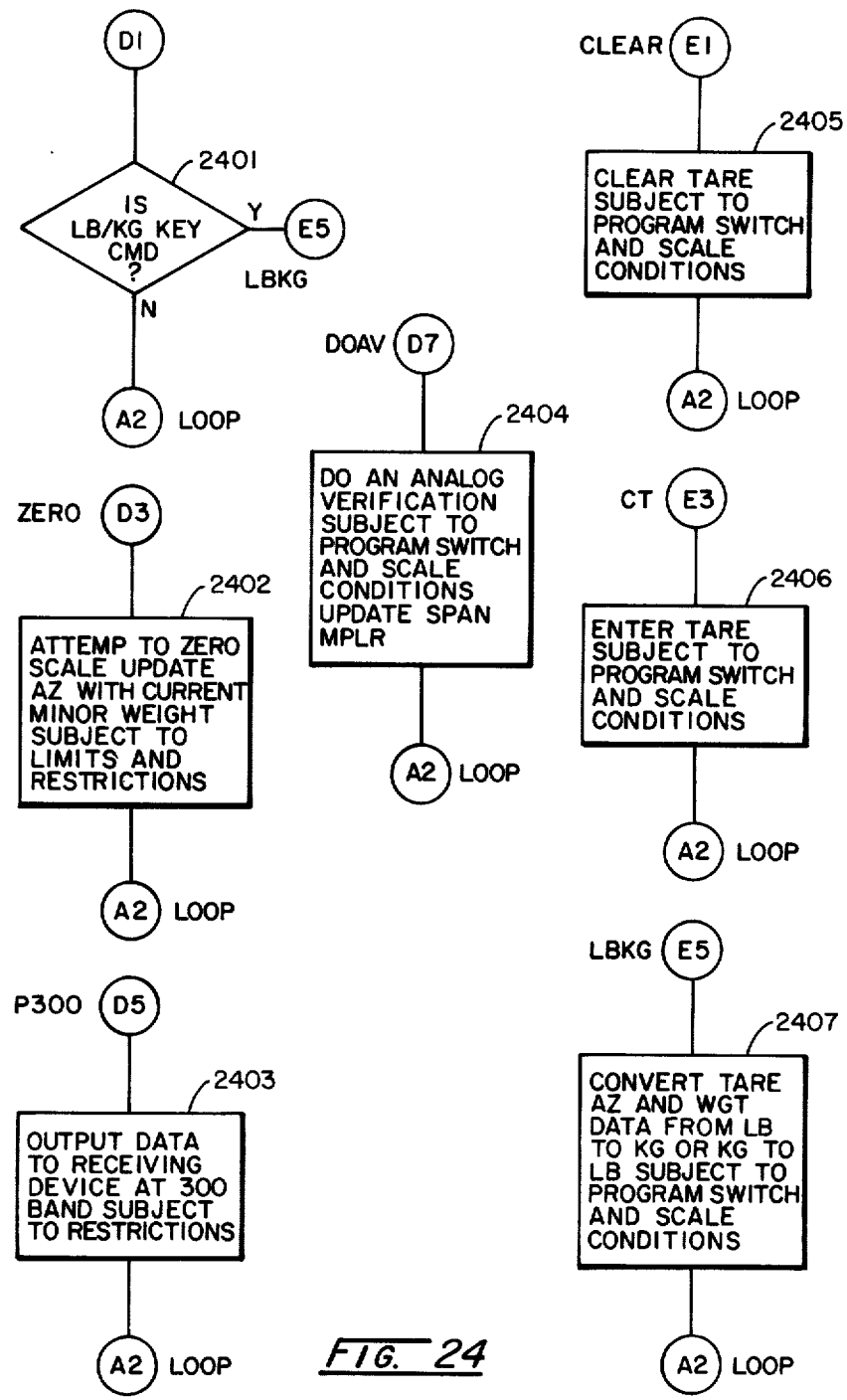
Figure 25:
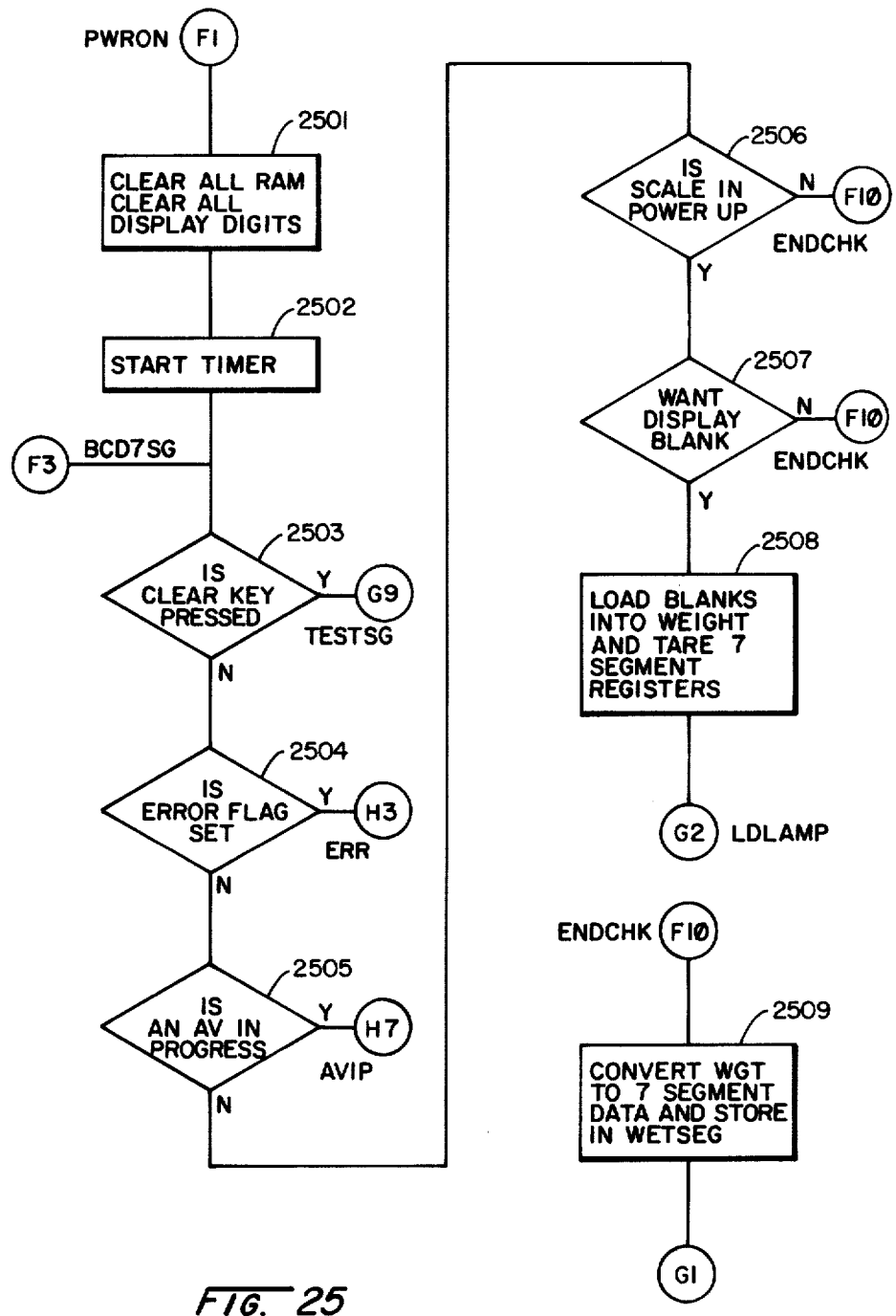
Figure 26:
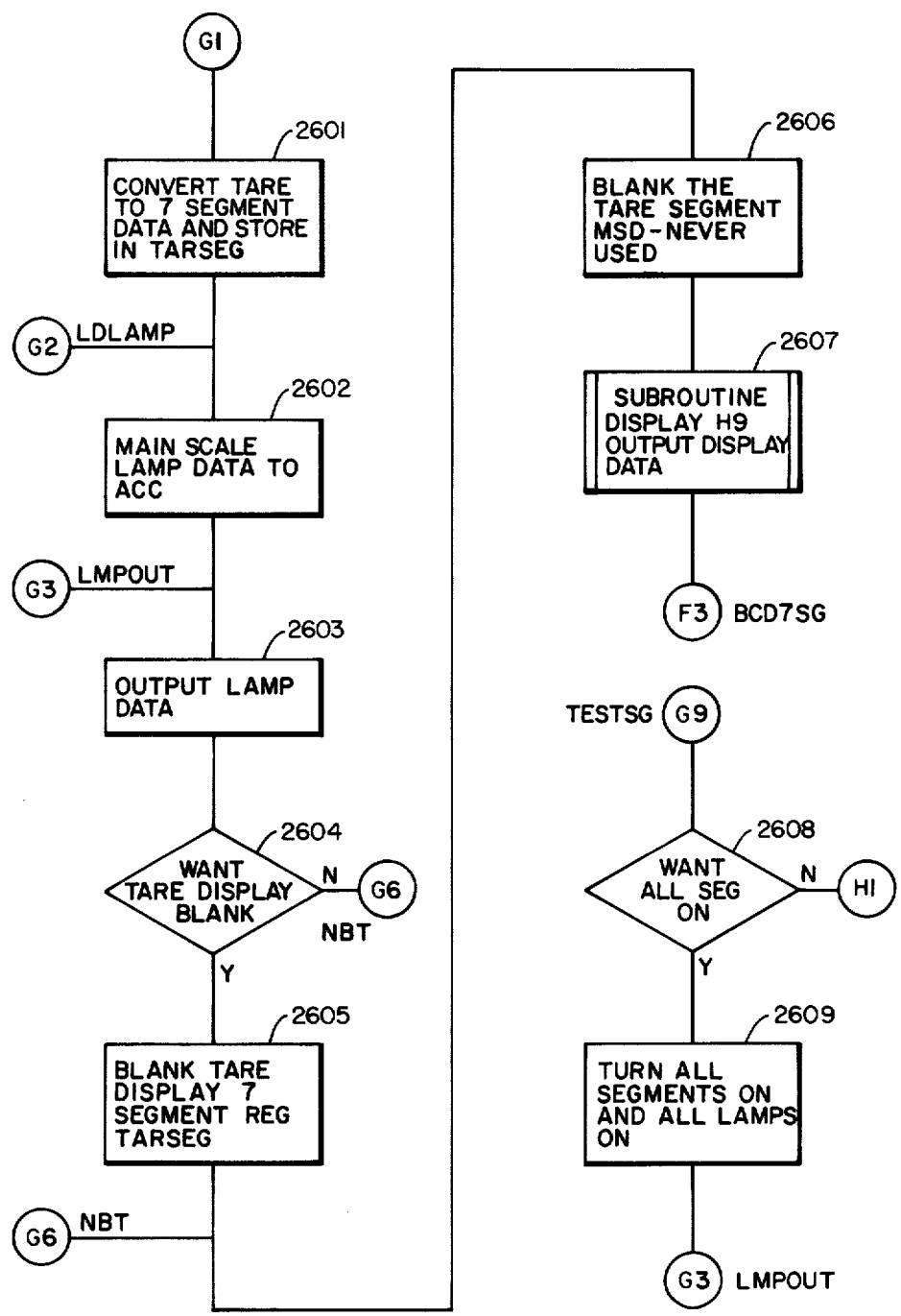
Figure 27:
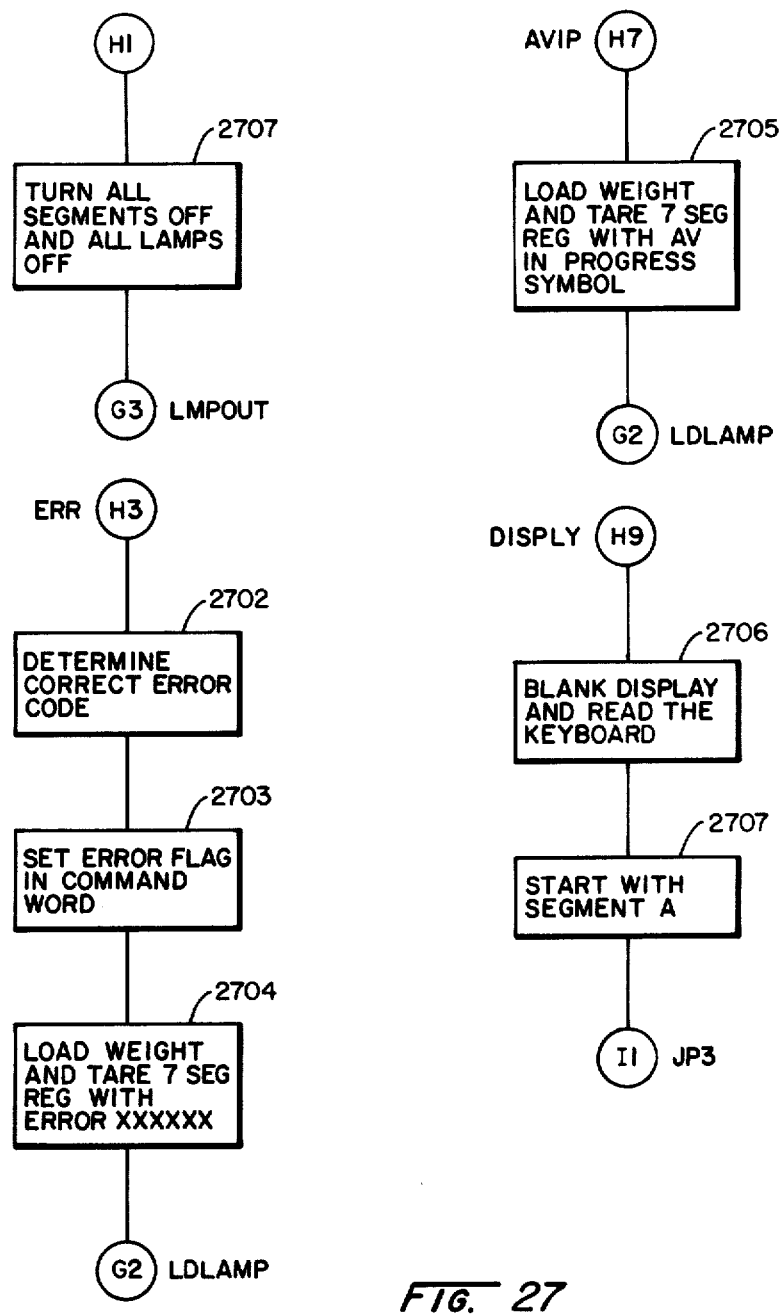
Figure 28:
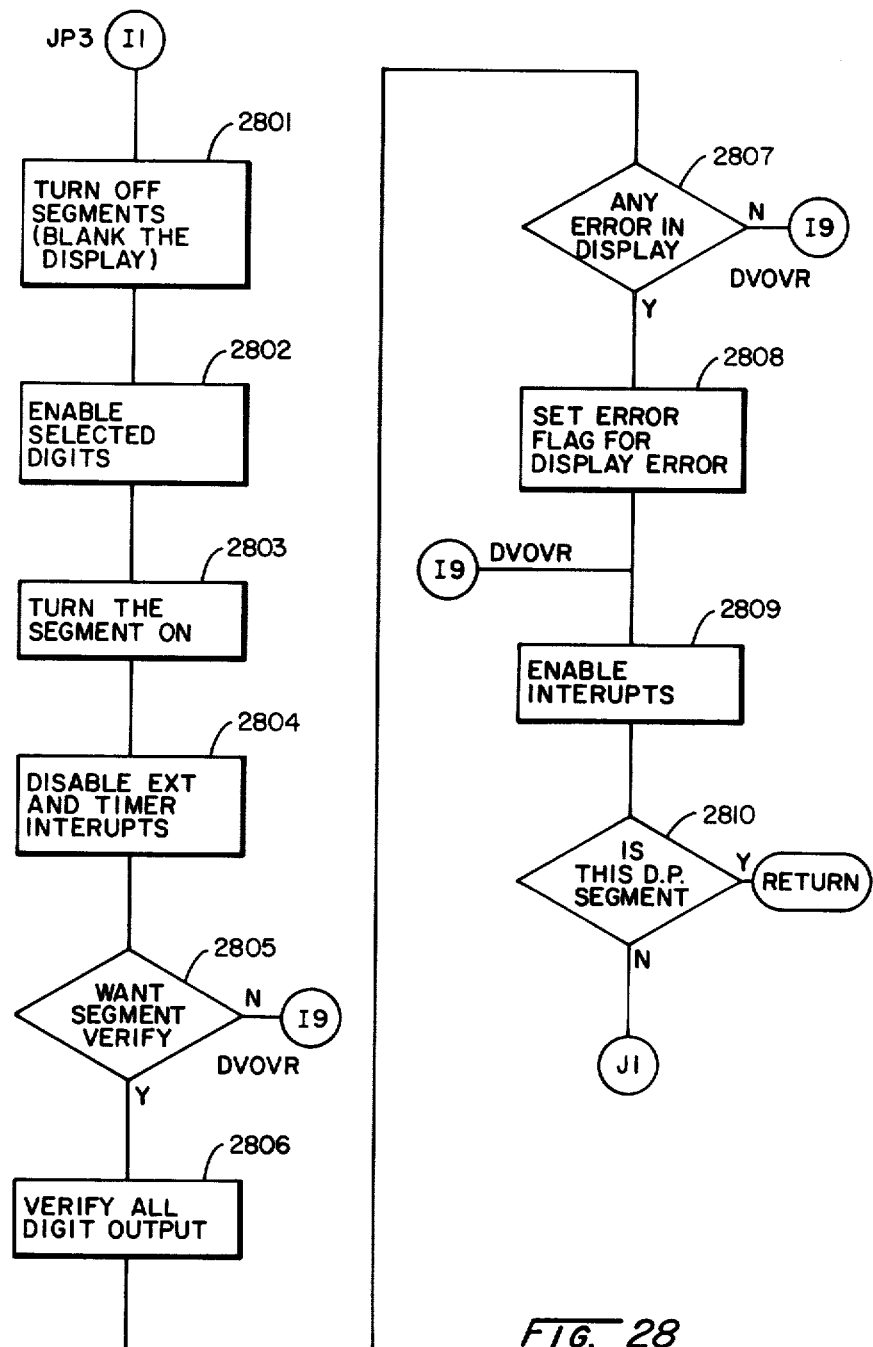
Figure 29:
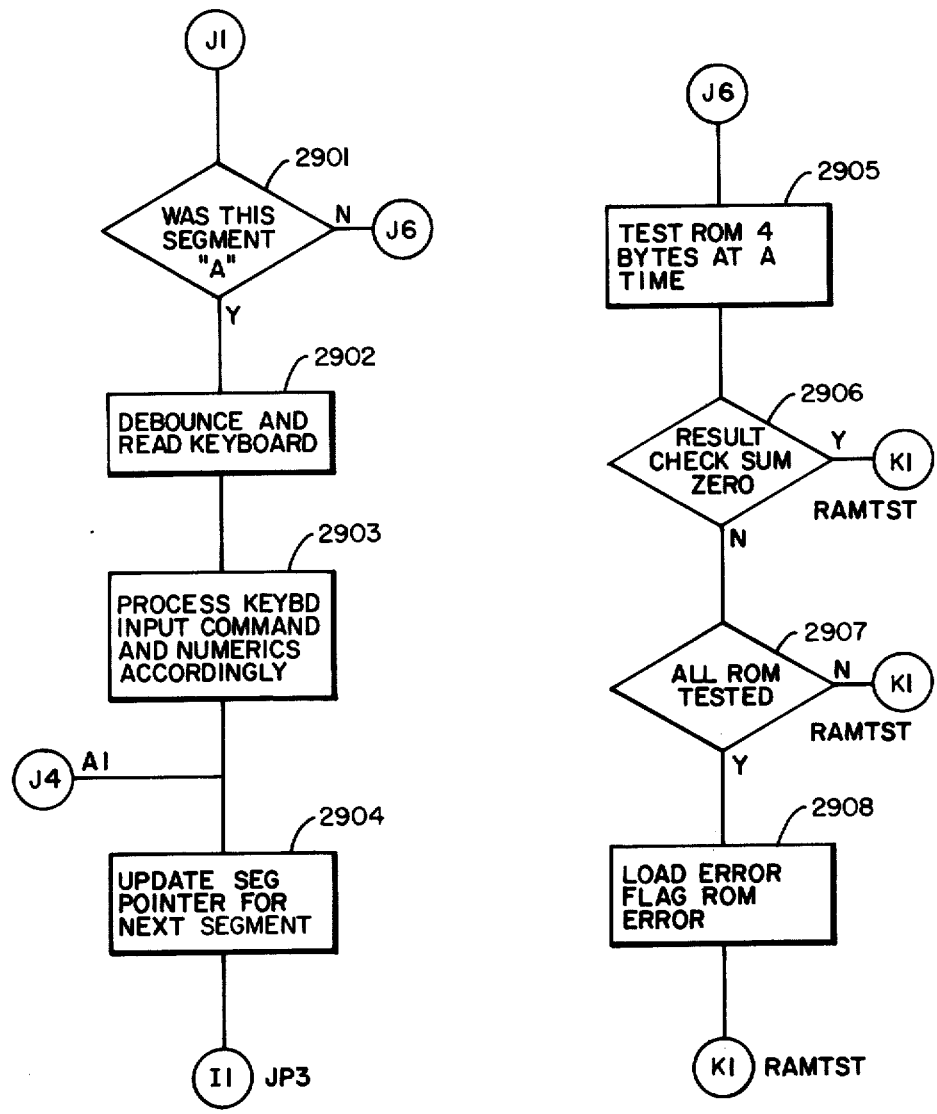
Figure 30:
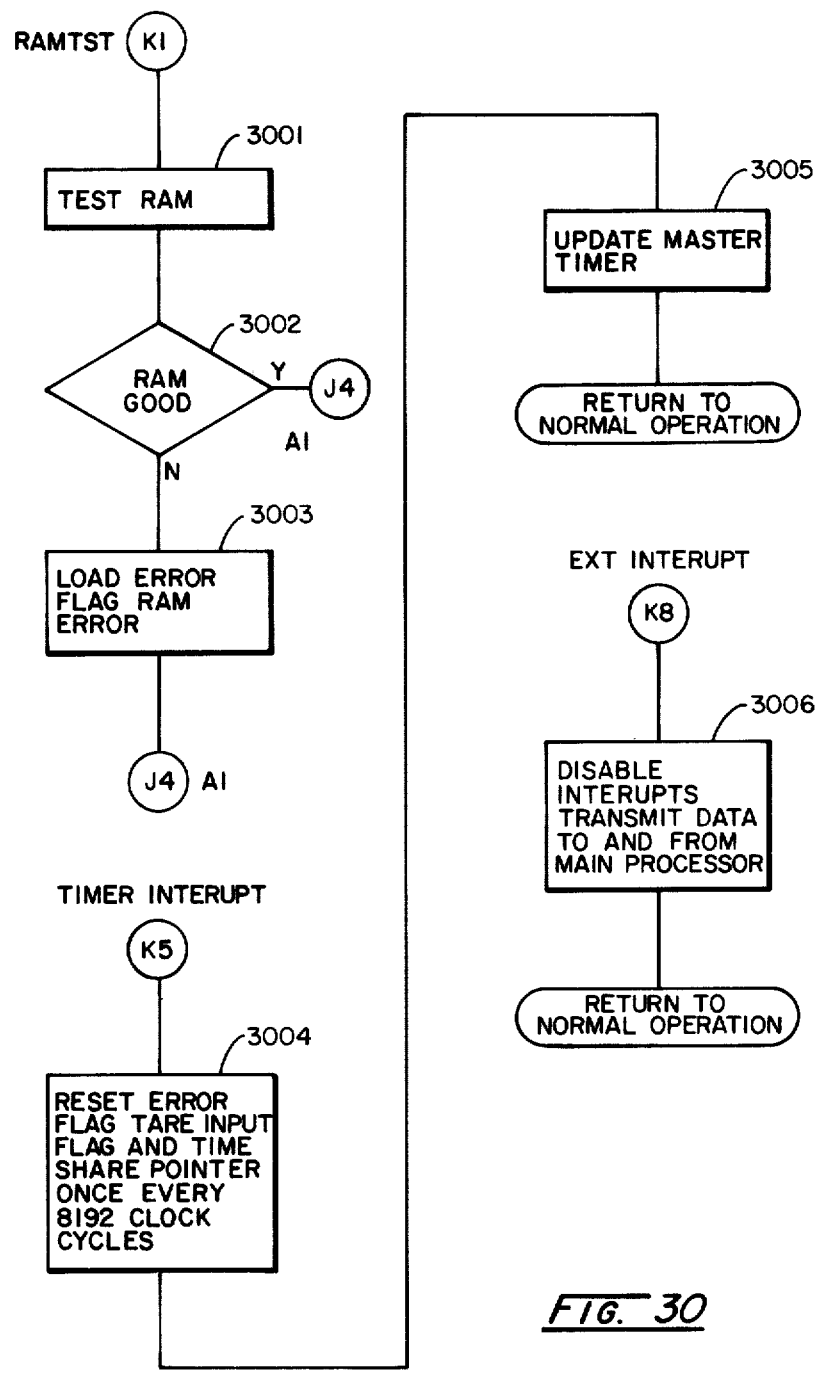
Figure 31:
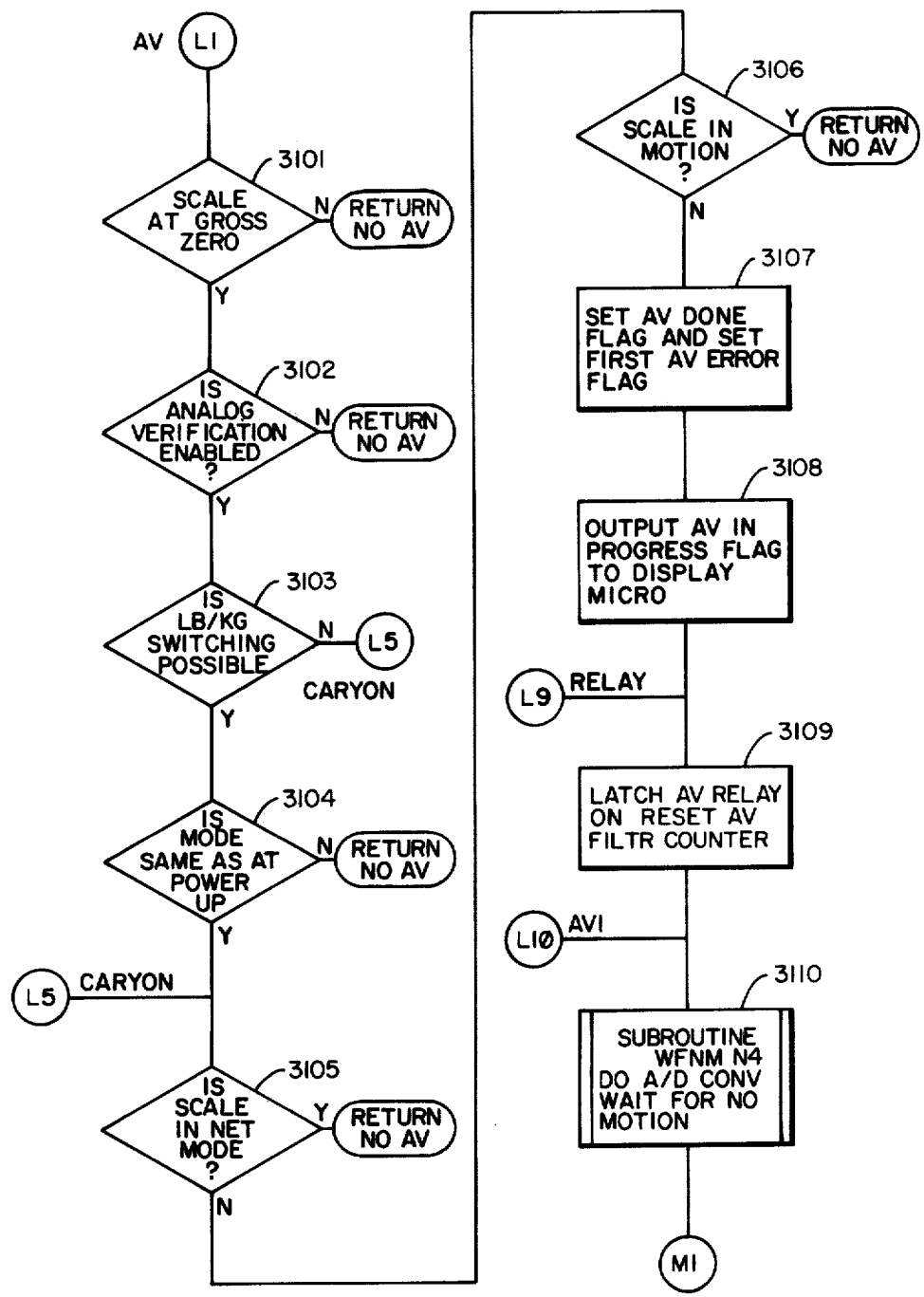
Figure 32:
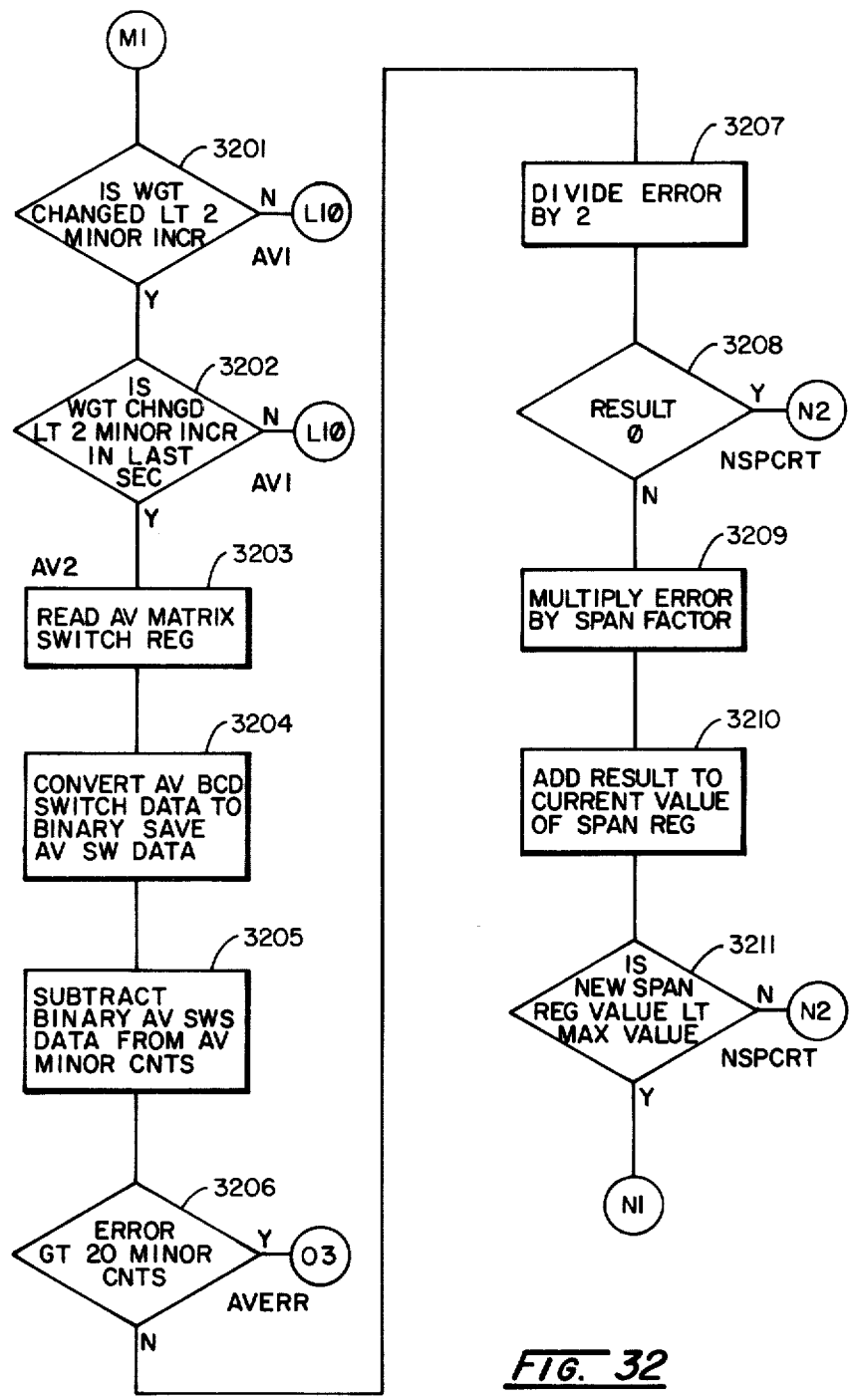
Figure 33:
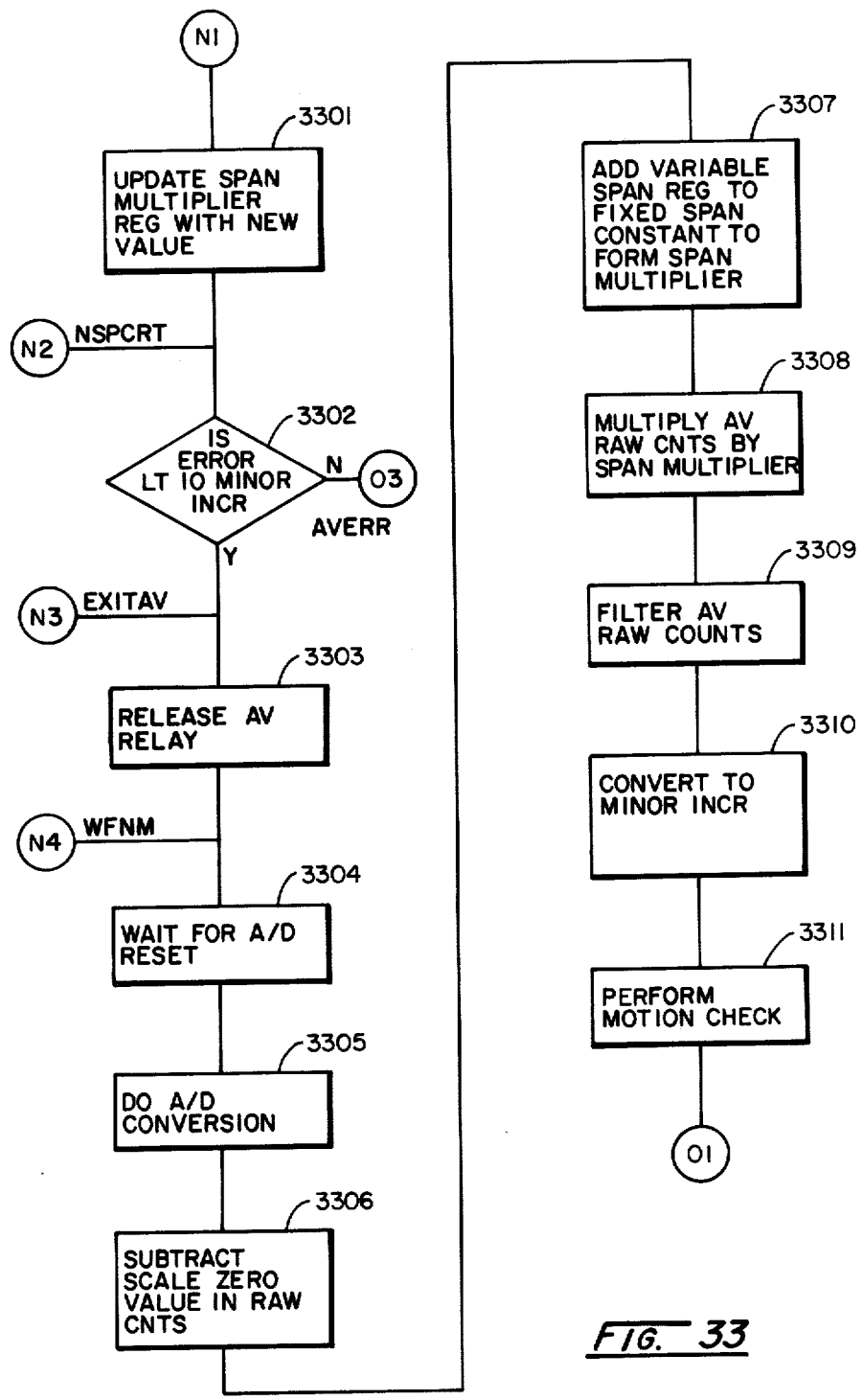
Figure 34:
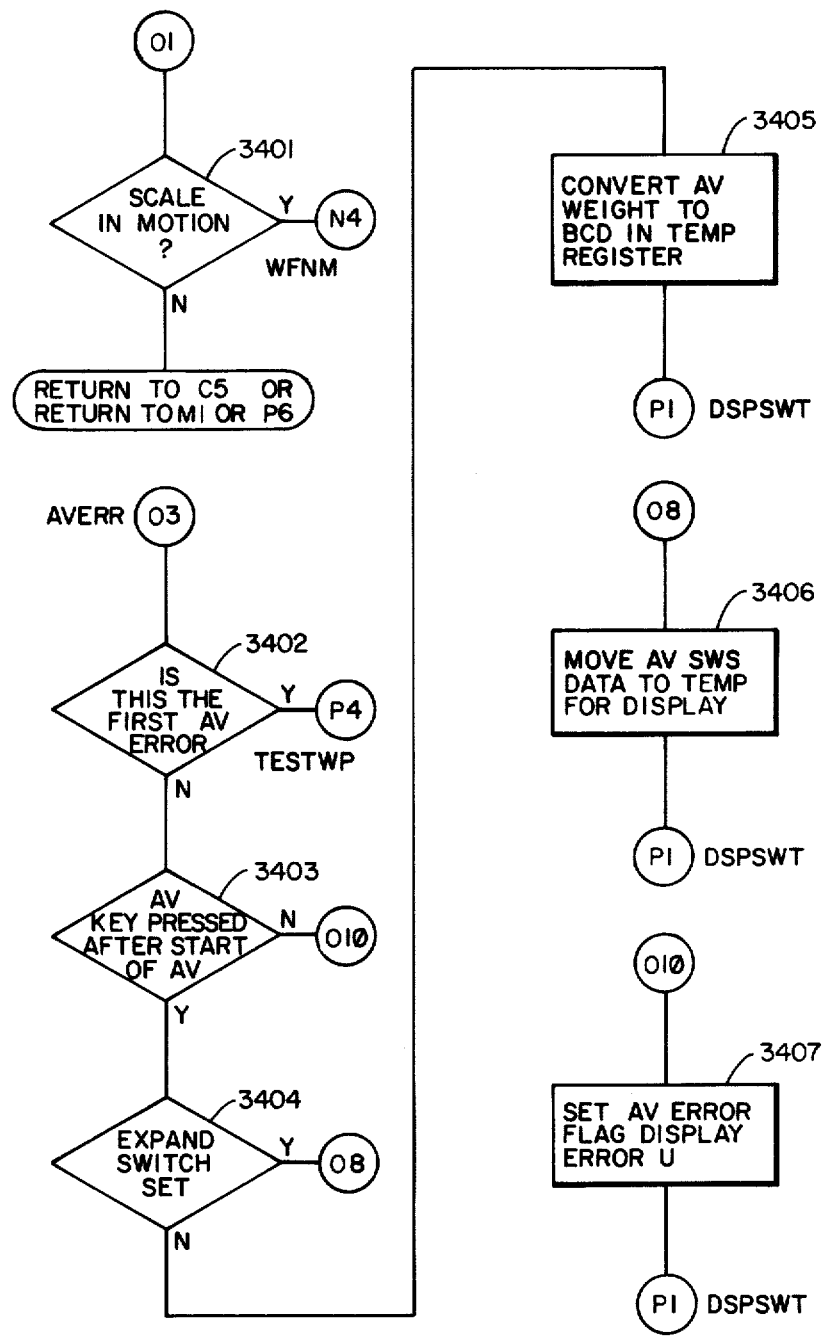
Figure 35:
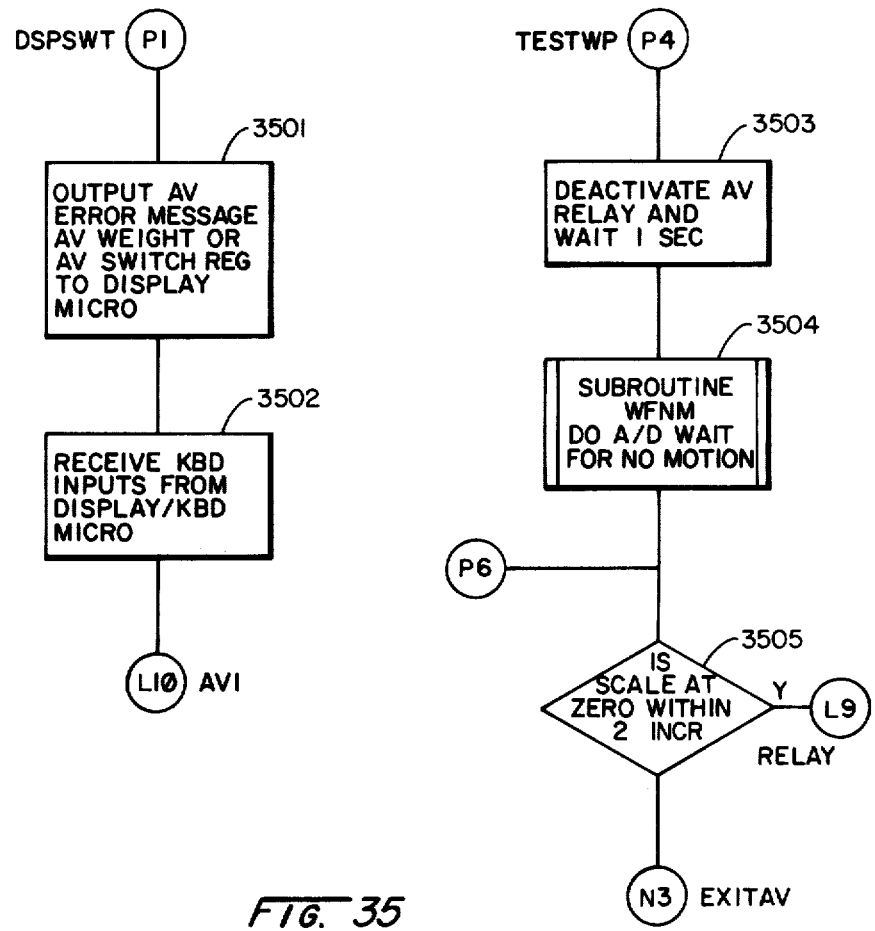

In accordance with the present invention a microprocessor or computer 15 in FIG. 1 may be any one of several readily available commercial types of computers and microprocessors or other similar control circuitry including wired components well known in the computer and microprocessor and related electronic arts. In the exemplary embodiment of the invention described herein the invention has been arranged to cooperate with and employ a microprocessor at computer 15 of the type manufactured by the Intel Corporation. As shown in FIG. 7 a 8039 microprocessor is employed together with an 8041 universal peripheral interface eight bit microcomputer also manufactured by the Intel Corporation. These microcomputers or microprocessors are described in two publications of the Intel Corporation entitled *MCS-48 TM Family of Single Chip Microcomputers Users Manual* dated July 1978 and a handbook entitled *Peripheral Design Handbook* dated April 1978. FIG. 19 shows a block diagram of the components of the 8039 microprocessor and FIG. 20 shows a block diagram of the components of the 8041 Universal Peripheral Interface 8-B Microcomputer.

The 8039 microprocessor or microcomputer does not contain any ROM storage memory for storing data or program orders. This computer does include a RAM storage space for storing random access memory of 128 eight bit storage spaces. The universal peripheral interface 8041 is provided with 1024 eight bit ROM storage spaces for program orders and other fixed data and with 64 by 8 bit RAM storage spaces. The microprocessor 8039 is provided with three input output ports and the number 1 port is shown at the top of the rectangle 710 and is employed to receive back information from the key or switch matrices of FIGS. 6 and 8 and also employed to output data to the printer 810 of FIG. 8. The number 3 input output port or Buss port is shown on the lefthand side of rectangle 710 and is used to communicate with the universal peripheral interface 8041 represented in rectangle 711 and also with the gates circuits 712 and the ROM storage device 713. Since the computer or microprocessor 710 does not include any internal ROM storage spaces an external ROM storage is provided by rectangle 713 which in the exemplary embodiment described herein comprises a 32, 768-bit static mos ROM (4096 times 8) manufactured by Signetics and designated 2632. The box 712 represents eight octal D-type transparent latches manufactured by Texas Instrument Incorporated and designated 74LS373. When the processor 710 requires a program order the processor transmits an auxiliary latch enabled signal over the ALE conductor to the latches 712 and at the same time transmits lower eight bits of the address of the required order to these latches. The latch enable signal is removed and these latches then store these eight bits and in turn transmit them to the ROM 713. In addition the microprocessor transmits an enable signal of the PSEN conductor to the ROM storage 713 and also the high four bits of address of the desired order over the fourth conductors shown at the lower righthand corner of rectangle 710 to the ROM 713. In response to these address bits of the desired order the ROM 713 then transmits the desired order back to the microprocessor 710 over the conductors of port 3. Latches 715 are also connected to the four conductors extending from the lower righthand bottom of the microprocessor 710 of port 2 and also enabled by the enable signal over the ALE conductor. Latches in the exemplary embodiment described herein comprise four edge triggered type D flip-flops which store the signals received over the four conductors from the bottom of the microprocessor 710 when enabled by the leading edge of an enabling signal simultaneously received over the ALE conductor. These latches or flip-flops are manufactured by the Texas Instrument Corporation and designated 74LS175. The other four conductors from Port 2 extending from the lower righthand side of rectangle 710 of the microprocessor extend to the translator 714. This translator in the exemplary embodiment described herein is a four line to 16 line decoder/demultiplexer manufactured by Signetics and designated 74154. This arrangement is employed to multiplex data from the four conductors from the bottom of the microprocessor 710 which is stored in the flip-flops 715 to any one of a variety of other devices activated by the demultiplexer or translators 714. Thus the microprocessor will transmit a binary code over the four conductors from the lower righthand side of the microprocessor 710 to the translator 714 which then activates one of the 16 outputs to activate one of the possible output devices and then the data from the four conductors from the bottom of the microprocessor 710 stored in the flip-flops 715 is transmitted to the designated output device. These output devices are connected to the conductors from the latches or flip-flops 715 through AND gates which are in turn controlled by the outputs from the translator 714 so that they will respond to the output data from the latches 715 only when activated by an output from the corresponding one of the outputs from the translator 714.

The microprocessor 710 communicates with the universal peripheral interface 8041 over the conductors of port 3 and designating or activating either the read conductor RD or the write conductor WR.

Figure 8:
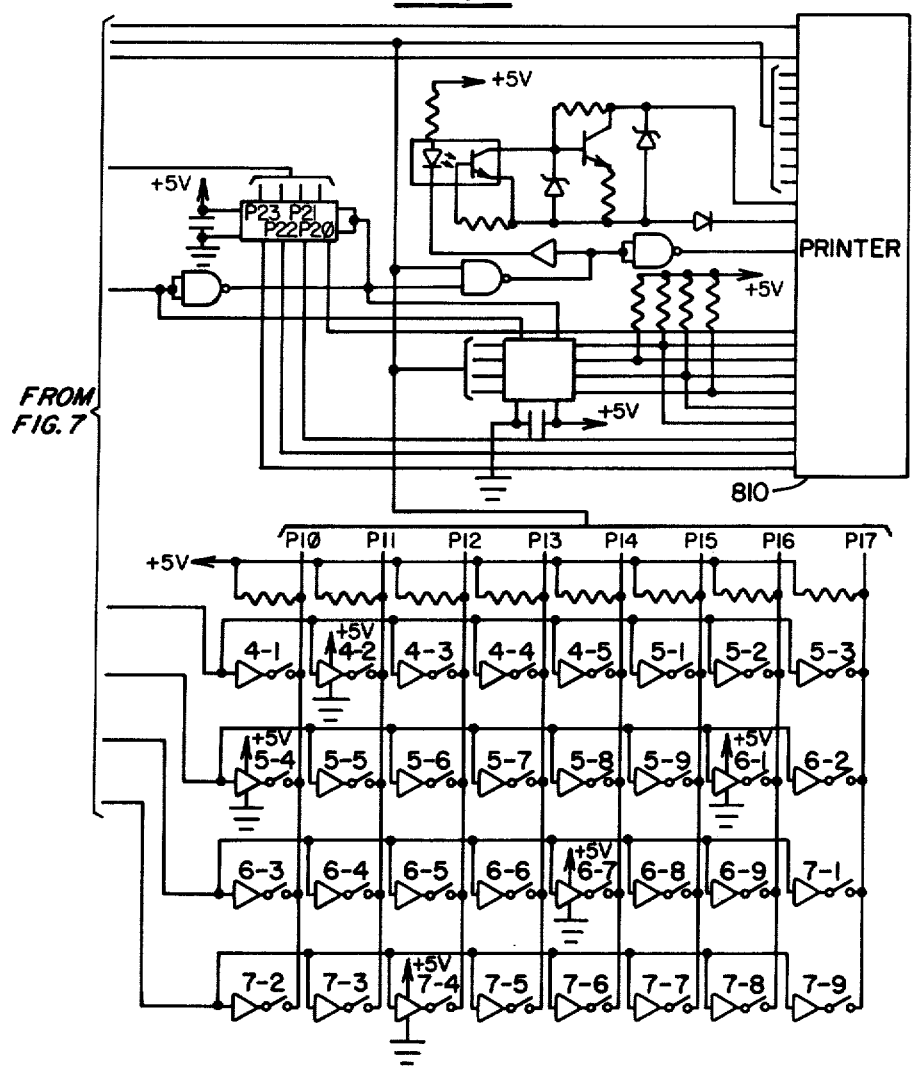
FIG. 8 shows the printer control interface and the program switches and function switches employed to control the microprocessor.

The lower portion of FIG. 8 shows a group of function switches which are usually located under the scale cover and are set initially to control the functions to be performed by the scales and supply other information to the microprocessor and scale mechanism to control its operation in the desired or prescribed manner. Each of these switches may be operated independently of all of the other switches and certain of the switches when operated control a particular individual function while other of the switches are operated in groups to supply desired information to the microprocessor or scale mechanism. The following tables A, B, C and D show the functions performed by the various switches and the manner in which they are operated to supply desired information to the microprocessor or still mechanism to control its operation.

TABLE A

| Increments | FULL SCALE | | | | |
|---|---|---|---|---|---|
| | SW4-1 | SW4-2 | SW4-3 | SW4-4 | SW4-5 |
| 1000 | 0 | 0 | 0 | 0 | 0 |
| 1500 | 0 | 0 | 0 | 0 | 1 |
| 1700 | 0 | 0 | 0 | 1 | |
| 2000 | 0 | 0 | 0 | 1 | 1 |
| 2500 | 0 | 0 | 1 | 0 | 0 |
| 3000 | 0 | 0 | 1 | 0 | 1 |
| 3400 | 0 | 0 | 1 | 1 | |
| 4000 | 0 | 0 | 1 | 1 | 1 |
| 5000 | 0 | 1 | 0 | 0 | 0 |
| 6000 | 0 | 1 | 0 | 0 | 1 |
| 6800 | 0 | 1 | 0 | 1 | 0 |
| 8000 | 0 | 1 | 0 | 1 | 1 |
| 8500 | 0 | 1 | 1 | 0 | 0 |
| 10000 | 0 | 1 | 1 | 0 | 1 |
| 12000 | 0 | 1 | 1 | 1 | 0 |
| 16000 | 0 | 1 | 1 | 1 | 1 |
| 17000 | 1 | 0 | 0 | 0 | 0 |
| 20000 | 1 | 0 | 0 | 0 | 1 |

TABLE B

| | INCREMENT SIZE | | |
|---|---|---|---|
| Avoir | Metric | SW5-2 | SW5-3 |
| X1 | X0.5 | 0 | 1 |
| X2 | X1 | 1 | 0 |
| X5 | X2 | 1 | 1 |

TABLE C

| DECIMAL POINT | | | | |
|---|---|---|---|---|
| Avoir & Metric X1 & X2 | Metric X5 | SW5-9 | SW5-1 | SW6-2 |
| XXXXOO | XXXXXO | 0 | 0 | 0 |
| XXXXXO | XXXXXX | 0 | 0 | 1 |
| XXXXXX | XXXXX.X | 0 | 1 | 0 |
| XXXXX.X | XXXX.XX | 0 | 1 | 1 |
| XXXX.XX | XXX.XXX | 1 | 0 | 0 |
| XXX.XXX | XX.XXXX | 1 | 0 | 1 |
| XX.XXXX | X.XXXXX | 1 | 1 | 0 |
| X.XXXXX | — | 1 | 1 | 1 |

TABLE D

| Functions | |
|---|---|
| Tare Display Disable | SW 5-4 |
| Auto CLR Inhibit | SW 5-5 |
| Multi Line GR, TR, NET | SW 5-6 |
| Tare Interlock Inhibit | SW 5-7 |
| KBD Tare Inhibit | SW 5-8 |
| AUTO AV Disable | SW 6-3 |

TABLE D-continued

| Functions | |
|---|---|
| Analog Verify Enable | SW 6-4 |
| Demandmode Disable | SW 6-5 |
| Expand X10 | SW 6-6 |
| Motion Sensitivity | SW 6-7 |
| Motion Blanking Disable | SW 6-8 |
| PWR Kg Enable | SW 6-9 |
| AZM Disable | SW 7-1 |
| Checksum Inhibit | SW 7-2 |
| PRT, GR, TR, NET | SW 7-3 |
| NEG PRT Inhibit | SW 7-4 |
| High Speed EXP PRT END | SW 7-5 |
| High Speed PRT ENB | SW 7-6 |
| MIN PRT 2 | SW 7-7 |
| MIN PRT 1 | SW 7-8 |
| Double Width PRT ENB | SW 7-9 |

As shown in FIG. 8 each of the switches is provided with an amplifier which decouples or isolates the respective switches so that there are no spurious paths between the various switches of various rows and columns and thus no intercoupling between any of the switches of the various rows and columns.

The respective horizontal rows of the switches as shown in FIG. 8 are strobed by signals received from the terminals 8, 9, 10 and 11 of the multiplexing or translating equipment 714 under control of the microprocessor 710 in the manner described above. When a switch in any of the strobe rows is closed it causes a signal to be transmitted over the corresponding vertical column to the port 1 of the microprocessor 710.

Figure 6:
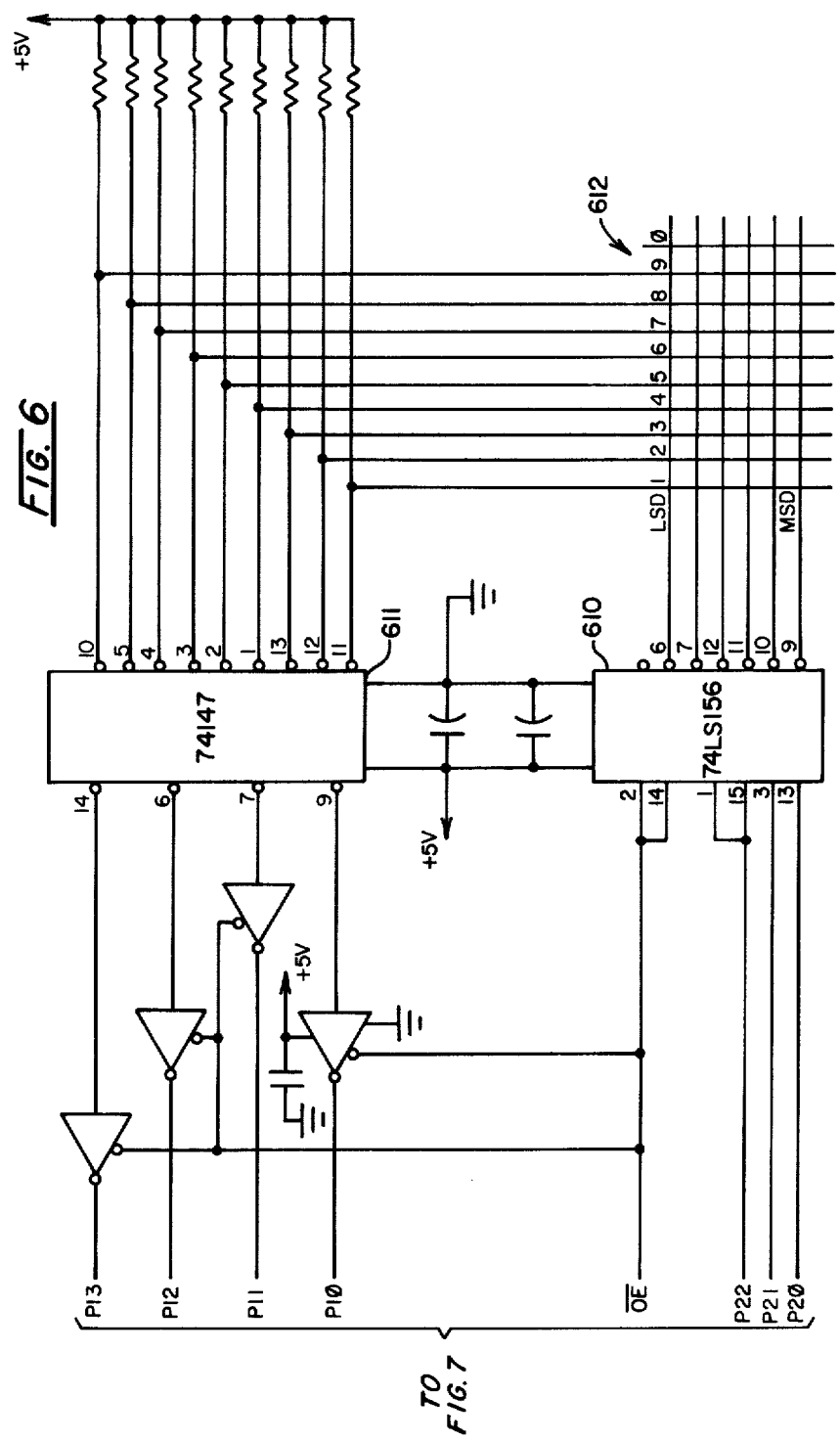
FIG. 6 shows the matrix switch and its interconnection with the computer for storing the reference or correct response to the automatic verification as signals.
Figure 12:
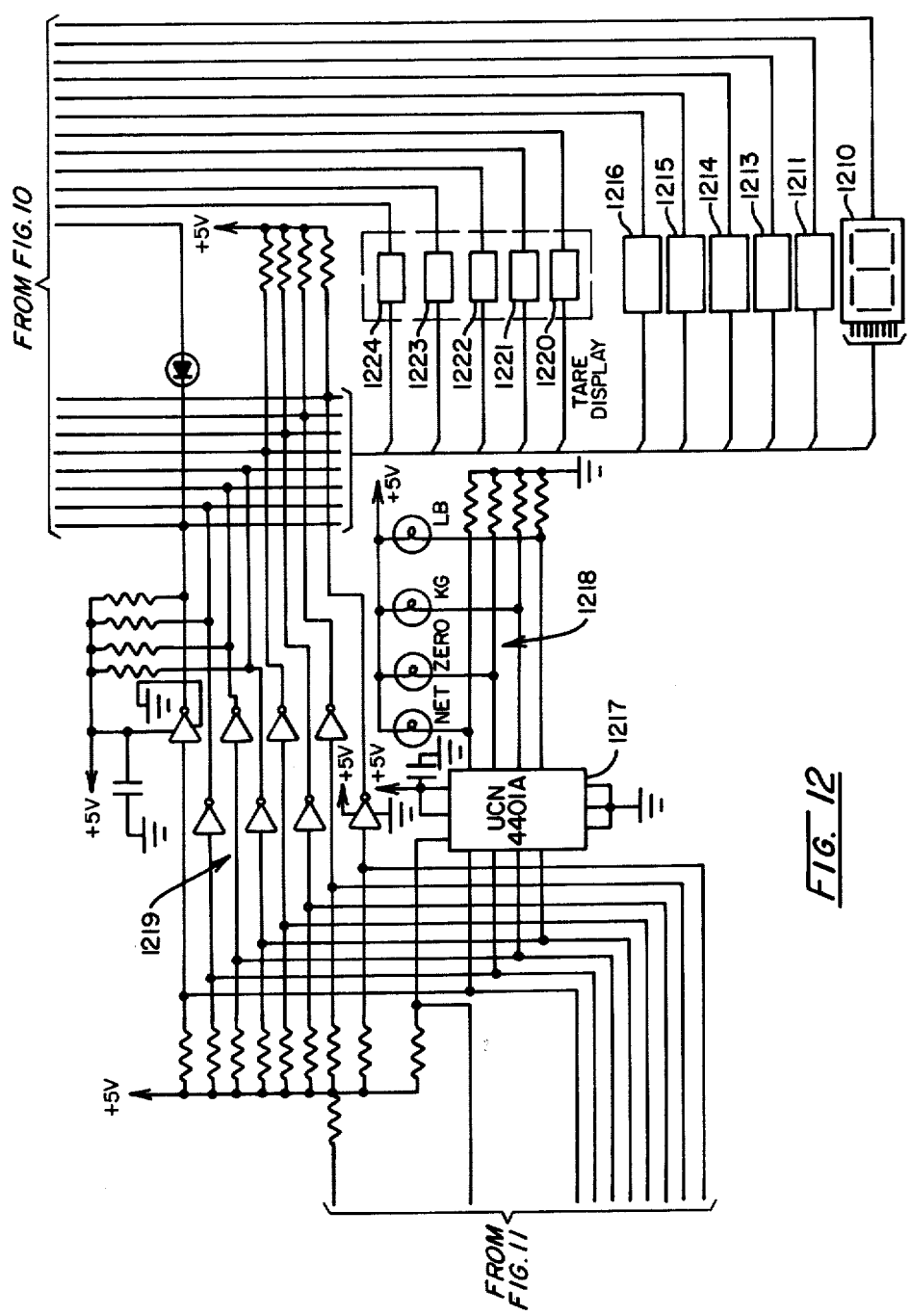

FIG. 6 shows a decimal matrix switch 612 which is employed to set the number or weight expected from the scale mechanism when the analog verify relay 311 is operated. The horizontal rows correspond to the various digits of the expected number or weight with the least significant digit at the top and the most significant digit at the bottom of the switch as shown in FIG. 12. Rectangle 610 of FIG. 6 represents a binary to one out of eight or in this case one out of six. In the exemplary embodiment of this invention a suitable translator decoder or demultiplexer 74LS156 manufactured by Signetics.

Figure 9:
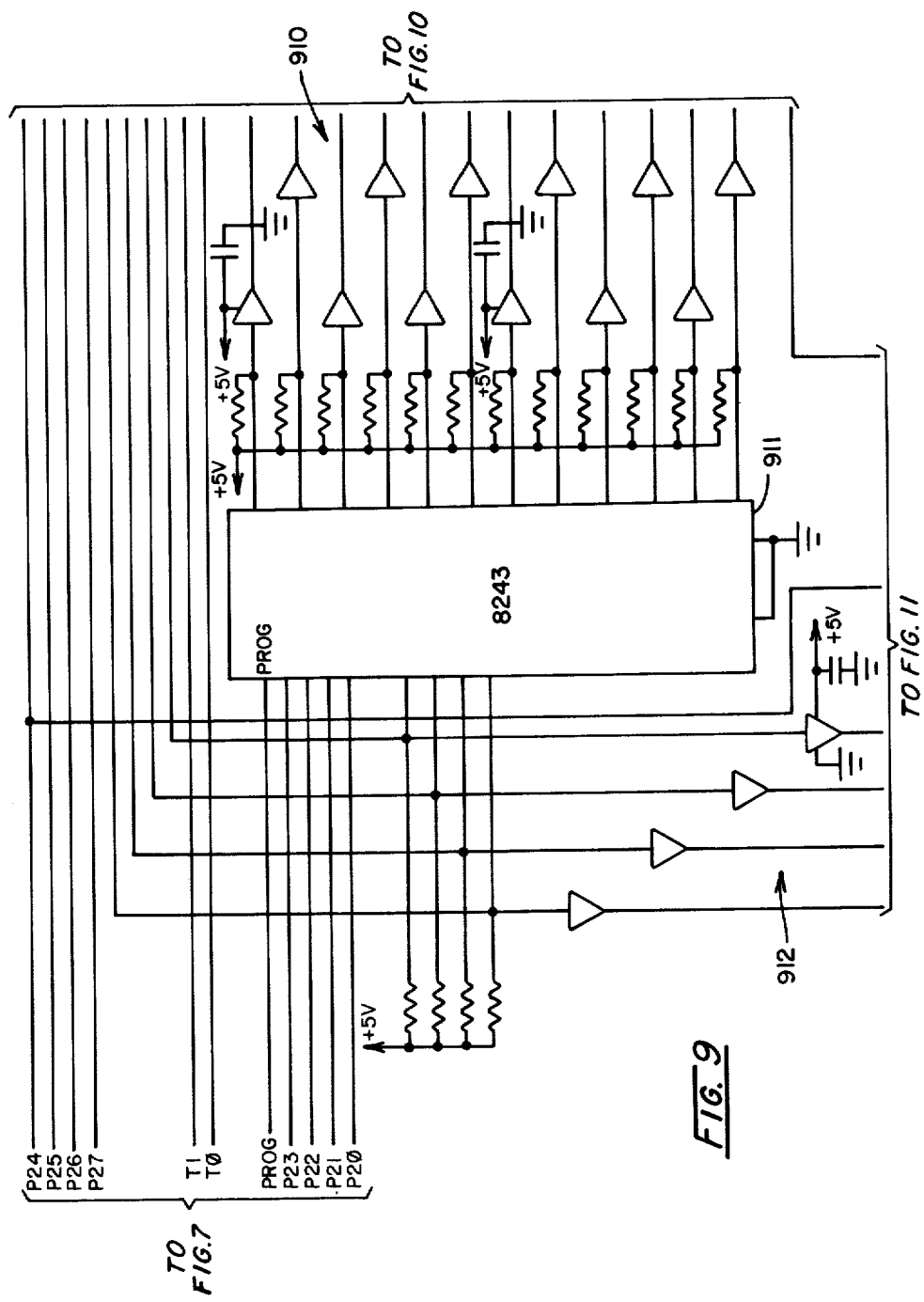
FIGS. 9, 10, 11 and 12 show the display and the control interface between the display and the microprocessor or computer plural of FIG. 7.
Figure 10:
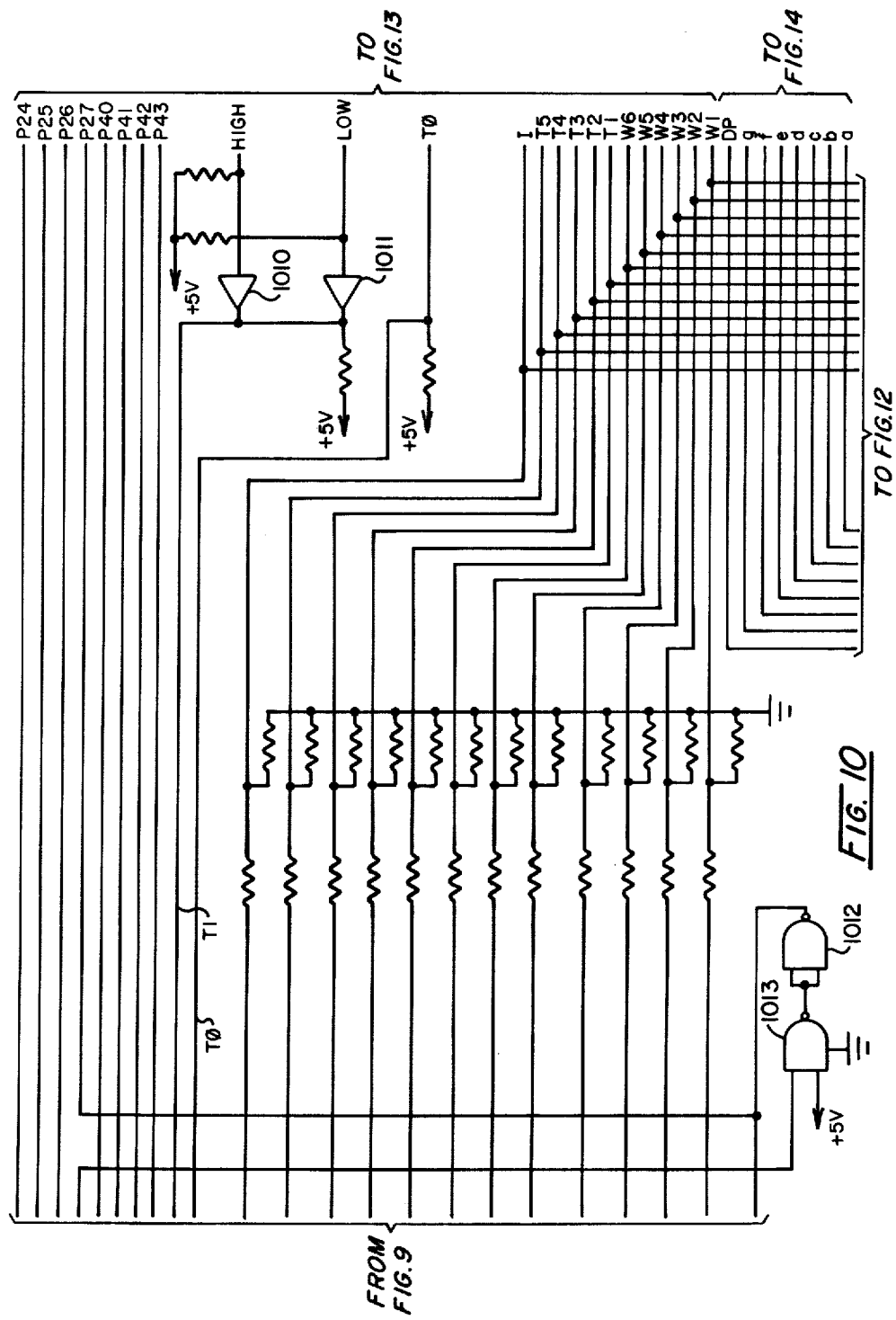
Figure 11:
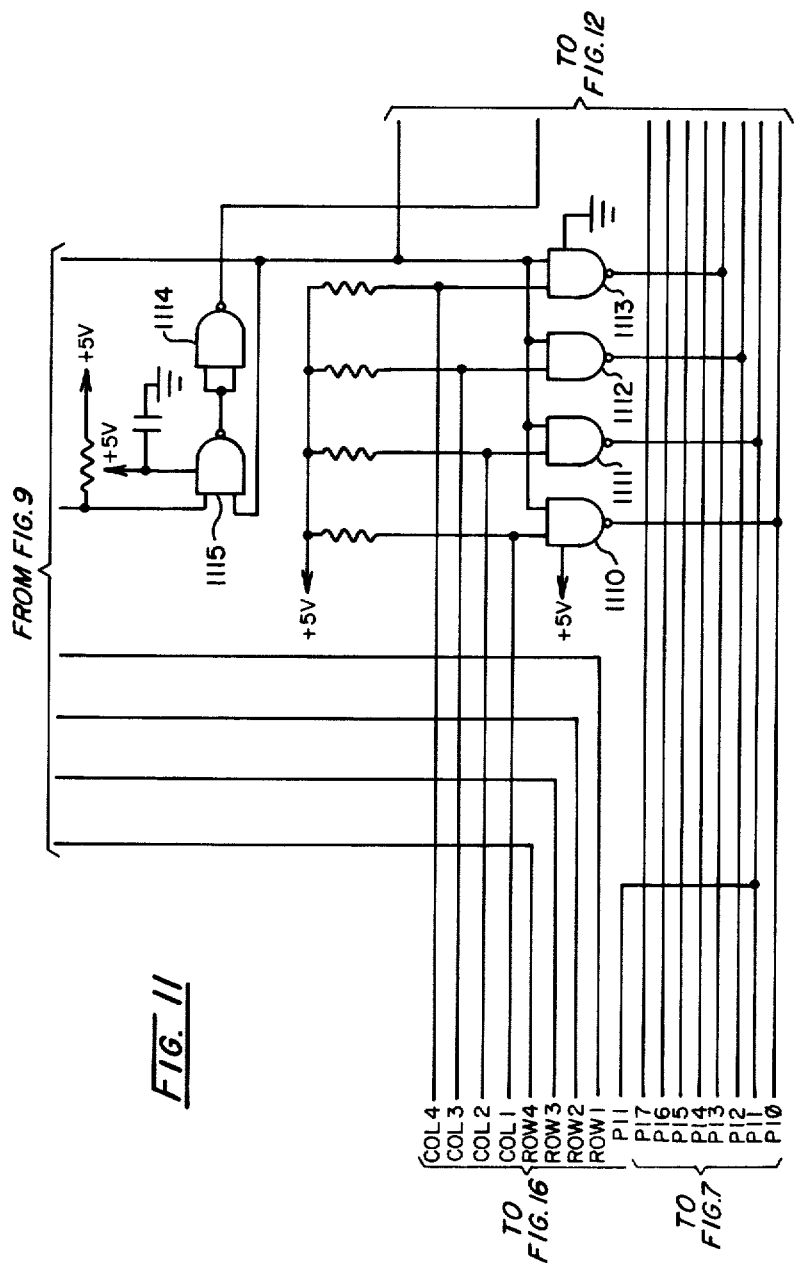

Rectangle 611 of FIG. 6 represents a ten line decimal encoder to a four line BCD code. A suitable translator is manufactured by Texas Instruments Incorporated and designated 74147. The switch 612 is set at the time the scale is adjusted or serviced in accordance with the indication received as described above. Then when the microprocessor desires to check the analog verification or check the automatic span control of the scale the computer 710 will cause a signal to be applied to the OE lead from the decoder 714. This signal enables the translator 610 and the amplifiers connected to the output of the encoder 611 then the signals received over the conductors from the bottom of the computer 710 of port 2 cause the various digits or horizontal rows of the switch 610 to be strobed and the switches in the respective rows which then causes a signal to be transmitted back to the encoder 611 to the port 11 of the microprocessor 710. FIGS. 9, 10, 11 and 12 when arranged as shown in FIG. 2 show the displayed circuits and equipment and the control thereof which are in turn connected to the microprocessor 710 and to the universal peripheral interface eight bit microcomputer 711. As shown in FIG. 12 the weight display comprises six digital display elements 1210 through 1216 and five digital display elements 1220 through 1224 and four lamp displays 1218 which are in turn driven by the latches UCN 4401A manufactured by Sprague designated 1217 in FIG. 12. Each of the digital display elements for displaying the weight and the tare comprise a seven segment display device in which the segments are selectively energized to display the desired numerals. Each of the display devices has eight cathodes one for each of the segments of the display and an eighth one for the decimal point. Connections to these cathodes are shown on the lefthand side of each of the display elements in FIG. 12. In addition, each of the digital display devices has an anode and connections to these anodes are shown on the righthand side of the devices in FIG. 12. The cathodes of each of the respective segments of each of the display devices are all connected in parallel and are driven from the respective amplifiers 1219 which supply the cathode voltage and power or current for the various display segments of the digital display devices. These amplifiers are in turn connected to and controlled by the output ports P10 through P17 shown at the bottom lefthand side of the universal peripheral interface 711. The anodes of the respective digital display devices are energized by amplifiers 910 over a bus system extending from FIG. 9 through FIG. 10 to the anodes of the digital display devices shown in FIG. 12. The amplifiers 910 are in turn controlled from the output ports 5, 6 and 7 shown on the righthand side of the input output expander 911. This input output expander in the exemplary embodiment described herein is an MCS-48TM input output expander number 8243 manufactured by Intel Corporation. This expander is in turn controlled by the universal peripheral interface 711 over the terminals P20 through P23 and the program terminal PROG as indicated in FIGS. 7 and 9. The microprocessor 710 transmits to the universal peripheral interface 711 the information desired to be displayed. The universal peripheral interface 711 then causes the respective segments of the digital display devices to be energized over the path described above and causes the corresponding anodes of the respective digital display devices to be energized through the input output expander 911 in the manner described above. Each of the segments desired to be illuminated are energized for a short interval of time and in rapid succession and the entire display cycle repeated sufficiently rapid so that the display segments of the display devices appear to be continuously illuminated.

Figure 13:
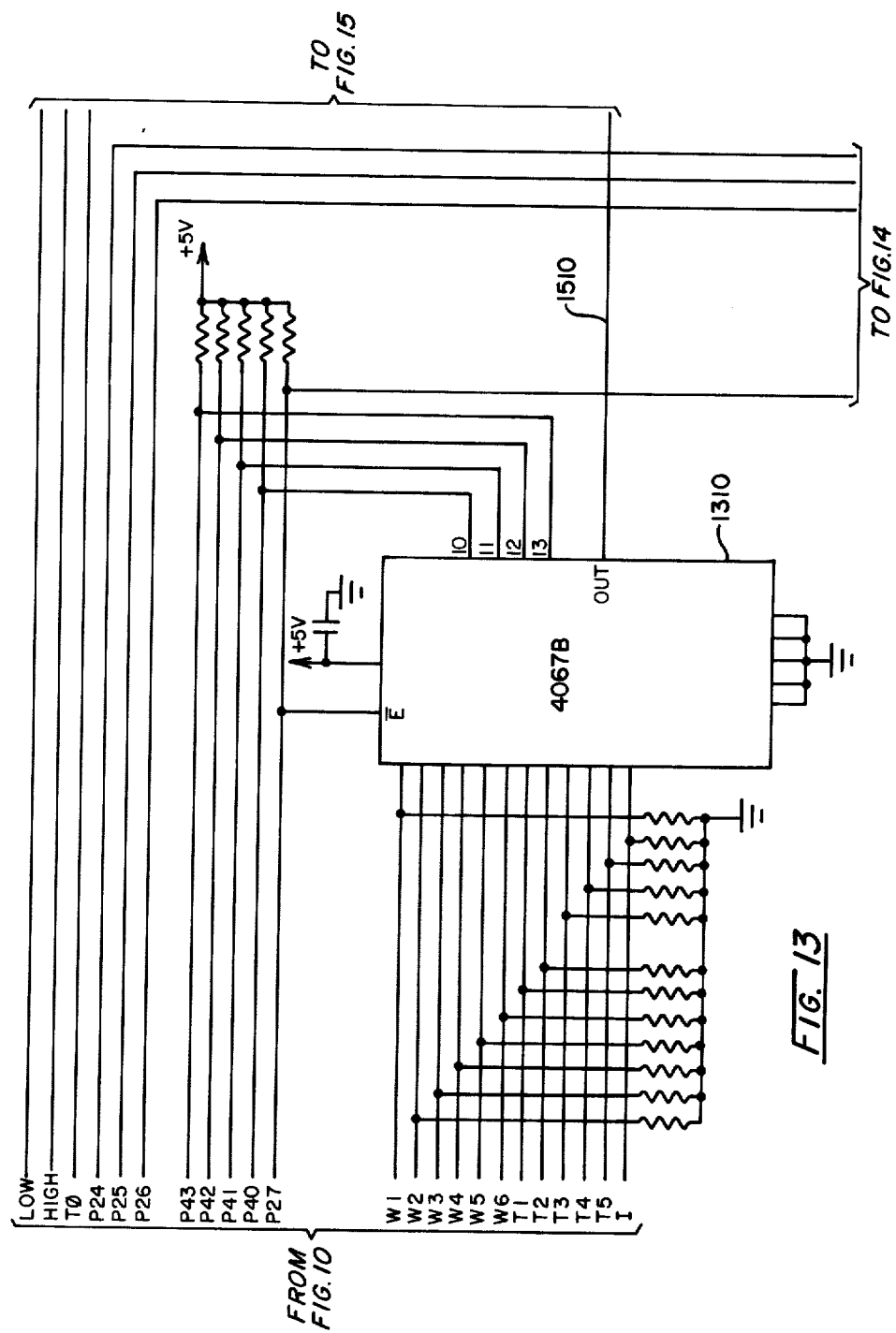
FIGS. 13, 14 and 15 show a circuit arrangement for controlling the display verification.
Figure 14:
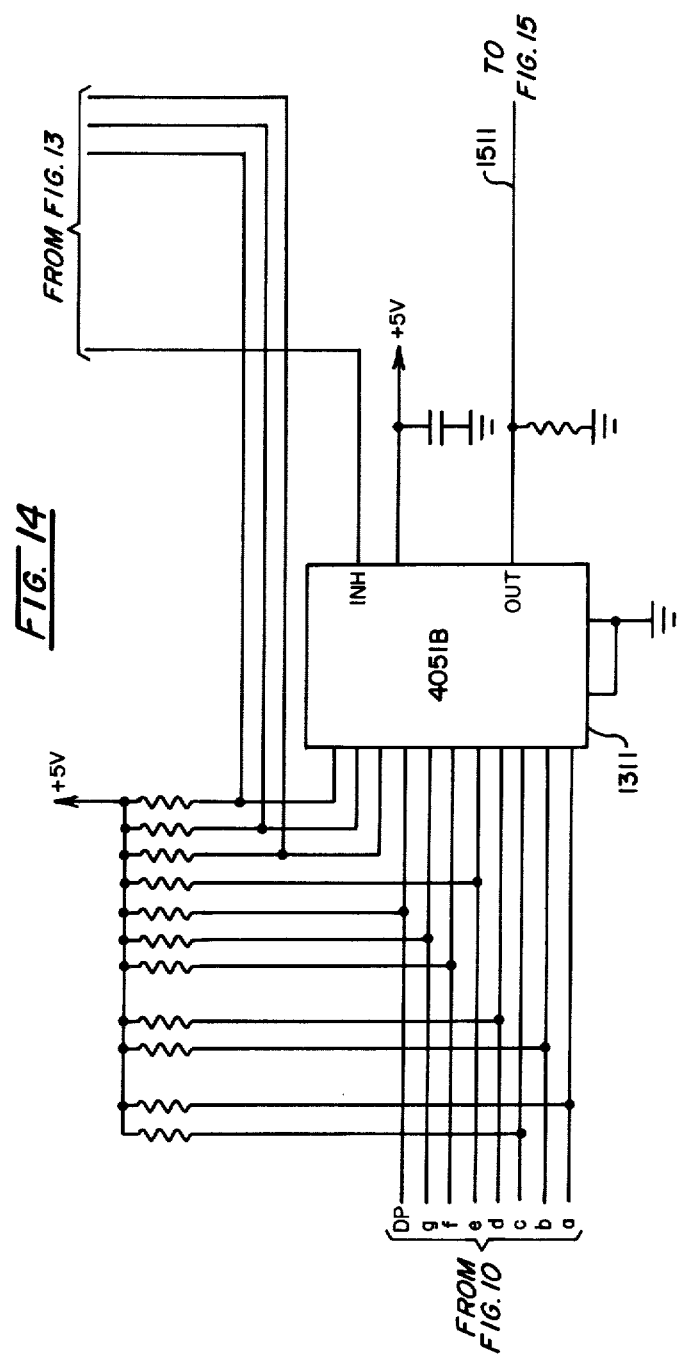
Figure 15:
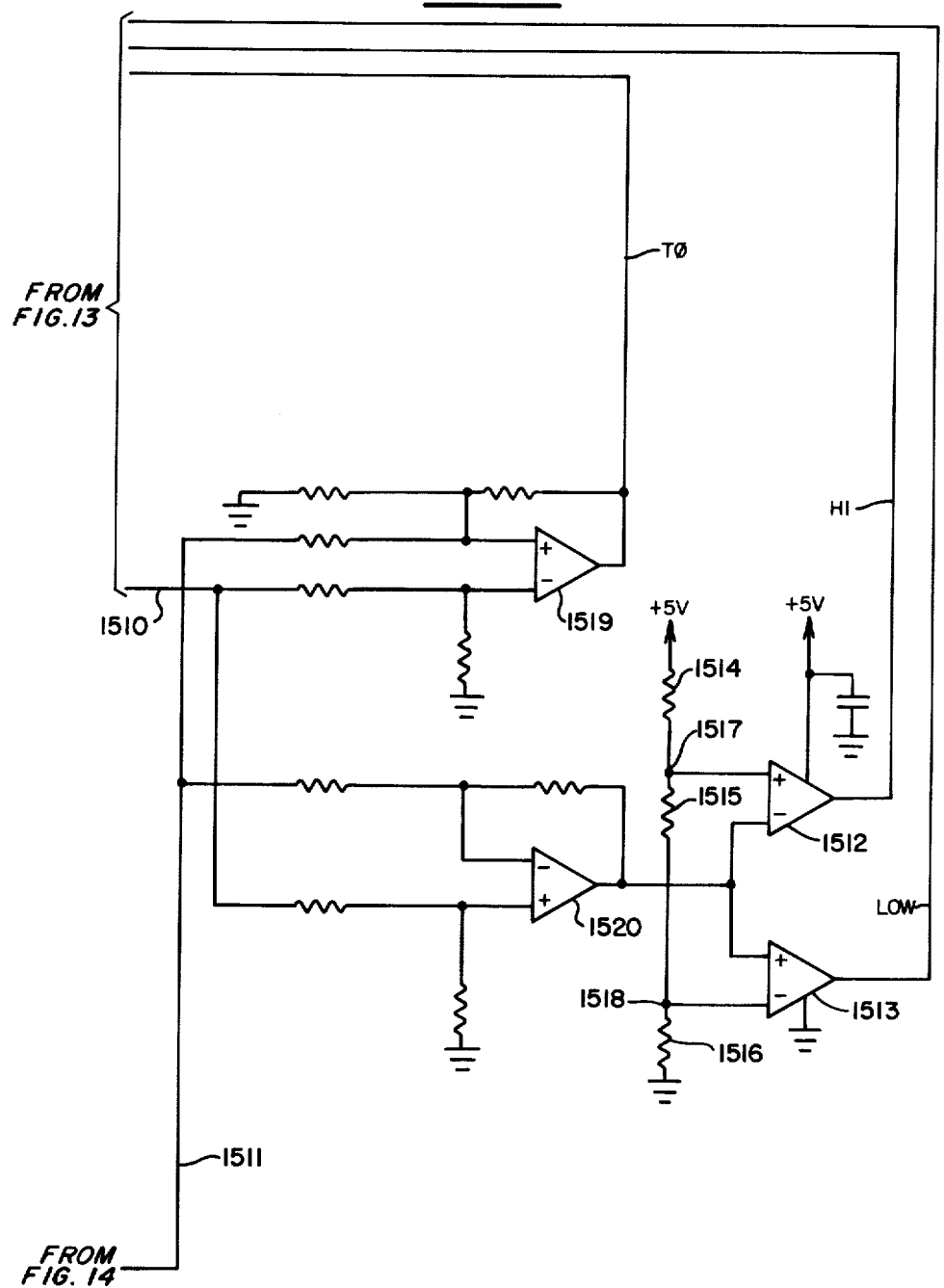

The display verification circuits are shown in FIGS. 13, 14 and 15. The output of the anode drive amplifiers 910 also extend to the analog switch 1310. In the exemplary embodiment of the invention described herein this analog switch is a 16 channel analog multiplexer/demultiplexer manufactured by Fairchild Corporation and designated 4067B. This switch is arranged so that the channels on the left as shown in the figure are interconnected with the output under control of the signals applied to the conductors or channels on the right. Thus when it is desired to verify a display, the universal peripheral interface 711, in addition to conditioning the input output expander 911 to apply a voltage of signal to the selected anodes of the selected digital display device, also causes a corresponding code to be transmitted from the number 2 ports of the input output expander to the control terminal shown on the right of the switch 1310. As a result the voltage on this conductor as applied to the anodes of the selected digital display device is also transmitted through the analog switch 1310 to the output conductor and thus to the comparing circuits of FIG. 15.

Likewise the output of the cathode drive amplifiers 1219 in addition to extending to the cathodes of the display devices as described above also extends to the analog switch 1311. This analog switch is an eight channel analog multiplexer demultiplexer manufactured by National Semiconductor and designated 4051B. This switch is arranged to switch the input conductors shown on the lower lefthand side to the output conductor on the righthand side under control of the code applied to the three uppermost lefthand conductors which extend to the pins 24, 25 and 26 of the universal peripheral interface 711.

Thus when the universal peripheral interface 711 applies a signal to one of the pins P10 through P17 to cause the application of cathode potential to the corresponding one of the cathodes of the digital display devices of FIG. 12 the interface 711 also applies a corresponding code to the pin terminals 24, 25 and 26 extending to the upper lefthand terminals of the analog switch 1311. As a result the switch 1311 connects the corresponding cathode of the digital display device to the output of the analog switch 1311 which extends to the level detecting circuits of FIG. 15.

Thus the anode voltage or potential of the display device being energized extends over conductor 1510 to the inverting input of the operational amplifier 1519 while the voltage or potential of the cathode of the corresponding digital display device being energized extends to the non-inverting input of this operational amplifier 1519. If the voltage on the conductor 1511 applied to the non-inverting input of amplifier 1519 from the cathode of the energized segment rises above the voltage of conductor 1510 from the anode of the energized digital display device then the output of amplifier 1519 rises to a positive value. This indicates that the segment is off or that a trouble condition exists because the voltage of an energized cathode should not be above the voltage of the energized anode of the respective digital display device. This positive voltage is then transmitted over conductors through FIGS. 13, 10, 9 to the TO terminal of the universal peripheral interface device 711 to indicate an off segment or a trouble condition to this device which will then transmit this information to the microprocessor 710 when called for by the microprocessor. If the voltage of the anode as transmitted over conductor 1510 is more positive than the voltage of the cathode as transmitted over conductor 1511 then the output of amplifier 1510 remains low and such a signal is then transmitted to the TO terminal of the universal peripheral interface 711.

The potential of the energized or selected digital display device is transmitted over conductor 1510 also to the noninverting input of the operational amplifier 1511 while the voltage of a selected segment cathode is transmitted over the conductor 1511 also to the inverting input of the amplifier 1511. As a result the output of this amplifier is in accordance with the difference of these two voltages which difference voltage is then transmitted to the inverting input of operational amplifier 1512 and to the noninverting input of amplifier 1513. The noninverting input of amplifier 1512 is connected to point 1517 of the voltage dividing resistors 1514, 1515 and 1516. The inverting input of amplifier 1513 is connected to point 1518 on this voltage dividing network. The voltage of point 1517 is the highest voltage of the normally energized and properly operating across the anode and selected cathode of the selected segment of the digital display device while point 1518 is the lowest operating voltage across such a selected device. If the voltage from the operational amplifier 1511 representing this voltage across the selected anode and cathode segment is within this voltage range then the output of the amplifiers 1512 and 1513 are maintained at a positive or high value and transmitted over the high and low conductors extending through FIG. 13 to the amplifiers 1010 and 1011 of FIG. 10. These amplifiers are noninverting so that if both their inputs are high both their output impedances will be high so a high positive voltage or 1 value signal will be transmitted over the T1 conductor to the T1 terminal of the universal peripheral interface 711 of FIG. 7. This condition indicates a normal operation of the discharge between the anode and the segment cathode of the selected digital display device. If however the voltage across the anode cathode path of the selected segment is greater than the normal operating voltage then the output of the operational amplifier 1512 will fall to a low value which is transmitted over the high conductor to the amplifier 1010 and as a result the output of the amplifier becomes a low so a low signal value is applied to the T1 terminal of the universal peripheral interface 711. Such an indication due to a high voltage across the discharge path in the selected digital display device is an indication either that the device is not energized or that a trouble condition exists so that the device is not illuminating the desired cathode segment. If the voltage drop across the anode cathode path of the selected segment of the selected digital display device is less than the normal operating voltage of such path then the output of the amplifier 1513 falls to a low value which is transmitted over the low conductor to the amplifier 1011 which amplifier transmits a low signal value to the T1 terminal of the universal peripheral interface 711. Such voltage indicates a short circuit or other trouble condition which prevents or indicates that the selected cathode is not illuminated. Such signals are then stored in the universal interface 711 for later transmission to the microprocessor 710 when called for by the microprocessor.

Figure 16:
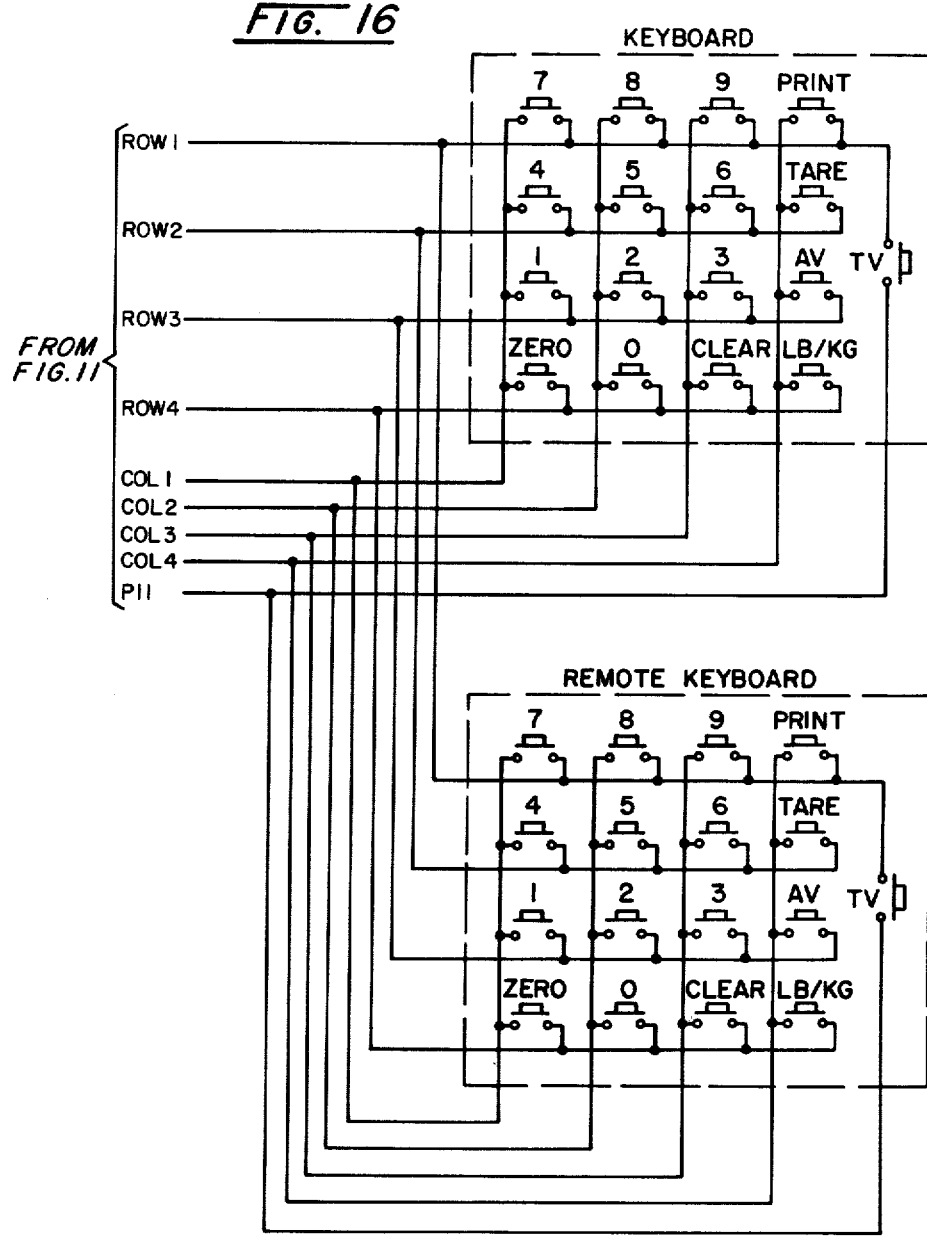
FIG. 16 shows the keyboard switches.

FIG. 16 shows a keyboard which may be employed to enter tare weight in the scale mechanism. FIG. 16 also shows the remote keyboard connected in parallel with the main keyboard. The keys of these keyboards are arranged in a matrix of rows and columns. The keys of each row are strobed from the universal peripheral interface 711 and when a key and a strobe row is operated a signal is returned from the column in which the operated key is located.

When it is desired to strobe the keyboard switches the universal peripheral interface 711 will cause a high or positive signal to be applied to the output pin P27. This signal causes the output of the gate 1013 to become low and the output of gate 1012 to become high. With the output of gate 1012 high an inhibiting signal is applied to the inhibit lead or terminal of the analog switch 1311 so that this switch no longer responds to the signals from output pins P24, P25 and P26 of the universal peripheral interface 711. In addition the high output from the gate circuit 1012 is also applied to the enabling terminal E of the analog switch 1310 thus disabling the switch and preventing it from responding to signals from the number 4 port of the input output expander 911. This number 4 port comprises the output pins P40, P41, P42 and P43.

With the output from the gate circuit 1011 high or positive the gate circuits 1110, 1111,1112 and 1113 are all conditioned to respond to signals received from the respective columns of the keyboard switches. Under these circumstances the signals transmitted from the number 4 port comprising the pins P40, P41, P42 and P43 are transmitted through the corresponding amplifier 912 to strobe the horizontal rows of switches and signals returned from the columns of the switches are then transmitted through the approximate gate circuits 1110, 1111, 1112 and 1113 back to the universal peripheral interface 711 where they are available for the microprocessor 710 when required. When it is desired to illuminate or change the illumination of the lamps 1218, a high voltage is applied to both pins 24 and 27 by the universal peripheral interface 711. As a result the output from gate 1115 changes from a high value to a low value and the output of gate 1114 changes from a low value to a high value. This output is applied to the enabling terminal of the latch and driving circuits 1712 so that these circuits will then respond to signals received from pins P14, P15, P16 and P17 from the universal peripheral interface 711 and cause the desired lamps 1218 to be either extinguished or lighted.

OPERATION OF THE SCALE SYSTEM

The operation of the scale system can be most conveniently described with reference to the flow diagram shown in FIGS. 21 through 35 of the drawing together with the other figures of the drawing and the listing of the main microprocessor or computer in appendix A and the listing of the display microprocessor or computer of appendix B. These listings are directed specifically to the microprocessor 710, 711 and the ROMs 712 shown in FIG. 7 are described above. However, it should be appreciated that the operating sequences disclosed in the flow charts may be implemented by other commercially available microprocessors or computers or by other hardwired physical equipment when desired. Many of the operations and functions of the exemplary embodiment described herein are similar to and operate in a manner similar to the manner of the corresponding operations disclosed and described in the above identified U.S. Pat. No. 4,159,521 and patent application Ser. No. 824,858. These and other features of the exemplary embodiment described herein operate in combination with and in cooperation with the improved arrangements in accordance with this invention including the automatic verification arrangement which automatically verifies the correct operation of the entire electrical and electronic system including both the analog and digital portions thereof, the automatic span control arrangement, the display verification and the checking of the ROMs and the RAMs and the microprocessors or computers shown in FIG. 7 and in FIGS. 19 and 20.

Reference is made to the listing of Appendix A for the microprocessor 8039 and FIG. 7 and also shown in FIG. 19. At the beginning of this Appendix A the assignment of the various registered spaces in the RAM within this computer is set forth. Particular reference is made to line 58 which refers to the span correction factor register having an address of 5D hexadecimal. Reference is also made to line 59 which lists the weight from the load cell and counts and has an address of 60 in hexadecimal notation. In addition reference is made to line 50 which designates a register for recording the weight from the load cell in increments or counts and has an address of 44 hexadecimal.

Reference is also made to the beginning of the listing of the display microprocessor which is included herein in Appendix B. The beginning of this listing likewise designates the various registered spaces in the RAM within the display microprocessor.

As is readily apparent from the above publications describing the microprocessors and from the listings these microprocessors are arranged to respond to and operate most effectively and efficiently with the hexadecimal code or notation and the listings of Appendix A and B are in the hexadecimal code or notation.

As will be apparent numerous of the operations require a plurality of excursions through the program to complete the operations or functions desired.

The flow diagrams of FIGS. 21 through 35 disclose in graphical form exemplary operating sequences of the scale system. The flow diagrams consist of geometrical shapes or blocks each of which corresponds to a particular type of operation. Each rectangular block represents the performance of a function which is generally indicated by the notation found within the rectangular block. Each diamond shaped geometrical figure represents a decision making operation where one of two alternatives is determined. The oval shape geometrical figures represent branch back operation and are used in conjunction with a subroutine to indicate that the operating sequence continues at that point in the main operating sequence from which the subroutine was entered. The numbers placed in circles at the top and left of the geometrical figures represent input notations to these particular operations. The numbers in the circles to the right and below the blocks in the flow diagrams represent an output connection to a different location in the flow diagrams indicating a transfer in the operating sequence. The mnemonic designations found in parentheses adjacent these circles contain numbers indicating labels which have been given to a particular group of operations. These mnemonics may be utilized in referring back to the detailed operating sequence disclosed in the listings of the Appendix.

The main computer 710 and as shown in FIG. 19 is arranged so that upon the application of power or upon the reapplication of power after a brief interruption is arranged to automatically return to the first program order at the zero ROM location. This is similar to the arrangements shown in the above identified patent applications. Thus in accordance with block 2101 of FIG. 21 the RAM storage spaces in the microprocessor 710 are initialized that is they are all set to zero.

Next the program switches of FIG. 8 are sensed or read into the various appropriate positions within the RAM of the microprocessor. These operations are similar to corresponding operations described in greater detail in the above identified patent and patent application.

Next in accordance with block 2103 a weight reading and converting cycle is performed. As described in the above identified patent application the analog output from the load cell 310 is amplified and filtered and adjusted for an analog zero and then under control of the microprocessor 710 and the integrated circuits of FIG. 4 converted to a digital number representing the weight on the scale. This converting arrangement in accordance with the exemplary embodiment described herein comprises a triple slope integrating arrangement illustrated in FIG. 18. For a more detailed description of the operation of a similar analog to digital converting arrangement reference is made to the above identified patent application.

The scale arrangement in accordance with the present invention is arranged to provide a number of different scale capacities in a manner similar to that described in the above patent application. In order to accomplish this it may be necessary to employ different load cells but the electronic portions of the system including the microprocessors are arranged so that the full load weight on the scale is represented by substantially the same number of raw weight counts obtained after the analog to digital conversion. This number representing the full load on the scale in the exemplary embodiment described herein is approximately 200,000 raw weight counts.

Next in accordance with block 2104 the raw weight counts obtained by the analog to digital converter is filtered by filter arrangements which tend to reduce or smooth out minor variations in the count due to vibrations and other spurious effects. Next the digital initial weight is subtracted. This weight is due to the scale platter and other offsets in the raw weight such as described in the above identified patent application.

Next in accordance with the present invention the raw weight counts are multiplied by a span multiplication factor in accordance with block 2106. In order to meet the strict requirements of the weights and measures authorities in the various countries over the entire weight range of the scale it has been found desirable to multiply the raw weight by a span control factor and to automatically and periodically adjust the span control factor to compensate for slight changes in the voltage and other variables such as ambient temperature which affect the accuracy of the weight measurements to a very minor degree. In order to facilitate both the adjustments to the scale and to the span control multiplier it has been found advantageous to select an initial or fixed span control factor to which is added a variable portion which is changed automatically as required. In accordance with the exemplary embodiment described herein a value of slightly less than one has been arbitrarily selected as the initial value of the span multiplication factor. This value has been selected to be sufficiently less than one but near to one so that the amount of corrections required will not cause the value to exceed one. This simplifies the operations of the microprocessor 710. However it is obvious that a value greater than one could be equally arbitrarily selected and sufficiently greater than one so that it will never be reduced to or below one by the correction thereto required by the system. Also if desired one may be selected in which case the determinations of the corrections both above and below one become more involved but equally applicable in accordance with the present invention. Again in accordance with the present invention in order to simplify calculations and operations of the microprocessor an initial value of FFB000 hexadecimal divided by $2^{24}$ or 1000000 hexadecimal has been arbitrarily selected as the initial span muliplying factor.

In as much as under the assumed conditions power has just been applied to the system the span multiplier factor this time will be the initial value without any corrections applied thereto. The manner in which the corrections are obtained and applied thereto will be described hereinafter.

Next in accordance with block 2107 (FIG. 2) and after multiplication by the span factor the number of raw weight counts representing the weight on the scale is multiplied by scale factor to convert this number of raw weight counts to the number of minor scale increments. Each scale capacity is divided into a number of display increments. Each of these increments is further divided into ten minor increments in accordance with the exemplary embodiment described herein. The various scale factors are stored in the program in the ROM in the microprocessor 710 and set forth in the listing in Appendix A.

Next in accordance with the block 2108 a check is made for a motion of the scale platter. Since this motion check requires a number of excursions around the program loop the indication at this time will be of one of motion. Similar motion detecting arrangements are described in U.S. Pat. Nos. 3,986,012 and 4,159,521 and patent application Ser. No. 824,858.

Next as indicated in block 2109 the value of the zero correction factor stored in the automatic zero register is subtracted from the counts of the minor increments of the current weight reading. However this as well as the other registers in the RAM were returned to zero by the initializing process described above zero will be subtracted this time from the number of minor counts representing the current weight reading.

Next in accordance with block 2201 a check is made to determine whether or not the automatic zero maintenance or adjustment is enabled or operating at this time. Since it is assumed there is motion and since the zero null key to be described later is not operated and has not been operated since power was applied to the system the automatic zero maintenance arrangement is not enabled so that the program then transfers from via transfer B3 to the block 2203 where the tare entered in the system is subtracted from the current weight reading. Under assumed conditions no tare has been entered so that the program advances to block 2204 where the current net weight in minor increments is transferred to binary coded decimal notation. Next the RAM and ROMs are checked in accordance with block 2205 as will be described hereinafter. Then in accordance with block 2206 or 2207 the weight data may be outputed at either high speed in accordance with block 2206 or in parallel in accordance with block 2207. Then in accordance with block 2208 the current weight data and lamp data is transmitted to the display and keyboard microprocessor 711.

Next in accordance with block 2209 keyboard data that is keys which are currently being depressed or operated is transmitted from the display and keyboard microprocessor 711 to the main processor 710. Under the assumed conditions, no keys are currently operated so this information is transmitted to the main microprocessor 710.

Then in accordance with block 2210 the microprocessor 710 determines whether or not it has been three seconds since the last automatic verification. Under the assumed conditions this condition will not be met so that the program transfers via transfers C5 to block 2305. In accordance with this block the microprocessor examines the keyboard inputs from the keyboard and display microprocessor to determine whether or not any of the command keys are operated. In accordance with block 2306 the processor determines whether or not an error flag has been set. Under the assumed conditions the flag is not set so the program advances to block 2307 and since the z key or null key is not operated the program advances to block 2308 and since the print key is not operated it advances to block 2309. Since the AV key is not operated the program advances to block 2310 and since the clear key is not operated the program advances to block 2311 and since the tare key is not operated the program advances via transfer D1 to block 2401. Since the pound kg key is not operated the program then transfers via transfer A2 to block 2102 and the above described sequence of operations repeated. On succeeding excursions around the program loop described above in response to block 2108 no motion condition will be found. However the scale is not properly conditioned to make weight measurements until the z or null key is operated. When this key is operated and the program advances to block 2307 in a manner described above the program transfers via transfer D3 to block 2402. If the scale is in no motion condition and if the weight indication from the scale is within prescribed small range near zero the scale will be nulled or zeroed and then conditioned for weight measurements. The operation in zeroing or nulling the scale is described in greater detail in one or more of the above identified patents and patent application. After the nulling or zeroing operation in accordance with block 2402 the program is again transferred via transfer A2 back to block 2102 and the program proceeds around the program loop in a manner described above.

Then when a weight greater than 10 major increments has been placed upon the scale platter and the platter has come to rest and the program advances to block 2210 the program will then advance over transfer C1 instead of C5 to block 2301. At this time however a weight will be on the scale so that the scale will not be a gross zero and the program then advances via transfer C5 to block 2305 and the remaining portions of the program loop employed to control a system in a manner described above. When the weight is later removed from the scale and the scale returns to zero and the no motion condition established and the program returns to block 2210 the program transfers via C1 to block 2301 because the scale has established a no motion condition with a weight on the scale greater than 10 major increments. Then if the scale has found a no motion condition in accordance with block 2301 the program advances to block 2302. In accordance with block 2302 the no motion condition must be maintained for a minimum time interval of a second if the no motion condition has not been this long then the program transfers via transfer C5 to block 2305 and the program then advances through the various stages and steps as described herein. If however the no motion condition is maintained for at least a second after a no motion condition has been obtained with a weight greater than ten increments and later the scale returns to zero and a no motion condition established. Under these conditions the program then advances from block 2302 to block 2303. In accordance with block 2303 the microcomputer 710 checks the condition of the function switches described above to ascertain that the automatic analog verification feature is enabled. If it is, then the program advances to block 2304 but if it is not so enabled then a program transfers via transfer C5 to block 2305 as described above.

In accordance with block 2304 the automatic vertification and automatic span controller adjustment routines are performed as described hereinafter.

If the computer 710 upon advancing the block 2309 at any time finds the analog verification key operated the program transfers via transfer D7 to block 2404 where the same analog verification routines and automatic span adjustments in accordance with the present invention are performed as described in detail herein.

If the computer finds the print key operated upon advancing to block 2308 the program transfers via transfer D5 to block 2403 where the data is transmitted out to receiving devices provided. If the clear key 20 is operated when the computer advances to block 2310 then the program transfers via transfer E1 to block 2405 which causes the tare entry in the computer to be cleared. If the clear key is operated and the computer advances to block 2311 then the control transfers to via transfer E3 to block 2406 which causes a tare weight to be entered in the scale system so that it may be later subtracted from the gross weight to provide a net weight.

Except for the automatic analog and overall verification and the automatic span adjustment as described hereinafter the above features are similar to various features described in greater detail in one or more of the above identified patents or patent application.

AUTOMATIC ANALOG AND OVERALL VERIFICATION AND AUTOMATIC SPAN ADJUSTMENT AND TRACKING

An exemplary embodiment of the automatic analog and overall verification and the automatic span control and adjustment in accordance with the present invention may be more readily understood from the following description when read with reference to the drawings and more particularly with reference to the detailed flow charts of FIGS. 31 through 35. While the exemplary embodiment described herein employs the microprocessors or computers identified above which are conveniently programmed and operate in the hexadecimal numerical notation or numbering system other commercially available computers may be equally well employed operating either in the hexadecimal notation or other convenient number systems in combination with the improved scale arrangement embodying the present invention.

In addition the invention is not limited to the hexadecimal notation or the various constants and factors employed and incorporated in the program listing to simplify the program and the operation of the system. Also in order to provide suitable operation of the automatic digital and combined overall verification and the automatic correction of the span factor as certain initial adjustments through the system must be made. First, as pointed out above, it is desirable to select an initial fixed span multiplier factor. Next the system should be initially adjusted so that with zero weight on the scale and the scale at no motion with a zero indication within predetermined narrow limits, i.e. a quarter of one major increment in the exemplary embodiment described herein. The scale should be adjusted so that, with the initial span multiplier incorporated, the scale should be adjusted to accurately indicate a test weight. Next the switch SW1 should be set so that this switch together with the resistor network 32 causes an analog signal to be injected into the output of the strain gauge bridge 310 which analog signal should have a value of approximately 90% full scale capacity in order to comply with certain of the weights and measures requirements. If these requirements are for other values then this analog signal should be adjusted to meet the particular requirements of the jurisdiction where the scale is to be used. Finally the switch matrix 612 of FIG. 6 should be set in accordance with the reference digital value accurately corresponding to the value of the analog signal injected by the resistor and switch network 32. In addition various scale factors and span control or adjustment factors are calculated and incorporated in the program listing in order to facilitate the computing of the scan control multiplication factor in accordance with the hexadecimal notation employed by the computer 710 in the exemplary embodiment of the invention described herein. The amount of correction to be made to the span multiplying factor at any one time as well as the limits of error which may be corrected and the limits in error which may be accepted as satisfactory in order to comply with the weights and measures bureaus must be determined and entered into the system in some manner. In accordance with the present invention these various factors are entered in the program listing of Appendix A.

As described above in accordance with blocks 2210, 2301, 2302, 2303 in order for the program to advance to the analog verification routines of block 2304, which are described in detail in FIGS. 31 through 35, it is necessary first that it has been at least three seconds since the last verification operations. Also the scale must come to rest with a no motion condition with a weight exceeding some predetermined value which is of the order of 10 major increments in the exemplary embodiment described herein. Thereafter the scale must return to gross zero. The zero to which the scale must return must be within predetermined narrow limits. If these conditions are met and in addition if the program or function switches shown in the lower portion of FIG. 8 as listed in tables A and D are set to enable automatic verification operation the program advances to block 2304. As described above block 2304 represents the program sequences required to do an automatic verification and span correction. FIGS. 31, 32, 33, 34 and 35 comprise flow charts which show in greater detail the various steps and routines in accordance with the exemplary embodiment of the invention described herein which perform the automatic verification and span control adjustment. Thus when the program advances from block 2303 to block 2304 as described above the program advances through block 3101 of FIG. 31 where the scale is again tested to insure that it is at gross zero. If it is not at gross zero the program returns to the major loop which is to block 2305 and the above described excursions around this main program loop repeated until when the program advances to block 3101 it finds the scale at gross zero. At this time the program then advances to block 3102 where the microprocessor determines whether or not the automatic analog verification is enabled by the proper operation of the program and function switches shown in the lower portion of FIG. 8. If the automatic analog verification is not properly enabled then the program again returns to block 2305. At such times the program will continue to return to this block and then advance through the other blocks described above around the program loop.

If the various switches of FIG. 8 are actuated to enable automatic analog verification then the program will advance from block 3102 to block 3103. In accordance with block 3103 the microprocessor 710 determines whether or not the program and function switches shown in the lower part of FIG. 8 are positioned to permit the switching from pounds to kilograms or kilograms to pounds during the operation of the scale. If these switches do not permit such switching then the program transfers via transfer L5 to block 3105. Alternately if the program and function switches of the lower part of FIG. 8 are positioned to permit switching from pounds to kilograms or kilograms to pounds the program advances from block 3103 to block 3104. In accordance with block 3104 the microprocessor 710 determines whether or not the pound kilogram switch is in a proper position for performing an automatic analog and combined verification operation as well as to permit adjustment of the span control factor or multiplier. While it is possible to employ the present invention in combination with arrangements which permit the pound kilogram switch to be in either position and provide both automatic verification and the automatic adjustment of the span control multiplier the present exemplary embodiment described herein is arranged to permit the automatic verification and the automatic adjustment of the span multiplier factor in only one position of the pound kilogram switch namely the position which it is in when the initial adjustments are made of the switch and resistor network 32 and the reference value set on the switches of FIG. 6. When the program advances to block 3104 the pound kilogram switch is not in its proper position to permit automatic analog verification, the program will return to block 2305 and then advance through the above described program loop without performing an automatic verification or changing the span multiplier factor. Alternatively if the switch is in the proper position then the program advances from block 3104 to block 3105.

While applicants' invention of automatic verification and automatic span factor adjustment may be arranged to cooperate with scale arrangements which operate in either or both the gross the net modes the arrangement in accordance with the exemplary embodiment described herein has been arranged to cooperate only with the gross mode and not with net mode of operation. Consequently if tare has been entered setting the scale for net operation, then when the program advances to block 3105 the program will return to block 2305 and then advance through the remaining portions of the program loop described above. If however the scale is not set in the net weighing condition, then the program advances from block 3105 to block 3106. In accordance with block 3106 the microprocessor 710 again determines whether or not the scale platform or platter is in motion. If it is, the program again returns to block 2305 and then through the remaining portions of the program loop described above. However if the scale is not in motion at this time, the program will then advance from block 3106 to block 3107 where the automatic verification done flag is set at the number 1 automatic verification error value. As indicated one page 1 of Appendix A of the listing of the program the analog verification done or taken is located in the bit position six of line 35 of page 1 and address 2D hexadecimal in the RAM storage within the microprocessor 710. The analog error flag is located in bit position 6 as shown in line 21 page 1 of the printout which is located in address 28 hexadecimal in the RAM within the microprocessor 710.

Then in accordance with block 3108 the microprocessor 710 signals the display microprocessor 711 that an automatic verification sequence is in progress by the microprocessor 710.

Next the program will advance from block 3108 to block 3109 where the microprocessor 710 causes the automatic verification relay 311 to be operated and latched operated closing contacts 312. The relay is maintained, operated and contacts 312 closed until released under control of the microprocessor 710. The operation of relay 311 and the closing of contacts 312 causes the automatic analog verification signal to be applied to the output of the strain gauge bridge 310 and maintained at this output until released or removed as described hereinafter.

The program then advances from block 3109 to block 3110. Block 3110 represents a routine which does an A to D conversion and then waits for the no motion indication. The details of this routine are shown beginning with block 3304 so that when the program advances from block 3109 it in effect transfers to block 3304. In accordance with block 3304 the microprocessor 710 waits for a reset of the analog to digital converter that is a reset of the integrator circuit comprising the amplifier 418 and condenser 419 as described above. After the analog to digital converter has been reset the program will advance from block 3304 to block 3305 where the microprocessor 710 causes an analog to digital conversion with the automatic verification signal now applied to the output of the strain gauge 310. After the A to D conversion has been completed the program will advance to block 3306 where the digital initial value in raw counts is subtracted and then the program advances to block 3307 where the span multiplier is computed by adding the value in the span register to the fixed span constant. Under start-up conditions the zero will be recorded in the span register which has an address of 5D hexadecimal in the RAM in the microprocessor 710. This address is indicated in line 34 of page 1 of the listing of Appendix A. Fixed constant is the same as the hexadecimal number FFB000 described above with reference to block 2106.

Then the thus formed span multiplier is multiplied by the raw weight counts in accordance with block 3308 and thereafter the resulting automatic verification raw counts is filtered in accordance with block 3309. Next the raw weight counts are converted to minor increments in accordance with block 3310. The conversion of raw weight counts to minor increments is in accordance with the setting of the switches SW4-1 through SW4-5 of the lower portion of FIG. 8 as indicated in table A above.

Then in accordance with block 3311 and 3401 the motion or no motion indication is determined. If a motion condition is indicated the program then transfers via transfer N4 back to block 3304 where the above sequence of operations is performed. This sequence is repeatedly performed until when the program advances to block 3401 a no motion indication is found. At this time the program control will return to the block 3110 which originally caused the program to advance to block 3304 as described above. As a result the program transfers via transfer M1 to block 3201.

In accordance with block 3201 the microprocessor 710 determines whether or not the weight has changed more or less than two minor increments. Since this change may be less than required for a no motion indication it is necessary for the microprocessor 710 to determine whether or not the weight between successive A to D conversions during the automative verification routines has changed more than two minor increments. The value of two minor increments is determined by requirements of the weight authorities. Most weights and measures authorities limit the amount of correction which may be made the span correction and span correction factors so that it is necessary to check these various values. If the weight has changed more than two minor increments the control is transferred by transfer L10 to block 3310 and the above described sequence of operations is repeated. This sequence of operations is repeated until the change in weight between successive weight determinations or A to D conversions is less than two minor increments when the program arrives at block 3201. Under these circumstances the program advances to block 3202 which causes the microprocessor 710 to determine whether or not the change in weight has been less than two minor increments for at least a second. If it has not then the program again transfers via transfer L10 to block 3310 and the above sequence of operations is repeated. These sequences are repeatedly performed until when the program advances to block 3202 the weight change has been less than two minor increments for at least a second. When these conditions are present when the program advances to block 3202 the program will then advance to block 3203 where the matrix switch 612 of FIG. 6 is read. This switch is set in accordance with the expected automatic verification indication. And then this indication is converted from binary coded decimal notation to straight binary notation in accordance with block 3204 and then in accordance with block 3205 this switch information is subtracted from the automatic verification minor counts obtained in response to the application of the automatic analog verification signal injected by the operation of the automatic verification relay 311. Next the program advances to block 3206 where the microprocessor 710 checks to determine whether the error is greater than 20 minor increments.

Assume first that the error is less than 20 minor increments 18 minor increments for example. Under these circumstances the program then advances from block 3206 to block 3207 where the error is divided by two so that the result is 9 minor increments. The program then advances to block 3208 and since the result from block 3207 is not zero the program advances to block 3209. In block 3209 the result 9 is multiplied by a span error factor to determine the amount of correction to be applied to the value of the correction to be added to the variable portion of the span multiplier which is stored in the span register at location 5D hexadecimal as set forth in line 58 of page 2 of the appendix A of the program listing.

In accordance with the present invention the span multiplier factor may be changed by any desired amount so that on the next excursion around the automatic verification loop described herein the error obtained will be changed by any desired arbitrary amount. This is accomplished by selecting the appropriate factor to change the span correction factor stored in the RAM storage space 5D hexadecimal. However the exemplary embodiment described herein it is assumed that it is desired to change the span correction factor stored in the span correction register by an amount equal to one-half the error between the reference values stored in the matrix switch 612 of FIG. 6 and the actual analog verification value obtained from the analog verification signal applied to the output of the strain gauge bridge 310. To obtain this result it is necessary to multiply the 9 minor increments by a span factor which is set forth in the listing of Appendix A beginning in line 2539 of page 51 and extending to line 2556 of page 52. These span factors are substantially equal to $2^{24}$ times one over the number of full scale minor increments and the result converted into hexadecimal notation. The error is then multiplied by this span factor and added to the value in the span correction register located at 5D hexadecimal in the RAM of the microprocessor 710. Then in accordance with block 3211 the microprocessor 710 determines whether or not the new value stored in the span register exceeds the maximum value of a span correction permitted usually by the weights and measures authorities where the scale is being used. Under the assumed conditions the new value of the span correction value does not exceed the maximum admitted value so that the program advances to block 3301 where the value stored in the span register at location 5D hexadecimal is updated with the new value. Next the program advances to block 3302 and since the error is assumed to be 18 minor increments the program will then transfer via transfer 03 to block 3402. Under the assumed conditions this is the first time that the automatic verification error occurred or was found so that the program then transfers via transfer P4 to block 3503.

In accordance with block 3503 the AV relay 311 is released and after one second, the program then advances to block 3504 and thus transfers via N4 to block 3304 and then to block 3305. In block 3305 another A to D conversion is made. If there is no weight on the scale the result should be a zero indication, if however there is a weight on the scale the result will not be a zero indication. The program then advances through the blocks 3306 through 3401 as described above and then returns to block 3505 at this time.

If there is a weight on the scale the scale will not be at zero so the program transfers via transfer N3 to block 3303 and then advances through blocks 3304 through 3311 and 3401 and then returns via transfer C5 to block 2305. The program then advances through blocks of the main program as described above thus bypassing or cancelling further automatic verification operations.

If there is no weight on the scale when the program advances to block 3505 as described above there the program transfer via transfer L9 to block 3109. The program then advances through the various blocks of the automatic verification routine as described above. If upon advancing to block 3206 the error is greater than 20 minor increments or if on advancing to block 3302 the error is greater than 10 minor increments the program transfers via transfer 03 to block 3402. This time when advancing to block 3402 will not be the first time the error was encountered as a result the program will advance to block 3403 instead of being transferred via transfer P4 as described above. If the AV key is operated when the program advances to block 3403 then the program transfers to 010 to block 3407 where the automatic verification error flag is set so that the verification error symbol U will be displayed. Thereafter the program transfers via transfer P1 to block 3501 which causes the automatic verification error and automatic verification weighed or the automatic verification switches of FIG. 6 to be transmitted to the display microprocessor 711 then in accordance with block 3502 the microprocessor 710 receives the input from the display microprocessor of the keyboard information stored therein after which the program transfers via transfer L10 and the program then advances through the various blocks of the automatic verification routine described above. The program will continue around this program loop as described so that the scale will be unable to satisfactorily perform a weight measurement until power is turned off or other maintenance procedures performed.

OPERATION OF THE DISPLAY MICROPROCESSOR

As described above a separate microprocessor 711 is provided to control the display, verify the display and to scan and record operations of the keys of the keyboard as shown in FIG. 16. As indicated above this microprocessor is provided with RAM storage spaces and with ROM storage spaces. Sequences of program orders for controlling the microprocessor are stored in the ROM storage spaces as well as other fixed information. The sequences of program orders are appended in the listing comprising Exhibit B appended hereto. The assignments of the RAM storage spaces are listed in the first page of the listing of appendix B appended hereto. Normally this microprocessor 711 operates independently of the main processor 710 and advances through the program sequences of orders stored within its ROM storage spaces. However the operation of the microprocessor 711 in advancing through the sequences of orders in its ROM storage spaces is interrupted by the main processor 710 when the main processor desires to send information to the microprocessor for display or receive information from the microprocessor relative to the display or to the operating condition of the keys of the keyboard of FIG. 16. The listing of appendix B like the listing of appendix A employs the hexadecimal notation.

The operation of the microprocessor 711 may be more readily understood from the following description when read with reference to FIGS. 25 through 30 inclusive which show flow diagrams of the operations and functions performed by the microprocessor 711. When power is first applied to the microprocessor 711 the processor will automatically read the first order of the program stored in zero address location. As indicated in block 2501 the program then causes all of the RAM storage spaces to be cleared including all of the storage information of the digits to be displayed. In block 2502 the main microprocessor timer is started or set into operation. Then in accordance with blocks 2503 through 2507 the condition of various keys and flags is determined. Thus in block 2503 the condition of the clear key is determined in block 2504 it is determined whether or not the error flag is set, 2505 determines whether there is an automatic verification routine in progress, 2506 determines whether or not the scale is in power up condition and 2507 determines if it is desired to display blanks. Initially the clear key is not depressed, the error flag is not set and an automatic verification routine will not be in progress. In addition the scale will not be in the power up mode of operation so that the program then transferred via transfer F10 to block 2509 where the weight stored in the binary coded decimal notation is converted to the seven segment notation or code for displaying in the seven segment displays. In accordance with block 2601 to which the program advances from block 2509 the tare weight stored in binary coded decimals is translated to the seven segment code or notation for operating the seven segment tare display units or digits. Then blocks 2602 and 2603 cause the lamps to be controlled in accordance with the function switches and other data. These lamps are controlled in their usual manner in such scales. Then in blocks 2604 and 2605 the microprocessor 711 determines whether tare weight should be displayed or whether the tare display should be blank. Block 2606 blanks the most significant digit of tare since this digit is never used or displayed. Then on block 2607 program advances to the display routine which causes the stored data in the form of seven digit notation to be displayed or causes this information to energize the appropriate segments of the respective digits of the weight display. In accordance with block 2607 the program transfers via transfer H9 to block 2706 where the display is blanked or turned off and the keyboard scanned to determine which if any of the keys are operated. Next the program advances to blocks 2707 where the A segments of all of the display units and digits are selected for display in accordance with the digit information to be displayed. Next the program advances to block 2801 or all the segments are turned off in the display and then the program advances to block 2802. In accordance with block 2802 the A segments of the weight digits as stored in accordance with the seven segment code are scanned to determine in which digits the A segments are to be energized. Next in accordance with block 2803 these segments are energized or turned on. Next in accordance with block 2804 various interrupts of the microprocessor 711 are interrupted or disabled so that the microprocessor 710 cannot interfer with the subsequent display verification routines. Next in accordance with block 2805 the microprocessor 711 determines whether or not it is desired to verify the proper operation of the A segments in all of the respective digits. Assuming it is desired to verify the operation of the display the program then advances to block 2806 where the microprocessor in combination with the display verification circuits of FIGS. 13, 14 and 15 causes these circuits to test each of the A segments of the respective digits in sequence and to indicate the condition of these segments. The circuits of FIGS. 13, 14 and 15 are in effect connected in sequence to the A segment of each of the weight digits during the time that these segments are energized. After the A segments of all of the weight digits have been tested or scanned or read the program will advance to block 2807 where the condition of these segments as determined by the verification circuits is compared with the A segments of the respective digits of the stored weight in accordance with the seven segment display notation. Assume first that no error exists so that the program transfers via transfer 19 to block 2809 where the interrupts are now enabled so that the microprocessor 710 may interrupt the operation of the microprocessor 711. However assuming that no such operation occurs the program then advances to block 2810 and since the A segment was just tested and not the decimal point segment the program advances via transfer J1 to block 2809 and since the A segment was just tested the program then advances to block 2902 where the keyboard keys are read and processed in accordance with block 2903. The program then advances to block 2904 where the next or B segment is selected and then the program transfers via transfer I1 to block 2801 and the above described routine for controlling and verifying the A segments is now repeated with respect to the B segments. Near the end of this routine when the program advances to block 2901 since the A segment was not tested at this time the program transfers via transfer J6 to block 2509 instead of to block 2902 as described above. In accordance with block 2905 ones in an order in each of the sheets or pages of the ROM test in the microprocessor 711 are added together to form an ultimate ROM test. After all of the orders are so tested the sum of the ones is added to the stored two's complement of the proper sum and, if the result is zero, the ROM test is satisfactory. On the first and successive cycles of display as described above when the program advances to block 2906 the test will not be zero since all of the ROM orders have not been tested so the program will advance to block 2907 and then via transfer K1 to block 3001 where a RAM test is performed and if successful a program then advances from block 3002 to block 2904 via transfer J4 where the next display segment is selected. The above routines are then repeated for each of the succeeding segments thus causing the display segments to be energized in sequence and verified. These sequences of energizing the various segments of the display are repeated sufficiently frequently so that they appear to be constantly illuminated and the digits which they make up also appear to be constantly illuminated. The repetition rate is sufficiently fast so that it is not at all apparent to the eye.

If an error is indicated on any of the display verification program excursions then when the program advances to block 2807 the error causes the program to advance to block 2808 where the error flag is set. Thereafter the program advances through the remaining blocks in the manner described. If an error is found during the ROM test then the program advances from block 2906 through blocks 2907 and to block 2908 where the error flag is again set. Similarly if error is found during the RAM test the program advances to block 3003 wherein the error flag is again set. Then during the main program loop when the program advances to block 2507 with the error flag set the program then transfers via transfer H3 to block 2702 where the particular error and the code or symbols representing this error are determined. Then the program advances to blocks 2703 and 2704 where the load and tare seven segment registers are loaded with the proper error code. The program then advances to block 2602 via the transfer G2. Thereafter the program advances through the various blocks of the main program as described above and in particular to block 2607 where the error symbol is then displayed in the manner described above with respect to the weight symbols or digits.

Reference is also made to block 3006 which causes the main program of the microprocessor 711 to be interrupted and then to receive data from the main processor and return data to the main processor all under control of the main processor. The operation of interrupting the program of the microprocessor 711 by the main processor 710 is in accordance with the usual manner of cooperation between these two microprocessors.

ASM48 :F1:MAIN.ASM

*APPENDIX A*

```
ISIS-II MCS-48/UPI-41 MACRO ASSEMBLER, V3.0         PAGE   1
+++ 8132 MAIN PROCESSOR+++ -- LAST EDITTED 11/29/79 --  11:30 AM

LOC  OBJ     LINE       SOURCE STATEMENT

1  $TITLE ('+++ 8132 MAIN PROCESSOR+++ -- LAST EDITTED 11/29/79 --  11:30 AM')
              2  $XREF MACROFILE PAGELENGTH(64) PAGEWIDTH(132) NOCOND
              3  ;+++++++++++++++++++++++++++++++++++++++++++++++++++++++++++++++++++++++++++++
              4  ;++                                                                         ++
              5  ;++                              MODEL 8132                                 ++
              6  ;++                                                                         ++
              7  ;++                          MAIN SCALE PROCESSOR                           ++
              8  ;++                                                                         ++
              9  ;++                     HEX CODE LAST CHANGED -- 11/29/79                   ++
             10  ;++                                                                         ++
             11  ;+++++++++++++++++++++++++++++++++++++++++++++++++++++++++++++++++++++++++++++
             12  ;
             13  ;                           *** MEMORY MAP ***
             14  ;
             15  ;            BIT 7    BIT 6    BIT 5    BIT 4    BIT 3    BIT 2    BIT 1    BIT 0
             16  ;
0020         17  STAT1  EQU  20H;  X        X        X     AV IN PROG-KB TARE INH.   DECIMAL POINT POSITION
             18         ;
0021         19  STAT2  EQU  21H; POWER UP  RAM ERROR ROM ERROR AV ERROR  NET LAMP  ZERO LAMP  KG LAMP  LB LAMP
             20         ;
0028         21  COMMND EQU  28H;KB TARE AVL-ERROR FLAG  ZERO REQ PRINT REQ  AV REQ  CLEAR REQ TARE REQ LB/KG REQ
             22         ;
0029         23  SWTCH1 EQU  29H;          FULL SCALE INCREMENT SIZE             NO LB/KG   INCREMENT SIZE
             24         ;
002A         25  SWTCH2 EQU  2AH;NO TAR DSP-NO AUTO CLR   N/G/T   NO TAR INLK-NO KB TAR  DECIMAL POINT POSITION
             26         ;
002B         27  SWTCH3 EQU  2BH;NO AUTO AV  AV ENA-NO DEMND MOD-NO EXPND MOD-MOTN SENS-NO MOTN BLNK-PWRUP KG-ZERO DIS
             28         ;
002C         29  SWTCH4 EQU  2CH;NO CHCKSUM  PRINT N+T  NEG PRINT  PRINT TON   HSO   MININIUM PRINT  DOUBLE WIDTH
             30         ;
002D         31  STAT3  EQU  2DH; POWER UP  AV TAKEN   X        X        NET    NET ZERO   LB/KG   GROSS SIGN
             32         ;
002E         33  STAT4  EQU  2EH;AUTOCLR TAR-NO MOTION-USED IN MOTION   X   KB TAR-USED IN FILT   UNDER   OVER
             34         ;
0057         35  STAT5  EQU  57H;  X        X        X        X        X     GROSS ZERO  NET SIGN  1RST AV ERR
             36         ;
005B         37  STATA  EQU  5BH;  X        0        1     INCREMENT SIZE       DECIMAL POINT POSITION
             38         ;
005C         39  STATB  EQU  5CH;  X     POWER UP    1        LB/KG   MOTION    OVER    NET SIGN    NET
             40         ;
006F         41  STATC  EQU  6FH;  X        0        1      HSO EXP  PRNT REQ    0         0         0
             42         ;
0022         43  WETBCD EQU  22H;DISPLAYED GROSS/NET WEIGHT IN BCD    (3 BYTES)
0025         44  TARBCD EQU  25H;DISPLAYED TARE WEIGHT IN BCD         (3 BYTES)
002F         45  NET    EQU  2FH;GROSS/NET WEIGHT IN BINARY           (3 BYTES)
0032         46  TARE   EQU  32H;TARE WEIGHT IN BINARY                (3 BYTES)
0035         47  TEMP   EQU  35H;TEMPORARY REGISTER 0                 (3 BYTES)
0038         48  TEMP1  EQU  38H;TEMPORARY REGISTER 1                 (6 BYTES)
003E         49  TEMP2  EQU  3EH;TEMPORARY REGISTER 2                 (6 BYTES)
0044         50  RAWCNT EQU  44H;A/D WEIGHT IN INCREMENTS OR COUNTS   (3 BYTES)
0047         51  RAWAV  EQU  47H;THE LAST WEIGHT FOR AV FILTER        (3 BYTES)
004A         52  OUTWET EQU  4AH;THE WEIGHT AFTER INITIAL FILTERING   (3 BYTES)
```

```
LOC   OBJ       LINE           SOURCE STATEMENT 004D              53 TEMP3     EQU    4DH;TEMPORARY REGISTER 3              (3 BYTES)
0050              54 OFFSET    EQU    50H;THE AUTO ZERO REGISTER            (3 BYTES)
0053              55 AZMCNT    EQU    53H;DELAY COUNTER FOR AUTO-ZERO MAINT.(1 BYTE )
0054              56 TEMP4     EQU    54H;TEMPORARY REGISTER 4              (3 BYTES)
0058              57 GRSBCD    EQU    58H;GROSS WEIGHT IN BCD               (3 BYTES)
005D              58 SPANRG    EQU    5DH;VARIABLE SPAN CORRECTION FACTOR   (3 BYTES)
0060              59 CNTRAW    EQU    60H;A/D WEIGHT IN COUNTS              (3 BYTES)
0063              60 ZROCNT    EQU    63H;THE SCALE ZERO VALUE IN COUNTS    (3 BYTES)
0066              61 TEMP5     EQU    66H;TEMPORARY REGISTER 5              (3 BYTES)
0069              62 TEMP6     EQU    69H;TEMPORARY REGISTER 6              (3 BYTES)
006C              63 AVCNT     EQU    6CH;DELAY COUNTER FOR AUTO-AV         (1 BYTE )
006D              64 ROMPLC    EQU    6DH;POSITION COUNTER FOR ROM TEST     (1 BYTE )
006E              65 ROMADD    EQU    6EH;CURRENT SUM FOR ROM TEST          (1 BYTE )
0070              66 FLTBCD    EQU    70H;OUTPUT FILTERED BCD WEIGHT        (3 BYTES)
0073              67 FLTCNT    EQU    73H;OUTPUT FILTER COUNTER             (1 BYTE )
0076              68 TEMP7     EQU    76H;TEMPORARY REGISTER 7              (3 BYTES)
0079              69 TEMP8     EQU    79H;TEMPORARY REGISTER 8              (3 BYTES)
007C              70 AVFLTR    EQU    7CH;ANALOG VERIFY FILTER CNTR         (1 BYTE )
007D              71 FILTWT    EQU    7DH;FILTERED WEIGHT REG               (3 BYTES)
                  72                  ;
                  73                  ;CHARACTERS USED IN PRINTED OUTPUT
                  74                  ;
000D              75 CR        EQU    0DH         ;CARRAGE RETURN CHARACTER
000A              76 LF        EQU    0AH         ;LINE FEED CHARACTER
000E              77 SO        EQU    0EH         ;SPACE OUT CHARACTER
0080              78 NUM3      EQU    80H         ;PRINTER INTERPRETIVE COMMAND, PRINT 3 BYTE NUMBER TO FOLLOW
0081              79 CHKSUM    EQU    81H         ;PRINTER INTERPRETIVE COMMAND, PRINT CHECKSUM CHARACTER
0082              80 RETO      EQU    82H         ;PRINTER INTERPRETIVE COMMAND, RETURN TO CALLING PROGRAM
0083              81 GO        EQU    83H         ;PRINTER INTERPRETIVE COMMAND, GO OR JUMP COMMAND
0084              82 NUM1      EQU    84H         ;PRINTER INTERPRETIVE COMMAND, PRINT 1 BYTE NUMBER TO FOLLOW
0085              83 HNUM3     EQU    85H         ;PRINTER INTERPRETIVE COMMAND, PRINT 3 BYTE NUMBER TO FOLLOW IN HSO FORMAT
0086              84 OPTCR     EQU    86H         ;PRINTER INTERPRETIVE COMMAND, PRINT OPTIONAL CR, CHECKSUM, LF
0087              85 OPTSO     EQU    87H         ;PRINTER INTERPRETIVE COMMAND, PRINT OPTIONAL SO
                  86                  ;
                  87                  ;PROGRAM MACRO INSTRUCTIONS
                  88                  ;
                  89 TST       MACRO  N           ;;TEST ROM MACRO
   -              90           MOV    A,@R0       ;LOAD ROM POINTER INTO ACCUMULATOR
   -              91           MOVP   A,@A        ;FETCH ROM VALUE ADDRESSED BY R0
   -              92           IF     $/100H EQ N
                  93           ELSE
   -              94           ERROR  N           ;PAGING ERROR IN TEST ROM ROUTINE
                  95           ENDIF
   -              96           ADD    A,@R1       ;ADD ROM VALUE TO ROM CHECKSUM REGISTER
   -              97           MOV    @R1,A       ;UPDATE ROM CHECKSUM REGISTER
                  98           ENDM
                  99 SUB       MACRO  ACC,REG     ;;SUBTRACT FROM A MACRO
   -             100           CPL    ACC
   -             101           ADD    ACC,REG
   -             102           CPL    ACC
                 103           ENDM
                 104 SUBC      MACRO  ACC,REG     ;;SUBTRACT WITH CARRY FROM A MACRO
   -             105           CPL    ACC
   -             106           ADDC   ACC,REG
   -             107           CPL    ACC
                 108           ENDM
                 109                  ;
                 110                  ;*EXECUTABLE CODE STARTS HERE*
                 111                  ;
0000             112           ORG    0
0000 75          113           ENT0   CLK
0001 9A00        114           ANL    P2,#00H
0003 27          115           CLR    A           ;CLEAR ACCUMULATOR
0004 C5          116           SEL    RB0
0005 B87F        117           MOV    R0,#7FH     ;ADDR TOP OF RAM
0007 A0          118 CLLOOP:   MOV    @R0,A       ;CLEAR RAM LOCATION @R0
0008 E807        119           DJNZ   R0,CLLOOP   ;CONTINUE TILL ALL RAM CLEAR
000A F4AC        120           CALL   PWRON       ;INITIALIZE SYSTEM
000C B82E        121 LOOP:     MOV    R0,#STAT4   ;RESET OVERFLOW AND UNDERFLOW FLAGS
000E F0          122           MOV    A,@R0
000F 53FC        123           ANL    A,#0FCH
0011 A0          124           MOV    @R0,A
0012 F5          125           SEL    MB1         ;SELECT MEMORY BANK 1 FOR SWITCH READ ROUTINE
0013 B42A        126           CALL   SWTCRD      ;READ PROGRAM SWITCHES AND STORE IN SWTCH1 THRU SWTCH4
0015 D45A        127           CALL   ADJSWT      ;ADJUST DEC PT , INCR SIZE SWS,AND TARE ENTRY CONDITIONS
0017 E5          128           SEL    MB0         ;RETURN TO MEMORY BANK 0 FOR DEMAND ROUTINE
0018 F497        129           CALL   DEMAND      ;WAIT FOR DEMAND MODE INPUT,IF ENABLED
001A 5437        130           CALL   AD          ;PERFORM AN ANALOG TO DIGITAL CONVERSION
001C F5          131           SEL    MB1         ;SELECT MEMORY BANK 1 FOR FILTER ROUTINE
001D D4BA        132           CALL   IFILTR      ;FILTER 200,000 BASED DATA
001F E5          133           SEL    MB0         ;RETURN MEMORY BANK 0 AFTER FILTER ROUTINE
0020 F4C5        134           CALL   CNTINC      ;SUBTRACT DIGITAL INITIAL,MULTIPLY RAW COUNTS BYSPAN MPLR
                 135                              ;AND CONVERT RAW COUNTS TO MINOR INCREMENTS
0022 548E        136           CALL   MCHK        ;CHECK FOR MOTION AND UPDATE MOTION FLAG
0024 B82B        137           MOV    R0,#SWTCH3  ;CHECK EXPAND X10 SWITCH FOR EXPAND MODE
0026 F0          138           MOV    A,@R0
0027 37          139           CPL    A
0028 923E        140           JB4    NEXPND      ;NOT IN EXPAND MODE JUMP NEXPND
002A B850        141           MOV    R0,#OFFSET
002C 94B6        142           CALL   CLR3        ;CLEAR THE AUTO ZERO REGISTER
002E B832        143           MOV    R0,#TARE
0030 94B6        144           CALL   CLR3        ;CLEAR THE TARE REGISTER
0032 B426        145           CALL   EXPZRO      ;CHECK ZERO IN EXPAND MODE
0034 D4C4        146           CALL   EXPAND      ;COMPUTE WEIGHT TO BCD IN EXPAND MODE
0036 241C        147           JMP    NOTAR       ;SKIP TARE FUNCTIONS IN EXPAND MODE
                 148                  ;
                 149 TEST0:    TST    0           ;TEST MEMORY ON PAGE 0
0038 F0          150+          MOV    A,@R0       ;LOAD ROM POINTER INTO ACCUMULATOR
0039 A3          151+          MOVP   A,@A        ;FETCH ROM VALUE ADDRESSED BY R0
```

```
LOC  OBJ    LINE       SOURCE STATEMENT
003A 61     156+       ADD    A,@R1              ;ADD ROM VALUE TO ROM CHECKSUM REGISTER
003B A1     157+       MOV    @R1,A              ;UPDATE ROM CHECKSUM REGISTER
003C 24A7   158        JMP    TEST1              ;
            159                                  ;
003E B82F   160 NEXPND: MOV   R0,#NET
0040 B94A   161        MOV    R1,#OUTWET
0042 54D5   162        CALL   MOV3               ;MOVE WEIGHT TO NET REGISTER
0044 B950   163        MOV    R1,#OFFSET
0046 94A3   164        CALL   SUB3               ;SUBTRACT THE AUTO ZERO REG FROM WEIGHT MINOR INREMENTS
0048 BF32   165        MOV    R7,#50D
004A B4FF   166        CALL   TESTOV             ;PERFORM AN OVER-CAPACITY TEST
004C F674   167        JC     OVERFL             ;JUMP TO OVERFL IF SCALE IS OVERCAPACITY
004E B432   168        CALL   AZM                ;PERFORM AUTO ZERO MAINTANCE SUBJECT FUCTION RESTRICTIONS
0050 85     169        CLR    F0
0051 95     170        CPL    F0
0052 F419   171        CALL   SBNBCD             ;CONVERT WEIGHT TO BCD
0054 B82D   172        MOV    R0,#STAT3          ;ADDR WEIGHT SIGN FLAG
0056 F0     173        MOV    A,@R0
0057 4301   174        ORL    A,#01H             ;SET GROSS WEIGHT SIGN FLAG
0059 765D   175        JF1    NEGK               ;JUMP TO NEGK,IF WEIGHT NEGATIVE
005B 53FE   176        ANL    A,#0FEH            ;RESET GROSS WEIGHT SIGN FLAG, WEIGHT POSITIVE
005D A0     177 NEGK:  MOV    @R0,A
005E B82F   178        MOV    R0,#NET            ;COMPUTE NET WEIGHT
0060 B932   179        MOV    R1,#TARE
0062 94A3   180        CALL   SUB3               ;SUBTRACT TARE WEIGHT FROM GROSS WEIGHT
0064 85     181        CLR    F0
0065 F419   182        CALL   SBNBCD             ;CONVERT IT TO SIGNED BCD
0067 95     183        CPL    F0
0068 B857   184        MOV    R0,#STAT5          ;ADDR NET WEIGHT SIGN FLAG
006A F0     185        MOV    A,@R0
006B 4302   186        ORL    A,#02H             ;SET NET WEIGHT SIGN FLAG
006D 7671   187        JF1    NONTNG             ;JUMP TO NONTNG,IF NET WEIGHT NEGATIVE
006F 53FD   188        ANL    A,#0FDH            ;RESET NET WEIGHT FLAG, WEIGHT POSITIVE
0071 A0     189 NONTNG: MOV   @R0,A
0072 B680   190        JF0    CONVTR             ;JUMP TO CONVTR IF NO OVERFLOW
0074 B82E   191 OVERFL: MOV   R0,#STAT4          ;ADDR OVERFLOW AND UNDERFLOW FLAGS
0076 F0     192        MOV    A,@R0
0077 37     193        CPL    A
0078 77     194        RR     A                  ;SET THE OVERFLOW FLAG TO THE COMPLEMENT OF THE
0079 D0     195        XRL    A,@R0              ;UNDERFLOW FLAG, IF NO UNDERFLOW THEN AN OVERFLOW
007A 5301   196        ANL    A,#01H             ;HAS OCCURRED
007C D0     197        XRL    A,@R0              ;
007D A0     198        MOV    @R0,A              ;UPDATE OVERFLOW FLAG
007E 2416   199        JMP    PREP1              ;GO PREPARE STATUS BYTES
0080 B932   200 CONVTR: MOV   R1,#TARE           ;CONVERT THE TARE TO BCD
0082 54F7   201        CALL   RAS                ;PERFORM ROUNDOFF
0084 B825   202        MOV    R0,#TARBCD
0086 9433   203        CALL   BINBCD             ;CONVERT TARE TO BCD
0088 B825   204        MOV    R0,#TARBCD
008A 9499   205        CALL   DLSD               ;CONVERT TARE BCD TO MAJOR INCREMENTS
008C B925   206        MOV    R1,#TARBCD
008E 9459   207        CALL   MLTINC             ;MULTIPLY TARE MAJOR INCR BY INCR SIZE
0090 B825   208        MOV    R0,#TARBCD         ;
0092 54FD   209        CALL   ROT                ;ADJUST TARE BCD FOR DUMMY ZEROS
0094 B674   210        JF0    OVERFL             ;JUMP TO OVERFL IF TARE DISPLAY OVERFLOW OCCURRED
0096 B827   211        MOV    R0,#TARBCD+2
0098 F0     212        MOV    A,@R0
0099 53F0   213        ANL    A,#0F0H            ;TARE DISPLAY ONLY 5 DIGITS
009B 9674   214        JNZ    OVERFL             ;JUMP TO OVERFL IF TARE .GT. 5 DIGITS
009D B879   215        MOV    R0,#TEMP8
009F B925   216        MOV    R1,#TARBCD
00A1 54D5   217        CALL   MOV3
00A3 B927   218        MOV    R1,#TARBCD+2
00A5 D484   219        CALL   BLNKIT             ;PERFORM LEAD ZERO BLANKING SUBJECT TO PRGM SWS
00A7 B82A   220        MOV    R0,#SWTCH2
00A9 F0     221        MOV    A,@R0
00AA 5307   222        ANL    A,#07H
00AC 03F9   223        ADD    A,#-07H
00AE C6B6   224        JZ     NBFD               ;JUMP TO NBFD IF DEC POINT JUST TO LEFT OF MSD OF TARE DISPLAY
00B0 B827   225        MOV    R0,#TARBCD+2       ;BLANK THE NON USED 6TH DIGIT OF TARE DISPLAY
00B2 F0     226        MOV    A,@R0
00B3 43F0   227        ORL    A,#0F0H
00B5 A0     228        MOV    @R0,A
00B6 F5     229 NBFD:  SEL    MB1
00B7 F400   230        CALL   GGRBCD             ;GENERATE GROSS BCD FROM NET BCD AND TARE BCD
00B9 E5     231        SEL    MB0
00BA B858   232        MOV    R0,#GRSBCD
00BC B979   233        MOV    R1,#TEMP8
00BE 54D5   234        CALL   MOV3               ;STORE GROSS BCD
00C0 B831   235        MOV    R0,#NET+2          ;IS NET WEIGHT GREATER THAN 10 MAJOR INCREMENTS?
00C2 F0     236        MOV    A,@R0
00C3 F2DC   237        JB7    LESST              ;WEIGHT NEGATIVE, JUMP TO LESST
00C5 B82F   238        MOV    R0,#NET
00C7 F0     239        MOV    A,@R0
00C8 039C   240        ADD    A,#-100D
00CA F6D1   241        JC     GREATT             ;WEIGHT GREATER THAN 10 MAJOR INCR, JUMP TO GREATT
00CC 27     242        CLR    A
00CD 54F1   243        CALL   TEST2
00CF C6DC   244        JZ     LESST              ;WEIGHT LESS THAN 10 MAJOR INCR, JUMP TO LESST
00D1 B82E   245 GREATT: MOV   R0,#STAT4          ;
00D3 F0     246        MOV    A,@R0              ;WEIGHT IS GREATER THAN 10 INCR, CHECK FOR MOTION
00D4 37     247        CPL    A
00D5 D2F4   248        JB6    HDGH1              ;SCALE IN MOTION, DON'T SET AUTO CLEAR FLAG, JUMP HDGH1
00D7 37     249        CPL    A                  ;SET THE AUTO-CLEAR TARE FLAG
00D8 4380   250        ORL    A,#80H
00DA 04F3   251        JMP    HDGH               ;GO UPDATE AUTO CLEAR FLAG
00DC B82E   252 LESST: MOV    R0,#STAT4          ;WEIGHT IS LESS THAN 10 MAJOR INCR
00DE F0     253        MOV    A,@R0              ;CHECK THE AUTO CLEAR FLAG
00DF 37     254        CPL    A
```

| LOC OBJ | LINE | | SOURCE STATEMENT | |
|---|---|---|---|---|
| 00E0 F2F0 | 255 | | JB7 | HERTE ;AUTO CLEAR FLAG NOT SET, JUMP TO HERTE |
| 00E2 B92A | 256 | | MOV | R1,#SWTCH2 ;CHECK AUTO CLEAR INHIBIT PROGRAM SWITCH |
| 00E4 F1 | 257 | | MOV | A,@R1 |
| 00E5 D2F0 | 258 | | JB6 | HERTE ;AUTO CLEAR INHIBITED, JUMP TO HERTE |
| 00E7 B496 | 259 | | CALL | CLIT ;ATTEMPT TO CLEAR THE TARE SUBJECT TO TARE RESTRICTIONS |
| 00E9 B82D | 260 | | MOV | R0,#STAT3 |
| 00EB F0 | 261 | | MOV | A,@R0 |
| 00EC 72F4 | 262 | | JB3 | HDGH1 ;TARE WAS NOT CLEARED, INTERLOCKED AND NOT ZERO |
| 00EE B82E | 263 | | MOV | R0,#STAT4 |
| 00F0 F0 | 264 | HERTE: | MOV | A,@R0 ;CLEAR THE AUTO CLEAR TARE FLAG |
| 00F1 537F | 265 | | ANL | A,#7FH |
| 00F3 A0 | 266 | HDGH: | MOV | @R0,A |
| 00F4 B82E | 267 | HDGH1: | MOV | R0,#STAT4 |
| 00F6 B92D | 268 | | MOV | R1,#STAT3 |
| 00F8 F0 | 269 | | MOV | A,@R0 |
| 00F9 77 | 270 | | RR | A |
| 00FA 41 | 271 | | ORL | A,@R1 ;ORL AUTO CLEAR FLAG TO AV TAKEN FLAG |
| 00FB 5340 | 272 | | ANL | A,#40H |
| 00FD D1 | 273 | | XRL | A,@R1 |
| 00FE 5344 | 274 | | ANL | A,#44H ;CLEAR THE NET WEIGHT ZERO FLAG |
| 0100 D1 | 275 | | XRL | A,@R1 |
| 0101 A1 | 276 | | MOV | @R1,A |
| 0102 B82F | 277 | | MOV | R0,#NET |
| 0104 B40A | 278 | | CALL | ABS3 |
| 0106 27 | 279 | | CLR | A |
| 0107 54F1 | 280 | | CALL | TEST2 ;NET WEIGHT AT ZERO WITHIN .25 MAJOR INCR? |
| 0109 9616 | 281 | | JNZ | PREPI ;NOT AT ZERO, GO PREPARE STATUS BYTES FOR DISPLAY PROCESSOR |
| 010B F0 | 282 | | MOV | A,@R0 |
| 010C 03FD | 283 | | ADD | A,#-03H |
| 010E F616 | 284 | | JC | PREPI ;NOT AT ZERO, GO PREPARE STATUS BYTES FOR DISPLAY PROCESSOR |
| 0110 F1 | 285 | | MOV | A,@R1 ;SET THE NET ZERO FLAG |
| 0111 4304 | 286 | | ORL | A,#04H |
| 0113 537F | 287 | | ANL | A,#7FH ;CLEAR THE POWER UP FLAG |
| 0115 A1 | 288 | | MOV | @R1,A |
| 0116 B82A | 289 | PREPI: | MOV | R0,#SWTCH2 ;IS A TARE DISPLAY PRESENT? |
| 0118 F0 | 290 | | MOV | A,@R0 |
| 0119 37 | 291 | | CPL | A |
| 011A F222 | 292 | | JB7 | PREP2 ;TARE DISPLAY PRESENT, GO PREPARE STATUS BYTES |
| 011C B825 | 293 | NOTAR: | MOV | R0,#TARBCD ;NO TARE DISPLAY, BLANK TARE DISPLAY DATA |
| 011E BA03 | 294 | | MOV | R2,#03H |
| 0120 9485 | 295 | | CALL | OVLOOP |
| 0122 B82A | 296 | PREP2: | MOV | R0,#SWTCH2 ;ASSEMBLE STAT1 |
| 0124 F0 | 297 | | MOV | A,@R0 |
| 0125 5308 | 298 | | ANL | A,#08H |
| 0127 4E | 299 | | ORL | A,R6 |
| 0128 B920 | 300 | | MOV | R1,#STAT1 |
| 012A A1 | 301 | | MOV | @R1,A |
| 012B B82D | 302 | | MOV | R0,#STAT3 ;ASSEMBLE STAT2 |
| 012D F0 | 303 | | MOV | A,@R0 |
| 012E 538A | 304 | | ANL | A,#8AH |
| 0130 B857 | 305 | | MOV | R0,#STAT5 ;GET GROSS ZERO FLAG |
| 0132 D0 | 306 | | XRL | A,@R0 |
| 0133 53FB | 307 | | ANL | A,#0FBH ;TURN KG LAMP ON IF IN KG MODE |
| 0135 D0 | 308 | | XRL | A,@R0 |
| 0136 323A | 309 | | JB1 | KG ;IF IN KG MODE, JUMP TO KG |
| 0138 4301 | 310 | | ORL | A,#01H ;LB MODE, TURN ON LB LAMP |
| 013A B92E | 311 | KG: | MOV | R1,#STAT4 ;CHECK MOTION FLAG |
| 013C AA | 312 | | MOV | R2,A |
| 013D F1 | 313 | | MOV | A,@R1 |
| 013E D244 | 314 | | JB6 | DBLAMP ;NO MOTION, JUMP DBLAMP |
| 0140 FA | 315 | | MOV | A,R2 |
| 0141 53FC | 316 | | ANL | A,#0FCH ;MOTION, BLANK LB & KG LAMPS |
| 0143 AA | 317 | | MOV | R2,A |
| 0144 FA | 318 | DBLAMP: | MOV | A,R2 |
| 0145 B821 | 319 | | MOV | R0,#STAT2 ;UPDATE STATUS BYTE STAT2 |
| 0147 A0 | 320 | | MOV | @R0,A |
| 0148 F5 | 321 | DATAIO: | SEL | MB1 ;SELECT MEMORY BANK 1 FOR ROM AND RAM CHECK |
| 0149 D410 | 322 | | CALL | TEST ;CHECK RAM AND ROM |
| 014B 54EE | 323 | | CALL | HSO ;HIGH SPEED OUTPUT HANDLER |
| 014D B448 | 324 | | CALL | PARALL ;PARALELL OUTPUT ROUTINE HANDLER |
| 014F E5 | 325 | | SEL | MB0 |
| 0150 B92E | 326 | | MOV | R1,#STAT4 ;CHECK STATUS REGISTER FOR OVERFLOW OR UNDERFLOW |
| 0152 F1 | 327 | | MOV | A,@R1 |
| 0153 5303 | 328 | | ANL | A,#03H |
| 0155 C663 | 329 | | JZ | EXBLCK ;NO OVERFLOW OR UNDERFLOW, JUMP TO EXBLCK |
| 0157 9481 | 330 | | CALL | BLANKD ;BLANK THE DISPLAY |
| 0159 B000 | 331 | | MOV | @R0,#00H ;CLEAR PRINT COMMAND IN COMMAND REG |
| 015B 1263 | 332 | | JB0 | EXBLCK ;IF SCALE HAS AN OVERFLOW JUMP EXBLCK |
| 015D B824 | 333 | | MOV | R0,#NETBCD+2 ;HAD AN UNDERFLOW, LOAD MINUS SIGN |
| 015F B0DF | 334 | | MOV | @R0,#0DFH |
| 0161 246F | 335 | | JMP | NOMOBL ;DATA BLANKED, JUMP NOMOBL, GO DISPLAY DATA |
| 0163 866D | 336 | EXBLCK: | JNI | EXBLNK ;JUMP EXBLNK WHEN EXTERNAL BLANKING INPUT IS LOW |
| 0165 B82B | 337 | | MOV | R0,#SWTCH3 ;CHECK MOTION BLANKING PROGRAM SWITCH |
| 0167 F0 | 338 | | MOV | A,@R0 |
| 0168 526F | 339 | | JB2 | NOMOBL ;MOTION BLANKING DISABLED, JUMP NOMOBL |
| 016A F1 | 340 | | MOV | A,@R1 ;IS SCALE IN MOTION? |
| 016B D26F | 341 | | JB6 | NOMOBL ;NO MOTION, JUMP NOMOBL |
| 016D 9481 | 342 | EXBLNK: | CALL | BLANKD ;SCALE IN MOTION, OR EXTERNAL BLANKING INPUT, BLANK DISPLAY |
| 016F F5 | 343 | NOMOBL: | SEL | MB1 |
| 0170 1400 | 344 | | CALL | DISPLY ;TRANSMIT DATA TO AND RECEIVE DATA FROM DISPLAY PROCESSOR |
| 0172 B86C | 345 | | MOV | R0,#AVCNT |
| 0174 F0 | 346 | | MOV | A,@R0 |
| 0175 07 | 347 | | DEC | A ;DECREMENT THE AV COUNTER |
| 0176 20 | 348 | | XCH | A,@R0 ;UPDATE AV COUNTER |
| 0177 9689 | 349 | | JNZ | NOAV ;AV COUNTER HAS NOT TIMED OUT, NO AV, JUMP NO AV |
| 0179 A0 | 350 | | MOV | @R0,A |
| 017A B82D | 351 | | MOV | R0,#STAT3 ;HAS AN AV BEEN TAKEN SINCE TIMER TIMED OUT? |
| 017C F0 | 352 | | MOV | A,@R0 |

```
LOC  OBJ    LINE           SOURCE STATEMENT 017D 37      353           CPL   A                        ;YES, NO AV, JUMP TO NO AV
017E D289    354           JB6   NOAV                     ;IF SCALE NOT AT ZERO +- .25 INCR JUMP NO AV
0180 5289    355           JB2   NOAV                     ;IS AUTOMATIC AV ENABLED?
0182 B82B    356           MOV   R0,#SWTCH3
0184 F0      357           MOV   A,@R0
0185 F289    358           JB7   NOAV                     ;AUTO AV DISABLED JUMP NO AV
0187 7467    359           CALL  AV
0189 E5      360  NOAV:    SEL   MB0
018A B828    361           MOV   R0,#COMMND               ;EXECUTION OF USER COMMANDS
018C F0      362           MOV   A,@R0
018D 537F    363           ANL   A,#7FH
018F C6D4    364           JZ    BACK                     ;NO COMMAND INPUT FROM KBD, GO TO LOOP
0191 B92E    365           MOV   R1,#STAT4
0193 21      366           XCH   A,@R1
0194 537F    367           ANL   A,#7FH                   ;RESET THE AUTO CLEAR TARE FLAG
0196 21      368           XCH   A,@R1
0197 BA9E    369           MOV   R2,#EXECUT-100H-1
0199 F7      370  WCLOOP:  RLC   A                        ;SELECT USER COMMAND FROM KEYBOARD
019A 1A      371           INC   R2
019B E699    372           JNC   WCLOOP
019D FA      373           MOV   A,R2
019E B3      374           JMPP  @A
             375           ;
             376           ;*** KEYBOARD COMMAND EXECUTION TABLE ***
             377           ;
019F D4      378  EXECUT:  DB    BACK-100H                ;DEFAULT CONDITION - START NEXT LOOP
01A0 D4      379           DB    BACK-100H                ;ERROR OVERRIDES EVERYTHING
01A1 DA      380           DB    ZERO-100H                ;ZERO FUNCTION
01A2 E0      381           DB    P300-100H                ;PRINT FUNCTION
01A3 E6      382           DB    DOAV-100H                ;AV FUNCTION
01A4 D6      383           DB    CLEAR-100H               ;CLEAR FUNCTION
01A5 EC      384           DB    CT-100H                  ;TARE
01A6 AD      385           DB    LBKG-100H                ;LB/KG
             386           ;
             387  TEST1:   TST   1                        ;TEST MEMORY ON PAGE 1
01A7 F0      388+          MOV   A,@R0                    ;LOAD ROM POINTER INTO ACCUMULATOR
01A8 A3      389+          MOVP  A,@A                     ;FETCH ROM VALUE ADDRESSED BY R0
01A9 61      394+          ADD   A,@R1                    ;ADD ROM VALUE TO ROM CHECKSUM REGISTER
01AA A1      395+          MOV   @R1,A                    ;UPDATE ROM CHECKSUM REGISTER
01AB 4431    396           JMP   TST2                     ;
             397           ;
             398           ;*** LB/KG CONVERSION REQUEST ROUTINE ***
             399           ;
01AD B829    400  LBKG:    MOV   R0,#SWTCH1               ;LB/KG CONVERSION ENABLED?
01AF F0      401           MOV   A,@R0
01B0 52D4    402           JB2   BACK                     ;LB/KG SWITCHING INHIBITED, JUMP TO LOOP
01B2 5303    403           ANL   A,#03H
01B4 0308    404           ADD   A,#POINT1-300H           ;PERFORM TABLE LOOKUP OF CONVERSION FACTOR
01B6 AE      405           MOV   R6,A
01B7 B82D    406           MOV   R0,#STAT3
01B9 F0      407           MOV   A,@R0
01BA D302    408           XRL   A,#02H
01BC A0      409           MOV   @R0,A
01BD 32C4    410           JB1   CKG
01BF FE      411           MOV   A,R6
01C0 0304    412           ADD   A,#04H
01C2 24C5    413           JMP   CONVER
01C4 FE      414  CKG:     MOV   A,R6
01C5 E3      415  CONVER:  MOVP3 A,@A
01C6 AE      416           MOV   R6,A
01C7 B832    417           MOV   R0,#TARE                 ;CONVERT TARE FROM LB TO KG OR KG TO LB INCR
01C9 D433    418           CALL  MULT2C
01CB B850    419           MOV   R0,#OFFSET               ;CONVERT AUTO ZERO REG FROM LB TO KG OR KG TO LB INCR
01CD B40A    420           CALL  ABS3
01CF FE      421           MOV   A,R6
01D0 D433    422           CALL  MULT2C
01D2 B423    423           CALL  SIGN3
01D4 040C    424  BACK:    JMP   LOOP                     ;BEGIN NEXT CYCLE
             425           ;
             426           ;*** CLEAR TARE REQUEST ROUTINE ***
             427           ;
01D6 B496    428  CLEAR:   CALL  CLIT                     ;ATTEMPT TO CLEAR TARE SUBJECT TO SCALE AND PROGRAM CONDITIONS
01D8 040C    429           JMP   LOOP                     ;BEGIN NEXT CYCLE
             430           ;
             431           ;*** PUSHBUTTON ZERO REQUEST ROUTINE ***
             432           ;
01DA BE4A    433  ZERO:    MOV   R6,#OUTWET
01DC 94BE    434           CALL  ZIT                      ;ATTEMPT TO ZERO SCALE SUBJECT TO SCALE AND PROGRAM CONDITIONS
01DE 040C    435           JMP   LOOP                     ;BEGIN NEXT CYCLE
             436           ;
             437           ;*** PRINT REQUEST ROUTINE ***
             438           ;
01E0 F5      439  P300:    SEL   MB1                      ;SELECT MEMORY BANK 1 FOR LOW SPEED PRT ROUTINE
01E1 14F6    440           CALL  LSO                      ;PRINT DATA TO RECEIVING DEVICE AT 300 BAUD SUBJECT TO RESTRICTIONS
01E3 E5      441           SEL   MB0                      ;RETURN TO MEMORY BANK 0 FOR NORMAL OPERATION
01E4 040C    442           JMP   LOOP                     ;BEGIN NEXT CYCLE
             443           ;
             444           ;*** ANALOG VERIFY REQUEST ROUTINE ***
             445           ;
01E6 F5      446  DOAV:    SEL   MB1                      ;SELECT MEMORY BANK 1 FOR AV ROUTINE
01E7 7467    447           CALL  AV                       ;ATTEMPT TO DO AN AV SUBJECT TO SCALE AND PROGRAM CONDITIONS
01E9 E5      448           SEL   MB0                      ;RETURN TO MEMORY BANK 0 FOR NORMAL OPERATION
01EA 040C    449           JMP   LOOP                     ;BEGIN NEXT CYCLE
             450           ;
             451           ;*** TARE ENTRY REQUEST ROUTINE ***
             452           ;
01EC B82D    453  CT:      MOV   R0,#STAT3                ;ATTEMPT TO ACCEPT TARE ENTRY SUBJECT TO SCALE AND PROGRAM CONDITIONS
01EE F0      454           MOV   A,@R0                    ;SCALE IN POWER UP MODE?
```

```
LOC  OBJ      LINE         SOURCE STATEMENT
01EF F2D4     455          JB7    BACK             ;YES,ABORT TARE ATTEMPT, BEGIN NEXT CYCLE
01F1 B857     456          MOV    R0,#STAT5        ;SCALE AT GROSS ZERO????
01F3 F0       457          MOV    A,@R0
01F4 52D4     458          JB2    BACK             ;YES,ABORT TARE ATTEMPT, BEGIN NEXT CYCLE
01F6 B82F     459          MOV    R0,#NET
01F8 BF05     460          MOV    R7,#05H
01FA B4FF     461          CALL   TESTOV           ;IS THE SCALE OVERCAP?
01FC F6D4     462          JC     BACK             ;YES,ABORT TARE ATTEMPT, BEGIN NEXT CYCLE
01FE B82D     463          MOV    R0,#STAT3        ;IS THE WEIGHT NEGATIVE?
0200 F0       464          MOV    A,@R0
0201 122F     465          JB0    BACK1            ;YES,ABORT TARE ATTEMPT, BEGIN NEXT CYCLE
0203 B82A     466          MOV    R0,#SWTCH2       ;IS THE TARE DISPLAY DISABLED?
0205 F0       467          MOV    A,@R0
0206 F22F     468          JB7    BACK1            ;YES,ABORT TARE ATTEMPT, BEGIN NEXT CYCLE
0208 920F     469          JB4    INTER            ;IF TARE NOT INTERLOCKED, SKIP NET CHECK
020A B82D     470          MOV    R0,#STAT3        ;SCALE IS INTERLOCKED, SCALE IN NET MODE?
020C F0       471          MOV    A,@R0
020D 722F     472          JB3    BACK1            ;YES,ABORT TARE ATTEMPT, BEGIN NEXT CYCLE
020F B82E     473 INTER:   MOV    R0,#STAT4        ;SCALE IN MOTION?
0211 F0       474          MOV    A,@R0
0212 37       475          CPL    A
0213 D22F     476          JB6    BACK1            ;SCALE IN MOTION, ABORT TARE ATTEMPT, BEGIN NEXT CYCLE
0215 B832     477          MOV    R0,#TARE
0217 B94A     478          MOV    R1,#OUTNET
0219 5405     479          CALL   MOV3             ;SET TARE=OUTNET-OFFSET
021B B950     480          MOV    R1,#OFFSET
021D 94A3     481          CALL   SUB3
021F B82E     482          MOV    R0,#STAT4
0221 F0       483          MOV    A,@R0
0222 5377     484          ANL    A,#077H          ;CLEAR THE KEYBD TARE AND AUTO CLEAR TARE FLAGS
0224 A0       485          MOV    @R0,A
0225 B82D     486          MOV    R0,#STAT3        ;SET NET FLAG
0227 F0       487          MOV    A,@R0
0228 4308     488          ORL    A,#08H
022A A0       489          MOV    @R0,A
022B B873     490          MOV    R0,#FLTCNT       ;RESET THE DIGITAL OUTPUT FILTER FLAG
022D B0FF     491          MOV    @R0,#0FFH
022F 040C     492 BACK1:   JMP    LOOP             ;BEGIN NEXT CYCLE
              493                                  ;
              494 TST2:    TST    2                ;TEST MEMORY ON PAGE 2
0231 F0       495+         MOV    A,@R0            ;LOAD ROM POINTER INTO ACCUMULATOR
0232 A3       496+         MOVP   A,@A             ;FETCH ROM VALUE ADDRESSED BY R0
0233 61       501+         ADD    A,@R1            ;ADD ROM VALUE TO ROM CHECKSUM REGISTER
0234 A1       502+         MOV    @R1,A            ;UPDATE ROM CHECKSUM REGISTER
0235 8420     503          JMP    TEST4            ;
              504                                  ;
              505                                  ;***ANALOG TO DIGITAL CONVERSION ROUTINE
              506                                  ;
0237 23F2     507 AD:      MOV    A,#0F2H
0239 3A       508          OUTL   P2,A             ;REMOVE A/D RESET & TURN ON T1
023A 97       509          CLR    C
023B 27       510          CLR    A
023C B901     511          MOV    R1,#01H
023E BA10     512          MOV    R2,#10H           ;SET UP THE DELAY (25,630 INSTRUCTION CYCLES)
0240 BB32     513          MOV    R3,#32H
0242 AC       514          MOV    R4,A
0243 AD       515          MOV    R5,A
0244 EA44     516 LOOP3:   DJNZ   R2,LOOP3         ;DELAY
0246 EB44     517          DJNZ   R3,LOOP3
0248 4680     518          JNT1   UNDER            ;IF SCALE IS BEHIND ZERO, APPROX - 7% GROSS, JUMP TO UNDER
024A 9AF0     519          ANL    P2,#0F0H
024C 8A04     520          ORL    P2,#04H          ;TURN OFF T1-TURN ON T2
024E 79       521 LOOP4:   ADDC   A,R1
024F 1D       522          INC    R5               ;INCREMENT T2 COUNTER
0250 564E     523          JT1    LOOP4            ;CONTINUE TILL ZERO CROSSING OCCURS
0252 1300     524          ADDC   A,#00H           ;ADJUST T2 COUNTER MS BYTE
              525          SUB    A,R5
0254 37       526+         CPL    A
0255 6D       527+         ADD    A,R5
0256 37       528+         CPL    A
0257 AE       529          MOV    R6,A
0258 9AF0     530          ANL    P2,#0F0H         ;TURN T2 OFF
025A 6D       531          ADD    A,R5             ;IF MSB+LSB OVERFLOWS THEN DECREMENT MSB
025B FE       532          MOV    A,R6
              533          SUBC   A,#00H
025C 37       534+         CPL    A
025D 1300     535+         ADDC   A,#00H
025F 37       536+         CPL    A
0260 AE       537          MOV    R6,A
0261 8A08     538          ORL    P2,#08H          ;TURN ON T3
0263 00       539 LOOP5:   NOP
0264 1C       540          INC    R4               ;INCREMENT T3 COUNTER
0265 4663     541          JNT1   LOOP5            ;CONTINUE TILL ZERO CROSSING OCCURS
0267 9A00     542          ANL    P2,#00H
0269 B905     543          MOV    R1,#05H
026B B844     544          MOV    R0,#RAWCNT
026D BF00     545          MOV    R7,#00
026F 5405     546          CALL   MOV3
0271 BA05     547          MOV    R2,#05H
0273 948B     548 RLP:     CALL   SHL3             ;MULTIPLY T2 COUNTER BY 32
0275 EA73     549          DJNZ   R2,RLP
0277 27       550          CLR    A
0278 AD       551          MOV    R5,A
0279 AE       552          MOV    R6,A
027A B904     553          MOV    R1,#04H
027C 94A3     554          CALL   SUB3             ;SUBTRACT T3 COUNTER FROM 32 X T2 COUNTER
027E E686     555          JNC    RET2             ;JUMP IF NO UNDERFLOW OCCURS
0280 B82E     556 UNDER:   MOV    R0,#STAT4        ;SCALE IS .GT. 7% NEGATIVE GROSS,SET UNDERFLOW FLAG
```

```
LOC  OBJ        LINE      SOURCE STATEMENT

0282 F0         557           MOV   A,@R0
0283 4302       558           ORL   A,#02H
0285 A0         559           MOV   @R0,A
0286 9A00       560 RET2:     ANL   P2,#00H         ;RESET A/D HARDWARE
0288 B860       561           MOV   R0,#CNTRAW
028A B944       562           MOV   R1,#RAWCNT      ;STORE RAWCNT FOR LATER
028C 44D5       563           JMP   MOV3
                564       ;
                565       ;*MOTION CHECK SUBROUTINE*
                566       ;
                567       ;IF THE DIFFERENCE BETWEEN A/D WGT AND  OUTWET REG
                568       ;IS .GT. MOTION SENSITIVITY (5 OR 20) RESET THE
                569       ;MOTION FLAG
                570       ;
028E B835       571 MCHK:     MOV   R0,#TEMP
0290 B944       572           MOV   R1,#RAWCNT
0292 54D5       573           CALL  MOV3            ;RAWCNTS > TEMP
0294 B94A       574           MOV   R1,#OUTWET
0296 9AA3       575           CALL  SUB3            ;SUBTRACT OUTWET FROM RAWCNT
0298 B40A       576           CALL  ABS3            ;OBTAIN MAGNITUDE OF DIFFERENCE
029A B837       577           MOV   R0,#TEMP+2
029C F0         578           MOV   A,@R0
029D 96CD       579           JNZ   MOTN            ;DIFF .GT. (5 OR 20), SCALE IN MOTION, JUMP MOTN
029F C8         580           DEC   R0
02A0 F0         581           MOV   A,@R0
02A1 96CD       582           JNZ   MOTN            ;DIFF .GT. (5 OR 20), SCALE IN MOTION, JUMP MOTN
02A3 C8         583           DEC   R0
02A4 B92B       584           MOV   R1,#SWTCH3      ;CHECK PROGRAM SWITCH FOR MOTION SENSITIVITY (HIGH OR LOW)
02A6 F1         585           MOV   A,@R1
02A7 72AD       586           JB3   LOSENS          ;LOW SENSITIVITY, JUMP LOSENS
02A9 23FB       587           MOV   A,#-05H         ;HIGH SENSITIVITY CONSTANT (5) INTO ACCUMULATOR
02AB 44AF       588           JMP   HISENS          ;GO CHECK FOR DIFF .GT. (5)
02AD 23EC       589 LOSENS:   MOV   A,#-20D         ;LOW SENSITIVITY CONSTANT (20) INTO ACCUMULATOR
02AF 60         590 HISENS:   ADD   A,@R0
02B0 F6CD       591           JC    MOTN            ;DIFF .GT. (5 OR 20), SCALE IN MOTION, JUMP MOTN
02B2 B92E       592           MOV   R1,#STAT4       ;DIFF .LE. (5 OR 20), INCREMENT MOTION COUNTER
02B4 F1         593           MOV   A,@R1
02B5 D2BA       594           JB6   ICK             ;NO MOTION, DON'T INCR MOTION COUNTER, JUMP ICK
02B7 0320       595           ADD   A,#20H
02B9 A1         596           MOV   @R1,A
02BA F1         597 ICK:      MOV   A,@R1
02BB 53FB       598           ANL   A,#0FBH         ;RESET AVFLTR FLAG
02BD A1         599           MOV   @R1,A
02BE F0         600           MOV   A,@R0
02BF 03FD       601           ADD   A,#-03
02C1 F6C7       602           JC    ICI             ;IF RAWCNT - OUTWET .GT. 2 MINOR INCR, JUMP ICI
02C3 F1         603           MOV   A,@R1
02C4 4304       604           ORL   A,#04H          ;SET AVFLTR FLAG, DIFF .LE. 2 MINOR INCR
02C6 A1         605           MOV   @R1,A
02C7 B944       606 ICI:      MOV   R1,#RAWCNT
02C9 B84A       607           MOV   R0,#OUTWET
02CB 44D5       608           JMP   MOV3            ;MOVE RAWCNT WGT TO OUTWET REG
02CD B82E       609 MOTN:     MOV   R0,#STAT4       ;SCALE IS IN MOTION
02CF F0         610           MOV   A,@R0
02D0 539B       611           ANL   A,#9BH          ;RESET THE NO MOTION COUNTER
02D2 A0         612           MOV   @R0,A
02D3 44C7       613           JMP   ICI             ;GO UPDATE OUTWET REG
                614       ;
                615       ;*** 3 BYTE MOVE ROUTINE ***
                616       ;
                617       ;MOVES THE 3 BYTES AT SOURCE ADDR R1 TO DEST ADDR R0
                618       ;AND RESTORES ADDR POINTERS
                619       ;
02D5 F1         620 MOV3:     MOV   A,@R1
02D6 A0         621           MOV   @R0,A
02D7 18         622           INC   R0
02D8 19         623           INC   R1
02D9 F1         624           MOV   A,@R1
02DA A0         625           MOV   @R0,A
02DB 18         626           INC   R0
02DC 19         627           INC   R1
02DD F1         628           MOV   A,@R1
02DE A0         629           MOV   @R0,A
02DF 84B1       630           JMP   RSTR10
                631       ;
                632       ;*** 3 BYTE ADD ROUTINE ***
                633       ;
                634       ;THIS ROUTINE ADDS 3 BYTES ADDR BY R0 AND R1
                635       ;RESULTS LOCATED AT R0 AND RESTORES R0 AND R1 POINTERS
                636       ;
02E1 F0         637 ADD3:     MOV   A,@R0
02E2 61         638           ADD   A,@R1
02E3 A0         639           MOV   @R0,A
02E4 18         640           INC   R0
02E5 19         641           INC   R1
02E6 F0         642           MOV   A,@R0
02E7 71         643           ADDC  A,@R1
02E8 A0         644           MOV   @R0,A
02E9 18         645           INC   R0
02EA 19         646           INC   R1
02EB F0         647           MOV   A,@R0
02EC 71         648           ADDC  A,@R1
02ED A0         649           MOV   @R0,A
02EE 84B1       650           JMP   RSTR10
                651       ;
                652       ;*** TEST IF ZERO ROUTINES ***
                653       ;
                654       ;THESE ROUTINES TEST 2 AND 3 BYTE REGISTERS
                655       ;FOR ZERO,A=0 IF ZERO, AND R0 POINTER IS RESTORED
                656       ;
```

```
LOC   OBJ      LINE          SOURCE STATEMENT

02F0  F0       657 TEST3:    MOV    A,@R0
02F1  18       658 TEST2:    INC    R0
02F2  40       659           ORL    A,@R0
02F3  18       660           INC    R0
02F4  40       661           ORL    A,@R0
02F5  84B3     662           JMP    RSTR0
               663           ;
               664           ;*** ROUND AND STORE ROUTINE ***
               665           ;
               666           ;THIS SUBROUTINE ADDS 5 TO BINARY VALUE LOCATED
               667           ;AT R1 AND MOVES RESULT TO TEMP REG
               668           ;
02F7  B835     669 RAS:      MOV    R0,#TEMP
02F9  94B6     670           CALL   CLR3
02FB  B005     671           MOV    @R0,#05H
02FD  44E1     672           JMP    ADD3
               673           ;
               674           ;PAGING FILLER (2FF)
               675           ;
02FF  00       676           DB     00H
               677           ;
               678           ;*DATA AREA*
               679           ;
0300           680           ORG    300H
               681           ;
               682           ;*** INCREMENT SIZES ***
               683           ;
0300  01       684 INCREM:   DB     01H,01H,02H,05H
0301  01
0302  02
0303  05

685           ;
               686           ;*** KG/LB CONVERSION FACTOR POINTERS ***
               687           ;
0304  10       688 POINT:    DB     R12-300H,R12-300H,R25-300H,R12-300H
0305  10
0306  13
0307  10
0308  10       689 POINT1:   DB     R12-300H,R12-300H,R12-300H,R25-300H
0309  10
030A  10
030B  13
030C  16       690           DB     R21-300H,R21-300H,R52-300H,R21-300H
030D  16
030E  19
030F  16

691           ;
               692           ;*** KG/LB CONVERSION FACTORS ***
               693           ;
0310  A1       694 R12:      DB     0A1H,1EH,74H       ;CONVERSION FACTOR FOR X1KG-X2LB
0311  1E
0312  74
0313  48       695 R25:      DB     48H,26H,91H        ;CONVERSION FACTORS FOR X2KG-X5LB
0314  26
0315  91
0316  89       696 R21:      DB     89H,18H,8DH        ;CONVERSION FACTORS FOR X2LB-X1KG
0317  18
0318  8D
0319  6E       697 R52:      DB     6EH,0E0H,70H       ;CONVERSION FACTORS FOR X5LB-X2KG
031A  E0
031B  70

698           ;
               699           ;*** FULL SCALE INCREMENT CONVERSION MULTIPLIERS ***
               700           ;
031C  CD       701 FSCALE:   DB     0CDH,0CCH,00CH  ;FOR 1000 INCR MPLR = .05000001
031D  CC
031E  0C
031F  33       702           DB     033H,033H,013H  ;FOR 1500 INCR MPLR = .07499999
0320  33
0321  13
0322  8F       703           DB     08FH,0C2H,015H  ;FOR 1700 INCR MPLR = .08499998
0323  C2
0324  15
0325  9A       704           DB     09AH,099H,019H  ;FOR 2000 INCR MPLR = .10000002
0326  99
0327  19
0328  00       705           DB     000H,000H,020H  ;FOR 2500 INCR MPLR = .12500000
0329  00
032A  20
032B  66       706           DB     066H,066H,026H  ;FOR 3000 INCR MPLR = .14999997
032C  66
032D  26
032E  1F       707           DB     01FH,085H,02BH  ;FOR 3400 INCR MPLR = .17000001
032F  85
0330  2B
0331  33       708           DB     033H,033H,033H  ;FOR 4000 INCR MPLR = .19999998
0332  33
0333  33
0334  00       709           DB     000H,000H,040H  ;FOR 5000 INCR MPLR = .25000000
0335  00
0336  40
0337  CD       710           DB     0CDH,0CCH,04CH  ;FOR 6000 INCR MPLR = .30000001
0338  CC
0339  4C
033A  3D       711           DB     03DH,00AH,057H  ;FOR 6800 INCR MPLR = .33999997
033B  0A
033C  57
```

```
LOC  OBJ        LINE    SOURCE STATEMENT 033D 66         712     DB      066H,066H,066H  ;FOR  8000 INCR MPLR = .39999997
033E 66
033F 66
0340 CD         713     DB      0CDH,0CCH,06CH  ;FOR  8500 INCR MPLR = .42500001
0341 CC
0342 6C
0343 00         714     DB      000H,000H,080H  ;FOR 10000 INCR MPLR = .50000000
0344 00
0345 80
0346 99         715     DB      099H,099H,099H  ;FOR 12000 INCR MPLR = .59999996
0347 99
0348 99
0349 CC         716     DB      0CCH,0CCH,0CCH  ;FOR 16000 INCR MPLR = .79999995
034A CC
034B CC
034C 9A         717     DB      09AH,099H,0D9H  ;FOR 17000 INCR MPLR = .85000002
034D 99
034E D9
034F FF         718     DB      0FFH,0FFH,0FFH  ;FOR 20000 INCR MPLR = .99999994
0350 FF
0351 FF
                719     ;
                720     ;MULTIPLICATION FACTOR FOR TARE INPUT
                721     ;       10/INCREMENT SIZE
                722     ;
0352 0A         723 MFACT: DB   0AH,00H,00H     ;10/1 = 10
0353 00
0354 00
0355 0A         724     DB      0AH,00H,00H     ;10/1 = 10
0356 00
0357 00
0358 05         725     DB      05H,00H,00H     ;10/2 = 5
0359 00
035A 00
035B 02         726     DB      02H,40H,00H     ;10/5 = 2
035C 00
035D 00
                727     ;
                728     ;OVERCAPACITY VALUES (FULL SCALE INCR IN MINOR INCREMENTS)
                729     ;
035E 10         730 OVRFL: DB   010H,027H,000H  ;FOR 1000 INCR (10000 MINORS)
035F 27
0360 00
0361 98         731     DB      098H,03AH,000H  ;FOR 1500 INCR (15000 MINORS)
0362 3A
0363 00
0364 68         732     DB      068H,042H,000H  ;FOR 1700 INCR (17000 MINORS)
0365 42
0366 00
0367 20         733     DB      020H,04EH,000H  ;FOR 2000 INCR (20000 MINORS)
0368 4E
0369 00
036A A8         734     DB      0A8H,061H,000H  ;FOR 2500 INCR (25000 MINORS)
036B 61
036C 00
036D 30         735     DB      030H,075H,000H  ;FOR 3000 INCR (30000 MINORS)
036E 75
036F 00
0370 D0         736     DB      0D0H,084H,000H  ;FOR 3400 INCR (34000 MINORS)
0371 84
0372 00
0373 40         737     DB      040H,09CH,000H  ;FOR 4000 INCR (40000 MINORS)
0374 9C
0375 00
0376 50         738     DB      050H,0C3H,000H  ;FOR 5000 INCR (50000 MINORS)
0377 C3
0378 00
0379 60         739     DB      060H,0EAH,000H  ;FOR 6000 INCR (60000 MINORS)
037A EA
037B 00
037C A0         740     DB      0A0H,009H,001H  ;FOR 6800 INCR (68000 MINORS)
037D 09
037E 01
037F 80         741     DB      080H,038H,001H  ;FOR 8000 INCR (80000 MINORS)
0380 38
0381 01
0382 08         742     DB      008H,04CH,001H  ;FOR 8500 INCR (85000 MINORS)
0383 4C
0384 01
0385 A0         743     DB      0A0H,086H,001H  ;FOR 10000 INCR (100000 MINORS)
0386 86
0387 01
0388 C0         744     DB      0C0H,0D4H,001H  ;FOR 12000 INCR (120000 MINORS)
0389 D4
038A 01
038B 00         745     DB      000H,071H,002H  ;FOR 16000 INCR (160000 MINORS)
038C 71
038D 02
038E 10         746     DB      010H,098H,002H  ;FOR 17000 INCR (170000 MINORS)
038F 98
0390 02
0391 40         747     DB      040H,00DH,003H  ;FOR 20000 INCR (200000 MINORS)
0392 0D
0393 03
                748     ;
                749     ;ASCII DIGIT CODES
                750     ;
0394 30313233   751 DIGITS: DB  '0123456789ABC-E '
```

```
LOC  OBJ        LINE     SOURCE STATEMENT 0398 34353637
039C 38394142
03A0 432D4520
                752               ;
                753               ;FORMATS FOR 300 BAUD PRINTOUTS
                754               ;
03A4 02         755 FORM:   DB    02H,OPTSO,NUM3,WETBCD+2
03A5 87
03A6 80
03A7 24
03A8 0D         756 EOT:    DB    CR,CHKSUM,LF,RETO
03A9 81
03AA 0A
03AB 82
03AC 02         757 FORM1:  DB    02H
03AD 87         758 NETFRM: DB    OPTSO,NUM3,WETBCD+2,' NET',GO,EOT-300H
03AE 80
03AF 24
03B0 204E4554
03B4 83
03B5 A8
03B6 02         759 FORM3:  DB    02H,NUM3,GRSBCD+2,OPTCR
03B7 80
03B8 5A
03B9 86
03BA 80         760         DB    NUM3,TARBCD+2,' TR',OPTCR,GO,NETFRM-300H
03BB 27
03BC 205452
03BF 86
03C0 83
03C1 AD
03C2 02         761 FORM2:  DB    02H,NUM3,GRSBCD+2,OPTCR
03C3 80
03C4 5A
03C5 86
03C6 80         762         DB    NUM3,TARBCD+2,' TRM',OPTCR,GO,NETCFR-300H
03C7 27
03C8 20545248
03CC 86
03CD 83
03CE D0
03CF 02         763 FORM4:  DB    02H
03D0 87         764 NETCFR: DB    OPTSO,NUM3,WETBCD+2,' NETC',GO,EOT-300H
03D1 80
03D2 24
03D3 204E4554
03D7 43
03D8 83
03D9 A8
                765               ;
                766               ;DIGIT BLANKING DATA
                767               ;
03DA 00         768 BLANK:  DB    0,0,0,1              ;1000-1500-1700-2000
03DB 00
03DC 00
03DD 01
03DE 01         769         DB    1,1,1,1              ;2500-3000-3400-4000
03DF 01
03E0 01
03E1 01
03E2 02         770         DB    2,2,2,2              ;5000-6000-6800-8000
03E3 02
03E4 02
03E5 02
03E6 02         771         DB    2,3,3,3              ;8500-10000-12000-16000
03E7 03
03E8 03
03E9 03
03EA 03         772         DB    3,4                  ;17000-20000
03EB 04
                773               ;
                774               ;HIGH SPEED OUTPUT FORMAT
                775               ;
03EC 02         776 HSOFOR: DB    02H,NUM1,STATA,NUM1,STATB,NUM1,STATC,HNUM3
03ED 84
03EE 5B
03EF 84
03F0 5C
03F1 84
03F2 6F
03F3 85
03F4 24         777         DB    WETBCD+2,HNUM3,TARBCD+2,CR,CHKSUM,RETO
03F5 85
03F6 27
03F7 0D
03F8 81
03F9 82
                781               ;
                782               ;*** BCD TO BINARY CONVERTER ***
                783               ;
                784               ;THIS ROUTINE TAKES BCD VALUE AT TARBCD AND
                785               ;CONVERTS IT INTO BINARY AT TEMP3
                786               ;
03FA B84D       787 BCDBIN: MOV   R0,#TEMP3
03FC 94B6       788         CALL  CLR3
03FE BF06       789         MOV   R7,#06H
0400 B835       790 BCLOOP: MOV   R0,#TEMP
0402 B94D       791         MOV   R1,#TEMP3   ;MULTIPLY THE RUNNING TOTAL (TEMP3) BY 10
```

```
LOC  OBJ    LINE         SOURCE STATEMENT
0404 54D5   792          CALL   MOV3
0406 28     793          XCH    A,R0         ;EXCHANGE R0 AND R1
0407 29     794          XCH    A,R1
0408 28     795          XCH    A,R0
0409 948B   796          CALL   SHL3
040B 948B   797          CALL   SHL3
040D 54E1   798          CALL   ADD3
040F 948B   799          CALL   SHL3
0411 B835   800          MOV    R0,#TEMP     ;ADD THE MSD TO THE RUNNING TOTAL
0413 94B6   801          CALL   CLR3
0415 B927   802          MOV    R1,#TARBCD+2
0417 F1     803          MOV    A,@R1
0418 53F0   804          ANL    A,#0F0H
041A 47     805          SWAP   A
041B A0     806          MOV    @R0,A
041C B84D   807          MOV    R0,#TEMP3
041E B935   808          MOV    R1,#TEMP
0420 54E1   809          CALL   ADD3
0422 BA04   810          MOV    R2,#04H      ;MULTIPLY THE BCD BY 10
0424 B825   811          MOV    R0,#TARBCD
0426 948B   812 MTLOOP:  CALL   SHL3
0428 EA26   813          DJNZ   R2,MTLOOP
042A EF00   814          DJNZ   R7,BCLOOP
042C 83     815          RET
            816          ;
            817 TEST4:   TST    4            ;TEST MEMORY ON PAGE 4
042D F0     818*         MOV    A,@R0        ;LOAD ROM POINTER INTO ACCUMULATOR
042E A3     819*         MOVP   A,@A         ;FETCH ROM VALUE ADDRESSED BY R0
042F 61     824*         ADD    A,@R1        ;ADD ROM VALUE TO ROM CHECKSUM REGISTER
0430 A1     825*         MOV    @R1,A        ;UPDATE ROM CHECKSUM REGISTER
0431 A404   826          JMP    TEST5
            827          ;
            828          ;*** BINARY TO BCD CONVERSION ROUTINE ***
            829          ;
            830          ;THIS ROUTINE CONVERTS BINARY LOCATED AT TEMP INTO
            831          ;BCD LOCATED AT ADDR R0, OVERFLOW IS COLLECTED IN
            832          ;R4
            833          ;
0433 94B6   834 BINBCD:  CALL   CLR3         ;ACCURACY TO 8 BCD DIGITS (INCLUDING R4 AS MSD)
0435 F8     835          MOV    A,R0
0436 A9     836          MOV    R1,A
0437 B835   837          MOV    R0,#TEMP
0439 BA18   838          MOV    R2,#18H
043B BC00   839          MOV    R4,#00H
043D 948B   840 BBLOOP:  CALL   SHL3
043F 9447   841          CALL   DIGRL
0441 E644   842          JNC    NOCARY
0443 11     843          INC    @R1
0444 EA3D   844 NOCARY:  DJNZ   R2,BBLOOP
0446 83     845          RET
0447 BB03   846 DIGRL:   MOV    R3,#03H
0449 97     847          CLR    C
044A F1     848 DRLOOP:  MOV    A,@R1
044B 71     849          ADDC   A,@R1
044C 57     850          DA     A
044D A1     851          MOV    @R1,A
044E 19     852          INC    R1
044F EB4A   853          DJNZ   R3,DRLOOP
0451 FC     854          MOV    A,R4
0452 7C     855          ADDC   A,R4
0453 57     856          DA     A
0454 AC     857          MOV    R4,A
0455 C9     858          DEC    R1
0456 C9     859          DEC    R1
0457 C9     860          DEC    R1
0458 93     861          RETR                ;RESTORE CARRY
            862          ;
            863          ;*** MULTIPLICATION BY INCREMENT SIZE ROUTINE ***
            864          ;THIS SUBROUTINE TAKES BCD VALUE ADDRESSED BY R1
            865          ;AND MULTIPLIES IT BY THE INCREMENT SIZE
            866          ;OVERFLOW IS INDICATED BY F0 = 1
            867          ;
0459 B835   868 MLTINC:  MOV    R0,#TEMP
045B 54D5   869          CALL   MOV3         ;MOVE BCD DATA ADDRESSED BY R1 REG TO TEMP REG
045D 85     870          CLR    F0           ;CLEAR THE OVERFLOW INDICATION
045E B829   871          MOV    R0,#SWTCH1   ;GET THE INCREMENT SIZE
0460 F0     872          MOV    A,@R0
0461 5303   873          ANL    A,#03H
0463 E3     877          MOVP3  A,@A
0464 AA     878          MOV    R2,A         ;MULTIPLY BY REPEATED ADDITIONS
0465 B835   879          MOV    R0,#TEMP
0467 EA6A   880 DCLOOP:  DJNZ   R2,DALOOP
0469 83     881          RET
046A BB03   882 DALOOP:  MOV    R3,#03H
046C 97     883          CLR    C
046D F0     884 DBLOOP:  MOV    A,@R0
046E 71     885          ADDC   A,@R1
046F 57     886          DA     A
0470 A1     887          MOV    @R1,A
0471 18     888          INC    R0
0472 19     889          INC    R1
0473 EB6D   890          DJNZ   R3,DBLOOP    ;CONTINUE TO ADD TILL DONE
0475 E679   891          JNC    NOVER        ;NO OVERFLOW, JUMP TO NOVER
0477 85     892          CLR    F0
0478 95     893          CPL    F0           ;SET F0 = 1, OVERFLOW HAS OCCURED
0479 C8     894 NOVER:   DEC    R0           ;RESTORE R0 & R1 POINTERS
047A C8     895          DEC    R0
047B C8     896          DEC    R0
```

```
LOC  OBJ      LINE       SOURCE STATEMENT
047C C9       897        DEC    R1
047D C9       898        DEC    R1
047E C9       899        DEC    R1
047F 8467     900        JMP    DCLOOP
              901        ;
              902        ;*** DISPLAY BLANKING ROUTINE ***
              903        ;
              904        ;THIS ROUTINE LOADS BLANKS (FF) INTO
              905        ;WETBCD (OUTPUT WEIGHT) AND TARBCD (OUTPUT TARE)REGS
              906        ;
0481 B822     907 BLANKD: MOV   R0,#WETBCD
0483 BA06     908        MOV    R2,#06H
0485 B0FF     909 OVLOOP: MOV   @R0,#0FFH
0487 18       910        INC    R0
0488 EA85     911        DJNZ   R2,OVLOOP
048A 83       912        RET
              913        ;
              914        ;*** 3 BYTE SHIFT LEFT ROUTINE ***
              915        ;
              916        ;THIS ROUTINE SHIFTS 3 BYTES ADDRESSED BY R0
              917        ;TO THE LEFT 1 BIT AND RESTORES R0 UPON RETURN
              918        ;
048B 97       919 SHL3:  CLR    C
048C F0       920        MOV    A,@R0
048D F7       921        RLC    A
048E A0       922        MOV    @R0,A
048F 18       923        INC    R0
0490 F0       924        MOV    A,@R0
0491 F7       925        RLC    A
0492 A0       926        MOV    @R0,A
0493 18       927        INC    R0
0494 F0       928        MOV    A,@R0
0495 F7       929        RLC    A
0496 A0       930        MOV    @R0,A
0497 84B3     931        JMP    RSTRO
              932        ;
              933        ;*** DIVIDE BCD BY 10 ROUTINE ***
              934        ;
              935        ;THIS ROUTINE DIVIDES A BCD VALUE ADDRESSED BY R0
              936        ;BY 10 AND RESTORES R0 POINTER UPON RETURN
              937        ;
0499 BA04     938 DLSD:  MOV    R2,#04H
049B FC       939 DLLOOP: MOV   A,R4
049C 67       940        RRC    A
049D AC       941        MOV    R4,A
049E D48B     942        CALL   SHR3C
04A0 EA9B     943        DJNZ   R2,DLLOOP
04A2 83       944 RET4:  RET
              945        ;
              946        ;*** 3 BYTE SUBTRACTION ROUTINE ***
              947        ;
              948        ;THIS ROUTINE SUBTRACTS 3 BYTES ADDRESSED BY R1
              949        ;FROM 3 BYTES ADDRESSED BY R0, RESULTS ARE
              950        ;ADDRESSED BY R0 UPON RETURN
              951        ;
04A3 97       952 SUB3:  CLR    C               ;CLEAR CARRY FOR SUBTRACTION
04A4 BA03     953        MOV    R2,#03H
04A6 F0       954 SBLOOP: MOV   A,@R0
              955        SUBC   A,@R1
04A7 37       956+       CPL    A
04A8 71       957+       ADDC   A,@R1
04A9 37       958+       CPL    A
04AA A0       959        MOV    @R0,A
04AB 18       960        INC    R0
04AC 19       961        INC    R1
04AD EAA6     962        DJNZ   R2,SBLOOP
04AF C9       963        DEC    R1              ;RESTORE POINTERS R0 & R1
04B0 C8       964        DEC    R0
04B1 C9       965 RSTR10: DEC   R1
04B2 C9       966        DEC    R1
04B3 C8       967 RSTRO: DEC    R0
04B4 C8       968        DEC    R0
04B5 83       969        RET
              970        ;
              971        ;*** 3 BYTE CLEAR ROUTINE ***
              972        ;
              973        ;THIS ROUTINE CLEARS 3 BYTES ADDRESSED BY R0
              974        ;AND RESTORES R0 POINTER UPON RETURN
              975        ;
04B6 27       976 CLR3:  CLR    A               ;CLEAR ACCUMULATOR
04B7 A0       977        MOV    @R0,A
04B8 18       978        INC    R0
04B9 A0       979        MOV    @R0,A
04BA 18       980        INC    R0
04BB A0       981        MOV    @R0,A
04BC 84B3     982        JMP    RSTRO
              983        ;
              984        ;*** DO A ZERO ROUTINE ***
              985        ;
04BE B82E     986 ZIT:   MOV    R0,#STAT4       ;IS THERE MOTION?
04C0 F0       987        MOV    A,@R0
04C1 37       988        CPL    A
04C2 D2A2     989        JB6    RET4            ;SCALE IS IN MOTION,RETURN NO ZERO DONE
04C4 B82B     990        MOV    R0,#SWTCH3      ;IS PUSHBUTTON ZERO & AUTOZERO MAINTANCE ENABLED?
04C6 F0       991        MOV    A,@R0
04C7 12A2     992        JB0    RET4            ;PUSHBUTTON ZERO & AZM DISABLED, RETURN NO ZERO DONE
04C9 B82D     993        MOV    R0,#STAT3       ;ALLOW NO ZERO OPERATIONS IF IN NET MODE
04CB F0       994        MOV    A,@R0           ;IN NET MODE?
```

```
LOC  OBJ      LINE        SOURCE STATEMENT

04CC 72A2     995          JB3    RET4           ;SCALE IN NET,RETURN NO ZERO DONE
04CE B94D     996          MOV    R0,#TEMP3
04D0 FE       997          MOV    A,R6
04D1 A9       998          MOV    R1,A
04D2 5405     999          CALL   MOV3           ;STORE CURRENT WEIGHT VALUE INTO TEMP3
04D4 B40A    1000          CALL   ABS3
04D6 B837    1001          MOV    R0,#TEMP+2
04D8 B005    1002          MOV    @R0,#05H       ;LOAD NUMERICAL VALUE 2% INTO TEMP
04DA C8      1003          DEC    R0
04DB B01E    1004          MOV    @R0,#1EH
04DD C8      1005          DEC    R0
04DE B088    1006          MOV    @R0,#088H
04E0 B929    1007          MOV    R1,#SWTCH1     ;ADDRESS FULL SCALE INCREMNTS STORED PAGE 3
04E2 F1      1008          MOV    A,@R1
04E3 47      1009          SWAP   A
04E4 E7      1010          RL     A
04E5 531F    1011          ANL    A,#1FH
04E7 A9      1012          MOV    R1,A
04E8 E7      1013          RL     A
04E9 69      1014          ADD    A,R1
04EA 035E    1015          ADD    A,#0VRFL-300H
04EC D437    1016          CALL   MULTC          ;MULTIPLY 2% X FULL SCALE INCR, RESULTS IN TEMP
04EE B94D    1017          MOV    R1,#TEMP3
04F0 94A3    1018          CALL   SUB3           ;COMPARE OUTWET TO 2% FULL SCALE
04F2 F2A2    1019          JB7    RET4           ;IF OUTWET>2% ,RETURN NO ZERO DONE
04F4 B863    1020          MOV    R0,#ZROCNT     ;SET ZROCNT=CNTRAW(THE NUMBER OF RAW COUNTS
04F6 B960    1021          MOV    R1,#CNTRAW     ;DIRECTLY FROM THE A/D) FOR ANALOG VERIFY
04F8 5405    1022          CALL   MOV3
04FA B873    1023          MOV    R0,#FLTCNT     ;ADDR OUT FLTR CNTR
04FC B0FF    1024          MOV    @R0,#0FFH      ;FORCE OUT FLTR CNTR RESET
04FE B850    1025          MOV    R0,#OFFSET     ;SET AUTOZERO REG(OFFSET) = OUTWET REG
0500 FE      1026          MOV    A,R6
0501 A9      1027          MOV    R1,A
0502 44D5    1028          JMP    MOV3
             1029                                ;
             1030 TEST5:   TST    5              ;TEST MEMORY ON PAGE 5
0504 F0      1031+         MOV    A,@R0          ;LOAD ROM POINTER INTO ACCUMULATOR
0505 A3      1032+         MOVP   A,@A           ;FETCH ROM VALUE ADDRESSED BY R0
0506 61      1037+         ADD    A,@R1          ;ADD ROM VALUE TO ROM CHECKSUM REGISTER
0507 A1      1038+         MOV    @R1,A          ;UPDATE ROM CHECKSUM REGISTER
0508 C42D    1039          JMP    TEST6          ;
             1040                                ;
             1041                                ;*** ABSOLUTE VALUE ROUTINE ***
             1042                                ;
             1043                                ;THIS ROUTINE TAKES THE ABSOLUTE VALUE OF 3 BYTES
             1044                                ;ADDRESSED BY R0 AND SETS F1 = 1 IF NUMBER WAS NEGATIVE
             1045                                ;
050A A5      1046 ABS3:    CLR    F1             ;CLEAR NEGATIVE FLAG F1
050B 18      1047          INC    R0
050C 18      1048          INC    R0
050D F0      1049          MOV    A,@R0
050E C8      1050          DEC    R0
050F C8      1051          DEC    R0
0510 37      1052          CPL    A
0511 F225    1053          JB7    RET5           ;NUMBER POSITIVE, RETURN
0513 BA03    1054 CPL3:    MOV    R2,#03H
0515 97      1055          CLR    C
0516 A7      1056          CPL    C
0517 F0      1057 ABLOOP:  MOV    A,@R0
0518 37      1058          CPL    A
0519 1300    1059          ADDC   A,#00H
051B A0      1060          MOV    @R0,A
051C 18      1061          INC    R0
051D EA17    1062          DJNZ   R2,ABLOOP
051F B5      1063          CPL    F1             ;VALUE WAS NEGATIVE, SET F1 = 1
0520 C8      1064          DEC    R0
0521 84B3    1065          JMP    RSTR0
             1066                                ;
             1067                                ;*** COMPLIMENT ROUTINE BASED ON F1 FLAG ***
             1068                                ;
             1069                                ;THIS ROUTINE TAKES COMPLEMENT OF 3 BYTES ADDRESED
             1070                                ;BY R0 IF F1 = 1 AND RESTORES R0 POINTER UPON RETURN
             1071                                ;
0523 7613    1072 SIGN3:   JF1    CPL3
0525 83      1073 RET5:    RET
             1074                                ;
             1075                                ;*** EXPAND ZERO ROUTINE ***
             1076                                ;
0526 B857    1077 EXPZRO:  MOV    R0,#STAT5      ;ADDR GROSS ZERO FLAG
0528 F0      1078          MOV    A,@R0
0529 53FB    1079          ANL    A,#0FBH        ;RESET GROSS ZERO FLAG
052B A0      1080          MOV    @R0,A
052C B835    1081          MOV    R0,#TEMP
052E B94A    1082          MOV    R1,#OUTWET
0530 A43C    1083          JMP    AZM0
             1084                                ;
             1085                                ;*** AZM ROUTINE ***
             1086                                ;
0532 B857    1087 AZM:     MOV    R0,#STAT5      ;ADDR GROSS ZERO FLAG
0534 F0      1088          MOV    A,@R0
0535 53FB    1089          ANL    A,#0FBH        ;RESET GROSS ZERO FLAG
0537 A0      1090          MOV    @R0,A
0538 B854    1091          MOV    R0,#TEMP4
053A B92F    1092          MOV    R1,#NET
053C 5405    1093 AZM0:    CALL   MOV3           ;MOVE OUTWET OR NET WEIGHT TO TEMP4
053E B40A    1094          CALL   ABS3
0540 27      1095          CLR    A
0541 54F1    1096          CALL   TEST2          ;IS WEIGHT WITHIN +-5 INCREMENTS OF GROSS ZERO?
```

```
LOC  OBJ    LINE         SOURCE STATEMENT 0543 967F   1097           JNZ    MZA            ;GO MZA IF NOT WITHIN +-5 INCREMENTS
0545 F0     1098           MOV    A,@R0
0546 03FB   1099           ADD    A,#-05H
0548 F67F   1100           JC     MZA            ;GO MZA IF NOT WITHIN +-5 INCREMENTS
054A F0     1101           MOV    A,@R0          ;IS WEIGHT WITHIN +-2 INCREMENTS OF GROSS ZERO?
054B 03FD   1102           ADD    A,#-03H
054D F65B   1103           JC     AZM1           ;NOT WITHIN +-2, SKIP SETTING GROSS ZERO FLAG
054F B957   1104           MOV    R1,#STAT5      ;SCALE IS WITHIN +-2 INCR, SET GROSS ZERO FLAG
0551 F1     1105           MOV    A,@R1
0552 4304   1106           ORL    A,#04H
0554 A1     1107           MOV    @R1,A
0555 B863   1108           MOV    R0,#ZROCNT     ;LOAD RAW COUNTS INTO ZROCNT REG FOR ANALOG VERIFY
0557 B960   1109           MOV    R1,#CNTRAW     ;ZERO REFERENCE
0559 54D5   1110           CALL   MOV3
055B B82B   1111 AZM1:     MOV    R0,#SWTCH3     ;IS SCALE IN EXPAND MODE?
055D F0     1112           MOV    A,@R0
055E 9225   1113           JB4    RET5           ;IN EXPAND,RETURN
0560 B854   1114           MOV    R0,#TEMP4      ;RETURN R0 POINTER TO TEMP4 REG
0562 F0     1115           MOV    A,@R0
0563 C67F   1116           JZ     MZA            ;IF WEIGHT IS EXACTLY ZERO, RETURN NO AZM DONE
0565 B953   1117           MOV    R1,#AZMCNT     ;HAS AZMCNT TIMED OUT?(ONLY 1 AZM CORRECTION
0567 F1     1118           MOV    A,@R1          ;PERMITTED EVERY .7 SEC)
0568 967F   1119           JNZ    MZA            ;GO MZA TIMER NOT TIMED OUT
056A B105   1120           MOV    @R1,#05H
056C 94B6   1121           CALL   CLR3
056E B001   1122           MOV    @R0,#01H       ;IF WE ARE, ADD A 1 WITH THE SAME SIGN AS
0570 B423   1123           CALL   SIGN3          ;THE DIFFERENCE
0572 B950   1124           MOV    R1,#OFFSET
0574 54E1   1125           CALL   ADD3
0576 BE54   1126           MOV    R6,#TEMP4
0578 94BE   1127           CALL   ZIT            ;ATTEMPT TO CORRECT AUTO ZERO REG SUBJECT TO
            1128                                 ;ZERO FUNCTION PROGRAM RESTRICTIONS
057A B953   1129           MOV    R1,#AZMCNT     ;RESET THE AZM COUNTER
057C B105   1130           MOV    @R1,#05H
057E 83     1131           RET
057F B953   1132 MZA:      MOV    R1,#AZMCNT     ;DECREMENT THE AZM COUNTER
0581 F1     1133           MOV    A,@R1
0582 C685   1134           JZ     AZREDY
0584 07     1135           DEC    A
0585 A1     1136 AZREDY:   MOV    @R1,A
0586 83     1137           RET
            1138                                 ;
            1139                                 ;*** 3 BYTE SHIFT RIGHT ROUTINE ***
            1140                                 ;
            1141                                 ;THIS ROUTINE SHIFTS 3 BYTES ADDRESSED BY R0
            1142                                 ;1 BIT TO RIGHT AND RESTORE R0 POINTER UPON RETURN
            1143                                 ;
0587 97     1144 SHR3:     CLR    C
0588 18     1145 SHR3C:    INC    R0
0589 18     1146           INC    R0
058A F0     1147           MOV    A,@R0
058B 67     1148           RRC    A
058C A0     1149           MOV    @R0,A
058D C8     1150           DEC    R0
058E F0     1151           MOV    A,@R0
058F 67     1152           RRC    A
0590 A0     1153           MOV    @R0,A
0591 C8     1154           DEC    R0
0592 F0     1155           MOV    A,@R0
0593 67     1156           RRC    A
0594 A0     1157           MOV    @R0,A
0595 83     1158           RET
            1159                                 ;
            1160                                 ;*** CLEAR TARE ROUTINE ***
            1161                                 ;
            1162                                 ;THIS ROUTINE CLEARS THE TARE REG SUBJECT TO
            1163                                 ;TARE FUNCTION PROGRAM RESTRICTIONS
            1164                                 ;
0596 B82A   1165 CLIT:     MOV    R0,#SWTCH2
0598 F0     1166           MOV    A,@R0          ;IS THE TARE INTERLOCKED?
0599 92A1   1167           JB4    NNZCT          ;TARE NOT INTERLOCKED,JUMP NNZCT & CLEAR TARE
059B B857   1168           MOV    R0,#STAT5      ;TARE IS INTERLOCKED, TARE CAN BE CLEARED ONLY AT ZERO
059D F0     1169           MOV    A,@R0          ;IS SCALE AT GROSS ZERO?
059E 52A1   1170           JB2    NNZCT          ;SCALE IS AT GROSS ZERO, JUMP NNZCT & CLEAR TARE
05A0 83     1171           RET                   ;SCALE NOT AT GROSS ZERO,RETURN TARE NOT CLEARED
05A1 B873   1172 NNZCT:    MOV    R0,#FLTCNT     ;RESET DIGITAL OUTPUT FILTER
05A3 B0FF   1173           MOV    @R0,#0FFH
05A5 B82D   1174           MOV    R0,#STAT3
05A7 F0     1175           MOV    A,@R0
05A8 53F7   1176           ANL    A,#0F7H        ;CLEAR NET FLAG FOR GROSS MODE
05AA A0     1177           MOV    @R0,A
05AB B832   1178           MOV    R0,#TARE       ;CLEAR THE TARE
05AD 84B6   1179           JMP    CLR3
            1180                                 ;
            1181                                 ;*** TARE ENTRY ROUTINE ***
            1182                                 ;
            1183                                 ;THIS ROUTINE CHECKS THE RESTRICTIONS UPON KEYBOARD
            1184                                 ;TARE ENTRY AND DETERMINES WHETHER TARE IS TAKEN
            1185                                 ;
05AF A5     1186 OKCHCK:   CLR    F1
05B0 B82E   1187           MOV    R0,#STAT4      ;IS THERE MOTION???
05B2 F0     1188           MOV    A,@R0
05B3 37     1189           CPL    A
```

```
LOC  OBJ    LINE         SOURCE STATEMENT

05B4 D2FD   1190         JB6     NOTARE
05B6 B825   1191         MOV     R0,#TARBCD
05B8 54F0   1192         CALL    TEST3
05BA C6FD   1193         JZ      NOTARE      ;IF ZERO INPUT IGNORE
05BC B82D   1194         MOV     R0,#STAT3
05BE F0     1195         MOV     A,@R0
05BF F2FD   1196         JB7     NOTARE      ;IF SCALE IS IN POWER UP NO TARE ALLOWED
05C1 12FD   1197         JB0     NOTARE      ;IF SCALE GROSS WGT < 0 NO TARE ALLOWED
05C3 B82A   1198         MOV     R0,#SWTCH2
05C5 F0     1199         MOV     A,@R0
05C6 5307   1200         ANL     A,#07H
05C8 03FE   1201         ADD     A,#-02H
05CA F6DE   1202         JC      NOTEST      ;NO DUMMY ZEROS-DON'T TEST, JUMP NOTEST
05CC 37     1203         CPL     A
05CD 17     1204         INC     A
05CE AB     1205         MOV     R3,A
05CF B825   1206         MOV     R0,#TARBCD
05D1 B927   1207         MOV     R1,#TARBCD+2
05D3 F0     1208 LOOPRO: MOV     A,@R0
05D4 530F   1209         ANL     A,#0FH
05D6 96FD   1210         JNZ     NOTARE      ;LSD'S NOT ZERO SUBJECT TO BUILD, ALLOW NO TARE
05D8 9499   1211         CALL    DLSD
05DA B100   1212         MOV     @R1,#00H
05DC EBD3   1213         DJNZ    R3,LOOPRO
05DE B92A   1214 NOTEST: MOV     R1,#SWTCH2  ;LAST DIGIT TEST
05E0 F1     1215         MOV     A,@R1       ;IS TARE INTERLOCKED?
05E1 9225   1216         JB4     RET5        ;NO, RETURN NO LSD CHECK FOR EXACT INCREMENT ENTRY
05E3 B82D   1217         MOV     R0,#STAT3   ;IS SCALE IN NET MODE?
05E5 F0     1218         MOV     A,@R0
05E6 72FD   1219         JB3     NOTARE      ;YES, RETURN NO TARE PERMITTED
05E8 B929   1220         MOV     R1,#SWTCH1
05EA F1     1221         MOV     A,@R1
05EB 5303   1222         ANL     A,#03H
05ED E3     1226         MOVP3   A,@A
05EE A9     1227         MOV     R1,A
05EF B825   1228         MOV     R0,#TARBCD
05F1 F0     1229         MOV     A,@R0
05F2 530F   1230         ANL     A,#0FH
05F4 C625   1231         JZ      RET5        ;LSD IS ZERO, RETURN TARE ALLOWED
            1232 DTLOOP: SUB     A,R1
05F6 37     1233+        CPL     A
05F7 69     1234+        ADD     A,R1
05F8 37     1235+        CPL     A
05F9 C625   1236         JZ      RET5        ;LSD IS SAME AS INCREMENT SIZE, RETURN TARE ALLOWED
05FB E6F6   1237         JNC     DTLOOP      ;CONTINUE, CHECK FOR MULTIPLES OF INCR SIZE
05FD B5     1238 NOTARE: CPL     F1          ;SET F1 = 1 , TARE NOT ALLOWED AND RETURN
05FE 83     1239         RET
            1240         ;
            1241         ;*** TEST FOR OVERCAPACITY ROUTINE ***
            1242         ;
            1243         ;THIS ROUTINE COMPARES 3 BYTES ADDRESSED BY R0 WITH
            1244         ;FULL SCALE INCREMENTS + R7 AND SETS C = 1 IF OVERCAP
            1245         ;
05FF F8     1246 TESTOV: MOV     A,R0
0600 AE     1247         MOV     R6,A
0601 97     1248         CLR     C           ;CLEAR CARRY FOR NO OVERCAPACITY
0602 18     1249         INC     R0
0603 18     1250         INC     R0
0604 F0     1251         MOV     A,@R0
0605 F2BE   1252         JB7     RET6        ;NUMBER IS NEGATIVE, RETURN NO OVERCAP
0607 B835   1253         MOV     R0,#TEMP
0609 B929   1254         MOV     R1,#SWTCH1  ;LOOKUP FULL SCALE INCREMENTS ADDRESS
060B F1     1255         MOV     A,@R1
060C 47     1256         SWAP    A
060D E7     1257         RL      A
060E 531F   1258         ANL     A,#1FH
0610 AA     1259         MOV     R2,A
0611 E7     1260         RL      A
0612 6A     1261         ADD     A,R2
0613 035E   1262         ADD     A,#OVRFL-300H
0615 A9     1263         MOV     R1,A
0616 BA03   1264         MOV     R2,#03H
0618 F9     1265 TOLOOP: MOV     A,R1
0619 E3     1266         MOVP3   A,@A        ;LOAD FULL SCALE INCREMENTS INTO TEMP REG
061A A0     1267         MOV     @R0,A
061B 18     1268         INC     R0
061C 19     1269         INC     R1
061D EA18   1270         DJNZ    R2,TOLOOP
061F B838   1271         MOV     R0,#TEMP1
0621 94B6   1272         CALL    CLR3
0623 FF     1273         MOV     A,R7
0624 A0     1274         MOV     @R0,A       ;LOAD OFFSET IN R7 INTO TEMP1
0625 B935   1275         MOV     R1,#TEMP
0627 54E1   1276         CALL    ADD3        ;ADD VALUE IN TEMP1 TO FULL SCALE INCR, RESULT IN TEMP
0629 FE     1277         MOV     A,R6
062A A9     1278         MOV     R1,A
062B 84A3   1279         JMP     SUB3        ;COMPARE WEIGHT VALUE TO OVERCAP LIMIT IN TEMP REG
            1280         ;
            1281 TEST6:  TST     6           ;TEST MEMORY ON PAGE 6
062D F0     1282+        MOV     A,@R0       ;LOAD ROM POINTER INTO ACCUMULATOR
062E A3     1283+        MOVP    A,@A        ;FETCH ROM VALUE ADDRESSED BY R0
062F 61     1288+        ADD     A,@R1       ;ADD ROM VALUE TO ROM CHECKSUM REGISTER
0630 A1     1289+        MOV     @R1,A       ;UPDATE ROM CHECKSUM REGISTER
0631 E4BE   1290         JMP     TEST7
            1291         ;
            1292         ;*** MULTC & MULT2C MULTIPLY ROUTIES ***
            1293         ;
            1294         ;MULTC -- MULTIPLIES CONTENTS @R0 BY A CONSTANT @A LOCATED
```

| LOC OBJ | LINE | SOURCE STATEMENT | | |
|---|---|---|---|---|
| | 1295 | | | ;IN PAGE 3 DATA AREA |
| | 1296 | ; | | |
| | 1297 | | | ;MULT2C -- MULTIPLIES CONTENTS @R0 BY 2 THEN MULTIPLIES |
| | 1298 | | | ;THE RESULT BY A CONSTANT @A LOCATED IN PAGE 3 DATA AREA |
| | 1299 | ; | | |
| 0633 AA | 1300 MULT2C: | MOV | R2,A | |
| 0634 948B | 1301 | CALL | SHL3 | ;MULTIPLY BY 2*@R0 |
| 0636 FA | 1302 | MOV | A,R2 | |
| 0637 BA03 | 1303 MULTC: | MOV | R2,#03H | ;THIS MULTIPLIES THE 3 BYTES AT @R0 BY THE |
| 0639 B938 | 1304 | MOV | R1,#TEMP1 | ;3 BYTE CONSTANT @A ON PAGE 3 |
| 063B AB | 1305 | MOV | R3,A | ;6 BYTE RESULT IN TEMP2 |
| 063C FB | 1306 CMLOOP: | MOV | A,R3 | ;UPPER 3 BYTES IN @R0---R0 IS UNCHANGED |
| 063D E3 | 1307 | MOVP3 | A,@A | |
| 063E A1 | 1308 | MOV | @R1,A | |
| 063F 1B | 1309 | INC | R3 | |
| 0640 19 | 1310 | INC | R1 | |
| 0641 EA3C | 1311 | DJNZ | R2,CMLOOP | |
| 0643 F8 | 1312 MULT3: | MOV | A,R0 | |
| 0644 AD | 1313 | MOV | R5,A | ;SAVE R0 |
| 0645 A9 | 1314 | MOV | R1,A | |
| 0646 B835 | 1315 | MOV | R0,#TEMP | |
| 0648 54D5 | 1316 | CALL | MOV3 | |
| 064A B838 | 1317 | MOV | R0,#TEMP1+3 | |
| 064C BA09 | 1318 | MOV | R2,#09H | |
| 064E 27 | 1319 | CLR | A | |
| 064F A0 | 1320 CGLOOP: | MOV | @R0,A | |
| 0650 18 | 1321 | INC | R0 | |
| 0651 EA4F | 1322 | DJNZ | R2,CGLOOP | ;CLEAR TEMP1+3,TEMP2 |
| 0653 BF24 | 1323 | MOV | R7,#24H | |
| 0655 B835 | 1324 MMLOOP: | MOV | R0,#TEMP | |
| 0657 B487 | 1325 | CALL | SHR3 | |
| 0659 E669 | 1326 | JNC | NOADD | |
| 065B B83E | 1327 | MOV | R0,#TEMP2 | |
| 065D B938 | 1328 | MOV | R1,#TEMP1 | |
| 065F BA06 | 1329 | MOV | R2,#06H | |
| 0661 97 | 1330 | CLR | C | |
| 0662 F0 | 1331 AMLOOP: | MOV | A,@R0 | |
| 0663 71 | 1332 | ADDC | A,@R1 | |
| 0664 A0 | 1333 | MOV | @R0,A | |
| 0665 18 | 1334 | INC | R0 | |
| 0666 19 | 1335 | INC | R1 | |
| 0667 EA62 | 1336 | DJNZ | R2,AMLOOP | |
| 0669 B838 | 1337 NOADD: | MOV | R0,#TEMP1 | |
| 066B BA06 | 1338 | MOV | R2,#06H | |
| 066D 97 | 1339 | CLR | C | |
| 066E F0 | 1340 L6LOOP: | MOV | A,@R0 | |
| 066F F7 | 1341 | RLC | A | |
| 0670 A0 | 1342 | MOV | @R0,A | |
| 0671 18 | 1343 | INC | R0 | |
| 0672 EA6E | 1344 | DJNZ | R2,L6LOOP | |
| 0674 EF55 | 1345 | DJNZ | R7,MMLOOP | |
| 0676 FD | 1346 | MOV | A,R5 | |
| 0677 A8 | 1347 | MOV | R0,A | |
| 0678 94B6 | 1348 | CALL | CLR3 | |
| 067A B940 | 1349 | MOV | R1,#TEMP2+2 | |
| 067C F1 | 1350 | MOV | A,@R1 | |
| 067D F7 | 1351 | RLC | A | |
| 067E F0 | 1352 | MOV | A,@R0 | |
| 067F F7 | 1353 | RLC | A | |
| 0680 A0 | 1354 | MOV | @R0,A | |
| 0681 19 | 1355 | INC | R1 | |
| 0682 44E1 | 1356 | JMP | ADD3 | |
| | 1357 | ; | | |
| | 1358 | | | ;*** DIGIT BLANKING ROUTINE *** |
| | 1359 | ; | | |
| | 1360 | | | ;THIS ROUTINE DECIDES HOW MANY DIGITS SHOULD BE BLANKED |
| | 1361 | | | ;BECAUSE THE DIGITS ARE ALWAYS ZERO |
| | 1362 | ; | | |
| 0684 B829 | 1363 BLNKIT: | MOV | R0,#SWTCH1 | ;LOOKUP FULL SCALE INCR BUILD |
| 0686 F0 | 1364 | MOV | A,@R0 | |
| 0687 47 | 1365 | SWAP | A | |
| 0688 E7 | 1366 | RL | A | |
| 0689 531F | 1367 | ANL | A,#1FH | |
| 068B 03DA | 1368 | ADD | A,#BLANK-300H | ;ADDR DIGIT BLANKING DATA PAGE 3 |
| 068D E3 | 1369 | MOVP3 | A,@A | ;GET THE BLANKING NUMBER CORROSPONDING TO |
| 068E AA | 1370 | MOV | R2,A | ;THE CURRENT FULL SCALE SIZE |
| 068F F0 | 1371 | MOV | A,@R0 | ;OBTAIN CURRENT INCREMENT SIZE |
| 0690 5303 | 1372 | ANL | A,#03H | |
| 0692 07 | 1373 | DEC | A | |
| 0693 6A | 1374 | ADD | A,R2 | ;ADD THE CURRENT INCREMENT SIZE & BLANKING NUMBER |
| 0694 BA03 | 1375 | MOV | R2,#03H | ;CALCULATE 2-(A/3)=NUMBER OF DIGITS TO BLANK |
| 0696 03FD | 1376 D3LOOP: | ADD | A,#-03H | |
| 0698 CA | 1377 | DEC | R2 | |
| 0699 F696 | 1378 | JC | D3LOOP | |
| 069B B82A | 1379 | MOV | R0,#SWTCH2 | ;DO WE HAVE ANY DUMMY DIGITS AT THE RIGHT END |
| 069D F0 | 1380 | MOV | A,@R0 | ;OF THE DISPLAY (THEY CAUSE THE DISPLAY TO |
| 069E 5307 | 1381 | ANL | A,#07H | ;MOVE OVER) |
| 06A0 03FE | 1382 | ADD | A,#-02H | ;SUBTRACT 2 FROM DEC PT SWS |
| 06A2 E6A5 | 1383 | JNC | DZA | ;IF NO DUMMY ZEROS EXITS CLEAR ACCUMULATOR |
| 06A4 27 | 1384 | CLR | A | |
| 06A5 6A | 1385 DZA: | ADD | A,R2 | ;ADD CALCULATED DIGITS TO BLANK |
| 06A6 F2BE | 1386 | JB7 | RET6 | ;RESULT NEGATIVE, RETURN NO DIGIT BLANKED |
| 06A8 C6BE | 1387 | JZ | RET6 | ;RESULT ZERO, RETURN NO DIGIT BLANKED |
| 06AA AA | 1388 | MOV | R2,A | |
| 06AB F0 | 1389 | MOV | A,@R0 | |
| 06AC 5307 | 1390 | ANL | A,#07H | |
| 06AE 03FA | 1391 | ADD | A,#-06H | ;IS DECIMAL POINT IN MSD OR MSD-1 POSITIONS? |
| 06B0 E6B9 | 1392 | JNC | NDEF | ;NO, GO PERFORM CORRECT DIGIT BLANKING |

```
LOC  OBJ      LINE           SOURCE STATEMENT 0682 96BE     1393           JNZ    RET6           ;DECIMAL POINT IN MSD OF DISPLAY, RETURN NO DIGI BLANKED
0684 FA       1394           MOV    A,R2           ;MOVE NUMBER OF DIGITS TO BLANKED TO ACCUMULATOR
0685 C6BE     1395           JZ     RET6           ;DIGITS TO BE BLANKED = 0, RETURN
0687 BA01     1396           MOV    R2,#01H        ;LOAD ONE INTO DIGITS TO BE BLANKED REG
0689 FA       1397  NDEF:    MOV    A,R2
068A 12BF     1398           JB0    ONE            ;IF BIT 0 = 1, JUMP ONE & BLANK 1 DIGIT
068C B1FF     1399           MOV    @R1,#0FFH      ;BLANK 2 DIGITS
068E 83       1400  RET6:    RET
068F F1       1401  ONE:     MOV    A,@R1
06C0 43F0     1402           ORL    A,#0F0H        ;BLANK 1 DIGIT
06C2 A1       1403           MOV    @R1,A
06C3 83       1404           RET
              1405           ;
              1406           ;*** EXPAND MODE ROUTINE ***
              1407           ;
              1408           ;PROCESS EXPANDED DATA TO WEIGHT DISPLAY WITHOUT
              1409           ;X1,X2 OR X5 INCREMENT SIZE AND DUMMY ZERO FACTORS
              1410           ;
06C4 B835     1411  EXPAND:  MOV    R0,#TEMP
06C6 B94A     1412           MOV    R1,#OUTWET
06C8 5405     1413           CALL   MOV3           ;MOVE OUTWET MINOR INCR VALUE TO TEMP
06CA B932     1414           MOV    R1,#TARE
06CC 94A3     1415           CALL   SUB3
06CE B40A     1416           CALL   ABS3
06D0 B822     1417           MOV    R0,#WETBCD
06D2 9433     1418           CALL   BINBCD         ;CONVERT MINOR INCR VALUE TO BCD FOR DISPLAY
06D4 B5       1419           CPL    F1
06D5 76DF     1420           JF1    EXPSGN         ;WEIGHT POSITIVE, JUMP EXPSGN
06D7 B824     1421           MOV    R0,#WETBCD+2
06D9 F0       1422           MOV    A,@R0
06DA 530F     1423           ANL    A,#0FH
06DC 43D0     1424           ORL    A,#0D0H        ;WEIGHT NEGATIVE LOAD MINUS SIGN IN MSD BCD
06DE A0       1425           MOV    @R0,A
06DF B835     1426  EXPSGN:  MOV    R0,#TEMP       ;MOVE TARE TO TEMP
06E1 B932     1427           MOV    R1,#TARE
06E3 5405     1428           CALL   MOV3
06E5 B825     1429           MOV    R0,#TARBCD     ;CONVERT TARE TO BCD FOR DISPLAY
06E7 8433     1430           JMP    BINBCD
              1431           ;
              1432           ;*** SPAN ADJUSTMENT ROUTINE ***
              1433           ;
              1434           ;THIS ROUTINE ADDS VARIABLE SPAN REG TO FIXED SPAN
              1435           ;CONSTANT TO FORM A SPAN MULTIPLIER
              1436           ;CONSTANT MPLR (FFB000) = .99877929
              1437           ;
06E9 B95D     1438  SPAN:    MOV    R1,#SPANRG
06EB B83A     1439           MOV    R0,#TEMP1+2    ;LOAD FIXED SPAN CONSTANT (FFB000) IN HEX INTO TEMP1
06ED B0FF     1440           MOV    @R0,#0FFH
06EF C8       1441           DEC    R0
06F0 B0B0     1442           MOV    @R0,#0B0H
06F2 C8       1443           DEC    R0
06F3 B000     1444           MOV    @R0,#00H
06F5 54E1     1445           CALL   ADD3           ;ADD VARIABLE SPAN REG TO SPAN CONSTANT
06F7 B844     1446           MOV    R0,#RAWCNT
06F9 D443     1447           CALL   MULT3          ;MULTIPLY RAWCNTS BY SPAN MULTIPLIER
06FB A423     1448           JMP    SIGN3          ;RESTORE SIGN OF RAWCNTS PRIOR TO MULTIPLICATION
              1449           ;
              1450           ;*** BCD ROTATION ROUTINE ***
              1451           ;
              1452           ;THIS ROUTINE ROTATES BCD DATA ADDRESSED BY R0
              1453           ;
06FD 85       1454  ROT:     CLR    F0
06FE B92A     1455           MOV    R1,#SWTCH2
0700 F1       1456           MOV    A,@R1
0701 5307     1457           ANL    A,#07H
0703 03FE     1458           ADD    A,#-02H
0705 F615     1459           JC     NOROT
0707 37       1460           CPL    A
0708 17       1461           INC    A
0709 AA       1462           MOV    R2,A
070A BB04     1463  ROLOOP:  MOV    R3,#04H
070C 9488     1464  RTLOOP:  CALL   SHL3
070E F617     1465           JC     OUTROT
0710 EB0C     1466           DJNZ   R3,RTLOOP
0712 EA0A     1467           DJNZ   R2,ROLOOP
0714 27       1468           CLR    A
0715 AE       1469  NOROT:   MOV    R6,A
0716 83       1470           RET
0717 95       1471  OUTROT:  CPL    F0
0718 83       1472           RET
              1473           ;
              1474           ;*** SIGNED BINARY TO BCD CONVERSION ROUTINE ***
              1475           ;
0719 B838     1476  SBNBCD:  MOV    R0,#TEMP1
071B B92F     1477           MOV    R1,#NET
071D 5405     1478           CALL   MOV3
071F B40A     1479           CALL   ABS3
0721 B938     1480           MOV    R1,#TEMP1
0723 54F7     1481           CALL   R8S            ;ROUND OFF VALUE
0725 B822     1482           MOV    R0,#WETBCD
0727 9433     1483           CALL   BINBCD         ;CONVERT BINARY TO BCD
0729 B822     1484           MOV    R0,#WETBCD
072B 9499     1485           CALL   DLSD           ;DIVIDE BCD VALUE BY 10
072D B667     1486           JF0    NOBCDF         ;NOT DISPLAY WGT,SKIP OUT FLTR, JUMP TO NOBCDF
072F B82E     1487           MOV    R0,#STAT4      ;IS SCALE IN MOTION?
0731 F0       1488           MOV    A,@R0
0732 37       1489           CPL    A
0733 D257     1490           JB6    BCDF           ;IF SO, DON'T FILTER, JUMP BCDF
```

| LOC OBJ | LINE | SOURCE STATEMENT | | | |
|---|---|---|---|---|---|
| 0735 B822 | 1491 | | MOV | R0,#METBCD | |
| 0737 B970 | 1492 | | MOV | R1,#FLTBCD | |
| 0739 F0 | 1493 | | MOV | A,@R0 | ;SEE IF THE LSD ARE WITHIN 1 OF EACH OTHER |
| 073A 37 | 1494 | | CPL | A | |
| 073B 039A | 1495 | | ADD | A,#9AH | |
| 073D 61 | 1496 | | ADD | A,@R1 | |
| 073E 57 | 1497 | | DA | A | |
| 073F C645 | 1498 | | JZ | WITHIN | ;BCD VALUES WITHIN 1, JUMP WITHIN |
| 0741 0368 | 1499 | | ADD | A,#68H | |
| 0743 9657 | 1500 | | JNZ | BCDF | ;BCD VALUES NOT WITHIN 1, JUMP BCDF |
| 0745 B873 | 1501 | WITHIN: | MOV | R0,#FLTCNT | ;TEST FLTR CNTR FOR UPDATE OF DISPLAY |
| 0747 F0 | 1502 | | MOV | A,@R0 | |
| 0748 5257 | 1503 | | JB2 | BCDF | ;GO UPDATE FLTBCD |
| 074A 10 | 1504 | | INC | @R0 | ;INCREMENT FLTR CNTR |
| 074B 18 | 1505 | | INC | R0 | ;ADDR BCD FLT WGT SIGN REG |
| 074C F0 | 1506 | | MOV | A,@R0 | ;FLT WGT SIGN > A |
| 074D A5 | 1507 | | CLR | F1 | |
| 074E C651 | 1508 | | JZ | FLWTSN | ;NOT NEG SKIP,FLAG 1 SIGN SET NEG |
| 0750 B5 | 1509 | | CPL | F1 | ;FLAG 1 = 1,WGT NEGATIVE |
| 0751 B822 | 1510 | FLWTSN: | MOV | R0,#METBCD | |
| 0753 5405 | 1511 | | CALL | MOV3 | |
| 0755 E467 | 1512 | | JMP | NOBCDF | |
| 0757 B873 | 1513 | BCDF: | MOV | R0,#FLTCNT | |
| 0759 27 | 1514 | | CLR | A | |
| 075A A0 | 1515 | | MOV | @R0,A | ;RESET FILTER COUNTER |
| 075B 18 | 1516 | | INC | R0 | ;ADDR FLT BCD WGT SIGN REG |
| 075C 37 | 1517 | | CPL | A | ; 0FFH > A FOR NEGATIVE SIGN |
| 075D 7660 | 1518 | | JF1 | BCDF1 | ;JUMP IF NEGATIVE |
| 075F 27 | 1519 | | CLR | A | ; 0 > A FOR POSITIVE SIGN |
| 0760 A0 | 1520 | BCDF1: | MOV | @R0,A | ;LOAD 0 OR FF INTO FLT WGT BCD SIGN REG |
| 0761 B870 | 1521 | | MOV | R0,#FLTBCD | |
| 0763 B922 | 1522 | | MOV | R1,#METBCD | |
| 0765 5405 | 1523 | | CALL | MOV3 | |
| 0767 B822 | 1524 | NOBCDF: | MOV | R0,#METBCD | ;ADDR METBCD REG FOR NEGATIVE ZERO TEST |
| 0769 54F0 | 1525 | | CALL | TEST3 | |
| 076B 966E | 1526 | | JNZ | NBCDF1 | |
| 076D A5 | 1527 | | CLR | F1 | ;BCD WGT IS ZERO,CLEAR SIGN |
| 076E B922 | 1528 | NBCDF1: | MOV | R1,#METBCD | |
| 0770 9459 | 1529 | | CALL | MLTINC | |
| 0772 B822 | 1530 | | MOV | R0,#METBCD | |
| 0774 D4FD | 1531 | | CALL | ROT | |
| 0776 B876 | 1532 | | MOV | R0,#TEMP7 | |
| 0778 B922 | 1533 | | MOV | R1,#METBCD | |
| 077A 5405 | 1534 | | CALL | MOV3 | |
| 077C B924 | 1535 | | MOV | R1,#METBCD+2 | |
| 077E D484 | 1536 | | CALL | BLNKIT | ;DIGIT BLANKING!!! |
| 0780 7683 | 1537 | | JF1 | NSIGN1 | |
| 0782 83 | 1538 | | RET | | |
| 0783 B824 | 1539 | NSIGN1: | MOV | R0,#METBCD+2 | ;IF THE SIGN IS NEGATIVE, PUT A - SIGN |
| 0785 F0 | 1540 | NSIGN2: | MOV | A,@R0 | ;IF FRONT |
| 0786 53F0 | 1541 | | ANL | A,#0FOH | ;IS THE MSD ANYTHING BUT A 0??? |
| 0788 9691 | 1542 | | JNZ | NOVERF | |
| 078A F0 | 1543 | AOK: | MOV | A,@R0 | |
| 078B 530F | 1544 | | ANL | A,#0FH | |
| 078D 43D0 | 1545 | | ORL | A,#0D0H | |
| 078F A0 | 1546 | | MOV | @R0,A | |
| 0790 83 | 1547 | | RET | | |
| 0791 0310 | 1548 | NOVERF: | ADD | A,#10H | ;OR A SPACE??? |
| 0793 C68A | 1549 | | JZ | AOK | |
| 0795 4480 | 1550 | | JMP | UNDER | ;IF SO, THEN SET THE UNDERFLOW FLAG |
| | 1551 | ; | | | |
| | 1552 | | | ;*** DEMAND MODE WAIT ROUTINE *** | |
| | 1553 | ; | | | |
| 0797 997F | 1554 | DEMAND: | ANL | P1,#7FH | ;DON'T OUTPUT ANYTHING TO THE PRINTER |
| 0799 B82B | 1555 | | MOV | R0,#SWTCH3 | ;DEMAND MODE ENABLED? |
| 079B F0 | 1556 | | MOV | A,@R0 | |
| 079C B2AB | 1557 | | JB5 | RET7 | ;RETURN NOT IN DEMAND MODE |
| 079E 23C0 | 1558 | | MOV | A,#0C0H | ;SCALE IS IN DEMAND MODE |
| 07A0 9A00 | 1559 | | ANL | P2,#00H | |
| 07A2 3A | 1560 | | OUTL | P2,A | |
| 07A3 09 | 1561 | | IN | A,P1 | ;INPUT DEMAND LINE |
| 07A4 37 | 1562 | | CPL | A | ;IS THE DEMAND LINE LOW? |
| 07A5 1297 | 1563 | | JB0 | DEMAND | ;YES,CONTINUE TO READ DEMAND LINE TILL HIGH |
| 07A7 9A00 | 1564 | | ANL | P2,#00H | |
| 07A9 89FF | 1565 | | ORL | P1,#0FFH | ;RE-ENABLE P1 |
| 07AB 83 | 1566 | RET7: | RET | | |
| | 1567 | ; | | | |
| | 1568 | | | ;*** INITIALIZE SYSTEM ROUTINE *** | |
| | 1569 | ; | | | |
| | 1570 | | | ;THIS ROUTINE INITIALIZES PWRUP FLAG, LB/KG FLAG, | |
| | 1571 | | | ;INITIALIZES THE VARIABLE SPAN REGISTER, TURNS OFF | |
| | 1572 | | | ;AV RELAY | |
| | 1573 | ; | | | |
| 07AC F5 | 1574 | PWRON: | SEL | MB1 | |
| 07AD C4F1 | 1575 | | JMP | PWRON1 | |
| 07AF 37 | 1576 | PWRON2: | CPL | A | |
| 07B0 5380 | 1577 | | ANL | A,#80H | |
| 07B2 D1 | 1578 | | XRL | A,@R1 | ;FORM STAT3 |
| 07B3 A1 | 1579 | | MOV | @R1,A | |
| 07B4 23E0 | 1580 | | MOV | A,#0E0H | |
| 07B6 3A | 1581 | | OUTL | P2,A | ;TURN OFF THE AV RELAY |
| 07B7 9A01 | 1582 | | ANL | P2,#01H | |
| 07B9 B85D | 1583 | | MOV | R0,#SPANRG | |
| 07BB 94B6 | 1584 | | CALL | CLR3 | ;PRESET THE SPAN REG TO ZERO |
| 07BD 83 | 1585 | | RET | | |
| | 1586 | ; | | | |
| | 1587 | TEST7: | TST | 7 | ;TEST MEMORY ON PAGE 7 |
| 07BE F0 | 1588+ | | MOV | A,@R0 | ;LOAD ROM POINTER INTO ACCUMULATOR |

```
LOC  OBJ    LINE         SOURCE STATEMENT

07BF A3     1589+       MOVP    A,@A            ;FETCH ROM VALUE ADDRESSED BY R0
07C0 61     1594+       ADD     A,@R1           ;ADD ROM VALUE TO ROM CHECKSUM REGISTER
07C1 A1     1595+       MOV     @R1,A           ;UPDATE ROM CHECKSUM REGISTER
07C2 F5     1596        SEL     MB1             ;SELECT MEMORY BANK 1 FOR PAGE 8 MEMORY TEST
07C3 0489   1597        JMP     TEST8           ;
            1598        ;
            1599        ;*** COUNTS TO INCREMENTS CONVERSION ROUTINES ***
            1600        ;
            1601        ;CNTINC ROUTINE CONVERTS (COUNTS - DIGITAL INITIAL) TO INCREMENTS
            1602        ;NODIGI ROUTINES CONVERTS (COUNTS W/O SUBTRACTING DIGITAL INITIAL) TO INCREMENTS
            1603        ;
07C5 B844   1604 CNTINC: MOV    R0,#RAWCNT
07C7 B937   1605        MOV     R1,#TEMP+2      ;LOAD DIGITAL INITITAL INTO TEMP
07C9 B100   1606        MOV     @R1,#00H
07CB C9     1607        DEC     R1
07CC B13E   1608        MOV     @R1,#3EH
07CE C9     1609        DEC     R1
07CF B13E   1610        MOV     @R1,#3EH
07D1 94A3   1611        CALL    SUB3            ;SUBTRACT DIGITAL INITIAL FROM RAWCNTS
07D3 B40A   1612        CALL    ABS3            ;MULTIPLY (RAWCNTS - DIGITAL INITITAL) BY SPAN MULTIPLIER
07D5 D4E9   1613        CALL    SPAN
07D7 B844   1614 NODIGI: MOV    R0,#RAWCNT
07D9 B40A   1615        CALL    ABS3
07DB B92D   1616        MOV     R1,#STAT3       ;COUNT-INCREMENT CONV. W/O DIGITAL INTIAL
07DD F1     1617        MOV     A,@R1
07DE 37     1618        CPL     A
07DF 32EB   1619        JB1     NOLB            ;IN LB MODE, JUMP NOLB
07E1 B929   1620        MOV     R1,#SWTCH1      ;PERFORM TABLE LOOKUP FOR CONVERSION FACTOR
07E3 F1     1621        MOV     A,@R1
07E4 5303   1622        ANL     A,#03H
07E6 0304   1623        ADD     A,#POINT-300H   ;GET CORRECT CONVERSION FACTOR
07E8 E3     1624        MOVP3   A,@A
07E9 D433   1625        CALL    MULT2C          ;CONVERT RAWCNTS TO KG RAWCNTS
07EB B929   1626 NOLB:  MOV     R1,#SWTCH1      ;GET THE FULL SCALE MULTIPLING FACTOR
07ED F1     1627        MOV     A,@R1
07EE 47     1628        SWAP    A
07EF E7     1629        RL      A
07F0 531F   1630        ANL     A,#1FH
07F2 A9     1631        MOV     R1,A
07F3 E7     1632        RL      A
07F4 69     1633        ADD     A,R1
07F5 031C   1634        ADD     A,#FSCALE-300H  ;CONVERT KG OR LB RAWCNTS TO KG OR LB INCREMENTS
07F7 D437   1635        CALL    MULTC
07F9 A423   1636        JMP     SIGN3           ;RESTORE SIGN
            1637        ;
            1638        ;*** PAGING FILLER (7FB - 7FE) ***
            1639        ;
07FB 00     1640        DB      00H
07FC 00     1641        DB      00H
07FD 00     1642        DB      00H
07FE 00     1643        DB      00H
            1644        ;
            1645        ;*** CHECKSUM DIGIT LOCATED HERE ***
            1646        ;
07FF 94     1647        DB      094H
            1652        ;
            1653        ;*** END OF MB0-START OF MB1 ***
            1654        ;
0800        1655        ORG     800H
            1656        ;
            1657        ;*** DISPLAY INPUT AND OUTPUT ROUTINE ***
            1658        ;
0800 9A00   1659 DISPLY: ANL    P2,#00H         ;THIS ROUTINE HANDLES THE I/O WITH THE MAIN PROCESSOR
0802 80     1660        MOVX    A,@R0           ;CLEAR DISPLAY PROCESSORS OBF FLAG
0803 8A80   1661        ORL     P2,#80H
0805 90     1662        MOVX    @R0,A
0806 147C   1663        CALL    DATOUT          ;WAIT ON INPUT BUFFER NOT FULL OR TIMER TIME OUT
0808 1470   1664        CALL    DATIN           ;WAIT ON OUTPUT BUFFER FULL OR TIMER TIME OUT
080A B828   1665        MOV     R0,#COMMND
080C F0     1666        MOV     A,@R0
080D 5310   1667        ANL     A,#10H
080F A0     1668        MOV     @R0,A
0810 80     1669        MOVX    A,@R0           ;INPUT COMMAND REG FROM DISPLAY PROCESSOR
0811 40     1670        ORL     A,@R0
0812 A0     1671        MOV     @R0,A
0813 37     1672        CPL     A               ;IS THERE A TARE VALUE AVAILABLE?
0814 5382   1673        ANL     A,#82H
0816 9664   1674        JNZ     NTI             ;NO TARE VALUE AVAILABLE, JUMP NTI & OUTPUT DATA TO DISPLAY
0818 537D   1675        ANL     A,#7DH          ;CLEAR TARE VALUE FLAG
081A A0     1676        MOV     @R0,A
081B B825   1677        MOV     R0,#TARBCD      ;IF SO, INPUT IT FROM THE DISPLAY PROCESSOR
081D BA03   1678        MOV     R2,#03H
081F 1470   1679 TILOOP: CALL   DATIN           ;INPUT TARE VALUE FROM DISPLAY PROCESSOR
0821 80     1680        MOVX    A,@R0
0822 A0     1681        MOV     @R0,A
0823 18     1682        INC     R0
0824 EA1F   1683        DJNZ    R2,TILOOP
0826 C8     1684        DEC     R0              ;CLEAR THE MOST SIGNIFICANT NYBBLE
0827 530F   1685        ANL     A,#0FH
0829 A0     1686        MOV     @R0,A
082A E5     1687        SEL     MB0
082B B4AF   1688        CALL    OKCHCK          ;DOES TARE VALUE SATISFY ALL TARE QUALIFICATIONS
082D F5     1689        SEL     MB1
082E 7664   1690        JF1     NTI             ;TARE DOES NOT QUALIFY, JUMP NTI & OUTPUT DATA
0830 E5     1691        SEL     MB0
0831 74FA   1692        CALL    BCDBIN          ;CONVERT IT TO BINARY
0833 B829   1693        MOV     R0,#SWTCH1
0835 F0     1694        MOV     A,@R0
```

```
LOC  OBJ     LINE         SOURCE STATEMENT
0836 5303    1695         ANL    A,#03H
0838 A9      1696         MOV    R1,A
0839 E7      1697         RL     A
083A 69      1698         ADD    A,R1
083B 0352    1699         ADD    A,#MFACT-300H    ;DIVIDE IT BY THE INCREMENT SIZE
083D B840    1700         MOV    R0,#TEMP3
083F D437    1701         CALL   MULTC
0841 B83E    1702         MOV    R0,#TEMP2        ;ARE WE ABOVE FULL CAPACITY?
0843 BF01    1703         MOV    R7,#01H
0845 B4FF    1704         CALL   TESTOV
0847 F5      1705         SEL    MB1
0848 F664    1706         JC     NTI              ;TARE TO LARGE, ABORT TARE ENTRY
084A B832    1707         MOV    R0,#TARE         ;MOVE THE TARE ENTRY VALUE TO TARE
084C B93E    1708         MOV    R1,#TEMP2
084E E5      1709         SEL    MB0
084F 54D5    1710         CALL   MOV3
0851 F5      1711         SEL    MB1
0852 B82D    1712         MOV    R0,#STAT3        ;PUT US INTO THE NET MODE
0854 F0      1713         MOV    A,@R0
0855 4308    1714         ORL    A,#08H
0857 A0      1715         MOV    @R0,A
0858 B82E    1716         MOV    R0,#STAT4
085A F0      1717         MOV    A,@R0
085B 4308    1718         ORL    A,#08H           ;THIS TARE CAME FROM THE KEYBOARD
085D 537F    1719         ANL    A,#07FH          ;CLEAR AUTO CLEAR TARE FLAG
085F A0      1720         MOV    @R0,A
0860 B873    1721         MOV    R0,#FLTCNT       ;SET THE DIGITAL FILTER TO ACCEPT VALUE
0862 B0FF    1722         MOV    @R0,#0FFH
0864 B820    1723 NTI:    MOV    R0,#STAT1        ;OUTPUT STAT1,STAT2,NETBCD REG AND TARBCD REG
0866 BA08    1724         MOV    R2,#08H
0868 F0      1725 OTLOOP: MOV    A,@R0
0869 90      1726         MOVX   @R0,A
086A 147C    1727         CALL   DATOUT           ;OUTPUT ONE BYTE AT A TIME
086C 18      1728         INC    R0
086D EA68    1729         DJNZ   R2,OTLOOP        ;CONTINUE TILL DONE
086F 83      1730         RET
             1731         ;
             1732         ;*** DATA INPUT WAIT SUBROUTINE ***
             1733         ;
0870 8A80    1734 DATIN:  ORL    P2,#80H
0872 BCFF    1735         MOV    R4,#0FFH         ;SET UP THE TIMEOUT TIMER
0874 80      1736 DATIN1: MOVX   A,@R0
0875 1279    1737         JB0    CNTI             ;JUMP CNTI IF DISPLAY PROCESSOR OUTPUT BUFFER IS FULL
0877 EC74    1738         DJNZ   R4,DATIN1        ;WAIT TILL OUTPUT BUFFER FULL OR TIMER TIME OUT
0879 9A00    1739 CNTI:   ANL    P2,#00H
087B 83      1740         RET
             1741         ;
             1742         ;*** DATA OUTPUT WAIT SUBROUTINE ***
             1743         ;
087C 8A80    1744 DATOUT: ORL    P2,#80H
087E BCFF    1745         MOV    R4,#0FFH         ;SET UP THE TIMEOUT TIMER
0880 80      1746 DATOT1: MOVX   A,@R0
0881 37      1747         CPL    A
0882 3286    1748         JB1    CNT2             ;JUMP CNT2 IF DISPLAY PROCESSOR INPUT BUFFER IS NOT FULL
0884 EC80    1749         DJNZ   R4,DATOT1        ;INPUT BUFFER FULL, WAIT TILL BUFFER EMPTY OR TIMER TIME OUT
0886 37      1750 CNT2:   CPL    A
0887 0479    1751         JMP    CNTI
             1752         ;
             1753 TEST8:  TST    8                ;TEST MEMORY ON PAGE 8
0889 F0      1754+        MOV    A,@R0            ;LOAD ROM POINTER INTO ACCUMULATOR
088A A3      1755+        MOVP   A,@A             ;FETCH ROM VALUE ADDRESSED BY R0
088B 61      1760+        ADD    A,@R1            ;ADD ROM VALUE TO ROM CHECKSUM REGISTER
088C A1      1761+        MOV    @R1,A            ;UPDATE ROM CHECKSUM REGISTER
088D 2478    1762         JMP    TEST9            ;
             1763         ;
             1764         ;*** PRINTED DATA OUTPUT ROUTINE ***
             1765
088F BA08    1766 PRINT:  MOV    R2,#08H          ;CALCULATE THE PARITY--NUMBER TO TRANSMIT IN A
0891 B900    1767         MOV    R1,#00H          ;--BAUD RATE IN R6
0893 67      1768 PALOOP: RRC    A
0894 E697    1769         JNC    PAR1
0896 19      1770         INC    R1
0897 EA93    1771 PAR1:   DJNZ   R2,PALOOP
0899 67      1772         RRC    A
089A 29      1773         XCH    A,R1
089B 77      1774         RR     A
089C 5380    1775         ANL    A,#80H
089E D9      1776         XRL    A,R1
089F A8      1777         MOV    R0,A             ;STORE IT--R6=01H MEANS 4805 BAUD
08A0 6C      1778         ADD    A,R4             ;ADD IT TO THE CHECKSUM-R6=10H MEANS 300.3 BAUD
08A1 AC      1779         MOV    R4,A             ;STORE THE NEW CHECKSUM-CHECKSUM IN R4
08A2 23C8    1780 CTS:    MOV    A,#0C8H          ;SEND A RTS-WAIT UNTIL A CTS SIGNAL
08A4 9A08    1781         ANL    P2,#08H
08A6 3A      1782         OUTL   P2,A
08A7 09      1783         IN     A,P1
08A8 37      1784         CPL    A
08A9 32A2    1785         JB1    CTS              ;NOT CLEAR TO SEND, JUMP CTS
08AB FE      1786         MOV    A,R6             ;GET TIME DELAY CONSTANT
08AC AA      1787         MOV    R2,A
08AD 89FF    1788         ORL    P1,#0FFH         ;TURN OFF THE OUTPUT (SEND THE START BIT)
08AF EAE4    1789 DELAY2: DJNZ   R2,DELAY1        ;BIT TIME DELAY
08B1 B944    1790         MOV    R1,#44H
08B3 E9B3    1791 DELAY3: DJNZ   R1,DELAY3
08B5 BD08    1792         MOV    R5,#08H          ;SET THE BIT COUNT TO 8
08B7 F8      1793         MOV    A,R0
08B8 67      1794 BITLOP: RRC    A                ;GET THE NEXT BIT
08B9 E6E0    1795         JNC    BIT0             ;BIT = 0, JUMP TO BIT0
08BB 997F    1796         ANL    P1,#7FH          ;SET THE OUTPUT TO 1
```

```
LOC  OBJ    LINE         SOURCE STATEMENT

08BD 00     1797         NOP
08BE 00     1798         NOP
08BF 2E     1799 BITDLY: XCH   A,R6           ;GET THE DELAY TIME CONSTANT
08C0 AA     1800         MOV   R2,A
08C1 2E     1801         XCH   A,R6
08C2 EAEA   1802 DELAY5: DJNZ  R2,DELAY4      ;BIT TIME DELAY
08C4 B942   1803         MOV   R1,#42H
08C6 E9C6   1804 DELAY6: DJNZ  R1,DELAY6
08C8 EDB8   1805         DJNZ  R5,BITLOP      ;CHECK IF LAST BIT HAS BEEN SENT
08CA 00     1806         NOP
08CB 00     1807         NOP
08CC 00     1808         NOP
08CD 997F   1809         ANL   P1,#7FH        ;SET THE OUTPUT TO 1
08CF FE     1810         MOV   A,R6           ;DELAY THE STOP BIT TIMES
08D0 E7     1811         RL    A
08D1 A8     1812         MOV   R0,A
08D2 E8F0   1813 DELAY8: DJNZ  R0,DELAY7
08D4 B940   1814         MOV   R1,#40H
08D6 E9D6   1815 DELAY9: DJNZ  R1,DELAY9
08D8 23C0   1816         MOV   A,#0C0H        ;CLEAR THE RTS SIGNAL
08DA 3A     1817         OUTL  P2,A
08DB 9A08   1818         ANL   P2,#08H
08DD 89FF   1819         ORL   P1,#0FFH       ;RESET P1 TO INPUT MODE
08DF 83     1820 RET8:   RET
08E0 8980   1821 BIT0:   ORL   P1,#80H        ;SET THE OUTPUT TO 0
08E2 04BF   1822         JMP   BITDLY
08E4 B947   1823 DELAY1: MOV   R1,#47H
08E6 E9E6   1824 DLY10:  DJNZ  R1,DLY10
08E8 04AF   1825         JMP   DELAY2
08EA B947   1826 DELAY4: MOV   R1,#47H
08EC E9EC   1827 DLY40:  DJNZ  R1,DLY40
08EE 04C2   1828         JMP   DELAY5
08F0 B947   1829 DELAY7: MOV   R1,#47H
08F2 E9F2   1830 DLY70:  DJNZ  R1,DLY70
08F4 04D2   1831         JMP   DELAY8
            1832         ;
            1833         ;*** 300 BAUD LOW SPEED PRINT OUTPUT ROUTINE ***
            1834         ;
08F6 B82E   1835 LSO:    MOV   R0,#STAT4      ;IS SCALE OVERCAPACITY?
08F8 F0     1836         MOV   A,@R0
08F9 12DF   1837         JB0   RET8           ;SCALE IS OVERCAP, RETURN NO PRINT
08FB 37     1838         CPL   A              ;IS SCALE IN MOTION?
08FC D2DF   1839         JB6   RET8           ;SCALE IS IN MOTION, RETURN NO MOTION
08FE 23C0   1840         MOV   A,#0C0H
0900 997F   1841         ANL   P1,#7FH
0902 3A     1842         OUTL  P2,A           ;DE-ACTIVATE THE PRINTER
0903 09     1843         IN    A,P1           ;IS THE DATA SET READY???
0904 9A0F   1844         ANL   P2,#0FH
0906 89FF   1845         ORL   P1,#0FFH       ;RE-ACTIVATE THE PRINTER
0908 37     1846         CPL   A
0909 5296   1847         JB2   RET9           ;DATA SET NOT READY,RETURN NO PRINT
090B B828   1848         MOV   R0,#COMMND     ;CLEAR THE PRINT REQUEST
090D B000   1849         MOV   @R0,#00H
090F B92C   1850         MOV   R1,#SWTCH4
0911 F1     1851         MOV   A,@R1          ;IS SCALE IN HIGH SPEED OUTPUT MODE?
0912 7296   1852         JB3   RET9           ;YES, RETURN NO PRINT
0914 5306   1853         ANL   A,#06H         ;ARE THERE ANY MIN. PRINT LIMITATIONS?
0916 C631   1854         JZ    NOLIM          ;NO LIMITATIONS, JUMP NOLIM
0918 77     1855         RR    A              ;LOOK UP THE MINIMUM ALLOWABLE PRINT VALUES
0919 0371   1856         ADD   A,#LIMIT-900H-1
091B AF     1857         MOV   R7,A
091C B831   1861         MOV   R0,#NET+2      ;IS NET>6553.6 INCREMENTS (IS THE M.S. BYTE>0?)
091E F0     1862         MOV   A,@R0
091F 9634   1863         JNZ   NCHECK         ;MS BYTE > 0, SKIP MINIMUM WEIGHT PRINT CHECK, JUMP NCHECK
0921 FF     1864         MOV   A,R7
0922 A3     1865         MOVP  A,@A
0923 C8     1866         DEC   R0
0924 60     1867         ADD   A,@R0          ;IF MIDDLE BYTE OF NET >MINIMUM WEIGHT, SET CARRY
0925 F634   1868         JC    NCHECK         ;CARRY, SET NET > MINIMUM WEIGHT, JUMP NCHECK
0927 FF     1869         MOV   A,R7
0928 0303   1870         ADD   A,#03H         ;IF L.S. BYTE OF NET > MINIMUM WEIGHT, SET CARRY
092A A3     1871         MOVP  A,@A
092B C8     1872         DEC   R0
092C 60     1873         ADD   A,@R0
092D E696   1874         JNC   RET9           ;CARRY NOT SET, NET <= MINIMUM WEIGHT, RETURN
092F 2434   1875         JMP   NCHECK         ;CARRY SET, NET > MINIMUM WEIGHT, JUMP NCHECK
0931 F1     1876 NOLIM:  MOV   A,@R1          ;IS THE SCALE IN NEGATIVE PRINT INHIBIT MODE?
0932 B239   1877         JB5   NEGPRT         ;NO, SKIP NEGATIVE WEIGHT CHECK, GO NEGPRT
0934 B957   1878 NCHECK: MOV   R1,#STAT5      ;IS THE NET WEIGHT NEGATIVE???
0936 F1     1879         MOV   A,@R1
0937 3296   1880         JB1   RET9           ;WEIGHT NEGATIVE, RETURN NO PRINT
0939 B82B   1881 NEGPRT: MOV   R0,#SWTCH3     ;IS SCALE IN EXPAND MODE?
093B F0     1882         MOV   A,@R0
093C 9296   1883         JB4   RET9           ;SCALE IN EXPAND, RETURN NO PRINT
093E BE10   1884         MOV   R6,#10H        ;LOAD BAUD RATE 300.3 INTO R6 FOR PRINT ROUTINE
0940 B82D   1885         MOV   R0,#STAT3      ;IS SCALE IN NET MODE?
0942 F0     1886         MOV   A,@R0
0943 7249   1887         JB3   NETPRT         ;YES, JUMP TO NETPRT
0945 BFA4   1888         MOV   R7,#FORM-300H  ;FORMAT DATA IN GROSS ONLY FORMAT
0947 247E   1889         JMP   OUTFOR         ;GO FORMAT THE DATA
0949 B829   1890 NETPRT: MOV   R0,#SWTCH1     ;IS SCALE IN EUROPEAN MODE?
094B F0     1891         MOV   A,@R0          ;EUROPEAN MODE PRINTS.-- COMMAS,TRH,NETC ACCORDINGLY
094C 77     1892         RR    A
094D B82B   1893         MOV   R0,#SWTCH3     ;EUROPEAN MODE IS PWRUP Kg & NO LB/Kg SWITCHING
094F 50     1894         ANL   A,@R0
0950 325B   1895         JB1   EUPRNT         ;YES, SCALE IN EUROPEAN MODE, GO EUPRNT
0952 B82C   1896 NEPRNT: MOV   R0,#SWTCH4     ;IS SCALE IN PRINT GROSS,TARE,NET MODE?
0954 F0     1897         MOV   A,@R0
```

```
LOC   OBJ     LINE         SOURCE STATEMENT
0955  D26A    1898            JB6     NTPRNT          ;YES, GO NTPRNT
0957  BFAC    1899            MOV     R7,#FORM1-300H  ;NO, PRINT ONLY NET WEIGHT
0959  247E    1900            JMP     OUTFOR          ;GO FORMAT DATA IN NET ONLY FORMAT
095B  B82E    1901  EUPRNT:   MOV     R0,#STAT4       ;IN EUROPEAN MODE,CHECK TARE FOR KBD TARE
095D  F0      1902            MOV     A,@R0           ;DID THE TARE COME FROM THE KEYBOARD?
095E  37      1903            CPL     A
095F  7252    1904            JB3     NEPRNT          ;NO, GO NEPRNT
0961  B82C    1905            MOV     R0,#SWTCH4      ;TARE FROM KBD,IS SCALE IN GROSS,TARE,NET PRINT MODE?
0963  F0      1906            MOV     A,@R0
0964  D26E    1907            JB6     NHPRNT          ;YES,SCALE IN GROSS,TARE,NET MODE, GO PRINT TRH & NETC FORMAT
0966  BFCF    1908            MOV     R7,#FORM4-300H  ;NOT GROSS,TARE,NET MODE PRINT NETC FORMAT
0968  247E    1909            JMP     OUTFOR          ;GO FORMAT DATA IN CALCULATED NET (NETC) FORMAT
096A  BFB6    1910  NTPRNT:   MOV     R7,#FORM3-300H  ;NET-HAND TARE (TR) & (NET) FORMAT
096C  247E    1911            JMP     OUTFOR          ;GO FORMAT GROSS,TARE,NET DATA IN NON KBD - NON CALCULATED NET FORMAT
096E  BFC2    1912  NHPRNT:   MOV     R7,#FORM2-300H  ;IN GROSS,TARE,NET MODE AND KBD TARE MODE
0970  247E    1913            JMP     OUTFOR          ;GO FORMAT GROSS,TARE,NET DATA IN KBD CALCULATED (TRH) & (NETC) FORMAT
              1914                    ;
              1915                    ;*** MINIMUM PRINT INHIBIT TABLE VALUES (95,195,495) ***
              1916                    ;
0972  FF      1917  LIMIT:    DB      0FFH,0FFH,0FEH  ;MIDDLE BYTE OF -MINIMUM WEIGHTS (95,195,495)
0973  FF
0974  FE
0975  A1      1918            DB      0A1H,03DH,011H  ;L.S. BYTE OF -MINIMUM WEIGHT (M.S.BYTE=0)
0976  3D
0977  11
              1919                    ;
              1920  TEST9:    TST     9               ;TEST MEMORY ON PAGE 9
0978  F0      1921+           MOV     A,@R0           ;LOAD ROM POINTER INTO ACCUMULATOR
0979  A3      1922+           MOVP    A,@A            ;FETCH ROM VALUE ADDRESSED BY R0
097A  61      1927+           ADD     A,@R1           ;ADD ROM VALUE TO ROM CHECKSUM REGISTER
097B  A1      1928+           MOV     @R1,A           ;UPDATE ROM CHECKSUM REGISTER
097C  444B    1929            JMP     TESTA           ;
              1930                    ;
              1931                    ;*** FORMATED OUTPUT GENERATOR ***
              1932                    ;
              1933                    ;THIS ROUTINE READS PAGE 3 STARTING AT @R7
              1934                    ;IF BIT 7 IS ZERO, THAT BYTE IS PRINTED
              1935                    ;    LITERALLY, AND THE NEXT ONE IS LOOKED AT
              1936                    ;IF IT IS AN 80H (NUM3), THE NEXT BYTE POINTS TO A
              1937                    ;    3 BYTE NUMBER+2 TO BE PRINTED IN LS FORMAT
              1938                    ;IF IT IS AN 81H (CHKSUM), THE CHECKSUM IS PRINTED
              1939                    ;IF IT IS AN 82H (RETO), THE ROUTINE RETURNS
              1940                    ;IF IT IS AN 83H (GO), THE ROUTINE READS THE NEXT
              1941                    ;    BYTE AND STARTS READING FROM THAT POS. ON
              1942                    ;    PAGE 3 (LIKE A JUMP INSTRUCTION)
              1943                    ;IF IT IS AN 84H (NUM1), THE NEXT BYTE POINTS TO A
              1944                    ;    BYTE IN RAM TO BE PRINTED
              1945                    ;IF IT IS AN 85H (HNUM3), THE NEXT BYTE POINTS TO A
              1946                    ;    3 BYTE NUMBER+2 TO BE PRINTED IN HS FORMAT
              1947                    ;IF IT IS AN 86H (OPTCR), A SPACE, FOLLOWED BY AN OPTIONAL
              1948                    ;    CR, CHECKSUM, LF IS PRINTED DEPENDING ON PROGRAM
              1949                    ;    FUNCTION SWITCHES
              1950                    ;IF IT IS AN 87H (OPTSO), AN OPTIONAL SO CHARACTER IS
              1951                    ;    PRINTED DEPENDING ON PROGRAM SWITCH
097E  BC00    1952  OUTFOR:   MOV     R4,#00H
0980  FF      1953  OUTPUT:   MOV     A,R7
0981  1F      1954            INC     R7              ;THIS SUBROUTINE OUTPUTS DATA ACCORDING TO
0982  E3      1955            MOVP3   A,@A            ;THE FORMAT AT @R7 ON PAGE 3
0983  F289    1956            JB7     KOMMND          ;IF BIT 7=0, THEN PRINT THAT CHARACTER
0985  148F    1957            CALL    PRINT           ;LITERALLY
0987  2480    1958            JMP     OUTPUT
0989  537F    1959  KOMMND:   ANL     A,#7FH          ;FIND THE CORRESPONDING ROUTINE
098B  038E    1960            ADD     A,#CTABLE-900H
098D  B3      1961            JMPP    @A
              1962                    ;
              1963                    ;*** FORMATED OUTPUT GENERATOR EXECUTION TABLE ***
              1964                    ;
098E  DF      1965  CTABLE:   DB      DPRINT-900H,CHPRNT-900H,RET9-900H,JUMP-900H
098F  97
0990  96
0991  9B
0992  A0      1966            DB      IBYTE-900H,BCDOUT-900H,CROPT-900H,SOOPT-900H
0993  A9
0994  BD
0995  D4
              1967                    ;
              1968                    ;*** FORMATED OUTPUT GENERATOR RETURN ***
              1969                    ;
0996  83      1970  RET9:     RET
              1971                    ;
              1972                    ;*** PRINT CHECKSUM CHARACTER ROUTINE ***
              1973                    ;
0997  5441    1974  CHPRNT:   CALL    PRNTCS          ;CALL CHECKSUM PRINT ROUTINE
0999  2480    1975            JMP     OUTPUT
              1976                    ;
              1977                    ;*** READ NEXT BYTE ROUTINE ***
              1978                    ;
099B  FF      1979  JUMP:     MOV     A,R7            ;START PRINTING BASED ON NEXT BYTE
099C  E3      1980            MOVP3   A,@A            ;PERFORM TABLE LOOKUP FOR ADDRESS
099D  AF      1981            MOV     R7,A
099E  2480    1982            JMP     OUTPUT
              1983                    ;
              1984                    ;*** PRINT A BYTE FROM RAM MEMORY ROUTINE ***
              1985                    ;ADDRESS OF RAM LOCATION TO BE PRINTED IS ON PAGE 3
              1986                    ;
09A0  FF      1987  IBYTE:    MOV     A,R7            ;ADDRESS POINTER > ACCUMULATOR
09A1  1F      1988            INC     R7
09A2  E3      1989            MOVP3   A,@A            ;PERFORM TABLE LOOKUP FOR ADDRESS
```

```
LOC   OBJ      LINE         SOURCE STATEMENT

09A3  A9       1990         MOV    R1,A
09A4  F1       1991         MOV    A,@R1
09A5  148F     1992         CALL   PRINT       ;OUTPUT RAM DATA
09A7  2480     1993         JMP    OUTPUT
               1994         ;
               1995         ;*** 3 BYTES HIGH SPEED (4800 BAUD) FORMAT PRINT ROUTINE ***
               1996         ;
09A9  FF       1997 BCDOUT: MOV    A,R7        ;ADDRESS POINTER > ACCUMULATOR
09AA  1F       1998         INC    R7
09AB  E3       1999         MOVP3  A,@A        ;PERFORM TABLE LOOKUP FOR ADDRESS
09AC  D5       2000         SEL    RB1
09AD  A8       2001         MOV    R0,A
09AE  BA03     2002         MOV    R2,#03H
09B0  F0       2003 SDLOOP: MOV    A,@R0       ;OUTPUT THE RAM DATA 1 DIGIT AT A TIME
09B1  47       2004         SWAP   A
09B2  5428     2005         CALL   SDOUT       ;OUTPUT (4800 BAUD) ASCII DIGIT
09B4  F0       2006         MOV    A,@R0
09B5  5428     2007         CALL   SDOUT       ;OUTPUT (4800 BAUD) ASCII DIGIT
09B7  C8       2008         DEC    R0
09B8  EAB0     2009         DJNZ   R2,SDLOOP
09BA  C5       2010         SEL    RB0
09BB  2480     2011         JMP    OUTPUT
               2012         ;
               2013         ;*** PRINT SPACE, CR, OPTIONAL CHKSUM, LF ROUTINE ***
               2014         ;
09BD  2320     2015 CROPT:  MOV    A,#' '
09BF  148F     2016         CALL   PRINT       ;PRINT SPACE
09C1  B82A     2017         MOV    R0,#SWTCH2  ;IS SCALE IN MULTIPLE LINE FORMAT?
09C3  F0       2018         MOV    A,@R0
09C4  B280     2019         JB5    OUTPUT      ;NO, RETURN TO OUTPUT GENERATOR
09C6  230D     2020         MOV    A,#CR
09C8  148F     2021         CALL   PRINT       ;PRINT CARRIAGE RETURN (CR) CHARACTER
09CA  5441     2022         CALL   PRNTCS      ;CALL PRNTCS, PRINT CHECKSUM IF ENABLED
09CC  230A     2023         MOV    A,#LF
09CE  148F     2024         CALL   PRINT       ;PRINT LINE FEED (LF) CHARACTER
09D0  BC00     2025         MOV    R4,#00H
09D2  2480     2026         JMP    OUTPUT
               2027         ;
               2028         ;*** PRINT OPTIONAL SO CHARACTER ROUTINE ***
               2029         ;
09D4  B82C     2030 SOOPT:  MOV    R0,#SWTCH4  ;IS SCALE IN DOUBLE WIDTH PRINT FORMAT?
09D6  F0       2031         MOV    A,@R0
09D7  12DD     2032         JB0    NOSO        ;NO, SKIP SO CHARACTER OUTPUT, GO NOSO
09D9  230E     2033         MOV    A,#SO
09DB  148F     2034         CALL   PRINT       ;PRINT SO CHARACTER
09DD  2480     2035 NOSO:   JMP    OUTPUT
               2036         ;
               2037         ;*** 3 BYTE (300 BAUD) FORMAT PRINTER ROUTINE ***
               2038         ;
09DF  FF       2039 DPRINT: MOV    A,R7        ;ADDRESS POINTER > ACCUMULATOR
09E0  1F       2040         INC    R7
09E1  D5       2041         SEL    RB1
09E2  E3       2042         MOVP3  A,@A        ;PERFORM TABLE LOOKUP FOR ADDRESS
09E3  A8       2043         MOV    R0,A
09E4  BA06     2044         MOV    R2,#06H     ;NUMBER OF DIGITS=6
09E6  B929     2045         MOV    R1,#SWTCH1
09E8  F1       2046         MOV    A,@R1
09E9  77       2047         RR     A           ;MOVE THE EUROPEAN BIT TO THE LEADING ZERO
09EA  B92B     2048         MOV    R1,#SWTCH3
09EC  51       2049         ANL    A,@R1
09ED  77       2050         RR     A
09EE  5301     2051         ANL    A,#01H      ;BLANKING BIT
09F0  AC       2052         MOV    R4,A
09F1  B92A     2053         MOV    R1,#SWTCH2  ;GET THE DECIMAL POINT DATA
09F3  F1       2054         MOV    A,@R1
09F4  37       2055         CPL    A
09F5  5307     2056         ANL    A,#07H
09F7  17       2057         INC    A
09F8  17       2058         INC    A
09F9  AB       2059         MOV    R3,A
09FA  F0       2060 DPLOOP: MOV    A,@R0
09FB  47       2061         SWAP   A
09FC  5451     2062         CALL   PDIGIT      ;OUTPUT (300 BAUD) ASCII DIGIT
09FE  CA       2063         DEC    R2
09FF  F0       2064         MOV    A,@R0
0A00  5451     2065         CALL   PDIGIT      ;OUTPUT (300 BAUD) ASCII DIGIT
0A02  C8       2066         DEC    R0
0A03  EA26     2067         DJNZ   R2,DPLOP1
0A05  C5       2068         SEL    RB0
0A06  B82C     2069         MOV    R0,#SWTCH4  ;WANT TO PRINT T FOR TONS OR TONNES?
0A08  F0       2070         MOV    A,@R0
0A09  9220     2071         JB4    PRNTT       ;YES, GO PRNTT AND PRINT T
0A0B  B82D     2072         MOV    R0,#STAT3   ;PRINT LB,kg
0A0D  F0       2073         MOV    A,@R0
0A0E  3218     2074         JB1    PRNTKG      ;PRINT kg
0A10  234C     2075         MOV    A,#'L'
0A12  148F     2076         CALL   PRINT       ;PRINT LB
0A14  2342     2077         MOV    A,#'B'
0A16  4422     2078         JMP    PRNTCH
0A18  236B     2079 PRNTKG: MOV    A,#'k'
0A1A  148F     2080         CALL   PRINT
0A1C  2367     2081         MOV    A,#'g'
0A1E  4422     2082         JMP    PRNTCH
0A20  2354     2083 PRNTT:  MOV    A,#'T'      ;PRINT T
0A22  148F     2084 PRNTCH: CALL   PRINT
0A24  2480     2085         JMP    OUTPUT
0A26  24FA     2086 DPLOP1: JMP    DPLOOP      ;PAGING ERROR CORRECTION
               2087         ;
```

```
LOC    OBJ         LINE        SOURCE STATEMENT
                   2088                    ;*** PRINT (4800 BAUD) ASCII DIGIT ***
                   2089                    ;
0A28  530F         2090 SDOUT: ANL    A,#0FH           ;MASK OFF DIGIT
0A2A  0331         2091        ADD    A,#ASCII-0A00H
0A2C  A3           2092        MOVP   A,@A             ;PERFORM TABLE LOOKUP OF ASCII CHARACTERS
0A2D  C5           2093        SEL    RB0              ;(DON'T DESTROY REGISTER DATA)
0A2E  148F         2094        CALL   PRINT            ;PRINT ASCII CHARACTER AT (4800 BAUD)
0A30  93           2095        RETR                    ;RESTORE RB FLAG
                   2096
                   2097                    ;*** ASCII CHARACTERS FOR (4800 BAUD) OUTPUT ***
                   2098                    ;
0A31  30313233     2099 ASCII: DB     '0123456789     '
0A35  34353637
0A39  38392020
0A3D  20202020
                   2100                    ;
                   2101                    ;*** PRINT CHECKSUM ROUTINE ***
                   2102                    ;
0A41  B82C         2103 PRNTCS: MOV   R0,#SWTCH4       ;IS CHECKSUM PRINT ENABLED?
0A43  F0           2104        MOV    A,@R0
0A44  F2B4         2105        JB7    RETA             ;CHECKSUM PRINTING
0A46  FC           2106        MOV    A,R4             ;TAKE THE TWO'S COMPLIMENT OF THE SUM
0A47  37           2107        CPL    A
0A48  17           2108        INC    A
0A49  048F         2109        JMP    PRINT
                   2110                    ;
                   2111 TESTA: TST    0AH              ;TEST MEMORY ON PAGE A
0A4B  F0           2112+       MOV    A,@R0            ;LOAD ROM POINTER INTO ACCUMULATOR
0A4C  A3           2113+       MOVP   A,@A             ;FETCH ROM VALUE ADDRESSED BY R0
0A4D  61           2118+       ADD    A,@R1            ;ADD ROM VALUE TO ROM CHECKSUM REGISTER
0A4E  A1           2119+       MOV    @R1,A            ;UPDATE ROM CHECKSUM REGISTER
0A4F  6442         2120        JMP    TESTB
                   2121                    ;
                   2122                    ;*** PRINT (300 BAUD) ASCII ROUTINE ***
                   2123                    ;
0A51  530F         2124 PDIGIT: ANL   A,#0FH
0A53  EB6B         2125        DJNZ   R3,PD
0A55  C5           2126        SEL    RB0
0A56  AB           2127        MOV    R3,A
0A57  B829         2128        MOV    R0,#SWTCH1
0A59  F0           2129        MOV    A,@R0
0A5A  77           2130        RR     A
0A5B  B82B         2131        MOV    R0,#SWTCH3       ;IS SCALE IN EUROPEAN MODE(Kg ONLY)?
0A5D  50           2132        ANL    A,@R0
0A5E  3266         2133        JB1    COMMA            ;YES, IN Kg ONLY MODE,PRINT A COMMA INSTEAD OF A DECIMAL POINT
0A60  232E         2134        MOV    A,#'.'           ;NOT Kg ONLY MODE,PRINT A DECIMAL POINT
0A62  148F         2135        CALL   PRINT            ;PRINT A DECIMAL POINT
0A64  446A         2136        JMP    PD1              ;SKIP COMMA PRINTING
0A66  232C         2137 COMMA: MOV    A,#','
0A68  148F         2138        CALL   PRINT            ;PRINT A COMMA
0A6A  FB           2139 PD1:   MOV    A,R3
0A6B  D5           2140 PD:    SEL    RB1
0A6C  2C           2141        XCH    A,R4
0A6D  9682         2142        JNZ    PRNTIT           ;HAVE WE PRINTED BEFORE???
0A6F  FB           2143        MOV    A,R3
0A70  07           2144        DEC    A
0A71  C682         2145        JZ     PRNTIT           ;ARE WE IN FRONT OF A DECIMAL POINT???
0A73  FA           2146        MOV    A,R2
0A74  07           2147        DEC    A
0A75  C682         2148        JZ     PRNTIT           ;THE LAST DIGIT???
0A77  FC           2149        MOV    A,R4
0A78  C68C         2150        JZ     PRNTSP           ;IS IT A ZERO???
0A7A  03F1         2151        ADD    A,#-0FH          ;IS IT A BLANK???
0A7C  C68C         2152        JZ     PRNTSP
0A7E  0302         2153        ADD    A,#0FH-0DH       ;IS IT A -???
0A80  C694         2154        JZ     PRNTMN
0A82  FC           2155 PRNTIT: MOV   A,R4
0A83  BC01         2156        MOV    R4,#01H
0A85  C5           2157        SEL    RB0
0A86  0394         2158        ADD    A,#DIGITS-300H
0A88  E3           2159        MOVP3  A,@A             ;PERFORM TABLE LOOKUP FOR ASCII CODE FOR THE DIGIT
0A89  148F         2160        CALL   PRINT            ;PRINT THE DIGIT
0A8B  93           2161        RETR
0A8C  2320         2162 PRNTSP: MOV   A,#' '           ;LOAD ACCUMULATOR WITH ASCII CODE FOR A SPACE
0A8E  BC00         2163        MOV    R4,#00H
0A90  C5           2164        SEL    RB0
0A91  148F         2165        CALL   PRINT            ;PRINT A SPACE
0A93  93           2166        RETR
0A94  232D         2167 PRNTMN: MOV   A,#'-'           ;LOAD ACCUMULATOR WITH ASCII CODE FOR MINUS SIGN
0A96  BC00         2168        MOV    R4,#00H
0A98  C5           2169        SEL    RB0
0A99  148F         2170        CALL   PRINT            ;PRINT A MINUS SIGN
0A9B  93           2171        RETR
                   2172                    ;
                   2173                    ;*** BUILD A BYTE ROUTINE ***
                   2174                    ;
                   2175                    ;THIS ROUTINE BUILDS A STATUS BYTE FROM DATA BITS
                   2176                    ;SCATTERED THROUGH-OUT MEMORY BASED ON BUILD INSTRUCTIONS
                   2177                    ;STORED IN R2 UPON ENTRY TO THIS ROUTINE
                   2178                    ;
                   2179                    ;REGISTER R2 CONTAINS LOCATION OF DATA TO BE FETCHED
                   2180                    ;THE FIRST BYTE ACCESSED IS THE DATA ADDRESS IN MEMORY
                   2181                    ;THE SECOND BYTE ACCESSED IS THE NUMBER OF THE DESIRED
                   2182                    ;BIT FOUND AT THAT ADDRESS
                   2183                    ;
                   2184                    ;THE RESULT IS AN SEVEN BIT STATUS BYTE IN ACCUMULATOR
                   2185
0A9C  BB00         2186 BUILD: MOV    R3,#00H          ;CLEAR TEMPORARY BYTE REGITER
```

```
LOC  OBJ        LINE         SOURCE STATEMENT

OA9E BC07       2187           MOV    R4,#07H         ;PRESET BIT COUNTER TO SEVEN
OAA0 FA         2188 BDLOOP:   MOV    A,R2
OAA1 A3         2192           MOVP   A,@A            ;FETCH ADDRESS POINTER
OAA2 A8         2193           MOV    R0,A            ;ADDRESS POINTER TO R0
OAA3 1A         2194           INC    R2
OAA4 FA         2195           MOV    A,R2
OAA5 A3         2196           MOVP   A,@A            ;FETCH BIT LOCATION
OAA6 A9         2197           MOV    R1,A
OAA7 1A         2198           INC    R2
OAA8 F0         2199           MOV    A,@R0
OAA9 77         2200 RBLOOP:   RR     A               ;SELECT THE DESIRED BIT
OAAA E9A9       2201           DJNZ   R1,RBLOOP
OAAC 5301       2202           ANL    A,#01H          ;MASK OFF ALL BUT DESIRED BIT
OAAE 2B         2203           XCH    A,R3
OAAF E7         2204           RL     A
OAB0 4B         2205           ORL    A,R3            ;COMBINED BIT WITH PREVIOUS INTERMEDIATE RESULT
OAB1 AB         2206           MOV    R3,A            ;STORE INTERMEDIATE RESULT
OAB2 ECA0       2207           DJNZ   R4,BDLOOP       ;CONTINUE TILL FULL 7 BIT BYTE BUILT
OAB4 83         2208 RETA:     RET
                2209                                  ;
                2210                                  ;*** BUILD INSTRUCTIONS FOR STATUS BYTE A ***
                2211                                  ;
OAB5 00         2212 BUILDA:   DB     0,1             ;0
OAB6 01
OAB7 01         2213           DB     1,0BH           ;1
OAB8 0B
OAB9 29         2214           DB     SWTCH1,1        ;INCREMENT SIZE
OABA 01
OABB 29         2215           DB     SWTCH1,8
OABC 08
OABD 2A         2216           DB     SWTCH2,2        ;DECIMAL POINT DATA
OABE 02
OABF 2A         2217           DB     SWTCH2,1
OAC0 01
OAC1 2A         2218           DB     SWTCH2,8
OAC2 08
                2219                                  ;
                2220                                  ;*** BUILD INSTRUCTIONS FOR STATUS BYTE B ***
                2221                                  ;
OAC3 2D         2222 BUILDB:   DB     STAT3,7         ;POWER UP FLAG
OAC4 07
OAC5 01         2223           DB     1,0BH           ;1
OAC6 0B
OAC7 2D         2224           DB     STAT3,1         ;LB/KG FLAG
OAC8 01
OAC9 2E         2225           DB     STAT4,6         ;NO MOTION FLAG
OACA 06
OACB 2E         2226           DB     STAT4,8         ;OVERFLOW FLAG
OACC 08
OACD 57         2227           DB     STAT5,1         ;NET SIGN FLAG
OACE 01
OACF 2D         2228           DB     STAT3,3         ;NET FLAG
OAD0 03
                2229                                  ;
                2230                                  ;*** BUILD INSTRUCTIONS FOR STATUS BYTE C ***
                2231                                  ;
OAD1 00         2232 CBUILD:   DB     0,1             ;0
OAD2 01
OAD3 01         2233           DB     1,0BH           ;1
OAD4 0B
OAD5 2B         2234           DB     SWTCH3,4        ;EXPANDED DATA IN HSO
OAD6 04
OAD7 28         2235           DB     COMMND,4        ;PRINT REQUEST
OAD8 04
OAD9 00         2236           DB     0,1             ;0
OADA 01
OADB 00         2237           DB     0,1             ;0
OADC 01
OADD 00         2238           DB     0,1             ;0
OADE 01
                2239                                  ;
                2240                                  ;*** BUILD INSTRUCTIONS FOR PARRALLEL OUTPUT STATUS BYTE ***
                2241                                  ;
OADF 00         2242 BUILDC:   DB     0,1             ;0
OAE0 01
OAE1 00         2243           DB     0,1             ;0
OAE2 01
OAE3 00         2244           DB     0,1             ;0
OAE4 01
OAE5 2D         2245           DB     STAT3,3         ;NET FLAG
OAE6 03
OAE7 2E         2246           DB     STAT4,6         ;NO MOTION FLAG
OAE8 06
OAE9 57         2247           DB     STAT5,1         ;NET SIGN FLAG
OAEA 01
OAEB 2E         2248           DB     STAT4,8         ;OVERFLOW FLAG
OAEC 08
                2252                                  ;
OAED 00         2253           DB     00H             ;PAGING ERROR CORRECTION
                2254                                  ;
                2255
                2256                                  ;*** HIGH SPEED OUTPUT ROUTINE ***
                2257                                  ;
OAEE B866       2258 HSO:      MOV    R0,#TEMP5       ;ADDRESS TEMPORARY REGISTER 5
OAF0 B922       2259           MOV    R1,#WETBCD      ;ADDRESS WEIGHT BCD DISPLAY REGISTER
OAF2 E5         2260           SEL    MB0
OAF3 54D5       2261           CALL   MOV3            ;SAVE THE DISPLAY WEIGHT REGISTER
OAF5 B869       2262           MOV    R0,#TEMP6       ;ADDRESS TEMPORARY REGISTER 6
```

```
LOC  OBJ      LINE        SOURCE STATEMENT

0AF7 B925     2263             MOV    R1,#TARBCD        ;ADDRESS TARE BCD DISPLAY REGISTER
0AF9 54D5     2264             CALL   MOV3              ;SAVE THE TARE DISPLAY REGISTER
0AFB B82C     2265             MOV    R0,#SWTCH4
0AFD F0       2266             MOV    A,@R0             ;ARE WE IS HSO MODE???
0AFE 37       2267             CPL    A
0AFF 7248     2268             JB3    PAD               ;NOT IN HIGH SPEED DATA OUTPUT MODE, GO DELAY 39 MSEC
0B01 C8       2269             DEC    R0                ;ADDRESS EXPAND SWITCH
0B02 F0       2270             MOV    A,@R0             ;MOVE EXPAND SWITCH TO ACCUMULATOR
0B03 37       2271             CPL    A
0B04 9208     2272             JB4    NXHSO             ;IF THE SCALE IS NOT IN EXPAND MODE GO NXHSO
0B06 D4C4     2273             CALL   EXPAND            ;GENERATE EXPAND MODE DATA FOR OUTPUT
0B08 F5       2274 NXHSO:      SEL    MB1
0B09 BAB5     2275             MOV    R2,#BUILDA-0A00H
0B0B 549C     2276             CALL   BUILD             ;BUILD STATUS BYTE (STATA)
0B0D B85B     2277             MOV    R0,#STATA
0B0F A0       2278             MOV    @R0,A             ;STORE STATA
0B10 BAC3     2279             MOV    R2,#BUILDB-0A00H
0B12 549C     2280             CALL   BUILD             ;BUILD STATUS BYTE (STATB)
0B14 D308     2281             XRL    A,#08H
0B16 B85C     2282             MOV    R0,#STATB
0B18 A0       2283             MOV    @R0,A             ;STORE STATB
0B19 BAD1     2284             MOV    R2,#CBUILD-0A00H
0B1B 549C     2285             CALL   BUILD             ;BUILD STATUS BYTE (STATC)
0B1D B86F     2286             MOV    R0,#STATC
0B1F A0       2287             MOV    @R0,A             ;STORE STATC
0B20 B929     2288             MOV    R1,#SWTCH1        ;CHECK FOR k9 ONLY MODE
0B22 F1       2289             MOV    A,@R1
0B23 77       2290             RR     A
0B24 B92B     2291             MOV    R1,#SWTCH3
0B26 51       2292             ANL    A,@R1
0B27 5302     2293             ANL    A,#02H
0B29 E7       2294             RL     A
0B2A 47       2295             SWAP   A
0B2B 40       2296             ORL    A,@R0
0B2C A0       2297             MOV    @R0,A             ;UPDATE STATC WITH k9 ONLY FLAG
0B2D BE01     2298             MOV    R6,#01H           ;4800 BAUD
0B2F BFEC     2299             MOV    R7,#HSOFOR-300H   ;FORMAT DATA FOR HIGH SPEED DATA OUTPUT (4800 BAUD)
0B31 347E     2300             CALL   OUTFOR            ;OUTPUT FORMATTED DATA AT 4800 BAUD
0B33 B822     2301             MOV    R0,#WETBCD        ;ADDRESS WEIGHT BCD DISPLAY REGISTER
0B35 B966     2302             MOV    R1,#TEMP5
0B37 E5       2303             SEL    MB0
0B38 54D5     2304             CALL   MOV3              ;RESTORE WEIGHT BCD DISPLAY REGISTER
0B3A B825     2305             MOV    R0,#TARBCD        ;ADDRESS TARE BCD DISPLAY REGISTER
0B3C B969     2306             MOV    R1,#TEMP6
0B3E 54D5     2307             CALL   MOV3              ;RESTORE TARE BCD DISPLAY REGISTER
0B40 F5       2308             SEL    MB1
0B41 83       2309 RETB:       RET
              2310                                      ;
              2311 TESTB:      TST    0BH               ;TEST MEMORY ON PAGE B
0B42 F0       2312+            MOV    A,@R0             ;LOAD ROM POINTER INTO ACCUMULATOR
0B43 A3       2313+            MOVP   A,@A              ;FETCH ROM VALUE ADDRESSED BY R0
0B44 61       2318+            ADD    A,@R1             ;ADD ROM VALUE TO ROM CHECKSUM REGISTER
0B45 A1       2319+            MOV    @R1,A             ;UPDATE ROM CHECKSUM REGISTER
0B46 84CE     2320             JMP    TESTC             ;
              2321                                      ;
              2322                                      ;*** DELAY ROUTINE ***
              2323                                      ;
              2324                                      ;THIS ROUTINE USED WHEN SCALE NOT IN HIGH SPEED DATA
              2325                                      ;OUTPUT ROUTINE NOT ENABLED TO RETAIN CONSISTANT
              2326                                      ;A/D UPDATE RATES
              2327                                      ;
              2328                                      ;THIS ROUTINE ALSO READS DATA SET READY INPUT FOR
              2329                                      ;REMOTE PRINT REQUEST INPUT
              2330                                      ;
0B48 B837     2331 PAD:        MOV    R0,#37H           ;WAIT FOR 39 MSEC
0B4A E94A     2332 PADLOP:     DJNZ   R1,PADLOP
0B4C E84A     2333             DJNZ   R0,PADLOP
0B4E 23C0     2334             MOV    A,#0C0H
0B50 997F     2335             ANL    P1,#7FH
0B52 3A       2336             OUTL   P2,A              ;DE-ACTIVATE PRINTER
0B53 09       2337             IN     A,P1              ;TEST DSR INPUT FOR PRT REQ
0B54 9A0F     2338             ANL    P2,#0FH
0B56 89FF     2339             ORL    P1,#0FFH          ;RE-ACTIVATE PRINTER
0B58 5260     2340             JB2    PADRTN
0B5A B828     2341             MOV    R0,#COMMND
0B5C F0       2342             MOV    A,@R0
0B5D 4310     2343             ORL    A,#10H            ;SET PRINT REQ FLAG
0B5F A0       2344             MOV    @R0,A
0B60 27       2345 PADRTN:     CLR    A
0B61 A8       2346             MOV    R0,A
0B62 F5       2347             SEL    MB1
0B63 83       2348             RET
0B64 F5       2349 AVERRP:     SEL    MB1               ;PAGING ERROR CORRECTION
0B65 84D4     2350             JMP    AVERR
              2351                                      ;
              2352                                      ;*** ANALOG VERFIY ROUTINE ***
              2353                                      ;
              2354                                      ;THIS ROUTINE PERFORMS ANALOG VERIFICATION, AUTOMATIC SPAN
              2355                                      ;CORRECTIONS SUBJECT TO PROGRAM RESTRICTIONS
              2356                                      ;
0B67 B857     2357 AV:         MOV    R0,#STAT5         ;IS SCALE AT GROSS ZERO?
0B69 B929     2358             MOV    R1,#SWTCH1
0B6B F0       2359             MOV    A,@R0
0B6C 37       2360             CPL    A
0B6D 5241     2361             JB2    RETB              ;NO,RETURN NO AV
0B6F B82B     2362             MOV    R0,#SWTCH3        ;IS ANALOG VERFICATION ENABLED?
0B71 F0       2363             MOV    A,@R0
0B72 37       2364             CPL    A
```

| LOC | OBJ | LINE | | SOURCE STATEMENT | | |
|---|---|---|---|---|---|---|
| 0B73 | D241 | 2365 | | JB6 | RETB | ;NO, RETURN NO AV |
| 0B75 | F1 | 2366 | | MOV | A,@R1 | ;IS LB/KG SWITCHING POSSIBLE? |
| 0B76 | 527E | 2367 | | JB2 | CARYON | ;NO, JUMP TO CARYON |
| 0B78 | F0 | 2368 | | MOV | A,@R0 | |
| 0B79 | B92D | 2369 | | MOV | R1,#STAT3 | ;IS SCALE MODE (LB/KG) SAME AS AT POWER-UP? |
| 0B7B | D1 | 2370 | | XRL | A,@R1 | |
| 0B7C | 3241 | 2371 | | JB1 | RETB | ;NO, RETURN NO AV |
| 0B7E | B82D | 2372 | CARYON: | MOV | R0,#STAT3 | |
| 0B80 | F0 | 2373 | | MOV | A,@R0 | ;IS SCALE IN NET MODE? |
| 0B81 | 7241 | 2374 | | JB3 | RETB | ;YES,RETURN NO AV |
| 0B83 | B92E | 2375 | | MOV | R1,#STAT4 | ;IS SCALE IN MOTION? |
| 0B85 | F1 | 2376 | | MOV | A,@R1 | |
| 0B86 | 37 | 2377 | | CPL | A | |
| 0B87 | D241 | 2378 | | JB6 | RETB | ;YES, RETURN NO AV |
| 0B89 | F0 | 2379 | | MOV | A,@R0 | ;SET THE AV DONE FLAG |
| 0B8A | 53BF | 2380 | | ANL | A,#0BFH | |
| 0B8C | A0 | 2381 | | MOV | @R0,A | |
| 0B8D | B86C | 2382 | | MOV | R0,#AVCNT | ;SET THE AV COUNTER |
| 0B8F | B020 | 2383 | | MOV | @R0,#20H | |
| 0B91 | B857 | 2384 | | MOV | R0,#STAT5 | ;SET 1ST AV ERROR FLAG |
| 0B93 | B001 | 2385 | | MOV | @R0,#01H | |
| 0B95 | B820 | 2386 | | MOV | R0,#STAT1 | ;OUTPUT AV IN PROCESS FLAG |
| 0B97 | B018 | 2387 | | MOV | @R0,#18H | ;DISABLE KB TARE |
| 0B99 | 1400 | 2388 | | CALL | DISPLY | ;DISPLAY UUUUUU (AV IN PROCESS) |
| 0B9B | B821 | 2389 | | MOV | R0,#STAT2 | |
| 0B9D | B010 | 2390 | | MOV | @R0,#10H | |
| 0B9F | 23E1 | 2391 | RELAY: | MOV | A,#0E1H | ;LATCH THE ANALOG VERIFY RELAY |
| 0BA1 | 3A | 2392 | | OUTL | P2,A | |
| 0BA2 | 9A01 | 2393 | | ANL | P2,#01H | |
| 0BA4 | B87C | 2394 | | MOV | R0,#AVFLTR | ;RESET AV FILTER COUNTER |
| 0BA6 | B0FB | 2395 | | MOV | @R0,#0FBH | |
| 0BA8 | 9460 | 2396 | AV1: | CALL | WFNM | ;DO AN A/D CONVERSION AND WAIT FOR NO MOTION |
| 0BAA | B87C | 2397 | | MOV | R0,#AVFLTR | |
| 0BAC | B92E | 2398 | | MOV | R1,#STAT4 | ;IS WGT CHANGE .LT. 2 MINOR INCREMENTS |
| 0BAE | F1 | 2399 | | MOV | A,@R1 | |
| 0BAF | 37 | 2400 | | CPL | A | |
| 0BB0 | 52A8 | 2401 | | JB2 | AV1 | ;NO, CONTINUE A/D PROCESS TILL CHANGE .LT. 2 MINOR INCR, JUMP AV1 |
| 0BB2 | F0 | 2402 | | MOV | A,@R0 | ;IS WGT CHANGE BEEN .LT. 2 MINOR INCR FOR 1 SECOND |
| 0BB3 | C6B8 | 2403 | | JZ | AV2 | ;YES, GO READ ANALOG VERIFY SWITCH REGISTER, JUMP AV2 |
| 0BB5 | 10 | 2404 | | INC | @R0 | ;NO, INCREMENT AV FILTER COUNTER |
| 0BB6 | 64A8 | 2405 | | JMP | AV1 | ;CONTINUE A/D PROCESS TILL .LT. 2 MINOR INCR FOR1 SECOND |
| 0BB8 | B827 | 2406 | AV2: | MOV | R0,#TARBCD+2 | |
| 0BBA | BA03 | 2407 | | MOV | R2,#03H | ;READ THE 6 DIGIT AV SWITCH MATRIX AND STORE VALUE |
| 0BBC | B9D0 | 2408 | | MOV | R1,#0D0H | ; IN TARBCD REGISTER |
| 0BBE | F9 | 2409 | SVLOOP: | MOV | A,R1 | |
| 0BBF | 3A | 2410 | | OUTL | P2,A | |
| 0BC0 | 09 | 2411 | | IN | A,P1 | |
| 0BC1 | 47 | 2412 | | SWAP | A | |
| 0BC2 | 53F0 | 2413 | | ANL | A,#0F0H | |
| 0BC4 | AB | 2414 | | MOV | R3,A | |
| 0BC5 | 19 | 2415 | | INC | R1 | |
| 0BC6 | F9 | 2416 | | MOV | A,R1 | |
| 0BC7 | 3A | 2417 | | OUTL | P2,A | |
| 0BC8 | 09 | 2418 | | IN | A,P1 | |
| 0BC9 | 530F | 2419 | | ANL | A,#0FH | |
| 0BCB | 4B | 2420 | | ORL | A,R3 | |
| 0BCC | A0 | 2421 | | MOV | @R0,A | |
| 0BCD | C8 | 2422 | | DEC | R0 | |
| 0BCE | 19 | 2423 | | INC | R1 | |
| 0BCF | EABE | 2424 | | DJNZ | R2,SVLOOP | ;CONTINUE TILL ALL 6 DIGITS HAVE BEEN READ |
| 0BD1 | B822 | 2425 | | MOV | R0,#NETBCD | |
| 0BD3 | B925 | 2426 | | MOV | R1,#TARBCD | |
| 0BD5 | E5 | 2427 | | SEL | MB0 | |
| 0BD6 | 54D5 | 2428 | | CALL | MOV3 | ;SAVE SWITCH DATA FOR DISPLAY LATER |
| 0BD8 | 74FA | 2429 | | CALL | BCDBIN | ;CONVERT BCD SWITCH VALUE TO BINARY |
| 0BDA | B825 | 2430 | | MOV | R0,#TARBCD | ;CLEAR THE TARE DISPLAY |
| 0BDC | B0FF | 2431 | | MOV | @R0,#0FFH | |
| 0BDE | B854 | 2432 | | MOV | R0,#TEMP4 | ;SAVE THE AV WEIGHT FOR DISPLAY |
| 0BE0 | B944 | 2433 | | MOV | R1,#RAWCNT | |
| 0BE2 | 54D5 | 2434 | | CALL | MOV3 | |
| 0BE4 | B94D | 2435 | | MOV | R1,#TEMP3 | |
| 0BE6 | B844 | 2436 | | MOV | R0,#RAWCNT | |
| 0BE8 | 9443 | 2437 | | CALL | SUB3 | ;SUBTRACT BINARY SWITCH DATA FROM AV WGT MINOR COUNTS |
| 0BEA | B40A | 2438 | | CALL | ABS3 | |
| 0BEC | 27 | 2439 | | CLR | A | |
| 0BED | 54F1 | 2440 | | CALL | TEST2 | ;IS ERROR .GT. 20 MINOR COUNTS? |
| 0BEF | ?664 | 2441 | | JNZ | AVERRP | ;YES, GO ANALOG VERIFY ERROR (AVERR) |
| 0BF1 | F0 | 2442 | | MOV | A,@R0 | |
| 0BF2 | 03EC | 2443 | | ADD | A,#-20D | |
| 0BF4 | F664 | 2444 | | JC | AVERRP | ;YES, GO ANALOG VERIFY ERROR (AVERR) |
| 0BF6 | B879 | 2445 | | MOV | R0,#TEMP8 | |
| 0BF8 | B929 | 2446 | | MOV | R1,#SWTCH1 | ;ADDR F.S. INCR SWS |
| 0BFA | F1 | 2447 | | MOV | A,@R1 | |
| 0BFB | 47 | 2448 | | SWAP | A | |
| 0BFC | E7 | 2449 | | RL | A | |
| 0BFD | 531F | 2450 | | ANL | A,#1FH | ;MASK OFF ALL BUT F.S. INCR SWS |
| 0BFF | E7 | 2451 | | RL | A | |
| 0C00 | 0384 | 2452 | | ADD | A,#SPNFCT AND 0FFH | |
| 0C02 | A9 | 2453 | | MOV | R1,A | |
| 0C03 | A3 | 2454 | | MOVP | A,@A | ;LOOK UP SPAN FACTER MPLR |
| 0C04 | A0 | 2455 | | MOV | @R0,A | ;STORE IN TEMP8 |
| 0C05 | 18 | 2456 | | INC | R0 | |
| 0C06 | 19 | 2457 | | INC | R1 | |
| 0C07 | F9 | 2458 | | MOV | A,R1 | |
| 0C08 | A3 | 2459 | | MOVP | A,@A | ;LOOK UP SPAN FACTOR MPLR LSB+1 |
| 0C09 | A0 | 2460 | | MOV | @R0,A | ;STORE IN TEMP8 |

| LOC OBJ | LINE | SOURCE STATEMENT | |  |
|---|---|---|---|---|
| 0C0A 18 | 2461 | | INC | R0 |
| 0C0B B000 | 2462 | | MOV | @R0,#00H |
| 0C0D B979 | 2463 | | MOV | R1,#TEMP8 |
| 0C0F B83E | 2464 | | MOV | R0,#TEMP2 |
| 0C11 94B6 | 2465 | | CALL | CLR3 |
| 0C13 B844 | 2466 | | MOV | R0,#RAWCNT |
| 0C15 F0 | 2467 | | MOV | A,@R0 |
| 0C16 97 | 2468 | | CLR | C |
| 0C17 67 | 2469 | | RRC | A | ;DIVIDE ERROR BY 2 |
| 0C18 C654 | 2470 | | JZ | NSPCRT | ;ERROR .EQ. 0, NO CORRECTION, JUMP NSPCRT |
| 0C1A AA | 2471 | | MOV | R2,A |
| 0C1B B83E | 2472 | | MOV | R0,#TEMP2 |
| 0C1D 54E1 | 2473 | MSPFCT: | CALL | ADD3 | ;MULTIPLY ERROR BY SPAN FACTOR |
| 0C1F EA1D | 2474 | | DJNZ | R2,MSPFCT |
| 0C21 B423 | 2475 | | CALL | SIGN3 | ;CORRECTLY SET SIGN |
| 0C23 B95D | 2476 | | MOV | R1,#SPANRG |
| 0C25 B879 | 2477 | | MOV | R0,#TEMP8 |
| 0C27 5405 | 2478 | | CALL | MOV3 | ;SPAN REG > TEMP8 |
| 0C29 B93E | 2479 | | MOV | R1,#TEMP2 |
| 0C2B 94A3 | 2480 | | CALL | SUB3 | ;CREATE NEW SPAN REG VALUE |
| 0C2D B40A | 2481 | | CALL | ABS3 |
| 0C2F B876 | 2482 | | MOV | R0,#TEMP7 |
| 0C31 B929 | 2483 | | MOV | R1,#SWTCH1 |
| 0C33 F1 | 2484 | | MOV | A,@R1 |
| 0C34 47 | 2485 | | SWAP | A |
| 0C35 E7 | 2486 | | RL | A |
| 0C36 531F | 2487 | | ANL | A,#1FH | ;MASK OFF ALL BUT BUILD SWS |
| 0C38 E7 | 2488 | | RL | A |
| 0C39 03A8 | 2489 | | ADD | A,#SPNMPR AND 0FFH |
| 0C3B A9 | 2490 | | MOV | R1,A |
| 0C3C A3 | 2491 | | MOVP | A,@A | ;LOOK UP SPAN MPLR MAX VALUE |
| 0C3D A0 | 2492 | | MOV | @R0,A | ;STORE IN TEMP7 |
| 0C3E 18 | 2493 | | INC | R0 |
| 0C3F 19 | 2494 | | INC | R1 |
| 0C40 F9 | 2495 | | MOV | A,R1 |
| 0C41 A3 | 2496 | | MOVP | A,@A | ;LOOK UP SPAN MPLR MAX VALUE |
| 0C42 A0 | 2497 | | MOV | @R0,A | ;STORE IN TEMP7 |
| 0C43 18 | 2498 | | INC | R0 |
| 0C44 B000 | 2499 | | MOV | @R0,#00H |
| 0C46 B876 | 2500 | | MOV | R0,#TEMP7 |
| 0C48 B979 | 2501 | | MOV | R1,#TEMP8 |
| 0C4A 94A3 | 2502 | | CALL | SUB3 | ;IS THE NEW SPAN REG VALUE .GT. MAXIMUM VALUE |
| 0C4C F654 | 2503 | | JC | NSPCRT | ;YES, NO SPAN CORRECTION, JUMP NSPCRT |
| 0C4E B93E | 2504 | | MOV | R1,#TEMP2 |
| 0C50 B85D | 2505 | | MOV | R0,#SPANRG |
| 0C52 94A3 | 2506 | | CALL | SUB3 | ;UPDATE SPAN REG WITH NEW VALUE |
| 0C54 B844 | 2507 | NSPCRT: | MOV | R0,#RAWCNT |
| 0C56 F0 | 2508 | | MOV | A,@R0 |
| 0C57 03F6 | 2509 | | ADD | A,#-0AH | ;IS ERROR .LT. 10 MINOR INCR? |
| 0C59 F6D4 | 2510 | | JC | AVERR | ;NO, GO ANALOG VERFIY ERROR ROUTINE |
| 0C5B 23E0 | 2511 | EXITAV: | MOV | A,#0E0H |
| 0C5D 3A | 2512 | | OUTL | P2,A | ;RELEASE AV RELAY |
| 0C5E 9A01 | 2513 | | ANL | P2,#01H |
| 0C60 E5 | 2514 | WFNM: | SEL | MB0 | ;PERFORM AN A/D CONVERSION AND WAIT FOR NO MOTION |
| 0C61 B9C9 | 2515 | | MOV | R1,#0C9H | ;WAIT FOR A/D TO RESET |
| 0C63 EA63 | 2516 | W1LOOP: | DJNZ | R2,W1LOOP |
| 0C65 E963 | 2517 | | DJNZ | R1,W1LOOP |
| 0C67 5437 | 2518 | | CALL | AD | ;DO AN A/D CONVERSION |
| 0C69 B844 | 2519 | | MOV | R0,#RAWCNT |
| 0C6B B963 | 2520 | | MOV | R1,#ZROCNT | ;SUBTRACT OFF THE ZERO VALUE IN RAW COUNTS |
| 0C6D 94A3 | 2521 | | CALL | SUB3 |
| 0C6F B40A | 2522 | | CALL | ABS3 |
| 0C71 A5 | 2523 | | CLR | F1 | ;ADD VARIABLE SPAN REG TO FIXED SPAN CONSTANT TO FORM SPAN MULTIPLIER |
| 0C72 D4E9 | 2524 | | CALL | SPAN | ;MULTIPLY AV RAW COUNTS BY SPAN MULTIPLIER |
| 0C74 F5 | 2525 | | SEL | MB1 | ; |
| 0C75 D4BA | 2526 | | CALL | IFILTR | ;FILTER AV RAW COUNTS |
| 0C77 E5 | 2527 | | SEL | MB0 | ; |
| 0C78 F407 | 2528 | | CALL | NODIGI | ;CONVERT COUNTS TO INCREMENTS |
| 0C7A 548E | 2529 | | CALL | MCHK | ;PERFORM MOTION CHECK |
| 0C7C B82E | 2530 | | MOV | R0,#STAT4 | ;IS SCALE IN MOTION? |
| 0C7E F0 | 2531 | | MOV | A,@R0 |
| 0C7F 37 | 2532 | | CPL | A |
| 0C80 D260 | 2533 | | JB6 | WFNM | ;YES, CONTINUE A/D PROCESS TILL NO MOTION |
| 0C82 F5 | 2534 | | SEL | MB1 | ;NO MOTION RETURN |
| 0C83 83 | 2535 | | RET | |
| | 2536 | ; | | |
| | 2537 | | ;*** SPAN FACTOR MPLRS *** | |
| | 2538 | ; | | |
| 0C84 90 | 2539 | SPNFCT: | DB | 090H,006H | ;MPLR FOR 1000 INCR |
| 0C85 06 | | | | | |
| 0C86 60 | 2540 | | DB | 060H,004H | ;MPLR FOR 1500 INCR |
| 0C87 04 | | | | | |
| 0C88 DC | 2541 | | DB | 0DCH,003H | ;MPLR FOR 1700 INCR |
| 0C89 03 | | | | | |
| 0C8A 48 | 2542 | | DB | 048H,003H | ;MPLR FOR 2000 INCR |
| 0C8B 03 | | | | | |
| 0C8C A0 | 2543 | | DB | 0A0H,002H | ;MPLR FOR 2500 INCR |
| 0C8D 02 | | | | | |
| 0C8E 30 | 2544 | | DB | 030H,002H | ;MPLR FOR 3000 INCR |
| 0C8F 02 | | | | | |
| 0C90 EE | 2545 | | DB | 0EEH,001H | ;MPLR FOR 3400 INCR |
| 0C91 01 | | | | | |
| 0C92 A4 | 2546 | | DB | 0A4H,001H | ;MPLR FOR 4000 INCR |
| 0C93 01 | | | | | |
| 0C94 50 | 2547 | | DB | 050H,001H | ;MPLR FOR 5000 INCR |
| 0C95 01 | | | | | |
| 0C96 18 | 2548 | | DB | 018H,001H | ;MPLR FOR 6000 INCR |
| 0C97 01 | | | | | |

```
LOC  OBJ    LINE    SOURCE STATEMENT
0C98 F7     2549    DB     0F7H,000H    ;MPLR FOR 6800 INCR
0C99 00
0C9A D2     2550    DB     0D2H,000H    ;MPLR FOR 8000 INCR
0C9B 00
0C9C C6     2551    DB     0C6H,000H    ;MPLR FOR 8500 INCR
0C9D 00
0C9E A8     2552    DB     0A8H,000H    ;MPLR FOR 10000 INCR
0C9F 00
0CA0 8C     2553    DB     08CH,000H    ;MPLR FOR 12000 INCR
0CA1 00
0CA2 69     2554    DB     069H,000H    ;MPLR FOR 16000 INCR
0CA3 00
0CA4 63     2555    DB     063H,000H    ;MPLR FOR 17000 INCR
0CA5 00
0CA6 54     2556    DB     054H,000H    ;MPLR FOR 20000 INCR
0CA7 00
            2557           ;
            2558           ;*** SPAN REG MAXIMUM VALUE ***
            2559
0CA8 A0     2560 SPNMPR: DB 0A0H,041H   ;1000 INCR
0CA9 41
0CAA C0     2561    DB     0C0H,02BH    ;1500 INCR
0CAB 2B
0CAC 9A     2562    DB     09AH,026H    ;1700 INCR
0CAD 26
0CAE D0     2563    DB     0D0H,020H    ;2000 INCR
0CAF 20
0CB0 40     2564    DB     040H,01AH    ;2500 INCR
0CB1 1A
0CB2 E0     2565    DB     0E0H,015H    ;3000 INCR
0CB3 15
0CB4 4D     2566    DB     04DH,013H    ;3400 INCR
0CB5 13
0CB6 68     2567    DB     068H,010H    ;4000 INCR
0CB7 10
0CB8 20     2568    DB     020H,00DH    ;5000 INCR
0CB9 0D
0CBA F0     2569    DB     0F0H,00AH    ;6000 INCR
0CBB 0A
0CBC A7     2570    DB     0A7H,009H    ;6800 INCR
0CBD 09
0CBE 34     2571    DB     034H,008H    ;8000 INCR
0CBF 08
0CC0 B8     2572    DB     0B8H,007H    ;8500 INCR
0CC1 07
0CC2 90     2573    DB     090H,006H    ;10000 INCR
0CC3 06
0CC4 78     2574    DB     078H,005H    ;12000 INCR
0CC5 05
0CC6 1A     2575    DB     01AH,004H    ;16000 INCR
0CC7 04
0CC8 DC     2576    DB     0DCH,003H    ;17000 INCR
0CC9 03
0CCA 48     2577    DB     048H,003H    ;20000 INCR
0CCB 03
            2578
0CCC A403   2579 PTESTW: JMP  TESTWP    ;PAGING ERROR CORRECTION
            2580           ;
            2581           ;
            2582 TESTC: TST  0CH        ;TEST MEMORY ON PAGE C
0CCE F0     2583+       MOV  A,@R0      ;LOAD ROM POINTER INTO ACCUMULATOR
0CCF A3     2584+       MOVP A,@A       ;FETCH ROM VALUE ADDRESSED BY R0
0CD0 61     2589+       ADD  A,@R1      ;ADD ROM VALUE TO ROM CHECKSUM REGISTER
0CD1 A1     2590+       MOV  @R1,A      ;UPDATE ROM CHECKSUM REGISTER
0CD2 A4D4   2591        JMP  TESTD      ;
            2592           ;
            2593           ;*** ANALOG VERIFY ERROR ROUTINE ***
            2594           ;
0CD4 F5     2595 AVERR: SEL  MB1
0CD5 B857   2596        MOV  R0,#STAT5  ;IS THIS THE FIRST AV ERROR?
0CD7 F0     2597        MOV  A,@R0
0CD8 12CC   2598        JB0  PTESTW     ;YES, GO CHECK FOR WEIGHT ON SCALE
0CDA B828   2599        MOV  R0,#COMMND
0CDC F0     2600        MOV  A,@R0      ;WAS THE AV BUTTON PRESSED AFTER START OF AV MODE?
0CDD E7     2601        RL   A
0CDE 5310   2602        ANL  A,#10H
0CE0 B821   2603        MOV  R0,#STAT2  ;YES, DISPLAY AV WEIGHT OR AV MATRIX SWS BASED ON
0CE2 D0     2604        XRL  A,@R0      ;EXPAND MODE SWITCH
0CE3 A0     2605        MOV  @R0,A
0CE4 842A   2606        CALL SWTCRD     ;READ PROGRAM SWITCHES
0CE6 D495   2607        CALL BLDADJ     ;ADJUST BUILD SWITCHES
0CE8 B82B   2608        MOV  R0,#SWTCH3 ;IN EXPAND MODE???
0CEA F0     2609        MOV  A,@R0
0CEB 92FE   2610        JB4  DSPSWT     ;YES, GO TO DSPSWT AND DISPLAY MATRIX SWITCH VAUE
0CED B820   2611        MOV  R0,#STAT1  ;EXPAND SWITCH IS NOT SET,CONVERT ANALOG
0CEF B008   2612        MOV  @R0,#08H   ;VERIFY WEIGHT TO BCD AND DISPLAY
0CF1 B954   2613        MOV  R1,#TEMP4
0CF3 B835   2614        MOV  R0,#TEMP
0CF5 E5     2615        SEL  MB0
0CF6 54D5   2616        CALL MOV3
0CF8 840A   2617        CALL ABS3
0CFA B822   2618        MOV  R0,#WETBCD
0CFC 9433   2619        CALL BINBCD     ;CONVERT ANALOG VERIFY WEIGHT TO BCD
0CFE F5     2620 DSPSWT: SEL MB1
0CFF 1400   2621        CALL DISPLY     ;OUTPUT AV ERROR MESSAGE, AV WEIGHT, OR AV MATRIX SWS TO DISPLAY MICRO
0D01 64A8   2622        JMP  AV1        ;GO TO AV1 CONTINUE AV IN PROCESS
0D03 53FE   2623 TESTWP: ANL A,#0FEH    ;THIS WAS FIRST AV ATTEMPT,RESULT OUT OF TOLLERANCE
```

```
LOC  OBJ    LINE          SOURCE STATEMENT

0D05 A0     2624          MOV    @R0,A              ;CHECK FOR WEIGHT ON SCALE
0D06 23E0   2625          MOV    A,#0E0H            ;
0D08 3A     2626          OUTL   P2,A               ;DE-ACTIVATE ANALOG VERIFY RELAY AND WAIT 1 SECOND
0D09 9A01   2627          ANL    P2,#01H
0D0B B805   2628          MOV    R0,#05H
0D0D EA0D   2629 ERLOOP:  DJNZ   R2,ERLOOP
0D0F E90D   2630          DJNZ   R1,ERLOOP
0D11 E80D   2631          DJNZ   R0,ERLOOP
0D13 9460   2632          CALL   WFNM               ;DO AN A/D CONVERSION AND WAIT FOR NO MOTION
0D15 E5     2633          SEL    MB0
0D16 B844   2634          MOV    R0,#RAWCNT         ;IS THE SCALE AT ZERO WITHIN 2 INCREMENTS?
0D18 B40A   2635          CALL   ABS3               ;(IS THERE A WEIGHT ON THE SCALE?)
0D1A F0     2636          MOV    A,@R0
0D1B 03EC   2637          ADD    A,#-20D
0D1D F624   2638          JC     NERRV              ;NO, THE USER MUST HAVE SOME WEIGHT ON SCALE, JUMP NEERV
0D1F 27     2639          CLR    A
0D20 54F1   2640          CALL   TEST2              ;TEST MS BYTES FOR ZERO
0D22 C627   2641          JZ     RELAYC             ;SCALE .LT. 2 INCR GO REACTIVATE RELAY
0D24 F5     2642 NERRV:   SEL    MB1                ;WEIGHT WAS GREATER THAN 2 INCREMENTS,GO EXIT
0D25 845B   2643          JMP    EXITAV             ;ANALOG VERIFY AND RETURN SCALE TO NORMAL OPERATION
            2644                                    ;
0D27 F5     2645 RELAYC:  SEL    MB1                ;SCALE WAS WITHIN 2 INCREMENTS OF ZERO
0D28 649F   2646          JMP    RELAY              ;RE-ACTIVATE ANALOG VERIFY RELAY AND TEST AGAIN
            2647          ;
            2648          ;*** PROGRAM SWITCH READ ROUTINE ***
            2649          ;
            2650          ;THIS ROUTINE READS PROGRAM FUNCTION SWITCHES AND STORES
            2651          ;THE DATA IN LOCATIONS SWTCH1 THRU SWTCH4
            2652          ;
0D2A B90B   2653 SWTCRD:  MOV    R1,#0BH
0D2C B829   2654          MOV    R0,#SWTCH1         ;ADDRESS SWTCH1 REGISTER
0D2E BA04   2655          MOV    R2,#04H
0D30 F9     2656 ISLOOP:  MOV    A,R1
0D31 47     2657          SWAP   A
0D32 3A     2658          OUTL   P2,A               ;OUTPUT SWITCH ADDRESS
0D33 89FF   2659          ORL    P1,#0FFH
0D35 09     2660          IN     A,P1               ;INPUT SWITCH DATA
0D36 37     2661          CPL    A
0D37 AD     2662          MOV    R5,A               ;REVERSE THE BYTE
0D38 BB08   2663          MOV    R3,#08H
0D3A FD     2664 SWAPLP:  MOV    A,R5
0D3B F7     2665          RLC    A
0D3C AD     2666          MOV    R5,A
0D3D FE     2667          MOV    A,R6
0D3E 67     2668          RRC    A
0D3F AE     2669          MOV    R6,A
0D40 EB3A   2670          DJNZ   R3,SWAPLP
0D42 A0     2671          MOV    @R0,A              ;STORE SWITCH DATA
0D43 18     2672          INC    R0
0D44 C9     2673          DEC    R1
0D45 EA30   2674          DJNZ   R2,ISLOOP          ;CONTINUE TILL ALL SWITCHES READ
0D47 83     2675          RET
            2676          ;
            2677          ;*** PARALELL OUTPUT ROUTINE ***
            2678          ;
0D48 B82E   2679 PARALL:  MOV    R0,#STAT4          ;IS SCALE IN AN UNDERFLOW CONDITION?
0D4A F0     2680          MOV    A,@R0
0D4B 32C3   2681          JB1    RETD               ;YES, GROSS WGT IS .GT. 7 PERCENT NEGATIVE, RETURN
0D4D 9A00   2682          ANL    P2,#00H            ;ADDRESS HOLD LINE
0D4F 23C0   2683          MOV    A,#0C0H
0D51 997F   2684          ANL    P1,#7FH            ;DE-ACTIVATE THE PRINTER
0D53 3A     2685          OUTL   P2,A
0D54 09     2686          IN     A,P1               ;INPUT HOLD LINE
0D55 37     2687          CPL    A
0D56 7248   2688          JB3    PARALL             ;LOOP TO PARALL IF HOLD LINE IS SET
0D58 BADF   2689          MOV    R2,#BUILDC-0A00H
0D5A 549C   2690          CALL   BUILD              ;BUILD PARRALEL STATUS BYTE
0D5C 47     2691          SWAP   A
0D5D 53F0   2692          ANL    A,#0F0H            ;PREPARE STATUS BYTE FOR OUTPUT
0D5F D3B0   2693          XRL    A,#0B0H
0D61 AF     2694          MOV    R7,A
0D62 B835   2695          MOV    R0,#TEMP
0D64 B922   2696          MOV    R1,#WETBCD
0D66 E5     2697          SEL    MB0
0D67 54D5   2698          CALL   MOV3               ;MOVE DISPLAY WEIGHT DATA TO TEMP FOR OUTPUT
0D69 B92A   2699          MOV    R1,#SWTCH2         ;IS THE SCALE IN X10,X20,X50,X100,X200 MODE?
0D6B F1     2700          MOV    A,@R1
0D6C 5306   2701          ANL    A,#06H
0D6E 9680   2702          JNZ    NOREST             ;NO,JUMP NOREST
0D70 BA04   2703          MOV    R2,#04H            ;YES, SCALE IN X10,X20,X50,X100,X200 MODE
0D72 B487   2704 RESTLP:  CALL   SHR3               ;ROTATE LSD 0 OUT OF DATA FIELD
0D74 EA72   2705          DJNZ   R2,RESTLP
0D76 B837   2706          MOV    R0,#TEMP+2         ;KEEP SIGN IN MSD LOCATION
0D78 F0     2707          MOV    A,@R0
0D79 03F6   2708          ADD    A,#-0AH
0D7B E680   2709          JNC    NOREST
0D7D F0     2710          MOV    A,@R0
0D7E 47     2711          SWAP   A
0D7F A0     2712          MOV    @R0,A
0D80 B837   2713 NOREST:  MOV    R0,#TEMP+2         ;CHECK TEMP REG FOR A 6TH DIGIT
0D82 F0     2714          MOV    A,@R0
0D83 53F0   2715          ANL    A,#0F0H            ;IS THERE A SIXTH DIGIT??
0D85 C69B   2716          JZ     FIVE               ;NO, GO FIVE
0D87 0330   2717          ADD    A,#-0D0H           ;YES,A 6TH DIGIT EXITS,IS IT A MINUS SIGN?
0D89 C69B   2718          JZ     FIVE               ;YES, THE 6TH DIGIT IS A MINUS SIGN, GO FIVE
0D8B 03E0   2719          ADD    A,#0D0H-0F0H       ;IS THE 6TH DIGIT A BLANK?
0D8D C69B   2720          JZ     FIVE               ;YES, 6TH DIGIT IS A BLANK, GO FIVE
0D8F B835   2721          MOV    R0,#TEMP
```

```
LOC  OBJ       LINE         SOURCE STATEMENT

0D91 BA03      2722           MOV   R2,#03H
0D93 9485      2723           CALL  OVLOOP           ;CLEAR THE DATA OUTPUT AN OVERFLOW EXITS
0D95 FF        2724           MOV   A,R7
0D96 4310      2725           ORL   A,#10H           ;SET THE OVERFLOW FLAG
0D98 AF        2726           MOV   R7,A
0D99 B837      2727           MOV   R0,#TEMP+2
0D9B F0        2728 FIVE:     MOV   A,@R0
0D9C 530F      2729           ANL   A,#0FH
0D9E 4F        2730           ORL   A,R7
0D9F A0        2731           MOV   @R0,A            ;COMBINED DATA & FLAGS FOR OUTPUT
0DA0 BA03      2732           MOV   R2,#03H
0DA2 BB30      2733           MOV   R3,#30H
0DA4 F5        2734           SEL   MB1
0DA5 B901      2735           MOV   R1,#01H
0DA7 47        2736 POLOOP:   SWAP  A
0DA8 F0        2737           MOV   A,@R0            ;OUTPUT THE DATA 4 BITS AT A TIME
0DA9 47        2738           SWAP  A
0DAA B4C4      2739           CALL  OUTBYT
0DAC F0        2740           MOV   A,@R0
0DAD B4C4      2741           CALL  OUTBYT
0DAF C8        2742           DEC   R0
0DB0 FB        2743           MOV   A,R3
0DB1 03F0      2744           ADD   A,#-10H
0DB3 AB        2745           MOV   R3,A
0DB4 EAA7      2746           DJNZ  R2,POLOOP        ;CONTINUE TILL DATA OUTPUT IS COMPLETE
0DB6 2340      2747           MOV   A,#40H
0DB8 3A        2748           OUTL  P2,A             ;OUTPUT SYNC PULSE
0DB9 B808      2749           MOV   R0,#08H
0DBB E9BB      2750 SYLOOP:   DJNZ  R1,SYLOOP
0DBD E8BB      2751           DJNZ  R0,SYLOOP
0DBF 9A00      2752           ANL   P2,#00H          ;CLEAR THE SYNC PULSE
0DC1 89FF      2753           ORL   P1,#0FFH         ;RE-ACTIVATE THE PRINTER
0DC3 83        2754 RETD:     RET
               2755         ;
               2756         ;*** PARRALELL 4 BIT OUTPUT ROUTINE ***
               2757         ;
0DC4 37        2758 OUTBYT:   CPL   A
0DC5 530F      2759           ANL   A,#0FH
0DC7 E9CE      2760           DJNZ  R1,RMVB
0DC9 6B        2761 RMVB1:    ADD   A,R3
0DCA 3A        2762           OUTL  P2,A
0DCB 9A0F      2763           ANL   P2,#0FH
0DCD 83        2764           RET
0DCE 96C9      2765 RMVB:     JNZ   RMVB1
0DD0 230F      2766           MOV   A,#0FH
0DD2 A4C9      2767           JMP   RMVB1
               2768         ;
               2769 TESTD:    TST   0DH              ;TEST MEMORY ON PAGE D
0DD4 F0        2770+          MOV   A,@R0            ;LOAD ROM POINTER INTO ACCUMULATOR
0DD5 A3        2771+          MOVP  A,@A             ;FETCH ROM VALUE ADDRESSED BY R0
0DD6 61        2776+          ADD   A,@R1            ;ADD ROM VALUE TO ROM CHECKSUM REGISTER
0DD7 A1        2777+          MOV   @R1,A            ;UPDATE ROM CHECKSUM REGISTER
0DD8 E430      2778           JMP   TESTF            ;
               2779         ;
               2780         ;*** BCD SUBTRACT ROUTINE ***
               2781         ;
0DDA BA03      2782 BCDSUB:   MOV   R2,#03H
0DDC 97        2783           CLR   C
0DDD F0        2784 BCDSB1:   MOV   A,@R0
0DDE 1365      2785           ADDC  A,#65H
0DE0 37        2786           CPL   A
0DE1 61        2787           ADD   A,@R1
0DE2 57        2788           DA    A
0DE3 A1        2789           MOV   @R1,A
0DE4 18        2790           INC   R0
0DE5 19        2791           INC   R1
0DE6 A7        2792           CPL   C
0DE7 EADD      2793           DJNZ  R2,BCDSB1
0DE9 C407      2794           JMP   RSTRM
               2795         ;
               2796         ;*** BCD COMPLEMENT ROUTINE ***
               2797         ;
0DEB BA03      2798 BCDCPL:   MOV   R2,#03H
0DED 97        2799           CLR   C
0DEE F1        2800 BCDCP1:   MOV   A,@R1
0DEF 1365      2801           ADDC  A,#65H
0DF1 37        2802           CPL   A
0DF2 0300      2803           ADD   A,#00H
0DF4 57        2804           DA    A
0DF5 A1        2805           MOV   @R1,A
0DF6 19        2806           INC   R1
0DF7 A7        2807           CPL   C
0DF8 EAEE      2808           DJNZ  R2,BCDCP1
0DFA C40A      2809           JMP   RSTRM1
               2810         ;
               2811         ;*** BCD ADD ROUTINE ***
               2812         ;
0DFC BA03      2813 BCDADD:   MOV   R2,#03H
0DFE 97        2814           CLR   C
0DFF F0        2815 BCDAD1:   MOV   A,@R0
0E00 71        2816           ADDC  A,@R1
0E01 57        2817           DA    A
0E02 A1        2818           MOV   @R1,A
0E03 18        2819           INC   R0
0E04 19        2820           INC   R1
0E05 EA0E      2821           DJNZ  R2,BCDAD2
0E07 C8        2822 RSTRM:    DEC   R0               ;RESTORE R0 POINTER
0E08 C8        2823           DEC   R0
```

```
LOC  OBJ    LINE         SOURCE STATEMENT

0E09 C8     2824         DEC    R0
0E0A C9     2825 RSTRM1: DEC    R1         ;RESTORE R1 POINTER
0E0B C9     2826         DEC    R1
0E0C C9     2827         DEC    R1
0E0D 83     2828         RET
            2829         ;
0E0E A4FF   2830 BCDAD2: JMP    BCDAD1     ;PAGING ERROR CORRECTION
            2831
            2832         ;
            2833         ;*** TEST RAM AND ROM ROUTINE ***
            2834         ;
0E10 B87F   2835 TEST:   MOV    R0,#7FH    ;TEST RAM
0E12 F8     2836 RALOOP: MOV    A,R0
0E13 537E   2837         ANL    A,#07EH    ;ARE WE TESTING R0 OR R1 OF FIRST RB
0E15 961A   2838         JNZ    NEXT36
0E17 F8     2839         MOV    A,R0       ;IF SO, THEN SWITCH REGISTER BANKS
0E18 D5     2840         SEL    RB1
0E19 A8     2841         MOV    R0,A
0E1A F0     2842 NEXT36: MOV    A,@R0      ;READ THE CURRENT CONTENTS
0E1B A9     2843         MOV    R1,A       ;SAVE THEM
0E1C 37     2844         CPL    A
0E1D A0     2845         MOV    @R0,A      ;STORE THE COMPLIMENTED DATA
0E1E F0     2846         MOV    A,@R0      ;CHECK IF THE DATA STORED PROPERLY
0E1F 69     2847         ADD    A,R1       ;THAT IS-CAN ALL BITS BE 0 AND 1???
0E20 29     2848         XCH    A,R1
0E21 A0     2849         MOV    @R0,A      ;RESTORE THE DATA TO THE WAY IT WAS
0E22 F9     2850         MOV    A,R1
0E23 C5     2851         SEL    RB0
0E24 17     2852         INC    A          ;IS THE SUM OF THE DATA AND ITS CPL
0E25 9652   2853         JNZ    RAMERR     ;EQUAL TO 0FFH???
0E27 C8     2854         DEC    R0
0E28 F0     2855         MOV    A,@R0
0E29 37     2856         CPL    A
0E2A F212   2857         JB7    RALOOP     ;TEST THE NEXT BYTE
0E2C B86D   2858 RMLOOP: MOV    R0,#ROMPLC ;ROM TEST ROUTINE STARTS HERE
0E2E B96E   2859         MOV    R1,#ROMADD
            2860         TST    0EH        ;TEST MEMORY ON PAGE E
0E30 F0     2861+        MOV    A,@R0      ;LOAD ROM POINTER INTO ACCUMULATOR
0E31 A3     2862+        MOVP   A,@A       ;FETCH ROM VALUE ADDRESSED BY R0
0E32 61     2867+        ADD    A,@R1      ;ADD ROM VALUE TO ROM CHECKSUM REGISTER
0E33 A1     2868+        MOV    @R1,A      ;UPDATE ROM CHECKSUM REGISTER
0E34 F0     2869         MOV    A,@R0
0E35 E3     2870         MOVP3  A,@A       ;TEST MEMORY ON PAGE 3
0E36 61     2871         ADD    A,@R1
0E37 A1     2872         MOV    @R1,A
0E38 E5     2873         SEL    MB0
0E39 1438   2874         CALL   TEST0      ;TEST THE MEMORY ON ALL THE OTHER PAGES
0E3B 10     2875         INC    @R0
0E3C F0     2876         MOV    A,@R0      ;ARE WE DONE(DID WE GO THROUGH 16 BYTES/PAGE)
0E3D B821   2877         MOV    R0,#STAT2
0E3F C649   2878         JZ     EOTEST     ;DID WE GO THROUGH ALL OF ROM???
0E41 530F   2879         ANL    A,#0FH
0E43 962C   2880         JNZ    RMLOOP
0E45 F0     2881         MOV    A,@R0      ;ARE WE DISPLAYING AN ERROR NOW???
0E46 B250   2882         JB5    TESTCC     ;IF SO, LOCK UP SCALE
0E48 83     2883 RETOC:  RET
0E49 F1     2884 EOTEST: MOV    A,@R1
0E4A C648   2885         JZ     RETOC      ;CHANGE TO A JZ WITH CHECKSUM
0E4C B020   2886         MOV    @R0,#20H   ;DISPLAY A ROM ERROR
0E4E 1400   2887         CALL   DISPLY
0E50 C410   2888 TESTCC: JMP    TEST       ;TRY AGAIN
0E52 B821   2889 RAMERR: MOV    R0,#STAT2  ;SIGNAL A RAM ERROR AND
0E54 B040   2890         MOV    @R0,#40H   ;PREVENT SCALE FROM DOING ANYTHING ELSE
0E56 1400   2891         CALL   DISPLY
0E58 C410   2892         JMP    TEST
            2893         ;
            2894         ;*** SWITCH ADJUSTMENT ROUTINE ***
            2895         ;
            2896         ;THIS ROUTINE PERFORMS LB/KG INCREMENT
            2897         ;SIZE CHANGES,EXPAND MODE OPERATION
            2898         ;CHANGES,AND PREVENTS TARE ENTRY
            2899         ;UNDER CERTAIN CONDITIONS
            2900         ;
0E5A D495   2901 ADJSWT: CALL   BLDADJ     ;PERFORM BUILD ADJUSTMENTS FOR LB/KG
0E5C B82B   2902         MOV    R0,#SWTCH3
0E5E F0     2903         MOV    A,@R0
0E5F 37     2904         CPL    A
0E60 927C   2905         JB4    NOXPND     ;NOT IN EXPAND MODE GO NOEXPND
0E62 37     2906         CPL    A
0E63 4301   2907         ORL    A,#01H     ;LOAD 1 INTO ZERO DISABLE LOCATION
0E65 A0     2908         MOV    @R0,A
0E66 B82A   2909         MOV    R0,#SWTCH2 ;LOAD NO DEC PT INTO SWTCH2
0E68 B002   2910         MOV    @R0,#02H
0E6A B82C   2911         MOV    R0,#SWTCH4 ;REMOVE ALL PRINT FUNCTIONS EXCEPT HIGH SPEED (4800 BAUD) MODE
0E6C F0     2912         MOV    A,@R0
0E6D 5398   2913         ANL    A,#098H
0E6F A0     2914         MOV    @R0,A
0E70 B82B   2915         MOV    R0,#SWTCH3 ;STRIP OUT AV AND DEMAND FUNCTIONS
0E72 F0     2916         MOV    A,@R0
0E73 531F   2917         ANL    A,#1FH
0E75 A0     2918         MOV    @R0,A
0E76 B82D   2919         MOV    R0,#STAT3
0E78 F0     2920         MOV    A,@R0
0E79 5373   2921         ANL    A,#73H
0E7B A0     2922         MOV    @R0,A
0E7C B82D   2923 NOXPND: MOV    R0,#STAT3
0E7E F0     2924         MOV    A,@R0
0E7F 37     2925         CPL    A
```

```
LOC  OBJ     LINE          SOURCE STATEMENT
0E80 728A    2926             JB3    INTERD
0E82 B82A    2927             MOV    R0,#SWTCH2       ;IF TARE INTERLOCK IS ON AND WE ARE IN NET MODE
0E84 F0      2928             MOV    A,@R0            ;PREVENT TARE ENTERY
0E85 928A    2929             JB4    INTERD
0E87 4308    2930             ORL    A,#08H
0E89 A0      2931             MOV    @R0,A
0E8A B82A    2932 INTERD:     MOV    R0,#SWTCH2       ;IF THE TARE DISPLAY IS DISABLED, DISABLE
0E8C F0      2933             MOV    A,@R0            ;TARE ENTERY
0E8D 37      2934             CPL    A
0E8E F294    2935             JB7    RETE
0E90 37      2936             CPL    A
0E91 4308    2937             ORL    A,#08H
0E93 A0      2938             MOV    @R0,A
0E94 83      2939 RETE:       RET
             2940                    ;
             2941                    ;*** BUILD ADJUST ROUTINE ***
             2942                    ;
             2943                    ;THIS ROUTINE PERFORMS PROGRAM SWITCH ADJUSTMENTS
             2944                    ;FOR KG MODES IN DECIMAL POINT DATA AND INCREMENT SIZE
             2945                    ;FOR LB MODE NO ADJUSTMENTS MADE
             2946                    ;
0E95 B82D    2947 BLDADJ:     MOV    R0,#STAT3        ;IS SCALE IN KG MODE?
0E97 F0      2948             MOV    A,@R0
0E98 37      2949             CPL    A
0E99 32B9    2950             JB1    LB               ;SCALE IN LB MODE, GO LB
0E9B B829    2951             MOV    R0,#SWTCH1
0E9D F0      2952             MOV    A,@R0
0E9E AA      2953             MOV    R2,A             ;SAVE ORIGINAL SWTCH DATA
0E9F 07      2954             DEC    A                ;DECREMENT INCREMENT SIZE
0EA0 5303    2955             ANL    A,#03
0EA2 20      2956             XCH    A,@R0            ;NEW INCR SIZE > @R0
0EA3 53FC    2957             ANL    A,#0FCH          ;REMOVE OLD INCR SIZE FROM SWTCH1
0EA5 40      2958             ORL    A,@R0            ;FORM NEW SWTCH1
0EA6 A0      2959             MOV    @R0,A            ;STORE NEW SWTCH1 > SWTCH1
0EA7 FA      2960             MOV    A,R2             ;TEST FOR LB X1 TO KG X0.5 CHANGE
0EA8 32B9    2961             JB1    LB               ;NO LB X1 TO KG X0.5 CHANGE,GO LB
0EAA 4303    2962             ORL    A,#03H           ;CHANGE INCR SIZE
0EAC A0      2963             MOV    @R0,A
0EAD B82A    2964             MOV    R0,#SWTCH2       ;NOW CORRECT DEC PT POSITON
0EAF F0      2965             MOV    A,@R0
0EB0 5307    2966             ANL    A,#07H
0EB2 17      2967             INC    A
0EB3 A9      2968             MOV    R1,A
0EB4 F0      2969             MOV    A,@R0
0EB5 53F8    2970             ANL    A,#0F8H
0EB7 49      2971             ORL    A,R1
0EB8 A0      2972             MOV    @R0,A
0EB9 83      2973 LB:         RET
             2974                    ;
             2975                    ;
             2976                    ;*** INITIAL FILTER ROUTINE ***
             2977                    ;
             2978                    ;SUBROUTINE TO FILTER 200,000 BASED RAW DATA
             2979                    ;AT EXIT--RAWCNT AND OUTWET ARE EQUAL--
             2980                    ;EITHER ADJUSTED,JAMMED OR PREV OUTWET
             2981                    ;
0EBA E5      2982 IFILTR:     SEL    MB0              ;SELECT MEMORY BANK 0 FOR MATH ROUTINES
0EBB B835    2983             MOV    R0,#TEMP
0EBD B944    2984             MOV    R1,#RAWCNT
0EBF 54D5    2985             CALL   MOV3             ;MOVE RAW WT TO TEMP
0EC1 B97D    2986             MOV    R1,#FILTWT       ;SUB FILTWT FROM RAWWT AT TEMP
0EC3 94A3    2987             CALL   SUB3             ;RESULT TO TEMP
0EC5 B40A    2988             CALL   ABS3             ;CONVERT DIFFERENCE TO ABSOLUTE
0EC7 B837    2989             MOV    R0,#TEMP+2       ;CHECK 2 HIGH BYTES FOR 0
0EC9 F0      2990             MOV    A,@R0
0ECA 96EB    2991             JNZ    NOFILT           ;DIFF TOO GTREAT--NO FILT
0ECC C8      2992             DEC    R0
0ECD F0      2993             MOV    A,@R0
0ECE 96EB    2994             JNZ    NOFILT           ;DITTO
0ED0 C8      2995             DEC    R0               ;CHECK LEAST BYTE OF RESULT
0ED1 23FB    2996             MOV    A,#-5            ;NO FILTER IF DIFF EQ OR >5
0ED3 60      2997             ADD    A,@R0
0ED4 F6EB    2998             JC     NOFILT           ;TOO MUCH
             2999                    ;
             3000                    ;START FILTERED WEIGHT ADJUSTMENT
             3001                    ;
0ED6 F0      3002             MOV    A,@R0            ;RETREIVE LEAST BYTE OF RESULT
0ED7 C6E5    3003             JZ     NOADJ            ;NO CORRECTION IF ZERO
0ED9 67      3004             RRC    A                ;DIVIDE BY TWO
0EDA C6E5    3005             JZ     NOADJ            ;NO CORRECTION IF +/- 1
0EDC A0      3006             MOV    @R0,A            ;PUT FACTOR BACK
0EDD B423    3007             CALL   SIGN3            ;SET SENSE BASED ON SIGN IN F1
0EDF B87D    3008             MOV    R0,#FILTWT
0EE1 B935    3009             MOV    R1,#TEMP
0EE3 54E1    3010             CALL   ADD3             ;ADD CORRECTION FACTOR TO FILT WT
0EE5 B97D    3011 NOADJ:      MOV    R1,#FILTWT
0EE7 B844    3012             MOV    R0,#RAWCNT
0EE9 44D5    3013             JMP    MOV3
0EEB B87D    3014 NOFILT:     MOV    R0,#FILTWT       ;MOVE RAW WT TO FILT WT
0EED B944    3015             MOV    R1,#RAWCNT
0EEF 44D5    3016             JMP    MOV3
0EF1 B42A    3017 PWRON1:     CALL   SWTCRD
0EF3 E5      3018             SEL    MB0
0EF4 B82B    3019             MOV    R0,#SWTCH3       ;PRESET LB/KG FLAG
```

```
LOC  OBJ    LINE          SOURCE STATEMENT

OEF6 F0     3020          MOV    A,@R0
OEF7 5302   3021          ANL    A,#02H
OEF9 B92D   3022          MOV    R1,#STAT3
OEFB A1     3023          MOV    @R1,A
OEFC F0     3024          MOV    A,@R0                  ;PRESET POWER UP FLAG
OEFD 77     3025          RR     A
OEFE E4AF   3026          JMP    PWRON2
            3027                 ;
            3028                 ;*** GENERATE GROSS BCD ROUTINE ***
            3029                 ;
OF00 A5     3030 GGRBCD:  CLR    F1                     ;CLEAR SIGN FLAG
OF01 B857   3031          MOV    R0,#STAT5              ;TEST FOR NEGATIVE NET
OF03 F0     3032          MOV    A,@R0
OF04 B979   3033          MOV    R1,#TEMP8
OF06 B876   3034          MOV    R0,#TEMP7
OF08 320E   3035          JB1    GRBCD1                 ;GO SUBTRACT IF NEGATIVE
OF0A B4FC   3036          CALL   BCDADD
OF0C E415   3037          JMP    GRBCD2
OF0E B4DA   3038 GRBCD1:  CALL   BCDSUB
OF10 E615   3039          JNC    GRBCD2
OF12 B5     3040          CPL    F1
OF13 B4EB   3041          CALL   BCDCPL
OF15 E5     3042 GRBCD2:  SEL    MB0
OF16 54F0   3043          CALL   TEST3                  ;TEST FOR NEGATIVE ZERO
OF18 961B   3044          JNZ    GRBCD3
OF1A A5     3045          CLR    F1
OF1B B82D   3046 GRBCD3:  MOV    R0,#STAT3              ;SET OR RESET GROSS ZERO FLAG
OF1D F0     3047          MOV    A,@R0
OF1E 4301   3048          ORL    A,#01H
OF20 7624   3049          JF1    GRBCD4
OF22 53FE   3050          ANL    A,#0FEH
OF24 A0     3051 GRBCD4:  MOV    @R0,A
OF25 B97B   3052          MOV    R1,#TEMP8+2
OF27 D484   3053          CALL   BLNKIT
OF29 762C   3054          JF1    GRBCD5
OF2B 83     3055          RET
OF2C B87B   3056 GRBCD5:  MOV    R0,#TEMP8+2
OF2E E485   3057          JMP    NSIGN2
            3058                 ;
            3059 TESTF:   TST    0FH                    ;TEST MEMORY ON PAGE F
OF30 F0     3060+         MOV    A,@R0                  ;LOAD ROM POINTER INTO ACCUMULATOR
OF31 A3     3061+         MOVP   A,@A                   ;FETCH ROM VALUE ADDRESSED BY R0
OF32 61     3066+         ADD    A,@R1                  ;ADD ROM VALUE TO ROM CHECKSUM REGISTER
OF33 A1     3067+         MOV    @R1,A                  ;UPDATE ROM CHECKSUM REGISTER
OF34 83     3068          RET
            3069                 ;
            3070                 ;PAGE FILLER
            3071                 ;
OF35 00     3072          DB     0,0,0,0,0,0,0,0
OF36 00
OF37 00
OF38 00
OF39 00
OF3A 00
OF3B 00
OF3C 00
OF3D 00     3073          DB     0,0,0,0,0,0,0,0
OF3E 00
OF3F 00
OF40 00
OF41 00
OF42 00
OF43 00
OF44 00
OF45 00     3074          DB     0,0,0,0,0,0,0,0
OF46 00
OF47 00
OF48 00
OF49 00
OF4A 00
OF4B 00
OF4C 00
OF4D 00     3075          DB     0,0,0,0,0,0,0,0
OF4E 00
OF4F 00
OF50 00
OF51 00
OF52 00
OF53 00
OF54 00
OF55 00     3076          DB     0,0,0,0,0,0,0,0
OF56 00
OF57 00
OF58 00
OF59 00
OF5A 00
OF5B 00
OF5C 00
OF5D 00     3077          DB     0,0,0,0,0,0,0,0
OF5E 00
OF5F 00
OF60 00
OF61 00
OF62 00
OF63 00
OF64 00
OF65 00     3078          DB     0,0,0,0,0,0,0,0
OF66 00
```

| LOC | OBJ | LINE | SOURCE STATEMENT |
|---|---|---|---|
| 0F67 | 00 | | |
| 0F68 | 00 | | |
| 0F69 | 00 | | |
| 0F6A | 00 | | |
| 0F6B | 00 | | |
| 0F6C | 00 | | |
| 0F6D | 00 | 3079 | DB 0,0,0,0,0,0,0,0 |
| 0F6E | 00 | | |
| 0F6F | 00 | | |
| 0F70 | 00 | | |
| 0F71 | 00 | | |
| 0F72 | 00 | | |
| 0F73 | 00 | | |
| 0F74 | 00 | | |
| 0F75 | 00 | 3080 | DB 0,0,0,0,0,0,0,0 |
| 0F76 | 00 | | |
| 0F77 | 00 | | |
| 0F78 | 00 | | |
| 0F79 | 00 | | |
| 0F7A | 00 | | |
| 0F7B | 00 | | |
| 0F7C | 00 | | |
| 0F7D | 00 | 3081 | DB 0,0,0,0,0,0,0,0 |
| 0F7E | 00 | | |
| 0F7F | 00 | | |
| 0F80 | 00 | | |
| 0F81 | 00 | | |
| 0F82 | 00 | | |
| 0F83 | 00 | | |
| 0F84 | 00 | | |
| 0F85 | 00 | 3082 | DB 0,0,0,0,0,0,0,0 |
| 0F86 | 00 | | |
| 0F87 | 00 | | |
| 0F88 | 00 | | |
| 0F89 | 00 | | |
| 0F8A | 00 | | |
| 0F8B | 00 | | |
| 0F8C | 00 | | |
| 0F8D | 00 | 3083 | DB 0,0,0,0,0,0,0,0 |
| 0F8E | 00 | | |
| 0F8F | 00 | | |
| 0F90 | 00 | | |
| 0F91 | 00 | | |
| 0F92 | 00 | | |
| 0F93 | 00 | | |
| 0F94 | 00 | | |
| 0F95 | 00 | 3084 | DB 0,0,0,0,0,0,0,0 |
| 0F96 | 00 | | |
| 0F97 | 00 | | |
| 0F98 | 00 | | |
| 0F99 | 00 | | |
| 0F9A | 00 | | |
| 0F9B | 00 | | |
| 0F9C | 00 | | |
| 0F9D | 00 | 3085 | DB 0,0,0,0,0,0,0,0 |
| 0F9E | 00 | | |
| 0F9F | 00 | | |
| 0FA0 | 00 | | |
| 0FA1 | 00 | | |
| 0FA2 | 00 | | |
| 0FA3 | 00 | | |
| 0FA4 | 00 | | |
| 0FA5 | 00 | 3086 | DB 0,0,0,0,0,0,0,0 |
| 0FA6 | 00 | | |
| 0FA7 | 00 | | |
| 0FA8 | 00 | | |
| 0FA9 | 00 | | |
| 0FAA | 00 | | |
| 0FAB | 00 | | |
| 0FAC | 00 | | |
| 0FAD | 00 | 3087 | DB 0,0,0,0,0,0,0,0 |
| 0FAE | 00 | | |
| 0FAF | 00 | | |
| 0FB0 | 00 | | |
| 0FB1 | 00 | | |
| 0FB2 | 00 | | |
| 0FB3 | 00 | | |
| 0FB4 | 00 | | |
| 0FB5 | 00 | 3088 | DB 0,0,0,0,0,0,0,0 |
| 0FB6 | 00 | | |
| 0FB7 | 00 | | |
| 0FB8 | 00 | | |
| 0FB9 | 00 | | |
| 0FBA | 00 | | |
| 0FBB | 00 | | |
| 0FBC | 00 | | |
| 0FBD | 00 | 3089 | DB 0,0,0,0,0,0,0,0 |
| 0FBE | 00 | | |
| 0FBF | 00 | | |
| 0FC0 | 00 | | |
| 0FC1 | 00 | | |
| 0FC2 | 00 | | |
| 0FC3 | 00 | | |
| 0FC4 | 00 | | |
| 0FC5 | 00 | 3090 | DB 0,0,0,0,0,0,0,0 |
| 0FC6 | 00 | | |
| 0FC7 | 00 | | |
| 0FC8 | 00 | | |

```
LOC  OBJ      LINE    SOURCE STATEMENT
OFC9 00
OFCA 00
OFCB 00
OFCC 00
OFCD 00      3091    DB    0,0,0,0,0,0,0,0
OFCE 00
OFCF 00
OFD0 00
OFD1 00
OFD2 00
OFD3 00
OFD4 00
OFD5 00      3092    DB    0,0,0,0,0,0,0,0
OFD6 00
OFD7 00
OFD8 00
OFD9 00
OFDA 00
OFDB 00
OFDC 00
OFDD 00      3093    DB    0,0,0,0,0,0,0,0
OFDE 00
OFDF 00
OFE0 00
OFE1 00
OFE2 00
OFE3 00
OFE4 00
OFE5 00      3094    DB    0,0,0,0,0,0,0,0
OFE6 00
OFE7 00
OFE8 00
OFE9 00
OFEA 00
OFEB 00
OFEC 00
OFED 00      3095    DB    0,0,0,0,0,0,0,0
OFEE 00
OFEF 00
OFF0 00
OFF1 00
OFF2 00
OFF3 00
OFF4 00
OFF5 00      3096    DB    0,0,0,0,0,0,0,0
OFF6 00
OFF7 00
OFF8 00
OFF9 00
OFFA 00
OFFB 00
OFFC 00
OFFD 00      3097    DB    0,0,0
OFFE 00
OFFF 00
             3098    END
```

USER SYMBOLS
```
ABLOOP 0517  ABS3   050A  AD     0237  ADD3   02E1  ADJSWT 0E5A  AMLOOP 0662  AOK    078A  ASCII  0A31
AV     0B67  AV1    0BA8  AV2    0BB8  AVCNT  006C  AVERR  0CD4  AVERRP 0B64  AVFLTR 007C  AZM    0532
AZM0   053C  AZM1   055B  AZMCNT 0053  AZREDY 0585  BACK   01D4  BACK1  022F  BBLOOP 043D  BCDAD1 0DFF
BCDAD2 0E0E  BCDADD 0DFC  BCDBIN 03FA  BCDCP1 0DEE  BCDCPL 0DEB  BCDF   0757  BCDF1  0760  BCDOUT 09A9
BCDSB1 0DDD  BCDSUB 0DDA  BCLOOP 0400  BDLOOP 0AA0  BINBCD 0433  BIT0   0BE0  BITDLY 0BBF  BITLOP 0BB8
BLANK  03DA  BLANKD 0481  BLDADJ 0E95  BLNKIT 0684  BUILD  0A9C  BUILDA 0AB5  BUILDB 0AC3  BUILDC 0ADF
CARYON 0B7E  CBUILD 0AD1  CGLOOP 064F  CHKSUM 0081  CHPRNT 0997  CKG    01C4  CLEAR  01D6  CLIT   0594
CLLOOP 0007  CLR3   04B6  CMLOOP 063C  CNT2   0886  CNT1   0879  CNTINC 07C5  CNTRAW 0060  COMMA  0A66
COMMND 0028  CONVER 01C5  CONVTR 0060  CPL3   0513  CR     000D  CROPT  09BD  CT     01EC  CTABLE 098E
CTS    08A2  D3LOOP 0696  DALOOP 046A  DATAIO 0148  DATIN  0870  DATIN1 0874  DATOT1 0680  DATOUT 087C
DBLAMP 0144  DBLOOP 046D  DCLOOP 0467  DELAY1 08E4  DELAY2 08AF  DELAY3 08B3  DELAY4 08EA  DELAY5 08C2
DELAY6 08C6  DELAY7 08F0  DELAY8 08D2  DELAY9 08D6  DEMAND 0797  DIGITS 0394  DIGRL  0447  DISPLY 0800
DLLOOP 049B  DLSD   0499  DLY10  08E6  DLY40  08EC  DLY70  08F2  DOAV   01E6  DPLOOP 09FA  DPLOP1 0A26
DPRINT 09DF  DRLOOP 044A  DSPSWT 0CFE  DTLOOP 05F6  DZA    0A65  EOT    03A8  EOTEST 0E49  EXPSGN 0EDF
EUPRNT 095B  EXBLCK 0163  EXBLNK 016D  EXECUT 019F  EXITAV 0C5B  EXPAND 06C4  EXPSGN 0EDF  EXPZRO 0526
FILTWT 007D  FIVE   009B  FLTBCD 0070  FLTCNT 0073  FLWTSN 0751  FORM   0A44  FORM1  03AC  FORM2  03C2
FORM3  03B6  FORM4  03CF  FSCALE 031C  GGRBCD 0F00  GO     0083  GRBCD1 0F0E  GRBCD2 0F15  GRBCD3 0F1B
GRBCD4 0F24  GRBCD5 0F2C  GREATT 00D1  GRSBCD 0058  HDGH   00F3  HDGH1  00F4  HERTE  00F0  HISENS 02AF
HNUM3  0085  HSO    0AEE  HSOFOR 03EC  IBYTE  09A0  ICI    02C7  ICK    02BA  IFILTR 0EBA  INCREM 0300
INTER  020F  INTERD 0E8A  ISLOOP 0D30  JUMP   099B  KG     013A  KOMMND 0989  L6LOOP 066E  LB     0EB9
LBKG   01AD  LESST  00DC  LF     000A  LIMIT  0972  LOOP   000C  LOOP3  0244  LOOP4  024E  LOOP5  0263
LOOPRO 05D3  LOSENS 02AD  LS0   08F6  MCHK   028E  MFACT  0352  MLTINC 0459  MMLOOP 0655  MOTN   02C0
MOV3   02D5  MSPFCT 0C1D  MTLOOP 0426  MULT2C 0633  MULT3  0643  MULTC  0637  MZA    057F  NBCDF1 076E
NBFD   0086  NCHECK 0934  NDEF   06B9  NEGK   050D  NEGPRT 0939  NEPRNT 0952  NERRV  0D24  NET    002F
NETCFR 03D0  NETPRT 03AD  NETPRT 0949  NEXPND 003E  NEXT36 0E1A  NHPRNT 096E  NNZCT  05A1  NOADD  0669
NOADJ  0EE5  NOAV   0189  NOBCDF 0767  NOCARY 0444  NODIGI 0707  NOFILT 0EEB  NOLB   07EB  NOLIM  0931
NOMOBL 016F  NONTNG 0071  NOREST 0D80  NOROT  0715  NOSO   09DD  NOTAR  011C  NOTARE 05FD  NOTEST 05DE
NOVER  0479  NOVERF 0791  NOXPND 0E7C  NSIGN1 0783  NSIGN2 0785  NSPCRT 0C54  NTI    0864  NTPRNT 096A
NUM1   0084  NUM3   0080  NXHSO  0B08  OFFSET 0050  OKCHCK 05AF  ONE    068F  OPTCR  0086  OPTSO  0087
OTLOOP 0868  OUTBYT 0DC4  OUTFOR 097E  OUTPUT 0980  OUTROT 0717  OUTWET 004A  OVERFL 0074  OVLOOP 0485
OVRFL  035E  P300   01E0  PAD    0B48  PADLOP 0B4A  PADRTN 0B60  PALOOP 0B93  PAR1   0897  PARALL 0D48
PD     0A6B  PD1    0A6A  PDIGIT 0A51  POINT  0304  POINT1 0308  POLOOP 0DA7  PREP2  0122  PREPI  0116
PRINT  088F  PRNTCH 0A22  PRNTCS 0A41  PRNTIT 0A82  PRNTKG 0A18  PRNTMM 0A94  PRNTSP 0A8C  PRNTT  0A20
PTESTW 0CCC  PWRON  07AC  PWRON1 0EF1  PWRON2 07AF  R12    0310  R21    0316  R25    0313  R52    0319
RALOOP 0E12  RAMERR 0E52  RAS    02F7  RAWAV  0047  RAWCNT 0044  RBLOOP 0AA9  RELAY  0B9F  RELAYC 0027
RESTLP 0D72  RETOC  0E48  RET2   0286  RET4   04A2  RET5   0525  RET6   066E  RET7   07AB  RET8   080F
RET9   0996  RETA   0AB4  RETB   0B41  RETD   0DC3  RETE   0E94  RETO   0082  RLP    0273  RMLOOP 0E2C
RMVB   0DCE  RMVB1  0DC9  ROLOOP 070A  ROMADD 006E  ROMPLC 006D  ROT    06FD  RSTR0  04B3  RSTR10 04B1
RSTRM  0E97  RSTRM1 0E0A  RTLOOP 070C  SBLOOP 04A6  SBNBCD 0719  SDLOOP 09B0  SDOUT  0A28  SHL3   048B
SHR3   0587  SHR3C  0588  SIGN3  0523  SO     000E  SOOPT  0904  SPAN   06E9  SPANRG 0050  SPNFCT 0C84
```

```
USER SYMBOLS
SPNMPR  0CA8    STAT1   0020    STAT2   0021    STAT3   002D    STAT4   002E    STAT5   0057    STATA   005B    STATB   005C
STATC   006F    SUB     0003    SUB3    04A3    SUBC    0004    SVLOOP  03BE    SWAPLP  0D3A    SWTCH1  0029    SWTCH2  002A
SWTCH3  002B    SWTCH4  002C    SWTCRD  0D2A    SYLOOP  0DBB    TARBCD  0025    TARE    0032    TEMP    0035    TEMP1   0038
TEMP2   003E    TEMP3   004D    TEMP4   0054    TEMP5   0066    TEMP6   0069    TEMP7   0076    TEMP8   0079    TEST    0E10
TEST0   0038    TEST1   01A7    TEST2   02F1    TEST3   02F0    TEST4   0420    TEST5   0504    TEST6   062D    TEST7   07BE
TEST8   0889    TEST9   0978    TESTA   0A4B    TESTB   0B42    TESTC   0CCE    TESTCC  0E50    TESTD   0DD4    TESTF   0F30
TESTOV  05FF    TESTWP  0D03    TILOOP  081F    TOLOOP  0618    TST     0000    TST2    0231    UNDER   0280    WILOOP  0C63
WCLOOP  0199    WETBCD  0022    WFNM    0C60    WITHIN  0745    ZERO    01DA    ZIT     04BE    ZROCNT  0063

ASSEMBLY COMPLETE, NO ERRORS

ISIS-II ASSEMBLER SYMBOL CROSS REFERENCE, V2.1
ABLOOP  1057#  1062
ABS3     278    420    576   1000  1046#  1094   1416   1479   1612   1615   2438   2481   2522   2617   2635   2988
AD       130    507#  2518
ADD3     637#   672    798    809  1125   1276   1356   1445   2473   3010
ADJSWT   127   2901#
AMLOOP  1331#  1336
AOK     1543#  1549
ASCII   2091   2099#
AV       359    447   2357#  2622
AV1     2396#  2401   2405   2622
AV2     2403   2406#
AVCNT     63#   345   2382
AVERR   2350   2510   2595#
AVERRP  2349#  2441   2444
AVFLTR    70#  2394   2397
AZM      168   1087#
AZM0    1083   1093#
AZM1    1103   1111#
AZMCNT    55#  1117   1129   1132
AZREDY  1134   1136#
BACK     364    378    379    402    424#   455    458    462
BACK1    465    468    472    476    492#
BBLOOP   840#   844
BCDAD1  2815#  2830
BCDAD2  2821   2830#
BCDADD  2813#  3036
BCDBIN   787#  1692   2429
BCDCP1  2800#  2808
BCDCPL  2798#  3041
BCDF    1490   1500   1503   1513#
BCDF1   1518   1520#
BCDOUT  1966   1997#
BCDSB1  2784#  2793
BCDSUB  2782#  3038
BCLOOP   790#   814
BDLOOP  2188#  2207
BINBCD   203    834#  1418   1430   1483   2619
BIT0    1795   1821#
BITDLY  1799#  1822
BITLOP  1794#  1805
BLANK    768#  1368
BLANKD   330    342    907#
BLDADJ  2607   2901   2947#
BLNKIT   219   1363#  1536   3053
BUILD   2186#  2276   2280   2285   2690
BUILDA  2212#  2275
BUILDB  2222#  2279
BUILDC  2242#  2689
CARYON  2367   2372#
CBUILD  2232#  2284
CGLOOP  1320#  1322
CHKSUM   79#    756    777
CHPRNT  1965   1974#
CKG      410    414#
CLEAR    383    428#
CLIT     259    428   1165#
CLLOOP   118#   119
CLR3     142    144    670    788    801    834    976#  1121   1179   1272   1348   1584   2465
CMLOOP  1306#  1311
CNT2    1748   1750#
CNT1    1737   1739#  1751
CNTINC   134   1604#
CNTRAW    59#   561   1021   1109
COMMA   2133   2137#
COMMND   21#   361   1665   1848   2235   2341   2599
CONVER   413    415#
CONVTR   190    200#
CPL3    1054#  1072
CR        75#   756    777   2020
CROPT   1966   2015#
CT       384    453#
CTABLE  1960   1965#
CTS     1780#  1785
D3LOOP  1376#  1378
DALOOP   880    882#
DATAIO   321#
DATIN   1664   1679   1734#
DATIN1  1736#  1738
DATOT1  1746#  1749
DATOUT  1663   1727   1744#
DBLAMP   314    318#
DBLOOP   884#   890
DCLOOP   880#   900
```

ISIS-II ASSEMBLER SYMBOL CROSS REFERENCE, V2.1

```
DELAY1   1789    1823#
DELAY2   1789#   1825
DELAY3   1791#   1791
DELAY4   1802    1826#
DELAY5   1802#   1828
DELAY6   1804#   1804
DELAY7   1813    1829#
DELAY8   1813#   1831
DELAY9   1815#   1815
DEMAND    129    1554#   1563
DIGITS    751#   2158
DIGRL     841     846#
DISPLY    344    1659#   2388   2621   2887   2891
DLLOOP    939#    943
DLSD      205     938#   1211   1485
DLY10    1824#   1824
DLY40    1827#   1827
DLY70    1830#   1830
DOAV      382     446#
DPLOOP   2060#   2086
DPLOP1   2067    2086#
DPRINT   1965    2039#
DRLOOP    848#    853
DSPSWT   2610    2620#
DTLOOP   1232#   1237
DZA      1383    1385#
EOT       756#    758    764
EOTEST   2878    2884#
ERLOOP   2629#   2629   2630   2631
ERROR     154     392    499    779    822   1035   1286   1592   1649   1758   1859   1925   2116   2190   2250   2316   2587   2774
          2865   3064
EUPRNT   1895    1901#
EXBLCK    329     332    336#
EXBLNK    336     342#
EXECUT    369     378#
EXITAV   2511#   2643
EXPAND    146    1411#   2273
EXPSGN   1420    1426#
EXPZRO    145    1077#
FILTWT     71#   2986    3008   3011   3014
FIVE     2716    2718    2720   2728#
FLTBCD     66#   1492    1521
FLTCNT     67#    490    1023   1172   1501   1513   1721
FLWTSN   1508    1510#
FORM      755#   1888
FORM1     757#   1899
FORM2     761#   1912
FORM3     759#   1910
FORM4     763#   1908
FSCALE    701#   1634
GGRBCD    230    3030#
GO         81#    758    760    762    764
GRBCD1   3035    3038#
GRBCD2   3037    3039    3042#
GRBCD3   3044    3046#
GRBCD4   3049    3051#
GRBCD5   3054    3056#
GREATT    241     245#
GRSBCD    570     232    759    761
HDGH      251     266#
HDGH1     248     262    267#
HERTE     255     258    2644#
HISENS    588     590#
HNUM3     83#     776    777
HSO       323    2258#
HSOFOR   2776#   2299
IBYTE    1966    1987#
ICI       602     606#   613
ICK       594     597#
IFILTR    132    2526    2982#
INCREM    684#    874    875   1223   1224
INTER     469     473#
INTERD   2926    2929    2932#
ISLOOP   2656#   2674
JUMP     1965    1979#
KG        309     311#
KOMMND   1956    1959#
L6LOOP   1340#   1344
LB       2950    2961    2973#
LBKG      385     400#
LESST     237     244    252#
LF         76#    756    2023
LIMIT    1856    1917#
LOOP      121#    424    429    435    442    449    492
LOOP3     516#    516    517
LOOP4     521#    523
LOOP5     539#    541
LOOPRO   1208#   1213
LOSENS    586     589#
LSO       440    1835#
MCHK      136     571#   2529
MFACT     723#   1699
MLTINC    207     868#   1529
MMLOOP   1324#   1345
MOTN      579     582    591    609#
MOV3      162     217    234    479    546    563    573    608    620#    792    869    999   1022   1028   1093   1110   1316   1413
         1428    1478   1511   1523   1534   1710   2261   2264   2304   2307   2428   2434   2478   2616   2698   2985   3013   3016
```

ISIS-II ASSEMBLER SYMBOL CROSS REFERENCE, V2.1

```
MSPECT  2473#  2474
MTLOOP  812#   813
MULT2C  418    422    1300#  1625
MULT3   1312#  1447
MULTC   1016   1303#  1635   1701
M2A     1097   1100   1116   1119   1132#
NBCDF1  1526   1529#
NBFD    224    229#
NCHECK  1863   1868   1875   1878#
NDEF    1392   1397#
NEGK    175    177#
NEGPRT  1877   1881#
NEPRNT  1896#  1904
NERRV   2638   2642#
NET     45#    160    178    235    238    277    459    1092   1477   1861
NETCFR  762    764#
NETFRM  758#   760
NETPRT  1887   1890#
NEXPND  140    160#
NEXT36  2838   2842#
NHPRNT  1907   1912#
NNZCT   1167   1170   1172#
NOADD   1326   1337#
NOADJ   3003   3005   3011#
NOAV    349    354    355    358    360#
NOBCDF  1486   1512   1524#
NOCARY  842    844#
NODIGI  1614#  2528
NOFILT  2991   2994   2998   3014#
NOLB    1619   1626#
NOLIM   1854   1876#
NOMOBL  335    339    341    343#
NONTNG  187    189#
NOREST  2702   2709   2713#
NOROT   1459   1469#
NOSO    2032   2035#
NOTAR   147    293#
NOTARE  1190   1193   1196   1197   1210   1219   1238#
NOTEST  1202   1214#
NOVER   891    894#
NOVERF  1542   1548#
NOXPND  2905   2923#
NSIGN1  1537   1539#
NSIGN2  1540#  3057
NSPCRT  2470   2503   2507#
NT1     1674   1690   1706   1723#
NTPRNT  1898   1910#
NUM1    82#    776    776    776
NUM3    78#    755    758    759    760    761    762    764
NXHSO   2272   2274#
OFFSET  54#    141    163    419    480    1025   1124
OKCHCK  1186#  1688
ONE     1398   1401#
OPTCR   84#    759    760    761    762
OPTSO   85#    755    758    764
OTLOOP  1725#  1729
OUTBYT  2739   2741   2758#
OUTFOR  1889   1900   1909   1911   1913   1952#  2300
OUTPUT  1953#  1958   1975   1982   1993   2011   2019   2026   2035   2085
OUTROT  1465   1471#
OUTWET  52#    161    433    478    574    607    1082   1412
OVERFL  167    191#   210    214
OVLOOP  295    909#   911    2723
OVRFL   730#   1015   1262
P300    381    439#
PAD     2268   2331#
PADLOP  2332#  2332   2333
PADRTN  2340   2345#
PALOOP  1768#  1771
PAR1    1769   1771#
PARALL  324    2679#  2688
PD      2125   2140#
PD1     2136   2139#
PDIGIT  2062   2065   2124#
POINT   688#   1623
POINT1  404    689#
POLOOP  2736#  2746
PREP2   292    296#
PREP1   199    281    284    289#
PRINT   1766#  1957   1992   2016   2021   2024   2034   2076   2080   2084   2094   2109   2135   2138   2160   2165   2170
PRNTCH  2078   2082   2084#
PRNTCS  1974   2022   2103#
PRNTIT  2142   2145   2148   2155#
PRNTKG  2074   2079#
PRNTMN  2154   2167#
PRNTSP  2150   2152   2162#
PRNTT   2071   2083#
PTESTW  2579#  2598
PWRON   120    1574#
PWRON1  1575   3017#
PWRON2  1576#  3026
R12     688    688    688    689    689    694#
R21     690    690    690    696#
R25     688    689    695#
R52     690    697#
```

ISIS-II ASSEMBLER SYMBOL CROSS REFERENCE, V2.1

```
RALOOP  2836#  2857
RAMERR  2853   2889#
RAS      201    669#  1481
RAWAV     51#
RAWCNT    50#   544    562    572    506   1446   1604   1614   2433   2436   2466   2507   2519   2634   2984   3012   3015
RBLOOP  2200#  2201
RELAY   2391#  2646
RELAYC  2641   2645#
RESTLP  2704#  2705
RETOC   2883#  2885
RET2     555    560#
RET4     944#   989    992    995   1019
RET5    1053   1073#  1113   1216   1231   1236
RET6    1252   1386   1387   1393   1395   1400#
RET7    1557   1566#
RET8    1820#  1837   1839
RET9    1847   1852   1874   1880   1883   1965   1970#
RETA    2105   2208#
RETB    2309#  2361   2365   2371   2374   2378
RETD    2681   2754#
RETE    2935   2939#
RETO     80#   756    777
RLP      548#   549
RMLOOP  2858#  2880
RMVB    2760   2765#
RMVB1   2761#  2765   2767
ROLOOP  1463#  1467
ROMADD    65#  2859
ROMPLC    64#  2858
ROT      209   1454#  1531
RSTR0    662    931    967#   982   1065
RSTR10   630    650    965#
RSTRM   2794   2822#
RSTRM1  2809   2825#
RTLOOP  1464#  1466
SBLOOP   954#   962
SBNBCD   171    182   1476#
SDLOOP  2003#  2009
SDOUT   2005   2007   2090#
SHL3     548    796    797    799    812    840    919#  1301   1464
SHR3    1144#  1325   2704
SHR3C    942   1145#
SIGN3    423   1072#  1123   1448   1636   2475   3007
S0        77#  2033
SOOPT   1966   2030#
SPAN    1438#  1613   2524
SPANRG    58#  1438   1583   2476   2505
SPNFCT  2452   2539#
SPNMPR  2489   2560#
STAT1     17#   300   1723   2386   2611
STAT2     19#   319   2389   2603   2877   2889
STAT3     31#   172    260    268    302    351    406    453    463    470    486    993   1174   1194   1217   1616   1712   1885
        2072   2222   2224   2228   2245   2369   2372   2919   2923   2947   3022   3046
STAT4     33#   121    191    245    252    263    267    311    326    365    473    482    556    592    609    986   1187   1487
        1716   1835   1901   2225   2226   2246   2248   2375   2398   2530   2679
STAT5     35#   184    305    456   1077   1087   1104   1168   1878   2227   2247   2357   2384   2596   3031
STATA     37#   776   2277
STATB     39#   776   2282
STATC     41#   776   2286
SUB       99#   525   1232
SUB3     164    180    481    554    575    952#  1018   1279   1415   1611   2437   2480   2502   2506   2521   2987
SUBC    1044#   533    955
SVLOOP  2409#  2424
SWAPLP  2664#  2670
SWTCH1    23#   400    871   1007   1220   1254   1363   1620   1626   1693   1890   2045   2128   2214   2215   2288   2358   2446
        2483   2654   2951
SWTCH2    25#   220    289    296    466   1165   1198   1214   1379   1455   2017   2053   2216   2217   2218   2699   2909
        2927   2932   2964
SWTCH3    27#   137    337    356    584    990   1111   1555   1881   1893   2048   2131   2234   2291   2362   2608   2902   2915
        3019
SWTCH4    29#  1850   1896   1905   2030   2069   2103   2265   2911
SWTCRD   126   2606   2653#  3017
SYLOOP  2750#  2750   2751
TARBCD    44#   202    204    206    208    211    216    218    225    293    760    762    777    802    811   1191   1206   1207
        1228   1429   1677   2263   2305   2406   2426   2430
TARE      46#   143    179    200    417    477   1178   1414   1427   1707
TEMP      47#   571    577    669    790    800    808    837    868    879   1001   1081   1253   1275   1315   1324   1411   1426
        1605   2614   2695   2706   2713   2721   2727   2983   2989   3009
TEMP1     48#  1271   1304   1317   1328   1337   1439   1476   1480
TEMP2     49#  1327   1349   1702   1708   2464   2472   2479   2504
TEMP3     53#   787    791    807    996   1017   1700   2435
TEMP4     54#  1091   1114   1126   2432   2613
TEMP5     61#  2258   2302
TEMP6     62#  2262   2306
TEMP7     63#  1532   2482   2500   3034
TEMP8     69#   215    233   2445   2463   2477   2501   3033   3052   3056
TEST     322   2835#  2888   2892
TEST0    149#  2874
TEST1    158    387#
TEST2    243    280    658#  1096   2440   2640
TEST3    657#  1192   1525   3043
TEST4    503    817#
TEST5    826   1030#
TEST6   1039   1281#
TEST7   1290   1587#
TEST8   1597   1753#
TEST9   1762   1920#
TESTA   1929   2111#
TESTB   2120   2311#
```

ISIS-II ASSEMBLER SYMBOL CROSS REFERENCE, V2.1

```
TESTC   2320   2582#
TESTCC  2882   2888#
TESTD   2591   2769#
TESTF   2778   3059#
TESTOV   166    461   1246#  1704
TESTWP  2579   2623#
TILOOP   679#  1683
TOLOOP  1265#  1270
TST       89#   149    387    494    917   1030   1281   1587   1753   1920   2111   2311   2582   2769   2860   3059
TST2     396    494#
UNDER    518    556#  1550
WILOOP  2516#  2516   2517
WCLOOP   370#   372
WETBCD    43#   333    755    758    764    777    907   1417   1421   1482   1484   1491   1510   1522   1524   1528   1530   1533
         1535  1539   2259   2301   2425   2618   2696
WFNM    2396   2514#  2533   2632
WITHIN  1498   1501#
ZERO     380    433#
ZIT      434    986#  1127
ZROCNT   604   1020   1108   2520
```

CROSS REFERENCE COMPLETE

ASM48 :F1:8132DP.ASM          *APPENDIX B*

ISIS-II MCS-48/UPI-41 MACRO ASSEMBLER, V3.0          PAGE  1
* 8132 DISPLAY PROCESSOR * -- LAST EDITTED 11/30/79 --  8:00

```
LOC  OBJ       LINE        SOURCE STATEMENT

1    $TITLE ('*** 8132 DISPLAY PROCESSOR *** -- LAST EDITTED 11/30/79 --  8:00 AM')
                2    $MOD41 XREF MACROFILE PAGEWIDTH(160) PAGELENGTH(64)
                3    ;*************************************************************************
                4    ;**                                                                     **
                5    ;**                          MODEL 8132                                 **
                6    ;**                                                                     **
                7    ;**                        DISPLAY PROCESSOR                            **
                8    ;**                                                                     **
                9    ;**                   HEX CODE LAST CHANGED -- 6/29/79                  **
               10    ;**                                                                     **
               11    ;*************************************************************************
               12    ;
               13    ;                                 *** MEMORY MAP ***
               14    ;
               15    ;              ; BIT 7      BIT 6      BIT 5     BIT 4       BIT 3       BIT 2       BIT 1     BIT 0
               16    ;
0020           17 STAT1   EQU   20H;   X          X          X       AV IN PROG  KB TARE INH.  DECIMAL POINT POSITION
               18    ;
0021           19 STAT2   EQU   21H; POWER UP  RAM ERROR  ROM ERROR  AV ERROR    NET LAMP    ZERO LAMP   KG LAMP   LB LAMP
               20    ;
0028           21 STAT3   EQU   28H; TARE INPUT LAMP TEST    X          X           X           X           X         X
               22    ;
0029           23 ERROR   EQU   29H; DISP ERROR RAM ERROR  ROM ERROR    X           X           X           X         X
               24    ;
002A           25 COMMND  EQU   2AH; KB TARE  AVL ERROR FLAG ZERO REQ  PRINT REQ   AV REQ    CLEAR REQ   TARE REQ  LB/KG REQ
               26    ;
0022           27 WEIGHT  EQU   22H;  DISPLAY WEIGHT IN BCD          (3 BYTES)
0025           28 TARE    EQU   25H;  TARE WEIGHT IN BCD             (3 BYTES)
002B           29 OLDKEY  EQU   2BH;  PREVIOUS INPUT FROM KEYBOARD   (2 BYTES)
002D           30 NEWKEY  EQU   2DH;  THIS INPUT FROM KEYBOARD       (2 BYTES)
002F           31 WETSEG  EQU   2FH;  WEIGHT DISPLAY IN 7 SEGMENT FORMAT (6 BYTES)
0035           32 TARSEG  EQU   35H;  TARE DISPLAY IN 7 SEGMENT FORMAT   (6 BYTES)
003B           33 DVTSTP  EQU   3BH;  DISPLAY VERIFY TEST POINTER    (1 BYTE )
003C           34 TSTPOS  EQU   3CH;  POSITION POINTER FOR ROM TEST  (1 BYTE )
003D           35 CHKSUM  EQU   3DH;  CHECKSUM VALUE OF ROM TEST     (1 BYTE )
               36 FILL    MACRO   LIMIT
               37         REPT    LIMIT-$
               38         NOP
               39         ENDM
               40         ENDM
0000           41         ORG     0
               42
               43                           ;*** POWER ON RESET ***
               44                           ;
0000 27        45         CLR     A         ;CLEAR THE ACCUMULATOR
0001 0483      46         JMP     PWRON     ;GO TO PWRON AND INITIALIZE SYSTEM
               47                           ;
               48                           ;*** DISPLAY INPUT/OUTPUT INTERUPT ***
               49                           ;
0003 35        50         DIS     TCNTI     ;DISABLE TIMER INTERUPT DURING I/O
0004 D5        51         SEL     RB1       ;SELECT REG BANK 1 FOR I/O OPERATIONS
0005 041F      52         JMP     DATAIO    ;GO TO DATAIO FOR INPUT/OUTPUT OPERATIONS
               53                           ;
               54                           ;*** TIMER INTERUPT SERVICE ROUTINE ***
               55                           ;
0007 15        56         DIS     I         ;DISABLE INTERUPTS DURING TIMER UPDATE
0008 D5        57         SEL     RB1       ;SELECT REGISTER BANK 1
0009 1F        58         INC     R7        ;INCREMENT THE MASTER TIMER
000A AD        59         MOV     R5,A      ;SAVE THE ACCUMALATER
000B FF        60         MOV     A,R7      ;HAS MASTER TIMER TIMED OUT( EQUAL 0 )?
000C 961C      61         JNZ     BACK      ;NO, JUMP BACK, RETURN TO MAIN PROGRAM
000E B829      62         MOV     R0,#ERROR ;YES, TIMER HAS TIMED OUT
0010 B000      63         MOV     @R0,#0    ;RESET ERROR FLAGS
```

```
LOC  OBJ      LINE              SOURCE STATEMENT

0012 R83B     64           MOV    R0,#DVTSTP
0014 B000     65           MOV    @R0,#00         ;RESET DISPLAY VERIFY TEST POINTER
0016 B928     66           MOV    R1,#STAT3
0018 F1       67           MOV    A,@R1           ;RESET TARE INPUT FLAG
0019 537F     68           ANL    A,#07FH
001B A1       69           MOV    @R1,A           ;UPDATE TARE INPUT FLAG
001C FD       70  BACK:    MOV    A,R5            ;RESTORE ACC AND RETURN TO MAIN PROGRAM
001D 05       71           EN     I
001E 93       72           RETR
              73           ;
              74           ;INTERUPT HANDLER--I/O WITH MAIN PROCESSOR
              75           ;
001F AD       76  DATAIO:  MOV    R5,A            ;SAVE ACC
0020 22       77           IN     A,DBB           ;CLEAR IBF FLAG
0021 09       78           IN     A,P1            ;INPUT THE CURRENT DISPLAY
0022 AC       79           MOV    R4,A            ;SAVE THE CURRENT DISPLAY IN REG 4
0023 9900     80           ANL    P1,#00H         ;BLANK THE DISPLAY OUPUT
0025 B828     81           MOV    R0,#STAT3       ;MOVE THE KEYBOARD TARE FLAG TO ACCUMULATOR
0027 F0       82           MOV    A,@R0
0028 5380     83           ANL    A,#80H          ;MASK OFF ALL BUT KEYBOARD TARE FLAG
002A B82A     84           MOV    R0,#COMMND
002C 40       85           ORL    A,@R0           ;LOAD KB TARE FLAG INTO COMMAND WORD FOR OUTPUT TO MAIN PROCESSOR
002D 02       86  NOTARE:  OUT    DBB,A           ;MOVE NEW COMMAND WORD TO DATA BUSS BUFFER
002E 54D0     87           CALL   DATOUT          ;OUTPUT COMMAND WORD TO MAIN SCALE PROCESSOR
0030 37       88           CPL    A
0031 5382     89           ANL    A,#82H          ;IS A KEYBOARD TARE VALUE AVAILABLE FOR MAIN PROCESSOR?
0033 964C     90           JNZ    TOUTCP          ;NO, JUMP TO TOUTCP
0035 BA03     91           MOV    R2,#03H         ;YES, A KEYBOARD TARE VALUE EXITS, OUTPUT VALUE TO MAIN PROCESSOR
0037 B825     92           MOV    R0,#TARE        ;ADDRESS TARE REGISTER FOR KEYBOARD TARE VALUE
0039 F0       93  TOUT:    MOV    A,@R0
003A 02       94           OUT    DBB,A           ;MOVE TARE VALUE TO DATA BUS BUFFER
003B 54D0     95           CALL   DATOUT          ;OUTPUT TARE VALUE TO MAIN SCALE PROCESSOR
003D 865E     96           JOBF   INTTAR
003F 18       97           INC    R0              ;INCREMENT TARE ADDRESS POINTER
0040 EA39     98           DJNZ   R2,TOUT         ;CONTINUE TILL TARE VALUE TRANSMISSION IS COMPLETE
0042 B8FF     99           MOV    R0,#0FFH
0044 B9FF    100           MOV    R1,#0FFH        ;DELAY FOR MAIN PROCESSOR BCD TO BINARY CONV.
0046 D677    101  WAIT2:   JNIBF  WAIT1
0048 BA05    102  IN5:     MOV    R2,#05H         ;LOAD DATA COUNTER WITH 5 FOR 5 BYTES DATA TRANSFER
004A 0453    103           JMP    INPUT           ;GO TO INPUT, RECEIVE MAIN SCALE DATA FOR DISPLAY
004C B828    104  TOUTCP:  MOV    R0,#STAT3       ;WAS KEYBOARD TARE VALUE JUST SENT TO MAIN SCALE PROCESSOR?
004E F0      105           MOV    A,@R0
004F F248    106           JB7    IN5             ;YES, ALREADY HAVE TARE VALUE LOAD DATA COUNTER WITH 5
0051 BA08    107           MOV    R2,#08H         ;LOAD DATA COUNTER WITH 8 TO RECEIVE ALL 8 BYTES (STAT1,STAT2,WEIGHT,TARE)
0053 B820    108  INPUT:   MOV    R0,#STAT1       ;ADDRESS STAT1 LOCATION IN RAM
0055 54C8    109  INLOOP:  CALL   DATIN           ;MONITOR INPUT BUFFER FULL FLAG
0057 D65E    110           JNIBF  INTTAR          ;INPUT BUFFER NOT FULL GO INTTAR
0059 22      111           IN     A,DBB           ;INPUT MAIN SCALE STATUS & DATA BYTES
005A A0      112           MOV    @R0,A           ;STORE DATA BYTES
005B 18      113           INC    R0              ;INCREMENT STORAGE POINTER
005C EA55    114           DJNZ   R2,INLOOP       ;CONTINUE TILL STATUS & DATA BYTES RECEIVED
005E 54C8    115  INTTAR:  CALL   DATIN           ;MONITOR INPUT BUFFER FULL FLAG
0060 D665    116           JNIBF  ENDIO           ;INPUT BUFFER NOT FULL, GO ENDIO
0062 22      117           IN     A,DBB           ;DISPLAY PROCESSOR WAITS TILL MAIN SCALE PROCESSOR IS DONE
0063 045E    118           JMP    INTTAR          ;WAIT FOR IBF NOT FULL, JUMP INTTAR
0065 B82A    119  ENDIO:   MOV    R0,#COMMND
0067 B928    120           MOV    R1,#STAT3
0069 F0      121           MOV    A,@R0           ;MOVE COMMAND BYTE TO ACCUMULATOR
006A B000    122           MOV    @R0,#00H        ;CLEAR COMMAND REGISTER
006C C672    123           JZ     NCDI            ;NO ERROR OR KEYBOARD COMMAND ENTRY JUMP NCDI
006E F1      124           MOV    A,@R1           ;MOVE STAT3 TO ACCUMULATOR
006F 537F    125           ANL    A,#7FH          ;CLEAR KEYBOARD TARE ENTRY FLAG
0071 A1      126           MOV    @R1,A           ;UPDATE STAT3 FLAG REGISTER
0072 FC      127  NCDI:    MOV    A,R4            ;CURRENT DISPLAY DATA TO ACCUMULATOR
0073 39      128           OUTL   P1,A            ;RESTORE THE DISPLAY
0074 FD      129           MOV    A,R5            ;RESTORE DATAIO ROUTINE ENTRY ACCUMULATOR VALUE
0075 25      130           EN     TCNTI           ;ENABLE TIMER INTERRUPT AND RETURN
0076 93      131           RETR
0077 E846    132  WAIT1:   DJNZ   R0,WAIT2        ;DELAY TIME LOOP
0079 E946    133           DJNZ   R1,WAIT2
007B 045E    134           JMP    INTTAR
             135           ;
             136           ;*** ROM TEST FOR PAGE 0 ***
             137           ;
007D F0      138  TEST0:   MOV    A,@R0           ;LOAD ROM POINTER INTO ACCUMULATOR
007E A3      139           MOVP   A,@A            ;FETCH ROM VALUE ADDRESSD BY R0
007F 61      140           ADD    A,@R1           ;ADD CHECKSUM REGISTER TO ROM VALUE
0080 A1      141           MOV    @R1,A           ;UPDATE CHECKSUM VALUE
0081 44D8    142           JMP    TEST2           ;GO TEST PAGE 2
             143           ;
             144           ;*** POWER ON INITIALIZATION ROUTINE ***
             145           ;
0083 C5      146  PWRON:   SEL    RB0             ;SELECT REGISTER BANK 0
0084 39      147           OUTL   P1,A            ;CLEAR ALL DISPLAYS
0085 3A      148           OUTL   P2,A
0086 3C      149           MOVD   P4,A
0087 3D      150           MOVD   P5,A
0088 3E      151           MOVD   P6,A
0089 3F      152           MOVD   P7,A
008A 9F      153           ANLD   P7,A
008B B83F    154           MOV    R0,#3FH         ;CLEAR ALL WORKING AREAS IN MEMORY
008D A0      155  RSTMEM:  MOV    @R0,A
008E E88C    156           DJNZ   R0,RSTMEM
0090 62      157           MOV    T,A             ;INITIALIZE TIMER
0091 55      158           STRT   T               ;START TIMER
```

| LOC | OBJ | LINE | | SOURCE STATEMENT | |
|---|---|---|---|---|---|
| | | 159 | | ; | |
| | | 160 | | ;*** BCD TO 7 SEGMENT LOGIC CYCLE *** | |
| | | 161 | | ; | |
| | | 162 | | ;THIS IS MAIN FLOW OF PROGRAM, ALL UPDATES FROM SCALE PROCESSOR | |
| | | 163 | | ;ARE PERFORMED BY INTERUPT | |
| | | 164 | | ; | |
| 0092 | B82B | 165 | BCD7SG: MOV | R0,#OLDKEY | ;IS THE CLEAR KEY IS BEING PRESSED? |
| 0094 | F0 | 166 | MOV | A,@R0 | |
| 0095 | 37 | 167 | CPL | A | |
| 0096 | F2DE | 168 | JB7 | TESTSG | ;YES, GO TO SEGMENT TEST ROUTINE |
| 0098 | B921 | 169 | MOV | R1,#STAT2 | ;NO, CHECK FOR ERROR IN MAIN & DISPLAY PROCESSORS |
| 009A | F1 | 170 | MOV | A,@R1 | ;MOVE MAIN SCALE ERROR FLAG TO ACCUMULATOR |
| 009B | 5370 | 171 | ANL | A,#70H | ;MASK OFF ALL BUT MAIN SCALE ERROR FLAG |
| 009D | B829 | 172 | MOV | R0,#ERROR | ;ADDRESS DISPLAY ERROR FLAG |
| 009F | 40 | 173 | ORL | A,@R0 | ;COMBINED ERROR FLAGS, RESULTANT FLAGE = 0 IF NO ERROR EXITS |
| 00A0 | 96F5 | 174 | JNZ | ERR | ;RESULT NOT ZERO, ERROR EXITS GO DISPLAY ERROR |
| 00A2 | B820 | 175 | MOV | R0,#STAT1 | ;NO ERROR, IS AN ANALOG VERIFY IN PROCESS? |
| 00A4 | F0 | 176 | MOV | A,@R0 | |
| 00A5 | 92F1 | 177 | JB4 | AVIP | ;YES, GO AVIP & DISPLAY UUUUUU |
| 00A7 | F1 | 178 | MOV | A,@R1 | ;IS SCALE IN POWER UP MODE? |
| 00A8 | 37 | 179 | CPL | A | |
| 00A9 | F2B0 | 180 | JB7 | ENDCHK | ;NO, GO ENDCHK |
| 00AB | D5 | 181 | SEL | RB1 | ;YES, SCALE IN POWER UP MODE CHECK TIMER FOR DISPLAY ON OR OFF |
| 00AC | FF | 182 | MOV | A,R7 | ;MOVE MASTER TIMER TO ACCUMULATOR |
| 00AD | C5 | 183 | SEL | RB0 | |
| 00AE | 92EC | 184 | JB4 | BLANKT | ;IF BIT 4 = 1, GO BLANKT & BLANK DISPLAY |
| 00B0 | B92F | 185 | ENDCHK: MOV | R1,#WETSEG | ;ADDRESS 7 SEGMENT WEIGHT DISPLAY REGISTER |
| 00B2 | BA22 | 186 | MOV | R2,#WEIGHT | ;ADDRESS BCD WEIGHT DISPLAY REGISTER |
| 00B4 | 54A0 | 187 | CALL | BCDSEG | ;CONVERT BCD WEIGHT TO 7 SEGMENT FORMAT |
| 00B6 | B935 | 188 | MOV | R1,#TARSEG | ;ADDRESS 7 SEGMENT TARE DISPLAY REGISTER |
| 00B8 | BA25 | 189 | MOV | R2,#TARE | ;ADDRESS BCD TARE DISPLAY REGISTER |
| 00BA | 54A0 | 190 | CALL | BCDSEG | ;CONVERT BCD TARE TO 7 SEGMENT FORMAT |
| 00BC | B821 | 191 | TAROVR: MOV | R0,#STAT2 | ;ADDRESS LAMP DATA IN STAT2 |
| 00BE | F0 | 192 | MOV | A,@R0 | |
| 00BF | 47 | 193 | SWAP | A | |
| 00C0 | 53F0 | 194 | ANL | A,#0F0H | |
| 00C2 | 39 | 195 | INDOVR: OUTL | P1,A | ;OUTPUT LAMP DATA (ZERO,NET,KG,LB) |
| 00C3 | 2390 | 196 | MOV | A,#90H | |
| 00C5 | 3A | 197 | OUTL | P2,A | ; |
| 00C6 | 27 | 198 | CLR | A | |
| 00C7 | 3A | 199 | OUTL | P2,A | |
| 00C8 | B825 | 200 | MOV | R0,#TARE | ;IS THE LEAST SIGNIFIGANT BYTE OF THE TARE = FF (BLANK)? |
| 00CA | F0 | 201 | MOV | A,@R0 | |
| 00CB | 17 | 202 | INC | A | |
| 00CC | 96D4 | 203 | JNZ | NBT | ;NO, TARE DISPLAY NOT BLANK GO NBT |
| 00CE | BA06 | 204 | MOV | R2,#6 | ;YES, TARE L. S. BYTE = FF, BLANK TARE DISPLAY |
| 00D0 | B835 | 205 | MOV | R0,#TARSEG | |
| 00D2 | 54E1 | 206 | CALL | LOOP | ;LOAD 7 SEGMENT TARE DISPLAY REG WITH BLANKS |
| 00D4 | B827 | 207 | NBT: MOV | R0,#TARE+2 | |
| 00D6 | F0 | 208 | MOV | A,@R0 | ;BLANK THE MOST SIGNIFICANT NYBBLE OF TARE (ONLY 5 TARE DIGITS) |
| 00D7 | 43F0 | 209 | ORL | A,#0F0H | |
| 00D9 | A0 | 210 | MOV | @R0,A | |
| 00DA | 342B | 211 | CALL | DISPLY | ;GO DISPLAY WEIGHT AND TARE DATA |
| 00DC | 0492 | 212 | JMP | BCD7SG | ;CONTINUE 7 SEGMENT OUTPUT |
| 00DE | B828 | 213 | TESTSG: MOV | R0,#STAT3 | ;TEST THE SEGMENTS BY TURNING THEM ALL ON OR OFF |
| 00E0 | F0 | 214 | MOV | A,@R0 | ;LAMP TEST BIT = 0, DISPLAY 888888, LAMP TEST BIT = 1: BLANK THE DISPLAYS |
| 00E1 | D2E9 | 215 | JB6 | BLANKZ | ;LAMP TEST (BIT 6) =1, GO BLANKZ TO BLANK DIGITS & LAMPS |
| 00E3 | 23FF | 216 | MOV | A,#0FFH | ;TURN ALL SEGMENTS ON |
| 00E5 | 54DD | 217 | FID: CALL | FILLIT | ;LOAD 7 SEGMENT REGISTERS WITH 888888 |
| 00E7 | 04C2 | 218 | JMP | INDOVR | |
| 00E9 | 27 | 219 | BLANKZ: CLR | A | ;BLANK DISPLAY AND LIGHTS |
| 00EA | 04E5 | 220 | JMP | FID | |
| 00EC | 27 | 221 | BLANKT: CLR | A | ;BLANK THE DISPLAY |
| 00ED | 54DD | 222 | FI: CALL | FILLIT | ;LOAD 7 SEGMENT REGISTERS WITH BLANKS |
| 00EF | 04BC | 223 | JMP | TAROVR | ;JUMP TO OUTPUT SEQUENCE |
| 00F1 | 233E | 224 | AVIP: MOV | A,#3EH | ;DISPLAY AN AV-IN-PROGRESS MESSAGE UUUUU |
| 00F3 | 04ED | 225 | JMP | FI | |
| 00F5 | B80F | 226 | ERR: MOV | R0,#0FH | ;DETERMINE THE APPROPIATE ERROR CODE |
| 00F7 | F7 | 227 | ELOOP: RLC | A | |
| 00F8 | 18 | 228 | INC | R0 | ;INCREMENT ERROR CODE POINTER |
| 00F9 | E6F7 | 229 | JNC | ELOOP | ;CONTINUE TILL ERROR CODE FOUND |
| 00FB | F8 | 230 | MOV | A,R0 | ;MOVE ERROR CODE POINTER TO ACC FOR TABLE LOOKUP |
| 00FC | E3 | 231 | MOVP3 | A,@A | ;PERFORM ERROR CODE TABLE LOOKUP @ ECODE PAGE 3 |
| 00FD | AA | 232 | MOV | R2,A | |
| 00FE | B82A | 233 | MOV | R0,#COMMND | ;ADDRESS COMMAND REGISTER |
| 0100 | F0 | 234 | MOV | A,@R0 | |
| 0101 | 4340 | 235 | ORL | A,#40H | ;SET ERROR FLAG |
| 0103 | A0 | 236 | MOV | @R0,A | ;UPDATE COMMAND REGISTER |
| 0104 | D5 | 237 | SEL | RB1 | |
| 0105 | FF | 238 | MOV | A,R7 | ;MOVE MASTER TIMER TO ACCUMULATOR |
| 0106 | C5 | 239 | SEL | RB0 | ;FLASH DISPLAY BY BLANKING 50 % OF TIME |
| 0107 | 9224 | 240 | JB4 | BLANKC | ;TIMER BIT 4 = 1 BLANK DISPLAY, GO BLANKT |
| 0109 | FA | 241 | MOV | A,R2 | ;TIMER BIT 4 = 0, DISPLAY ERROR CODE |
| 010A | B839 | 242 | MOV | R0,#TARSEG+4 | ;DISPLAY "ERROR.X XXXXX" |
| 010C | B905 | 243 | MOV | R1,#05H | |
| 010E | A0 | 244 | ELOP: MOV | @R0,A | |
| 010F | C8 | 245 | DEC | R0 | |
| 0110 | E90E | 246 | DJNZ | R1,ELOP | |
| 0112 | B079 | 247 | MOV | @R0,#79H | ;DISPLAY E |
| 0114 | C8 | 248 | DEC | R0 | |
| 0115 | B050 | 249 | MOV | @R0,#50H | ;     R |
| 0117 | C8 | 250 | DEC | R0 | |
| 0118 | B050 | 251 | MOV | @R0,#50H | ;     R |
| 011A | C8 | 252 | DEC | R0 | |
| 011B | B05C | 253 | MOV | @R0,#5CH | ;     O |
| 011D | C8 | 254 | DEC | R0 | |
| 011E | B050 | 255 | MOV | @R0,#50H | ;     R |
| 0120 | C8 | 256 | DEC | R0 | |

```
LOC  OBJ      LINE        SOURCE STATEMENT

0121 A0       257         MOV    @R0,A            ;         X
0122 04BC     258         JMP    TAROVR
0124 04EC     259 BLANKC: JMP    BLANKT
0126 440F     260 DEB:    JMP    DEBC             ;PAGING ERROR CORRECTIONS
0128 83       261 RETURN: RET
0129 00       262         NOP
012A 00       263         NOP
              264         ;
              265         ;*** DISPLAY ROUTINE ***
              266         ;
012B 27       267 DISPLY: CLR    A                ;BLANK THE DISPLAY
012C 3D       268         MOVD   P5,A
012D 3E       269         MOVD   P6,A
012E 3F       270         MOVD   P7,A
012F 8A80     271         ORL    P2,#80H          ;TURN ON THE KEYBOARD
0131 230F     272         MOV    A,#0FH
0133 39       273         OUTL   P1,A
0134 B817     274         MOV    R0,#17H          ;POINT TO THE SECOND KEYBOARD ROW
0136 B92D     275         MOV    R1,#NEWKEY       ;ADDRESS NEWKEY 1 REGISTER
0138 5489     276         CALL   KEYBRD           ;READ KEYBOARD ROWS 1 & 2
013A B81D     277         MOV    R0,#1DH          ;POINT TO THE FOURTH KEYBOARD ROW
013C 19       278         INC    R1               ;ADDRESS NEWKEY 2 REGISTER
013D 5489     279         CALL   KEYBRD           ;READ KEYBOARD ROWS 3 & 4
013F 27       280         CLR    A                ;TURN OFF THE KEYBOARD
0140 39       281         OUTL   P1,A
0141 3A       282         OUTL   P2,A
0142 3C       283         MOVD   P4,A             ;WRITE THE DISPLAY SECTION
0143 BF01     284         MOV    R7,#01H          ;SET THE SEGMENT POINTER TO THE A SEGMENT
0145 2451     285         JMP    JP3              ;JUMP TO JP3 & SET UP DIGIT OUTPUT DATA
              286         ;
              287         ;*** SET UP THE DIGIT OUTPUTS FOR NEXT SEGMENT ***
              288         ;
0147 C8       289 JP4:    DEC    R0               ;DECREMENT THE DIGIT INPUT POINTER
0148 FC       290         MOV    A,R4
0149 97       291         CLR    C
014A F7       292         RLC    A                ;ROTATE DIGIT REGISTERS TO LEFT ONCE
014B AC       293         MOV    R4,A
014C FD       294         MOV    A,R5
014D F7       295         RLC    A
014E AD       296         MOV    R5,A
014F 2458     297         JMP    JP2              ;JUMP JP2, DETERMINE IF DIGIT IS ON
0151 B83A     298 JP3:    MOV    R0,#TARSEG+5     ;INITIALIZE DIGIT POINTER TO MSD OF TARE
0153 BB0C     299         MOV    R3,#12D          ;SET THE DIGIT COUNTER TO 12
0155 27       300         CLR    A
0156 AC       301         MOV    R4,A             ;INITIALIZE DIGIT REGISTERS TO ZERO
0157 AD       302         MOV    R5,A
0158 F0       303 JP2:    MOV    A,@R0            ;MOVE DIGIT DATA TO ACCUMULATOR
0159 5F       304         ANL    A,R7             ;AND DIGIT DATA WITH SEGMENT POINTER
015A C65D     305         JZ     JP1              ;RESULT 0, DIGIT NOT ON, JUMP JP1
015C 1C       306         INC    R4               ;DIGIT ON, INCREMENT DIGIT REGISTER
015D EB47     307 JP1:    DJNZ   R3,JP4           ;CONTINUE TILL ALL DIGITS CHECKED FOR ON OR OFF STATUS
015F 9900     308         ANL    P1,#00H          ;DEACTIVATE DISPLAY SEGMENTS (INTERDIGIT BLANKING)
0161 FC       309         MOV    A,R4             ;OUTPUT THE DIGIT DATA TO DIGIT DRIVERS
0162 3D       310         MOVD   P5,A
0163 47       311         SWAP   A
0164 3E       312         MOVD   P6,A
0165 FD       313         MOV    A,R5
0166 3F       314         MOVD   P7,A
0167 FF       315         MOV    A,R7             ;ACTIVATE SEGMENT OUTPUTS (TURN DISPLAY ON)
0168 39       316         OUTL   P1,A
              317         ;
              318         ;*** DISPLAY VERIFY ***
              319         ;
0169 35       320         DIS    TCNTI            ;DURING DISPLAY VERIFY DISABLE TIMER INTERUPT
016A 15       321         DIS    I                ;DURING DISPLAY VERIFY DISABLE I/O INTERUPT
016B B83B     322         MOV    R0,#DVTSTP       ;ADDRESS THE DISPLAY VERIFY POINTER
016D F0       323         MOV    A,@R0            ;IS THE DISPLAY VERIFY TEST POINTER RESET?
016E 9698     324         JNZ    OKCHK            ;NO, JUMP OKCHK
0170 2380     325         MOV    A,#80H           ;YES, INITIALIZE DISPLAY VERIFY TEST POINTER
0172 A0       326         MOV    @R0,A            ;UPDATE DISPLAY VERIFY TEST POINTER
0173 AE       327 OK:     MOV    R6,A             ;SAVE DISPLAY VERIFY TEST POINTER
0174 B900     328         MOV    R1,#00H
0176 F7       329 GENSEG: RLC    A                ;GENERATE SEGMENT ADDRESS FROM DISLAY VERIFY TEST POINTER
0177 F67C     330         JC     GO               ;HAVE SEGMENT ADDRESS, JUMP GO
0179 19       331         INC    R1               ;INCREMENT SEGMENT ADDRESS COUNTER
017A 2476     332         JMP    GENSEG           ;CONTINUE TILL HAVE SEGMENT ADDRESS
017C 27       333 GO:     CLR    A
017D AA       334         MOV    R2,A             ;CLEAR TEST REGISTERS R2 AND R3
017E AB       335         MOV    R3,A
017F F9       336         MOV    A,R1             ;SEGMENT ADDRESS TO ACC
0180 47       337         SWAP   A
0181 3A       338         OUTL   P2,A             ;OUTPUT SEGMENT ADDRESS TO SEGMENT SELECTOR
0182 B90B     339         MOV    R1,#0BH          ;INITIALIZE DIGIT COUNTER
0184 C9       340 TSTAGN: DEC    R1               ;DECREMENT DIGIT COUNTER
0185 F9       341         MOV    A,R1             ;MOVE DIGIT ADDRESS TO ACC
0186 3C       342         MOVD   P4,A             ;OUTPUT DIGIT ADDRESS TO DIGIT SELECTOR
0187 0301     343         ADD    A,#01H           ;HAS ALL DIGITS BEEN CHECKED?
0189 F6A3     344         JC     TSTPTR           ;YES, C=1, JUMP TSTPTR
018B FA       345         MOV    A,R2             ;NO, SHIFT THE TEST REGISTERS (R2 AND R3) TO LEFT 1 BIT
018C F7       346         RLC    A
018D AA       347         MOV    R2,A
018E FB       348         MOV    A,R3
018F F7       349         RLC    A
0190 AB       350         MOV    R3,A
0191 469F     351         JNT1   TSEGOF           ;IF THE SEGMENT IS OFF (T1=0) JUMP TSEGOF
0193 36C5     352         JT0    DVOVR            ;SEGMENT IS ON, IF THE DV MODULE IS ABSENT (T0=1) JUMP DVOVR
0195 1A       353         INC    R2               ;SEGMENT IS ON DISPLAY VERIFY MODULE IS PRESENT INCR TEST REGISTERS
0196 2484     354         JMP    TSTAGN           ;GO TEST NEXT DIGIT FOR SEGMENT ON, JUMP TSTAGN
```

```
LOC   OBJ      LINE         SOURCE STATEMENT 0198  037F      355 OKCHK:   ADD    A,#7FH      ;IS THE DISPLAY VERIFY TEST POINTER IS IN THE ERROR MODE?
019A  F0        356          MOV    A,@R0
019B  F6C5      357          JC     DVOVR       ;YES, JUMP DVOVR
019D  2473      358          JMP    OK          ;NO, JUMP OK, GENERATE SEGMENT ADDRESS
019F  3684      359 TSEGOF:  JT0    TSTAGN      ;IF THE SEGMENT IS NOT OFF THEN GO TO DVERR
01A1  24AD      360          JMP    TSTREG      ;
01A3  FE        361 TSTPTR:  MOV    A,R6         ;FETCH DISPLAY VERIFY TEST POINTER
01A4  DF        362          XRL    A,R7         ;IS DISPLAY VERIFY POINTER EQUAL TO SEGMENT POINTER?
01A5  C6AD      363          JZ     TSTREG      ;YES, JUMP TSTREG, COMPARE TEST REGISTERS AND DIIT REGISTERS
01A7  FA        364          MOV    A,R2         ;NO, ARE THE TEST REGISTERS ZERO?
01A8  4B        365          ORL    A,R3
01A9  C6C5      366          JZ     DVOVR       ;YES, TEST REGISTERS ARE ZERO, JUMP DVOVR
01AB  24BD      367          JMP    DVERR       ;NO, TEST REGSTERS NOT ZERO, GO DVERR
01AD  FA        368 TSTREG:  MOV    A,R2         ;ARE THE TEST REG. AND THE DIGIT REG. EQUAL?
01AE  DC        369          XRL    A,R4
01AF  96BD      370          JNZ    DVERR       ;NO, DISPLAY VERIFY ERROR, JUMP DVERR
01B1  FB        371          MOV    A,R3
01B2  DD        372          XRL    A,R5
01B3  5307      373          ANL    A,#07H      ;DO NOT TEST LED DEC POINT AHEAD OF MSD OF TARE
01B5  96BD      374          JNZ    DVERR       ;REGISTERS NOT ZERO, JUMP DVERR
01B7  F0        375          MOV    A,@R0       ;SET DISPLAY VERIFY POINTER BACK ONE SEGMENT
01B8  97        376          CLR    C
01B9  67        377          RRC    A
01BA  A0        378          MOV    @R0,A
01BB  24C5      379          JMP    DVOVR       ;JUMP DVOVR, DISPLAY VERIFY OVER FOR THIS SEGMENT
01BD  B929      380 DVERR:   MOV    R1,#ERROR   ;ADDRESS THE ERROR FLAG REGISTER
01BF  F1        381          MOV    A,@R1
01C0  4380      382          ORL    A,#80H      ;SET DISPLAY ERROR FLAG
01C2  A1        383          MOV    @R1,A       ;UPDATE THE ERROR FLAG REGISTER
01C3  B081      384          MOV    @R0,#81H    ;LOAD ERROR CODE INTO DISPLAY VERIFY POINTER
01C5  05        385 DVOVR:   EN     I           ;DISPLAY VERIFY OVER, ENABLE MAIN SCALE I/O INTERUPTS
01C6  25        386          EN     TCNTI       ;DISPLAY VERIFY OVER, ENABLE TIMER INTERUPTS
01C7  27        387          CLR    A
01C8  3A        388          OUTL   P2,A        ;RESET DISPLAY VERIFY SEGMENT SELECTOR
01C9  3C        389          MOVD   P4,A        ;RESET DISPLAY VERIFY DIGIT SELECTOR
01CA  FF        390          MOV    A,R7        ;MOVE SEGMENT POINTER TO ACCUMULATOR
01CB  F228      391          JB7    RETURN      ;RETURN TO MAIN PROGRAM FLOW IF SEGMENT SELECTED IS DECIMAL POINT (BIT 7 = 1
01CD  1226      392          JB0    DEB         ;IF SEGMENT A IS SELECTED (BIT 0 = 1) GO DEBOUNCE THE KEYBOARD
                393                             ;JUMP DEB, NOT SEGMENT A THEN TEST ROM AND RAM
                394          ;
                395          ;*** ROM TEST ***
                396          ;
01CF  B83C      397          MOV    R0,#TSTPOS
01D1  B93D      398          MOV    R1,#CHKSUM
01D3  F0        399          MOV    A,@R0       ;LOAD ROM POINTER INTO ACCUMULATOR
01D4  A3        400          MOVP   A,@A        ;FETCH ROM VALUE ADDRESSED BY R0 ON PAGE 1
01D5  61        401          ADD    A,@R1       ;ADD CHECKSUM REGISTER TO ROM VALUE
01D6  A1        402          MOV    @R1,A       ;UPDATE CHECKSUM REGISTER
01D7  F0        403          MOV    A,@R0       ;LOAD ROM POINTER INTO ACCUMULATOR
01D8  E3        404          MOVP3  A,@A        ;FETCH ROM VALUE ADDRESSED BY R0 ON PAGE 3
01D9  61        405          ADD    A,@R1       ;ADD CHECKSUM REGISTER TO ROM VALUE
01DA  A1        406          MOV    @R1,A       ;UPDATE CHECKSUM REGISTER
01DB  147D      407          CALL   TEST0       ;GO TEST ROM ON PAGES 0 AND 2
01DD  10        408          INC    @R0         ;INCREMENT ROM POINTER
01DE  C6EC      409          JZ     RAMTST      ;CHECKSUM VALUE = 0, GO RAMTST
01E0  F0        410          MOV    A,@R0       ;CHECKSUM VALUE NOT 0, CHECK ROM POINTER
01E1  96EC      411          JNZ    RAMTST      ;ROM POINTER NOT ZERO, GO RAMTST, ALL ROM NOT CHECKED YET
01E3  00        412          NOP                ;ROM POINTER = 0, ROM ERROR EXITS
01E4  B100      413          MOV    @R1,#00H    ;RESET CHECKSUM REGISTER
01E6  B929      414          MOV    R1,#ERROR   ;ADDRESS ERROR FLAG REGISTER
01E8  F1        415          MOV    A,@R1       ;ERROR FLAGS TO ACCUMULATOR
01E9  4320      416          ORL    A,#20H      ;SET ROM ERROR FLAG
01EB  A1        417          MOV    @R1,A       ;UPDATE ERROR FLAG REGISTER
                418          ;
                419          ;*** RAM TEST ***
                420          ;
01EC  15        421 RAMTST:  DIS    I           ;DISABLE I/O INTERUPTS DURING RAM TEST
01ED  35        422          DIS    TCNTI       ;DISABLE TIMER INTERUPTS DURING RAM TEST
01EE  F0        423          MOV    A,@R0       ;MOVE RAM POINTER TO ACCUMULATOR
01EF  533E      424          ANL    A,#3EH      ;IS R0 OR R1 OF RB0 TO BE CHECKED?
01F1  96F6      425          JNZ    NEXT36      ;NO, JUMP NEXT36
01F3  D5        426          SEL    RB1         ;YES, USE RB1 TO TEST R0 AND R1 OF RB0
01F4  B83C      427          MOV    R0,#TSTPOS  ;LOAD TSTPOS INTO R0 OF RB1
01F6  F0        428 NEXT36:  MOV    A,@R0       ;LOAD THE POINTER INTO ACCUMULATOR
01F7  A9        429          MOV    R1,A        ;MOVE POINTER TO R1
01F8  F1        430          MOV    A,@R1       ;MOVE CONTENTS ADDRESSED BY R1 TO ACCUMULATOR
01F9  A8        431          MOV    R0,A        ;SAVE THE CONTENTS IN R0
01FA  37        432          CPL    A
01FB  A1        433          MOV    @R1,A       ;PUT THE ONE'S COMPLIMENT INTO THE REGISTER
01FC  F1        434          MOV    A,@R1       ;AND RECALL THE ONE'S COMPLIMENT DATA TO ACCUMULATOR
01FD  68        435          ADD    A,R0        ;ADD ORIGINAL CONTENTS TO ONE'S COMPLIMENT DATA
01FE  28        436          XCH    A,R0        ;RESULTANT SUM TO R0, AND ORIGINAL CONTENTS TO ACCUMULATOR
01FF  A1        437          MOV    @R1,A       ;RESTORE ORIGINAL CONTENTS TO RAM LOCATION
0200  F8        438          MOV    A,R0        ;MOVE SUM DATA TO ACCUMULATOR
0201  C5        439          SEL    RB0         ;RESTORE REGISTER BANK 0
0202  05        440          EN     I           ;RAM RESTORED, ENABLE MAIN SCALE I/O INTERUPTS
0203  25        441          EN     TCNTI       ;RAM RESTORED, ENABLE TIMER INTERUPTS
0204  17        442          INC    A           ;RESULTANT SUM DATA SHOULD BE = FF, ADD 1, RESULT = 0
0205  C639      443          JZ     A1          ;RAM + COMPLIMENT RAM + 1 = 0, NO RAM ERROR GO A1 FOR NEXT SEGMENT OUTPUT
0207  B929      444          MOV    R1,#ERROR   ;RAM + COMPLIMENT RAM + 1 NOT ZERO, RAM ERROR EXITS
0209  F1        445          MOV    A,@R1       ;MOVE ERROR FLAGS TO ACCUMULATOR
020A  4340      446          ORL    A,#40H      ;SET RAM ERROR FLAG
020C  A1        447          MOV    @R1,A       ;UPDATE ERROR FLAG REGISTER
020D  4439      448          JMP    A1          ;GO UPDATE SEGMENT POINTER
                449          ;
                450          ;*** KEYBOARD LEADING EDGE DETECTOR ***
                451          ;
020F  B82B      452 DEB:     MOV    R0,#OLDKEY  ;ADDRESS OLDKEY 1
```

```
LOC  OBJ     LINE         SOURCE STATEMENT

0211 B920    453          MOV    R1,#NEWKEY    ;ADDRESS NEWKEY 1
0213 F0      454          MOV    A,@R0
0214 51      455          ANL    A,@R1         ;DETECT CHANGE ( LEADING EDGE )
0215 21      456          XCH    A,@R1         ;STORE THE RESULT AT NEWKEY 1, PREVIOUS NEWKEY 1 TO ACCUMULATOR
0216 37      457          CPL    A             ;COMPLIMENT PREVIOUS NEWKEY 1
0217 A0      458          MOV    @R0,A         ;STORE THE RESULT AT OLDKEY 1
0218 18      459          INC    R0            ;ADDRESS OLDKEY 2
0219 19      460          INC    R1            ;ADDRESS NEWKEY 2
021A F0      461          MOV    A,@R0
021B F0      462          MOV    A,@R0         ;DETECT CHANGE ( LEADING EDGE )
021C 51      463          ANL    A,@R1
021D 21      464          XCH    A,@R1         ;STORE THE RESULT AT NEWKEY 2, PREVIOUS NEWKEY 2 TO ACCUMULATOR
021E 37      465          CPL    A             ;COMPLIMENT PREVIOUS NEWKEY 2
021F A0      466          MOV    @R0,A         ;STORE THE RESULT AT OLDKEY 2
             467          ;
             468          ;*** KEYBOARD ENTRY DECODE ***
             469          ;
0220 C9      470          DEC    R1            ;ADDRESS NEWKEY 1
0221 BA13    471          MOV    R2,#13H       ;INITIALIZE KEY POINTER
0223 F1      472  DLOOP:  MOV    A,@R1         ;NEWKEY TO ACCUMULATO
0224 C630    473          JZ     NONE          ;NEWKEY = 0, JUMP NONE, NO KEY ENTRY
0226 F7      474  FLOOP:  RLC    A             ;NEWKEY NOT ZERO, KEY PRESENT
0227 1A      475          INC    R2            ;INCREMENT KEY POINTER
0228 E626    476          JNC    FLOOP         ;CONTINUE TILL KEY FOUND (C=1)
022A FA      477          MOV    A,R2          ;KEY POINTER TO ACCUMULATOR
022B E3      478          MOVP3  A,@A          ;READ THE KEYBOARD TABLE TO SEE WHICH KEY WAS PRESSED
022C F275    479          JB7    NOTNUM        ;BIT 7 = 1, KEYBOARD ENTRY A COMMAND, GO NOTNUM
022E 443F    480          JMP    NUM           ;BIT 7 = 0, KEYBOARD ENTRY NUMERICAL, GO NUM
0230 19      481  NONE:   INC    R1            ;ADDRESS NEWKEY 2
0231 FA      482          MOV    A,R2          ;ADJUST KEY POINTER, KEY WAS NOT FOUND
0232 0308    483          ADD    A,#08H
0234 AA      484          MOV    R2,A
0235 D323    485          XRL    A,#13H+08H+08H
0237 9623    486          JNZ    DLOOP         ;KEY POINTER NOT ZERO, GO DLOOP, CHECK NEWKEY 2
0239 FF      487  A1:     MOV    A,R7          ;MOVE THE SEGMENT POINTER TO ACCUMULATOR
023A 97      488          CLR    C
023B F7      489          RLC    A             ;ROTATE SEGMENT POINTER 1 POSITION LEFT
023C AF      490          MOV    R7,A          ;UPDATE SEGMENT POINTER REGISTER
023D 2451    491          JMP    JP3
             492          ;
             493          ;*** NUMBER SERVICE ROUTINE ***
             494          ;
023F AB      495  NUM:    MOV    R3,A          ;SAVE THE DIGIT
0240 B820    496          MOV    R0,#STAT1     ;IS KEYBOARD TARE LEGAL?
0242 F0      497          MOV    A,@R0
0243 7239    498          JB3    A1            ;NO, JUMP A1 AND UPDATE SEGMENT POINTER
0245 B828    499          MOV    R0,#STAT3     ;HAS A NUMBER BEEN ENTERED BEFORE?
0247 F0      500          MOV    A,@R0
0248 F256    501          JB7    NCTARE        ;YES, JUMP NCTARE
024A B925    502          MOV    R1,#TARE      ;NO, ADDRESS TARE REGISTER
024C BA03    503          MOV    R2,#03H
024E B100    504  CTLOOP: MOV    @R1,#00H      ;CLEAR TARE REGISTER
0250 19      505          INC    R1
0251 EA4E    506          DJNZ   R2,CTLOOP
0253 4380    507          ORL    A,#80H        ;SET TARE INPUT FLAG = 1
0255 A0      508          MOV    @R0,A
0256 27      509  NCTARE: CLR    A             ;CLEAR THE TIMER
0257 62      510          MOV    T,A
0258 D5      511          SEL    RB1           ;CLEAR THE MASTER TIME
0259 AF      512          MOV    R7,A
025A C5      513          SEL    RB0
025B BA04    514          MOV    R2,#04H       ;SET THE SHIFT COUNTER EQUAL TO 4
025D B903    515  SHFTL3: MOV    R1,#03H       ;SET BYTE COUNTER EQUAL TO 3
025F B825    516          MOV    R0,#TARE      ;ADDRESS TARE REGISTER
0261 97      517          CLR    C
0262 F0      518  LOOPS3: MOV    A,@R0         ;SHIFT THE 3 BYTE BCD TARE REGISTER 4 BITS TO THE LEFT
0263 F7      519          RLC    A             ;(MULTIPLY X 10)
0264 A0      520          MOV    @R0,A
0265 18      521          INC    R0
0266 E962    522          DJNZ   R1,LOOPS3
0268 EA5D    523          DJNZ   R2,SHFTL3     ;CONTINUE SHIFT OPERATION TILL SHIFT COMPLETE
026A C8      524          DEC    R0            ;ADDRESS MOST SIGNIFICANT BYTE TO TARE REGISTER
026B 530F    525          ANL    A,#0FH        ;MASK OFF MSD (6 TH DIGIT) TARE DISPLAY ONLY FIVE DIGITS
026D A0      526          MOV    @R0,A
026E B825    527          MOV    R0,#TARE      ;ADDRESS TARE REGISTER LEAST SIGNIFICANT BYTE
0270 F0      528          MOV    A,@R0
0271 4B      529          ORL    A,R3          ;LOAD KEYBOARD ENTRY INTO LSD OF BCD TARE REGISTER
0272 A0      530          MOV    @R0,A         ;UPDATE LEAST SIGNIFICANT BYTE OF TARE REGISTER
0273 4439    531          JMP    A1            ;GO UPDATE SEGMENT POINTER
             532          ;
             533          ;*** KEYBOARD COMMAND SERVICE ROUTINE ***
             534          ;
0275 537F    535  NOTNUM: ANL    A,#7FH        ;CLEAR TOP BIT
0277 AA      536          MOV    R2,A          ;SAVE THE NON NUMERIC ENTRY IN REGISTER 2
0278 B82A    537          MOV    R0,#COMMAND   ;ADDRESS COMMAND REGISTER
027A 40      538          ORL    A,@R0         ;COMBINED ENTRY AND COMMAND REGISTER
027B A0      539          MOV    @R0,A         ;UPDATE COMMAND REGISTER
027C FA      540          MOV    A,R2
027D D304    541          XRL    A,#04H        ;WAS KEYBOARD ENTRY THE CLEAR KEY?
027F 9639    542          JNZ    A1            ;NO, GO UPDATE SEGMENT POINTER
0281 B828    543          MOV    R0,#STAT3     ;YES, TOGGLE THE LAMP TEST BIT
0283 F0      544          MOV    A,@R0
0284 D340    545          XRL    A,#40H
0286 A0      546          MOV    @R0,A
0287 4439    547          JMP    A1            ;GO UPDATE THE SEGMENT POINTER
             548          ;
             549          ;*** READ KEYBOARD ROUTINE ***
             550          ;
```

```
LOC  OBJ      LINE    SOURCE STATEMENT

0289 BE02     551 KEYBRD: MOV    R6,#02H      ;SET UP THE COUNTER
028B F8       552 KB1:   MOV    A,R0          ;KEYBOARD ADDRESS TO ACCUMULATOR
028C 3C       553        MOVD   P4,A          ;OUTPUT KEYBOARD ADDRESS
028D 77       554        RR     A             ;UPDATE KEYBOARD ADDRESS POINTER FOR NEXT ROW
028E A8       555        MOV    R0,A          ;STORE NEW KEYBOARD ADDRESS POINTER
028F 09       556        IN     A,P1          ;INPUT KEYBOARD MATRIX DATA 4 BITS AT A TIME
0290 47       557        SWAP   A             ;SHIFT DATA INTO UPPER 4 BITS
0291 AA       558        MOV    R2,A          ;TEMPORARILY SAVE UPPER 4 BITS IN REG 2
0292 F8       559        MOV    A,R0          ;FETCH KEYBOARD ADDRESS POINTER FOR NEXT ROW
0293 3C       560        MOVD   P4,A          ;OUTPUT KEYBOARD ADDRESS
0294 E7       561        RL     A             ;RESTORE KEYBOARD ADDRESS POINTER
0295 A8       562        MOV    R0,A          ;STORE NEW KEYBOARD ADDRESS POINTER
0296 09       563        IN     A,P1          ;INPUT KEYBOARD MATRIX DATA 4 BITS AT A TIME
0297 4A       564        ORL    A,R2          ;COMBINED FIRST 4 BITS WITH SECOND 4 BITS
0298 EE9D     565        DJNZ   R6,KB2        ;GO KBD2, READ KEYBOARD MATRIX A SECOND TIME
029A 5B       566        ANL    A,R3
029B A1       567        MOV    @R1,A         ;STORE THE KEYBOARD ENTRY
029C 83       568        RET                  ;RETURN
029D AB       569 KB2:   MOV    R3,A          ;STORE FIRST PASS DATA REG 3
029E 448B     570        JMP    KB1           ;READ KEYBOARD A SECOND TIME
              571        ;
              572        ;*** BCD TO 7 SEGMENT CONVERSION ROUTINE ***
              573        ;
              574        ;THIS ROUTINE TAKES BCD DATA AND CONVERTS TO 7 SEGMENT DATA
              575        ;THE BCD SOURCE ADDRESS IS FOUND IN R2 REG
              576        ;THE 7 SEGMENT DESTINATION ADDRESS IS FOUND IN R1 REG
              577
02A0 B820     578 BCDSEG: MOV   R0,#STAT1     ;READ DECIMAL POINT LOCATION IN STAT1
02A2 F0       579        MOV    A,@R0
02A3 5307     580        ANL    A,#07H
02A5 BC06     581        MOV    R4,#06H       ;LOAD DECIMAL POINT DEFAULT VALUE IN REG 4
02A7 C6AA     582        JZ     ZER           ;IF A=0, LOAD DECIMAL POINT DEFAULT VALUE, JUMP ZER
02A9 AC       583        MOV    R4,A          ;DECIMAL POINT NOT IN LSD, LOAD DECIMAL POINT LOCATION IN REG 4
02AA BB03     584 ZER:   MOV    R3,#03H
02AC FA       585        MOV    A,R2          ;MOVE BCD SOURCE ADDRESS TO R0 POINTER
02AD A8       586        MOV    R0,A
02AE F0       587 BLOOP: MOV    A,@R0         ;MOVE A BCD DATA TO ACCUMULATOR
02AF 54B9     588        CALL   TRANS         ;TRANSFORM BCD DATA IN THE LOWER NYBBLE INTO 7 SEGMENT DATA
02B1 F0       589        MOV    A,@R0         ;RESTORE BCD DATA TO ACCUMULATOR
02B2 47       590        SWAP   A             ;EXCHANGE UPPER AND LOWER NYBBLES
02B3 54B9     591        CALL   TRANS         ;TRANSFORM BCD DATA IN THE UPPER NYBBLE INTO 7 SEGMENT DATA
02B5 18       592        INC    R0            ;INCREMENT BCD ADDRESS POINTER
02B6 EBAE     593        DJNZ   R3,BLOOP      ;CONTINUE TILL ALL BCD DATA CONVERTED TO 7 SEGMENT DATA
02B8 83       594        RET
              595        ;
              596        ;*** BCD CHARACTER TO 7 SEGMENT CONVERSION ROUTINE ***
              597        ;
              598        ;THIS ROUTINE CONVERTS A BCD CHARACTER TO 7 SEGMENT DATA ONE DIGIT AT A TIME
              599
02B9 530F     600 TRANS: ANL    A,#0FH        ;MASK OFF UPPER NYBBLE
02BB E3       601        MOVP3  A,@A          ;PERFORM TABLE LOOKUP OF 7 SEGMENT DATA
02BC 2C       602        XCH    A,R4          ;7 SEGMENT DATA > R4, DECIMAL POINT LOCATION > ACC
02BD 96C3     603        JNZ    NDP           ;DECIMAL POINT COUNTER NOT EQUAL 0, NO DECIMAL POINT IN THIS DIGIT
02BF 2C       604        XCH    A,R4          ;7 SEGMENT DATA TO ACC
02C0 4380     605        ORL    A,#80H        ;INSERT DECIMAL POINT IN 7 SEGMENT DATA
02C2 2C       606        XCH    A,R4          ;7 SEGMENT DATA TO R4
02C3 2C       607 NDP:   XCH    A,R4          ;RESTORE DECIMAL POINT COUNTER TO R4
02C4 A1       608        MOV    @R1,A         ;STORE 7 SEGMENT DATA
02C5 CC       609        DEC    R4            ;DECREMENT DECIMAL POINT COUNTER
02C6 19       610        INC    R1            ;INCREMENT 7 SEGMENT DESTINATION ADDRESS
02C7 83       611        RET
              612        ;
              613        ;*** DATA INPUT WAIT ROUTINE ***
              614        ;
02C8 B90F     615 DATIN: MOV    R1,#0FH
02CA D6CD     616 ISIBF: JNIBF  NIBF
02CC 83       617        RET
02CD E9CA     618 NIBF:  DJNZ   R1,ISIBF
02CF 83       619        RET
              620        ;
              621        ;*** DATA OUTPUT WAIT ROUTINE ***
              622        ;
02D0 B90F     623 DATOUT: MOV   R1,#0FH
02D2 86D5     624 ISOBF: JOBF   OBF
02D4 83       625        RET
02D5 E9D2     626 OBF:   DJNZ   R1,ISOBF
02D7 83       627        RET
              628        ;
              629        ;*** ROM TEST FOR PAGE 2 ***
              630        ;
02D8 F0       631 TEST2: MOV    A,@R0
02D9 A3       632        MOVP   A,@A
02DA 61       633        ADD    A,@R1
02DB A1       634        MOV    @R1,A
02DC 83       635        RET
              636        ;
              637        ;*** LOAD ALL BLANKS OR EIGHTS ROUTINE ***
              638        ;
02DD B82F     639 FILLIT: MOV   R0,#WETSEG
02DF BA0C     640        MOV    R2,#0CH
02E1 A0       641 LOOP:  MOV    @R0,A
02E2 18       642        INC    R0
02E3 EAE1     643        DJNZ   R2,LOOP
02E5 83       644        RET
              645        ;
              646        ;*** PAGING FILLER (2E6H - 2FFH)
              647        FILL   300H
              648+       REPT   300H-$
```

```
LOC   OBJ        LINE    SOURCE STATEMENT
                 649+    NOP
                 650+    ENDM
02E6  00         651+    NOP
02E7  00         652+    NOP
02E8  00         653+    NOP
02E9  00         654+    NOP
02EA  00         655+    NOP
02EB  00         656+    NOP
02EC  00         657+    NOP
02ED  00         658+    NOP
02EE  00         659+    NOP
02EF  00         660+    NOP
02F0  00         661+    NOP
02F1  00         662+    NOP
02F2  00         663+    NOP
02F3  00         664+    NOP
02F4  00         665+    NOP
02F5  00         666+    NOP
02F6  00         667+    NOP
02F7  00         668+    NOP
02F8  00         669+    NOP
02F9  00         670+    NOP
02FA  00         671+    NOP
02FB  00         672+    NOP
02FC  00         673+    NOP
02FD  00         674+    NOP
02FE  00         675+    NOP
02FF  00         676+    NOP
0300             677     ORG     300H
                 678             ;
                 679             ;*** BCD TO 7 SEGMENT CONVERSION FACTORS ***
                 680             ;
0300  3F         681 BCD:    DB    3FH,06H,5BH,4FH       ;0,1,2,3
0301  06
0302  5B
0303  4F
0304  66         682         DB    66H,6DH,7DH,07H       ;4,5,6,7
0305  6D
0306  7D
0307  07
0308  7F         683         DB    7FH,67H,77H,7CH       ;8,9,A,B
0309  67
030A  77
030B  7C
030C  39         684         DB    39H,40H,79H,00H       ;C,D,E,
030D  40
030E  79
030F  00
                 685             ;
                 686             ;*** TABLE OF ERROR SYMBOLS ***
                 687             ;
                 688             ; D = DISPLAY ERROR
                 689             ; R = RAM ERROR
                 690             ; A = ROM ERROR
                 691             ; U = ANALOG VERIFY ERROR
                 692             ;
0310  5E         693 ERRCOD: DB   5EH,50H,77H,1CH ; ERROR SYMBOLS (D,R,A,U)
0311  50
0312  77
0313  1C
                 694             ;
                 695             ;*** KEYBOARD ENTRY INTERPRETIVE TABLE ***
                 696             ;
0314  84         697 ECODE:  DB    84H,09H,08H,07H       ;C,9,8,7
0315  09
0316  08
0317  07
0318  A0         698         DB    0A0H,88H,81H,90H      ;Z,AV,LB/KG,P
0319  88
031A  81
031B  90
031C  82         699         DB    82H,06H,05H,04H       ;T,6,5,4
031D  06
031E  05
031F  04
0320  00         700         DB    00H,03H,02H,01H       ;0,3,2,1
0321  03
0322  02
0323  01
                 701             ;
                 702             ;*** CHECK SUM DIGIT LOCATED HERE ***
                 703             ;
0324  2B         704         DB    2BH
0325  50524F47   705         DB    'PROGRAMMED BY SCOTT FLUHRER'
0329  52414D4D
032D  45442042
0331  59205343
0335  4F545420
0339  464C5548
033D  524552
                 706             ;
                 707             ;*** PAGING FILLER (340H - 3FFH)
                 708         FILL  400H
```

| LOC | OBJ | LINE | SOURCE STATEMENT |
|---|---|---|---|
|  |  | 709+ | REPT 400H-1 |
|  |  | 710+ | NOP |
|  |  | 711+ | ENDM |
| 0340 | 00 | 712+ | NOP |
| 0341 | 00 | 713+ | NOP |
| 0342 | 00 | 714+ | NOP |
| 0343 | 00 | 715+ | NOP |
| 0344 | 00 | 716+ | NOP |
| 0345 | 00 | 717+ | NOP |
| 0346 | 00 | 718+ | NOP |
| 0347 | 00 | 719+ | NOP |
| 0348 | 00 | 720+ | NOP |
| 0349 | 00 | 721+ | NOP |
| 034A | 00 | 722+ | NOP |
| 034B | 00 | 723+ | NOP |
| 034C | 00 | 724+ | NOP |
| 034D | 00 | 725+ | NOP |
| 034E | 00 | 726+ | NOP |
| 034F | 00 | 727+ | NOP |
| 0350 | 00 | 728+ | NOP |
| 0351 | 00 | 729+ | NOP |
| 0352 | 00 | 730+ | NOP |
| 0353 | 00 | 731+ | NOP |
| 0354 | 00 | 732+ | NOP |
| 0355 | 00 | 733+ | NOP |
| 0356 | 00 | 734+ | NOP |
| 0357 | 00 | 735+ | NOP |
| 0358 | 00 | 736+ | NOP |
| 0359 | 00 | 737+ | NOP |
| 035A | 00 | 738+ | NOP |
| 035B | 00 | 739+ | NOP |
| 035C | 00 | 740+ | NOP |
| 035D | 00 | 741+ | NOP |
| 035E | 00 | 742+ | NOP |
| 035F | 00 | 743+ | NOP |
| 0360 | 00 | 744+ | NOP |
| 0361 | 00 | 745+ | NOP |
| 0362 | 00 | 746+ | NOP |
| 0363 | 00 | 747+ | NOP |
| 0364 | 00 | 748+ | NOP |
| 0365 | 00 | 749+ | NOP |
| 0366 | 00 | 750+ | NOP |
| 0367 | 00 | 751+ | NOP |
| 0368 | 00 | 752+ | NOP |
| 0369 | 00 | 753+ | NOP |
| 036A | 00 | 754+ | NOP |
| 036B | 00 | 755+ | NOP |
| 036C | 00 | 756+ | NOP |
| 036D | 00 | 757+ | NOP |
| 036E | 00 | 758+ | NOP |
| 036F | 00 | 759+ | NOP |
| 0370 | 00 | 760+ | NOP |
| 0371 | 00 | 761+ | NOP |
| 0372 | 00 | 762+ | NOP |
| 0373 | 00 | 763+ | NOP |
| 0374 | 00 | 764+ | NOP |
| 0375 | 00 | 765+ | NOP |
| 0376 | 00 | 766+ | NOP |
| 0377 | 00 | 767+ | NOP |
| 0378 | 00 | 768+ | NOP |
| 0379 | 00 | 769+ | NOP |
| 037A | 00 | 770+ | NOP |
| 037B | 00 | 771+ | NOP |
| 037C | 00 | 772+ | NOP |
| 037D | 00 | 773+ | NOP |
| 037E | 00 | 774+ | NOP |
| 037F | 00 | 775+ | NOP |
| 0380 | 00 | 776+ | NOP |
| 0381 | 00 | 777+ | NOP |
| 0382 | 00 | 778+ | NOP |
| 0383 | 00 | 779+ | NOP |
| 0384 | 00 | 780+ | NOP |
| 0385 | 00 | 781+ | NOP |
| 0386 | 00 | 782+ | NOP |
| 0387 | 00 | 783+ | NOP |
| 0388 | 00 | 784+ | NOP |
| 0389 | 00 | 785+ | NOP |
| 038A | 00 | 786+ | NOP |
| 038B | 00 | 787+ | NOP |
| 038C | 00 | 788+ | NOP |
| 038D | 00 | 789+ | NOP |
| 038E | 00 | 790+ | NOP |
| 038F | 00 | 791+ | NOP |
| 0390 | 00 | 792+ | NOP |
| 0391 | 00 | 793+ | NOP |
| 0392 | 00 | 794+ | NOP |
| 0393 | 00 | 795+ | NOP |
| 0394 | 00 | 796+ | NOP |
| 0395 | 00 | 797+ | NOP |
| 0396 | 00 | 798+ | NOP |
| 0397 | 00 | 799+ | NOP |
| 0398 | 00 | 800+ | NOP |
| 0399 | 00 | 801+ | NOP |
| 039A | 00 | 802+ | NOP |
| 039B | 00 | 803+ | NOP |
| 039C | 00 | 804+ | NOP |
| 039D | 00 | 805+ | NOP |
| 039E | 00 | 806+ | NOP |

| LOC | OBJ | LINE | SOURCE STATEMENT |
|---|---|---|---|
| 039F | 00 | 807+ | NOP |
| 03A0 | 00 | 808+ | NOP |
| 03A1 | 00 | 809+ | NOP |
| 03A2 | 00 | 810+ | NOP |
| 03A3 | 00 | 811+ | NOP |
| 03A4 | 00 | 812+ | NOP |
| 03A5 | 00 | 813+ | NOP |
| 03A6 | 00 | 814+ | NOP |
| 03A7 | 00 | 815+ | NOP |
| 03A8 | 00 | 816+ | NOP |
| 03A9 | 00 | 817+ | NOP |
| 03AA | 00 | 818+ | NOP |
| 03AB | 00 | 819+ | NOP |
| 03AC | 00 | 820+ | NOP |
| 03AD | 00 | 821+ | NOP |
| 03AE | 00 | 822+ | NOP |
| 03AF | 00 | 823+ | NOP |
| 03B0 | 00 | 824+ | NOP |
| 03B1 | 00 | 825+ | NOP |
| 03B2 | 00 | 826+ | NOP |
| 03B3 | 00 | 827+ | NOP |
| 03B4 | 00 | 828+ | NOP |
| 03B5 | 00 | 829+ | NOP |
| 03B6 | 00 | 830+ | NOP |
| 03B7 | 00 | 831+ | NOP |
| 03B8 | 00 | 832+ | NOP |
| 03B9 | 00 | 833+ | NOP |
| 03BA | 00 | 834+ | NOP |
| 03BB | 00 | 835+ | NOP |
| 03BC | 00 | 836+ | NOP |
| 03BD | 00 | 837+ | NOP |
| 03BE | 00 | 838+ | NOP |
| 03BF | 00 | 839+ | NOP |
| 03C0 | 00 | 840+ | NOP |
| 03C1 | 00 | 841+ | NOP |
| 03C2 | 00 | 842+ | NOP |
| 03C3 | 00 | 843+ | NOP |
| 03C4 | 00 | 844+ | NOP |
| 03C5 | 00 | 845+ | NOP |
| 03C6 | 00 | 846+ | NOP |
| 03C7 | 00 | 847+ | NOP |
| 03C8 | 00 | 848+ | NOP |
| 03C9 | 00 | 849+ | NOP |
| 03CA | 00 | 850+ | NOP |
| 03CB | 00 | 851+ | NOP |
| 03CC | 00 | 852+ | NOP |
| 03CD | 00 | 853+ | NOP |
| 03CE | 00 | 854+ | NOP |
| 03CF | 00 | 855+ | NOP |
| 03D0 | 00 | 856+ | NOP |
| 03D1 | 00 | 857+ | NOP |
| 03D2 | 00 | 858+ | NOP |
| 03D3 | 00 | 859+ | NOP |
| 03D4 | 00 | 860+ | NOP |
| 03D5 | 00 | 861+ | NOP |
| 03D6 | 00 | 862+ | NOP |
| 03D7 | 00 | 863+ | NOP |
| 03D8 | 00 | 864+ | NOP |
| 03D9 | 00 | 865+ | NOP |
| 03DA | 00 | 866+ | NOP |
| 03DB | 00 | 867+ | NOP |
| 03DC | 00 | 868+ | NOP |
| 03DD | 00 | 869+ | NOP |
| 03DE | 00 | 870+ | NOP |
| 03DF | 00 | 871+ | NOP |
| 03E0 | 00 | 872+ | NOP |
| 03E1 | 00 | 873+ | NOP |
| 03E2 | 00 | 874+ | NOP |
| 03E3 | 00 | 875+ | NOP |
| 03E4 | 00 | 876+ | NOP |
| 03E5 | 00 | 877+ | NOP |
| 03E6 | 00 | 878+ | NOP |
| 03E7 | 00 | 879+ | NOP |
| 03E8 | 00 | 880+ | NOP |
| 03E9 | 00 | 881+ | NOP |
| 03EA | 00 | 882+ | NOP |
| 03EB | 00 | 883+ | NOP |
| 03EC | 00 | 884+ | NOP |
| 03ED | 00 | 885+ | NOP |
| 03EE | 00 | 886+ | NOP |
| 03EF | 00 | 887+ | NOP |
| 03F0 | 00 | 888+ | NOP |
| 03F1 | 00 | 889+ | NOP |
| 03F2 | 00 | 890+ | NOP |
| 03F3 | 00 | 891+ | NOP |
| 03F4 | 00 | 892+ | NOP |
| 03F5 | 00 | 893+ | NOP |
| 03F6 | 00 | 894+ | NOP |
| 03F7 | 00 | 895+ | NOP |
| 03F8 | 00 | 896+ | NOP |
| 03F9 | 00 | 897+ | NOP |
| 03FA | 00 | 898+ | NOP |
| 03FB | 00 | 899+ | NOP |
| 03FC | 00 | 900+ | NOP |
| 03FD | 00 | 901+ | NOP |
| 03FE | 00 | 902+ | NOP |
| 03FF | 00 | 903+ | NOP |
|  |  | 904 | END |

```
LOC  OBJ       LINE    SOURCE STATEMENT
```

USER SYMBOLS
| | | | | | | | | | | | | | | |
|---|---|---|---|---|---|---|---|---|---|---|---|---|---|---|
| A1 | 0239 | AVIP | 00F1 | BACK | 001C | BCD | 0300 | BCD7SG | 0092 | BCDSEG | 02A0 | BLANKC | 0124 | BLANKT | 00EC |
| BLANKZ | 00E9 | BLOOP | 02AE | CHKSUM | 003D | COMMND | 002A | CTLOOP | 024E | DATAIO | 001F | DATIN | 02C8 | DATOUT | 02D0 |
| DEB | 0126 | DEBC | 020F | DISPLY | 012B | DLOOP | 0223 | DVERR | 01BD | DVOVR | 01C5 | DVTSTP | 003B | ECODE | 0314 |
| ELOOP | 00F7 | ELOP | 010E | ENDCHK | 00B0 | ENDIO | 0065 | ERR | 00F5 | ERRCOD | 0310 | ERROR | 0029 | FI | 00ED |
| FID | 00E5 | FILL | 0000 | FILLIT | 02DD | FLOOP | 0226 | GENSEG | 0176 | GO | 017C | IN5 | 0048 | INDOVR | 00C2 |
| INLOOP | 0055 | INPUT | 0053 | INTTAR | 005E | ISIBF | 02CA | ISOBF | 02D2 | JP1 | 0150 | JP2 | 0158 | JP3 | 0151 |
| JP4 | 0147 | KB1 | 028B | KB2 | 029D | KEYBRD | 0289 | LOOP | 02E1 | LOOPS3 | 0262 | NBT | 0004 | NCDI | 0072 |
| NCTARE | 0256 | NDP | 02C3 | NEWKEY | 002D | NEXT36 | 01F6 | NIBF | 02CD | NONE | 0230 | NOTARE | 002D | NOTNUM | 0275 |
| NUM | 023F | OBF | 0205 | OK | 0173 | OKCHK | 0198 | OLDKEY | 002B | PWRON | 0083 | RANTST | 01EC | RETURN | 0128 |
| RSTMEM | 008D | SHFTL3 | 0250 | STAT1 | 0020 | STAT2 | 0021 | STAT3 | 0028 | TARE | 0025 | TAROVR | 00BC | TARSEG | 0035 |
| TEST0 | 007D | TEST2 | 02D8 | TESTSG | 00DE | TOUT | 0039 | TOUTCP | 004C | TRANS | 02B9 | TSEGOF | 019F | TSTAGN | 0184 |
| TSTPOS | 003C | TSTPTR | 01A3 | TSTREG | 01AD | WAIT1 | 0077 | WAIT2 | 0046 | WEIGHT | 0022 | WETSEG | 002F | ZER | 02AA |

ASSEMBLY COMPLETE,  NO ERRORS

ISIS-II ASSEMBLER SYMBOL CROSS REFERENCE, V2.1

| | | | | | | |
|---|---|---|---|---|---|---|
| A1 | 443 | 448 | 487# | 498 | 531 | 542 | 547 |
| AVIP | 177 | 224# | | | | |
| BACK | 61 | 70# | | | | |
| BCD | 681# | | | | | |
| BCD7SG | 165# | 212 | | | | |
| BCDSEG | 187 | 190 | 578# | | | |
| BLANKC | 240 | 259# | | | | |
| BLANKT | 184 | 221# | 259 | | | |
| BLANKZ | 215 | 219# | | | | |
| BLOOP | 587# | 593 | | | | |
| CHKSUM | 35# | 398 | | | | |
| COMMND | 25# | 84 | 119 | 233 | 537 | |
| CTLOOP | 504# | 506 | | | | |
| DATAIO | 52 | 76# | | | | |
| DATIN | 109 | 115 | 615# | | | |
| DATOUT | 87 | 95 | 623# | | | |
| DEB | 260# | 392 | | | | |
| DEBC | 260 | 452# | | | | |
| DISPLY | 211 | 267# | | | | |
| DLOOP | 472# | 486 | | | | |
| DVERR | 367 | 370 | 374 | 380# | 385# | |
| DVOVR | 352 | 357 | 366 | 379 | 385# | |
| DVTSTP | 33# | 64 | 322 | | | |
| ECODE | 697# | | | | | |
| ELOOP | 227# | 229 | | | | |
| ELOP | 244# | 246 | | | | |
| ENDCHK | 180 | 185# | | | | |
| ENDIO | 116 | 119# | | | | |
| ERR | 174 | 226# | | | | |
| ERRCOD | 693# | | | | | |
| ERROR | 23# | 62 | 172 | 380 | 414 | 444 |
| FI | 222# | 225 | | | | |
| FID | 217# | 220 | | | | |
| FILL | 36# | 647 | 708 | | | |
| FILLIT | 217 | 222 | 639# | | | |
| FLOOP | 474# | 476 | | | | |
| GENSEG | 329# | 332 | | | | |
| GO | 330 | 333# | | | | |
| IN5 | 102# | 106 | | | | |
| INDOVR | 195# | 218 | | | | |
| INLOOP | 109# | 114 | | | | |
| INPUT | 103 | 108# | | | | |
| INTTAR | 96 | 110 | 115# | 118 | 134 | |
| ISIBF | 616# | 618 | | | | |
| ISOBF | 624# | 626 | | | | |
| JP1 | 305 | 307# | | | | |
| JP2 | 297 | 303# | | | | |
| JP3 | 285 | 298# | 491 | | | |
| JP4 | 289# | 307 | | | | |
| KB1 | 552# | 570 | | | | |
| KB2 | 565 | 569# | | | | |
| KEYBRD | 276 | 279 | 551# | | | |
| LOOP | 206 | 641# | 643 | | | |
| LOOPS3 | 518# | 522 | | | | |
| NBT | 203 | 207# | | | | |
| NCDI | 123 | 127# | | | | |
| NCTARE | 501 | 509# | | | | |
| NDP | 603 | 607# | | | | |
| NEWKEY | 30# | 275 | 453 | | | |
| NEXT36 | 425 | 428# | | | | |
| NIBF | 616 | 618# | | | | |
| NONE | 473 | 481# | | | | |
| NOTARE | 86# | | | | | |
| NOTNUM | 479 | 535# | | | | |
| NUM | 480 | 495# | | | | |
| OBF | 624 | 626# | | | | |
| OK | 327# | 358 | | | | |
| OKCHK | 324 | 355# | | | | |
| OLDKEY | 29# | 165 | 452 | | | |
| PWRON | 46 | 146# | | | | |
| RANTST | 409 | 411 | 421# | | | |
| RETURN | 261# | 391 | | | | |
| RSTMEM | 155# | 156 | | | | |
| SHFTL3 | 515# | 523 | | | | |
| STAT1 | 17# | 108 | 175 | 496 | 578 | |
| STAT2 | 19# | 169 | 191 | | | |
| STAT3 | 21# | 66 | 81 | 104 | 120 | 213 | 499 | 543 |

ISIS-II ASSEMBLER SYMBOL CROSS REFERENCE, V2.1

| TARE | 28# | 92 | 189 | 200 | 207 | 502 | 516 | 527 |
|---|---|---|---|---|---|---|---|---|
| TAROVR | 191# | 223 | 258 | | | | | |
| TARSEG | 32# | 188 | 205 | 242 | 298 | | | |
| TEST0 | 138# | 407 | | | | | | |
| TEST2 | 142 | 631# | | | | | | |
| TESTSG | 168 | 213# | | | | | | |
| TOUT | 93# | 98 | | | | | | |
| TOUTCP | 90 | 104# | | | | | | |
| TRANS | 588 | 591 | 600# | | | | | |
| TSEGOF | 351 | 359# | | | | | | |
| TSTAGN | 340# | 354 | 359 | | | | | |
| TSTPOS | 34# | 397 | 427 | | | | | |
| TSTPTR | 344 | 361# | | | | | | |
| TSTREG | 360 | 363 | 368# | | | | | |
| WAIT1 | 101 | 132# | | | | | | |
| WAIT2 | 101# | 132 | 133 | | | | | |
| WEIGHT | 27# | 186 | | | | | | |
| WETSEG | 31# | 185 | 639 | | | | | |
| ZER | 582 | 584# | | | | | | |

CROSS REFERENCE COMPLETE

What is claimed is:

1. In a digital scale in combination a scale mechanism, apparatus for generating signals representing the weight on the scale mechanism, storage means for storing a span multiplying factor, means for multiplying the weight represented by said signals by said stored span multiplying factor to obtain a corrected weight, apparatus for generating a verification signal representing a verification weight means for multiplying the verification weight represented by said verification signal by said stored span multiplying factor to obtain a corrected verification weight, storage means for also storing a verification reference value, and means to display an error indication when the corrected verification weight and the stored verification reference value differ by a predetermined amount.

2. In a digital scale in combination apparatus for generating a verification signal representating a verification weight, storage means for storing a reference verification value, means for also storing a span multiplying factor, means for multiplying the verification weight represented by said verification weight signal by the span multiplying factor, and means to change the stored span factor when the difference between the stored reference verification value and the verification weight is within predetermined limits to reduce the difference toward zero.

3. In a digital scale system in combination a scale mechanism, apparatus for generating a weight signal representing a weight on the scale mechanism, means responsive to the removal of a weight from said scale mechanism and the generation of a weight signal representing zero weight on the scale mechanism for automatically applying a verification weight signal representing a verification weight to the scale system to check the operation of the scale system.

4. In a digital scale system, in accordance with claim 3, in combination, storage means for storing a verification reference value, comparing means for comparing the verification weight signal with the verification reference value, and display means responsive to the comparison means to display an error display when the verification weight represented by the verification weight signal and the verification reference value differ by more than a predetermined amount.

5. In a digital scale system, in accordance with claim 3, in combination, storage means for storing a span multiplying factor, means for multiplying the weight represented by the weight signal and by the weight represented by the verification weight signal by the span multiplying factor to obtain corrected weights.

6. In a digital scale system, in accordance with claim 5, in combination, storage means for storing a verification reference value, comparing means for comparing the weight represented by the weight verification signal with the stored verification value, and means responsive to the comparison means to change the span multiplying factor to reduce the difference between the verification reference factor and the weight represented by the verification weight signal.

7. In a digital scale system, in accordance with claim 5 in combination, storage means for storing a verification reference value, comparing means for comparing the weight represented by the weight verification signal with the stored verification value, means responsive to the comparison means to change the span multiplying factor by a fraction of the full scale capacity to change the result of the comparison means by a corresponding amount.

8. In a digital scale system, in combination, a scale mechanism apparatus for generating an analog weight signal representing the weight on the scale mechanism, analog circuits for responding to the analog weight signal, analog to digital conversion means for converting the analog signal to digital signals representing the weight on the scale, means for storing a digital span multiplying factor means for multiplying the weight represented by the digital signals by the span multiplying factor to generate a corrected weight signal.

9. In a digital scale system in accordance with claim 8, in combination, means for automatically applying to the analog circuits an analog verification signal representing a verification weight to obtain corrected digital signals representing a corrected verification weight, means for storing a verification digital reference weight value, comparing means for comparing the verification weight represented by the corrected digital weight signals with the stored verification weight value, and means responsive to the comparison means to change the digital span multiplying factor to compensate for a fraction of the difference between the stored verification digital weight value and the corrected verification weight represented by the digital verification weight signals.

10. In a digital scale system in accordance with claim 9, in combination, means for repeatedly automatically applying to the analog circuits the analog verification signal representing the verification weight to obtain a corrected verification weight represented by the digital verification weight signals and further change the span multiplying factor to compensate for a fraction of the difference between the verification digital weight value and the corrected verification weight represented by the digital verification weight signals until the difference between the stored verification digital weight value and the corrected verification weight represented by the digital verification weight signals is reduced below a predetermined minimum value.

11. In a digital scale system in accordance with claim 9, in combination, means to limit the maximum change in the stored span factor.

12. In a digital scale system in accordance with claim 9, in combination, means responsive to the removal of a weight from the scale and a return to a zero indication of the scale system to initiate the automatic application to the analog circuits of the analog verification signal representing a verification weight.

13. In a digital scale system, in accordance with claim 10, in combination, means to display a verification symbol during the application of the analog verification signal representing the verification weight to the analog circuits.

14. A digital scale system comprising in combination, a scale mechanism, apparatus for generating an analog weight signals representing the weight on the scale mechanism, analog circuits for responding to analog weight signals connected to the apparatus for generating analog weight signals, an integrator circuit and program controlled means interconnected with the analog circuits to convert the analog weight signals to digital weight signals representing the weight on the scale, means for storing a digital span multiplying factor, multiplying means for multiplying the weight represented by the digital weight signals by the digital span multiplying factor to obtain a corrected weight, means for storing a reference verification weight value, means responsive to the removal of a weight from the scale and a return to a zero indication of the scale system to automatically apply to the analog circuits an analog signal representing a verification weight, and obtaining a corrected verification weight, means for comparing the corrected verification weight with the stored verification weight value, and means for displaying an error symbol responsive to the comparison means when the stored verification reference value and the corrected verification weight differ by more than a predetermined amount.

15. A digital scale system in accordance with claim 14 comprising in combination, means responsive to the comparison means to change the stored digital span multiplying factor to compensate for a fraction of the difference between the stored verification weight value and the corrected verification weight.

16. A digital scale system in accordance with claim 15 comprising in combination means for automatically repeatedly reapplying the analog signal representing a verification weight until the difference between the stored verification weight value and the corrected verification weight has been reduced to less than a predetermined value.

17. A digital scale system in accordance with claim 14 comprising in combination an additional program controlled means interconnected with the program controlled means to control the display means to display an automatic verification signal in response to the application of the analog signal representing the verification weight to the analog circuits.

18. A digital scale system comprising in combination a scale mechanism, apparatus for generating a weight signal representing a weight on the scale mechanism, means responsive to the removal of a weight from the scale mechanism and the generation of a weight signal representing zero on the scale mechanism for automatically applying a verification weight signal representing a verification weight to the scale system, checking means responsive to the application of the verification weight signal to the scale system to check the operation of the scale system, and means responsive to the application of a weight to the scale mechanism during the operation of the checking means to prevent further operation of the checking means.

19. In a digital scale, in combination, apparatus for generating a verification signal representing a verification weight, storage means for storing a reference verification value, microprocessor means including means for storing a span multiplying factor, the microprocessor means including means for multiplying the verification weight represented by the verification weight signal by the span multiplying factor, the microprocessor means also including means to change the stored span factor when the difference between the stored reference value and the verification weight is within predetermined limits to reduce the difference toward zero.

* * * * *